(12) United States Patent
Hall

(10) Patent No.: US 12,203,279 B2
(45) Date of Patent: Jan. 21, 2025

(54) TRAILER WITH LOADING AND UNLOADING SYSTEM

(71) Applicant: Modology Design Group, Walnut Creek, CA (US)

(72) Inventor: Mark D. Hall, Walnut Creek, CA (US)

(73) Assignee: MODOLOGY DESIGN GROUP, Walnut Creek, CA (US)

( * ) Notice: Subject to any disclaimer, the term of this patent is extended or adjusted under 35 U.S.C. 154(b) by 0 days.

(21) Appl. No.: 18/614,209

(22) Filed: Mar. 22, 2024

(65) Prior Publication Data

US 2024/0309662 A1    Sep. 19, 2024

Related U.S. Application Data

(63) Continuation of application No. 18/408,364, filed on Jan. 9, 2024, which is a continuation of application No. PCT/US2023/019581, filed on Apr. 25, 2023, which is a continuation-in-part of application No. 18/112,942, filed on Feb. 22, 2023, now Pat. No. 11,787,650, and a continuation-in-part of application No. 17/949,467, filed on Sep. 21, 2022, now Pat. No. 11,739,508, and a continuation-in-part of application No. 17/949,477, filed on Sep. 21, 2022, now Pat. No. 11,781,312, said application No. 18/112,942 is a
(Continued)

(51) Int. Cl.
| | |
|---|---|
| *B60P 3/40* | (2006.01) |
| *B62D 53/06* | (2006.01) |
| *B65G 65/00* | (2006.01) |
| *B65G 67/04* | (2006.01) |
| *E04G 21/16* | (2006.01) |

(52) U.S. Cl.
CPC .............. *E04G 21/161* (2013.01); *B60P 3/40* (2013.01); *B62D 53/068* (2013.01); *B65G 65/00* (2013.01); *B65G 67/04* (2013.01)

(58) Field of Classification Search
USPC ...................................... 414/10, 12
See application file for complete search history.

(56) References Cited

U.S. PATENT DOCUMENTS

| 353,007 A | 11/1886 | Sohubert et al. |
| 414,976 A | 11/1889 | Harvey |
| (Continued) | | |

FOREIGN PATENT DOCUMENTS

| CH | 313131 A | 3/1956 |
| CN | 204488601 U | 7/2015 |
| (Continued) | | |

OTHER PUBLICATIONS

Abodu, Inc. retrieved from the Internet: https://abodu.com/, retrieved on Apr. 7, 2022.
(Continued)

*Primary Examiner* — Mark C Hageman
(74) *Attorney, Agent, or Firm* — Foley & Lardner LLP

(57) ABSTRACT

A trailer configured to transport a load includes a bed including an upper surface configured to support the load, a first rotation pin configured to move along a slot in the bed, a second rotation pin coupled to the bed, and a winch assembly positioned in the slot and coupled to the first rotation pin by a first rope. The winch assembly is configured to pull the first rotation pin toward the second rotation pin.

19 Claims, 135 Drawing Sheets

Related U.S. Application Data continuation of application No. 17/941,631, filed on Sep. 9, 2022, now Pat. No. 11,623,830, said application No. PCT/US2023/019581 is a continuation-in-part of application No. 17/941,584, filed on Sep. 9, 2022, now Pat. No. 11,828,058, and a continuation-in-part of application No. 17/940,503, filed on Sep. 8, 2022, now Pat. No. 11,731,551, and a continuation-in-part of application No. 17/940,357, filed on Sep. 8, 2022, now Pat. No. 11,781,310, and a continuation-in-part of application No. 17/940,643, filed on Sep. 8, 2022, now Pat. No. 11,732,463.

(60) Provisional application No. 63/388,536, filed on Jul. 12, 2022, provisional application No. 63/335,725, filed on Apr. 27, 2022.

(56) References Cited

U.S. PATENT DOCUMENTS

| | | |
|---|---|---|
| 1,390,487 A | 9/1921 | Black et al. |
| 1,673,541 A | 6/1928 | Wilson |
| 2,101,837 A | 12/1937 | Blanchett |
| RE20,760 E | 6/1938 | Ludington |
| 2,220,155 A | 11/1940 | Jachim |
| 2,266,791 A | 12/1941 | Norbom |
| 2,786,590 A | 3/1957 | Edwards et al. |
| 2,830,717 A | 4/1958 | Posey |
| 2,966,222 A | 12/1960 | Lambert |
| 2,990,588 A | 7/1961 | McKinley |
| 3,070,850 A | 1/1963 | McClure |
| 3,110,907 A | 11/1963 | King |
| 3,134,464 A | 5/1964 | Markle |
| 3,157,427 A | 11/1964 | Reynolds |
| 3,168,959 A | 2/1965 | Chandler et al. |
| 3,331,170 A | 7/1967 | Lowe et al. |
| 3,338,423 A | 8/1967 | Wellman, Jr. |
| 3,352,438 A | 11/1967 | Davidson |
| 3,442,404 A | 5/1969 | Pioch |
| 3,495,865 A | 2/1970 | Hill |
| 3,516,368 A | 6/1970 | Wright |
| 3,561,625 A | 2/1971 | Dioguardi et al. |
| 3,612,312 A | 10/1971 | Behrmann |
| 3,612,315 A | 10/1971 | Blackburn |
| 3,645,053 A | 2/1972 | Taggart |
| 3,655,236 A | 4/1972 | Hair |
| 3,667,172 A | 6/1972 | Erickson |
| 3,693,754 A | 9/1972 | Butler |
| 3,697,098 A | 10/1972 | Fisher |
| 3,699,731 A | 10/1972 | Arnold |
| 3,719,386 A | 3/1973 | Lambert et al. |
| 3,830,024 A | 8/1974 | Warnke |
| 3,835,600 A | 9/1974 | Padula et al. |
| 3,845,595 A | 11/1974 | Abrams et al. |
| 3,850,283 A | 11/1974 | Nordstrom |
| 3,884,158 A | 5/1975 | Rumell |
| 3,893,531 A | 7/1975 | Gee |
| 3,896,517 A | 7/1975 | Bigelow |
| 3,924,701 A | 12/1975 | Johnstone |
| 3,933,400 A | 1/1976 | Helgeson |
| 3,945,659 A | 3/1976 | Brown |
| 3,958,705 A | 5/1976 | Baxter |
| 3,959,936 A | 6/1976 | Lambooy |
| 3,971,486 A | 7/1976 | Carlsson |
| 3,986,702 A | 10/1976 | Barber |
| 4,017,094 A | 4/1977 | Pilcher |
| 4,036,345 A | 7/1977 | Webb |
| 4,036,377 A | 7/1977 | Weber |
| 4,045,926 A | 9/1977 | Gibbs |
| 4,075,814 A | 2/1978 | Theurer et al. |
| 4,077,532 A | 3/1978 | Bryan |
| 4,077,534 A | 3/1978 | Basso |
| 4,084,834 A | 4/1978 | Becker |
| 4,109,809 A | 8/1978 | Clark |
| 4,121,539 A | 10/1978 | Moore |
| 4,121,742 A | 10/1978 | Biricz et al. |
| 4,129,079 A | 12/1978 | Shannon |
| 4,179,220 A | 12/1979 | Rippon |
| 4,196,555 A | 4/1980 | Henges, Jr. et al. |
| 4,198,797 A | 4/1980 | Soble |
| 4,214,410 A | 7/1980 | Mitsueda |
| 4,222,581 A | 9/1980 | Treadwell et al. |
| 4,225,280 A | 9/1980 | Brunet et al. |
| 4,232,488 A | 11/1980 | Hanley |
| 4,293,412 A | 10/1981 | Lescure |
| 4,296,574 A | 10/1981 | Stephens |
| 4,303,140 A | 12/1981 | Franke et al. |
| 4,320,607 A | 3/1982 | Eubank |
| 4,352,628 A | 10/1982 | Rogers, Jr. |
| 4,419,038 A | 12/1983 | Pendergraft |
| 4,468,901 A | 9/1984 | Henderson et al. |
| 4,484,426 A | 11/1984 | Simms |
| 4,571,900 A | 2/1986 | Kelman |
| 4,598,503 A | 7/1986 | Berger |
| 4,611,817 A | 9/1986 | Dewing et al. |
| 4,701,086 A | 10/1987 | Thorndyke |
| 4,715,159 A | 12/1987 | Hijazi |
| 4,744,111 A | 5/1988 | Tegg et al. |
| 4,746,261 A | 5/1988 | Landoll et al. |
| 4,840,533 A | 6/1989 | Althoff |
| 4,869,030 A | 9/1989 | Clark |
| 4,966,510 A | 10/1990 | Johnson, Jr. |
| 4,986,719 A | 1/1991 | Galbreath |
| 5,000,642 A | 3/1991 | Matoba |
| 5,011,362 A | 4/1991 | Pijanowski |
| 5,094,048 A * | 3/1992 | Woo ................. E04B 1/34352 |
| | | 248/188.4 |
| 5,102,286 A | 4/1992 | Fenton |
| 5,234,308 A | 8/1993 | Mann |
| 5,263,807 A | 11/1993 | Pijanowski |
| 5,347,949 A | 9/1994 | Winston |
| 5,353,558 A | 10/1994 | Shea et al. |
| 5,379,842 A | 1/1995 | Terry |
| 5,384,993 A | 1/1995 | Phillips |
| 5,398,463 A | 3/1995 | Wright |
| 5,400,999 A | 3/1995 | Pavie |
| 5,421,687 A | 6/1995 | Wayman |
| 5,461,832 A | 10/1995 | Smith |
| 5,653,459 A | 8/1997 | Murphy |
| 5,662,453 A | 9/1997 | Gerstner et al. |
| 5,669,745 A | 9/1997 | Anderson |
| 5,689,917 A | 11/1997 | St-Germain |
| 5,701,715 A | 12/1997 | Masters et al. |
| 5,778,604 A | 7/1998 | Snow |
| 5,797,224 A | 8/1998 | Gunthardt |
| 5,816,765 A | 10/1998 | Pijanowski |
| 5,836,636 A | 11/1998 | Adams |
| 5,863,173 A | 1/1999 | Bremner |
| 5,921,742 A | 7/1999 | Gearhart |
| 5,931,262 A | 8/1999 | Greenlaw et al. |
| 5,948,303 A | 9/1999 | Larson |
| 6,027,290 A | 2/2000 | Andre |
| 6,027,295 A | 2/2000 | Geppert et al. |
| 6,035,590 A | 3/2000 | Lindsay |
| 6,050,358 A | 4/2000 | Kays et al. |
| 6,095,545 A | 8/2000 | Bol, II et al. |
| 6,123,499 A | 9/2000 | Thornton et al. |
| 6,126,378 A * | 10/2000 | Landoll ................. B60P 1/6454 |
| | | 414/559 |
| 6,155,770 A | 12/2000 | Warhurst |
| 6,244,417 B1 | 6/2001 | Timmer et al. |
| 6,352,400 B1 | 3/2002 | Forbes |
| 6,516,934 B2 | 2/2003 | Masciarelli, Jr. |
| 6,746,199 B2 | 6/2004 | Carawan et al. |
| 6,779,825 B1 | 8/2004 | Greenert et al. |
| 6,846,144 B2 | 1/2005 | Justice |
| 6,907,695 B2 | 6/2005 | Pierce |
| 7,086,209 B1 | 8/2006 | Pruitt et al. |
| 7,165,370 B1 | 1/2007 | Wolfe |
| 7,192,239 B2 | 3/2007 | Marmur et al. |
| 7,360,983 B2 | 4/2008 | Pate |
| 7,427,183 B2 | 9/2008 | Stabeno |
| 7,452,173 B2 | 11/2008 | Rhodes et al. |

(56) References Cited

U.S. PATENT DOCUMENTS

| | | |
|---|---|---|
| 7,478,984 B2 | 1/2009 | Hofius |
| 7,503,742 B2 | 3/2009 | Smith |
| D596,313 S | 7/2009 | Perrine |
| 7,615,149 B2 | 11/2009 | Hall et al. |
| 7,647,664 B2 | 1/2010 | Petermann et al. |
| 7,658,039 B2 | 2/2010 | Ziegelman |
| 7,749,380 B2 | 7/2010 | Yungner et al. |
| 7,765,745 B2 | 8/2010 | Kmet et al. |
| 7,802,958 B2 | 9/2010 | Garcia et al. |
| 7,901,174 B2 * | 3/2011 | Cullum .................. B64F 1/322 414/500 |
| 7,950,478 B2 | 5/2011 | Terry |
| 7,971,602 B2 | 7/2011 | Lewis |
| 7,985,382 B1 | 7/2011 | Henry et al. |
| 7,992,278 B2 | 8/2011 | Mccrary et al. |
| 8,021,155 B2 | 9/2011 | Rasmussen |
| 8,066,467 B2 | 11/2011 | Hammonds |
| 8,282,331 B2 | 10/2012 | Burns et al. |
| 8,353,661 B2 | 1/2013 | Morasse |
| 8,403,353 B2 | 3/2013 | Fink |
| 8,464,396 B2 | 6/2013 | Westby et al. |
| 8,474,194 B2 | 7/2013 | Tiramani |
| 8,505,249 B2 | 8/2013 | Geary |
| 8,528,962 B2 * | 9/2013 | Wilkie ...................... B60P 3/34 296/26.14 |
| 8,561,358 B2 | 10/2013 | Rowan |
| 8,584,428 B2 | 11/2013 | Pulver |
| 8,595,900 B2 | 12/2013 | Bedkowski et al. |
| 8,621,818 B1 | 1/2014 | Glenn et al. |
| 8,651,510 B2 | 2/2014 | Fankhauser et al. |
| 8,733,029 B2 | 5/2014 | Tiramani |
| 8,739,475 B2 | 6/2014 | Michaud et al. |
| 8,763,315 B2 | 7/2014 | Hartman et al. |
| 8,806,810 B2 | 8/2014 | Olaya |
| 8,826,601 B2 | 9/2014 | Gyory et al. |
| 8,844,209 B1 | 9/2014 | Oliver et al. |
| 8,881,470 B1 | 11/2014 | Lass |
| 8,973,311 B1 | 3/2015 | Nolte et al. |
| 9,017,003 B2 | 4/2015 | Nims et al. |
| 9,115,504 B2 | 8/2015 | Wallance |
| 9,121,168 B2 | 9/2015 | Levy et al. |
| 9,163,423 B1 | 10/2015 | Gill et al. |
| 9,169,633 B2 | 10/2015 | Digregory |
| 9,517,713 B2 | 12/2016 | Honigsberg |
| 9,551,143 B2 | 1/2017 | Saez |
| 9,555,731 B2 | 1/2017 | Konchan et al. |
| 9,611,637 B2 | 4/2017 | Dynon |
| 9,676,399 B1 | 6/2017 | Simko |
| 9,682,645 B2 | 6/2017 | Barber |
| 9,797,123 B2 | 10/2017 | Ryan et al. |
| 9,862,297 B2 | 1/2018 | Dagenais et al. |
| 10,000,939 B1 | 6/2018 | Gill et al. |
| 10,035,547 B1 | 7/2018 | Reyes |
| 10,047,514 B2 | 8/2018 | Sparks et al. |
| 10,066,397 B1 | 9/2018 | Sandburg |
| 10,100,509 B2 | 10/2018 | Smith et al. |
| 10,106,971 B2 | 10/2018 | Villanueva et al. |
| 10,114,231 B1 | 10/2018 | Armstrong et al. |
| D838,005 S | 1/2019 | Zacek et al. |
| 10,167,624 B1 | 1/2019 | Hodgetts |
| 10,208,474 B2 | 2/2019 | Kelly et al. |
| 10,219,961 B2 | 3/2019 | Patel et al. |
| 10,269,273 B1 | 4/2019 | Borden |
| 10,377,289 B2 | 8/2019 | Gentile |
| 10,384,619 B2 | 8/2019 | Wittorf |
| 10,400,439 B2 | 9/2019 | Lim |
| 10,465,375 B2 | 11/2019 | Fay et al. |
| D870,919 S | 12/2019 | Fuster et al. |
| 10,519,647 B2 | 12/2019 | Crozier |
| 10,519,671 B2 | 12/2019 | Tompkins et al. |
| 10,519,704 B2 | 12/2019 | Vemulapati et al. |
| 10,533,333 B2 | 1/2020 | Shin |
| 10,538,384 B2 | 1/2020 | Crowther et al. |
| 10,544,611 B2 | 1/2020 | Nicholas et al. |
| 10,604,056 B2 | 3/2020 | Roth et al. |
| 10,745,906 B1 | 8/2020 | Houston et al. |
| 10,753,711 B2 | 8/2020 | Muth |
| 10,781,627 B2 | 9/2020 | Martens |
| 10,894,676 B2 | 1/2021 | Turpin et al. |
| 10,946,783 B2 | 3/2021 | Cerocchi |
| 11,001,186 B2 | 5/2021 | Bryant |
| 11,007,921 B2 | 5/2021 | Tiramani et al. |
| 11,014,582 B2 | 5/2021 | Coston et al. |
| 11,084,413 B2 | 8/2021 | Rasmussen |
| 11,084,414 B2 | 8/2021 | Bettella |
| 11,117,741 B2 | 9/2021 | Curley |
| 11,180,319 B2 | 11/2021 | Smith et al. |
| 11,305,682 B2 | 4/2022 | Bourdon |
| 11,306,474 B1 | 4/2022 | Condie et al. |
| 11,525,256 B2 | 12/2022 | Tiramani et al. |
| 11,592,210 B2 | 2/2023 | Moskowitz |
| 11,623,830 B1 | 4/2023 | Hall |
| 2002/0020119 A1 | 2/2002 | Oberhofer et al. |
| 2002/0168254 A1 | 11/2002 | Oliver |
| 2004/0037653 A1 | 2/2004 | Kelso |
| 2004/0131453 A1 | 7/2004 | Birtic |
| 2004/0160084 A1 | 8/2004 | Mason et al. |
| 2004/0160086 A1 | 8/2004 | Kerr |
| 2004/0163333 A1 | 8/2004 | Whittaker et al. |
| 2004/0203317 A1 | 10/2004 | Small |
| 2005/0069403 A1 | 3/2005 | Holman |
| 2005/0138867 A1 | 6/2005 | Zhao |
| 2005/0212243 A1 | 9/2005 | Terry |
| 2005/0283371 A1 | 12/2005 | Tiramani |
| 2006/0127664 A1 | 6/2006 | Geary et al. |
| 2007/0266650 A1 | 11/2007 | Cohen et al. |
| 2008/0111327 A1 | 5/2008 | Rhodes et al. |
| 2008/0213074 A1 | 9/2008 | Garcia et al. |
| 2008/0256878 A1 | 10/2008 | Berns et al. |
| 2009/0143940 A1 | 6/2009 | Rhodes et al. |
| 2009/0272046 A1 | 11/2009 | Letscher et al. |
| 2010/0028123 A1 | 2/2010 | Mccrary et al. |
| 2010/0054907 A1 | 3/2010 | Puls |
| 2011/0232543 A1 | 9/2011 | Burroughs et al. |
| 2011/0260533 A1 | 10/2011 | Hardin |
| 2011/0296769 A1 | 12/2011 | Collins et al. |
| 2011/0303215 A1 | 12/2011 | Chuang |
| 2011/0305548 A1 | 12/2011 | Morasse |
| 2012/0102873 A1 | 5/2012 | Rust et al. |
| 2012/0279142 A1 | 11/2012 | Michaud |
| 2012/0311951 A1 | 12/2012 | Letts et al. |
| 2013/0140848 A1 | 6/2013 | Shanley |
| 2013/0160379 A1 | 6/2013 | Balfantz |
| 2013/0199516 A1 | 8/2013 | Snyder |
| 2013/0305626 A1 | 11/2013 | Strickland et al. |
| 2014/0059947 A1 | 3/2014 | Rothwell et al. |
| 2015/0125252 A1 | 5/2015 | Berzen Ratzel |
| 2015/0150388 A1 | 6/2015 | Elliott et al. |
| 2015/0211203 A1 | 7/2015 | Bree |
| 2015/0224906 A1 | 8/2015 | Harrison et al. |
| 2015/0267396 A1 | 9/2015 | Cantin et al. |
| 2016/0138258 A1 | 5/2016 | Schaffert et al. |
| 2016/0208512 A1 | 7/2016 | Saez Blaya |
| 2016/0332554 A1 | 11/2016 | Ambrosio et al. |
| 2016/0339824 A1 * | 11/2016 | Dagenais ............. B62D 63/061 |
| 2017/0129381 A1 | 5/2017 | Ferreira |
| 2017/0217518 A1 | 8/2017 | Vadillo Benavides et al. |
| 2017/0268218 A1 | 9/2017 | Hilton |
| 2018/0298731 A1 | 10/2018 | Bishop |
| 2018/0313075 A1 | 11/2018 | Lucho Do Valle |
| 2019/0251883 A1 | 8/2019 | Borden |
| 2019/0257137 A1 | 8/2019 | Martens |
| 2020/0068737 A1 | 2/2020 | Kamen et al. |
| 2020/0263412 A1 | 8/2020 | Tiramani et al. |
| 2020/0339348 A1 | 10/2020 | Durai |
| 2020/0354946 A1 | 11/2020 | Wilson |
| 2021/0062525 A1 | 3/2021 | Meyer et al. |
| 2021/0070592 A1 | 3/2021 | Schwartz et al. |
| 2021/0102366 A1 | 4/2021 | Reusing |
| 2021/0324644 A1 | 10/2021 | Dicks et al. |
| 2021/0383033 A1 | 12/2021 | Glenn et al. |
| 2022/0018110 A1 | 1/2022 | Stromberg et al. |
| 2022/0058862 A1 | 2/2022 | Glenn et al. |
| 2022/0072990 A1 | 3/2022 | Mitchell |

(56) References Cited

U.S. PATENT DOCUMENTS

| | | |
|---|---|---|
| 2022/0090399 A1 | 3/2022 | Nelson et al. |
| 2022/0154461 A1 | 5/2022 | Oliver et al. |
| 2022/0381050 A1 | 12/2022 | Jaycox et al. |

FOREIGN PATENT DOCUMENTS

| | | |
|---|---|---|
| CN | 107839775 A | 3/2018 |
| CN | 108979203 A | 5/2020 |
| CN | 215513398 U | 1/2022 |
| CN | 113147948 B | 4/2022 |
| DE | 198600344 | 10/1986 |
| DE | 10 2014 002 497 A1 | 8/2014 |
| DE | 10 2019 121 550 A1 | 2/2021 |
| EP | 0 808 780 | 11/1997 |
| EP | 3 592 923 | 1/2020 |
| FR | 2602725 | 2/1988 |
| KR | 101621658 B1 | 5/2016 |
| SU | 935336 A1 | 6/1982 |
| WO | WO-2013/040237 | 3/2013 |
| WO | WO-2020/188394 | 9/2020 |
| WO | WO-2021/070100 | 4/2021 |
| WO | WO-2022/068411 | 4/2022 |

OTHER PUBLICATIONS

Ark Shelter retrieved from the Internet: https://www.ark-shelter.com/gallery, retrieved on Apr. 7, 2022.

Boxabl Inc. retrieved from the Internet: https://www.youtube.com/watch?v=nyzzgxBu9yA, retrieved on Apr. 6, 2022.

Connect Homes retrieved from the Internet: https://vimeo.com/136766477, retrieved on Apr. 6, 2022.

Drop Structures retrieved from the Internet: https://www.dropstructures.ca/, retrieved on Apr. 7, 2022.

E-glamp retrieved from the Internet: https://www.yankodesign.com/2021/03/23/this-solar-powered-tiny-house-has-an-integrated-e-bike-system-to-boost-sustainable-local-tourism/, retrieved on Apr. 7, 2022.

EcoCapusle 6Pack retrieved from the Internet: https://www.ecocapsule.sk/sixpack, retrieved on Apr. 7, 2022.

EcoCapusle SPACE retrieved from the Internet: https://www.ecocapsule.sk/space, retrieved on Apr. 7, 2022.

Ecoliv Buildings Pty Ltd. retrieved from the Internet: https://ecoliv.com.au/modular-homes/designs/, retrieved on Apr. 7, 2022.

Haus.me Inc. retrieved from the Internet: https://haus.me/gallery/, retrieved on Apr. 6, 2022.

IO House retrieved from the Internet: https://iohouse.se/thespace/, retrieved on Apr. 7, 2022.

Kodasema retrieved from the Internet: https://www.instagram.com/kodasema/?hl=en, retrieved on Apr. 7, 2022.

Mighty Buildings, Inc. retrieved from the Internet: https://mightybuildings.com/mks, retrieved on Apr. 7, 2022.

Miles Tow Trucks, retrieved from the Internet: https://www.youtube.com/watch?v=OnlUg9IVyGs, retrieved on Apr. 22, 2022.

Moliving Inc. retrieved from the Internet: https://www.moliving.com/how-it-works, retrieved on Apr. 7, 2022.

Nestron House Pte. Ltd. retrieved from the Internet: https://nestron.house/product/, retrieved on Apr. 6, 2022.

Sunset BUD LivingHome—Plant Prefab, Inc. retrieved from the Internet: https://www.plantprefab.com/, retrieved on Apr. 7, 2022.

Tommy Gate, retrieved from the Internet: https://www.tommygate.com/liftgates/flatbed-and-van/railgate-series-high-cycle/, retrieved on Apr. 22, 2022.

Tri-Tainer, retrieved from the Internet: https://www.youtube.com/watch?v=gGS_2OFdPtE&list=TLGGtc_0GlCrsjgwODA0MjAyMg&t=20s, retrieved on Apr. 22, 2022.

Zennihome, LLC retrieved from the Internet: https://zennihome.com/pages/citizen, retrieved on Apr. 6, 2022.

ZeroHouse retrieved from the Internet: https://home.howstuffworks.com/zero-house.htm, retrieved on Apr. 7, 2022.

PCT International Prelim. Report on Patentability and Written Opinion dated Nov. 7, 2024 in International Application No. PCT/US2023/019581.

* cited by examiner

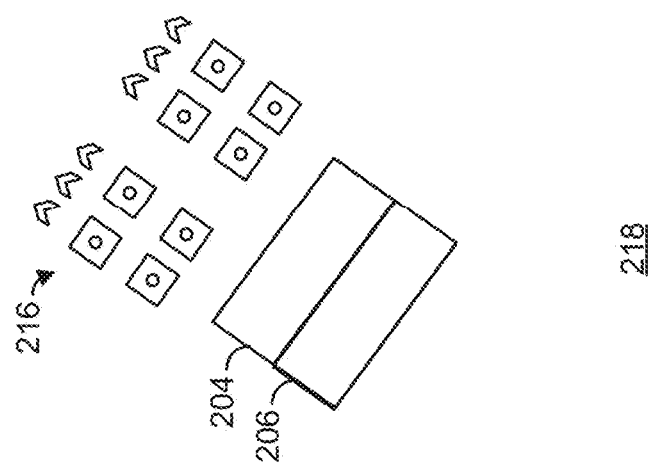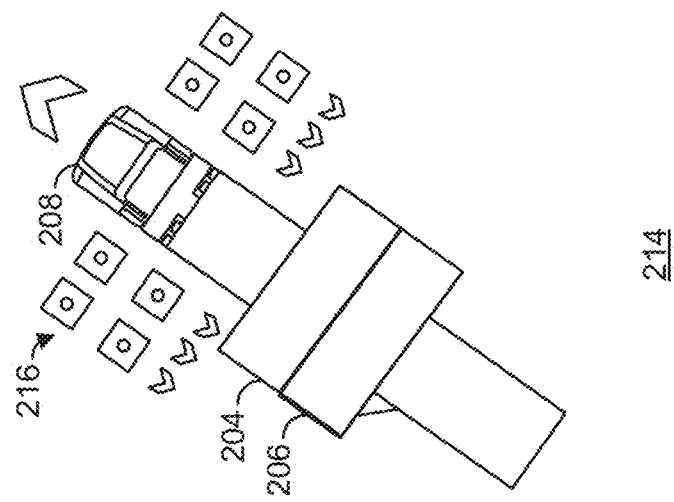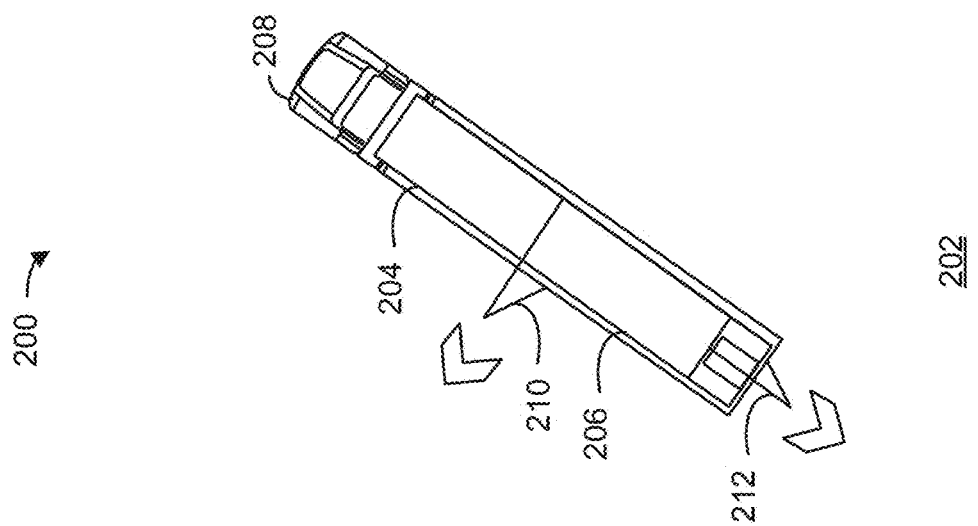

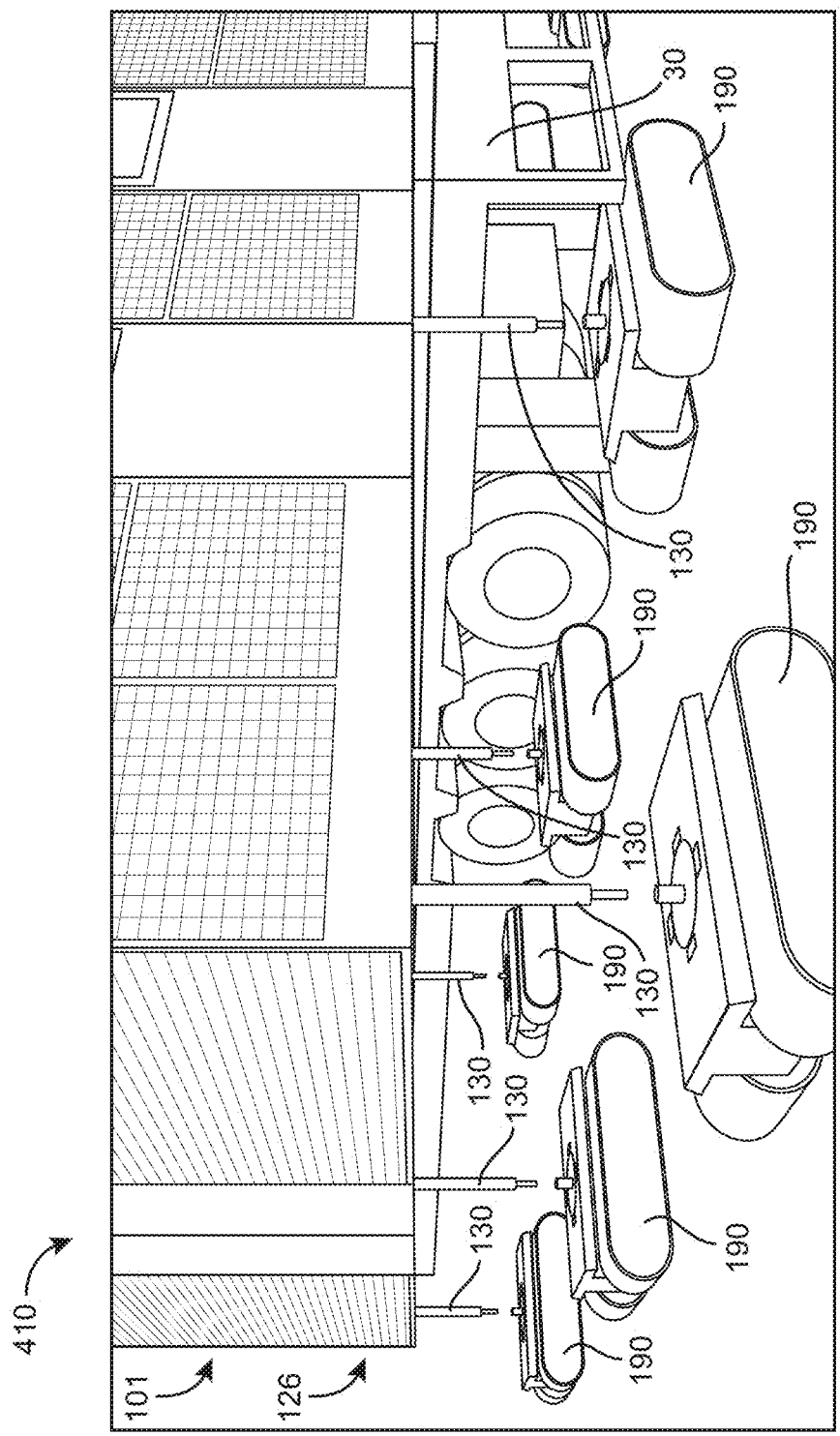

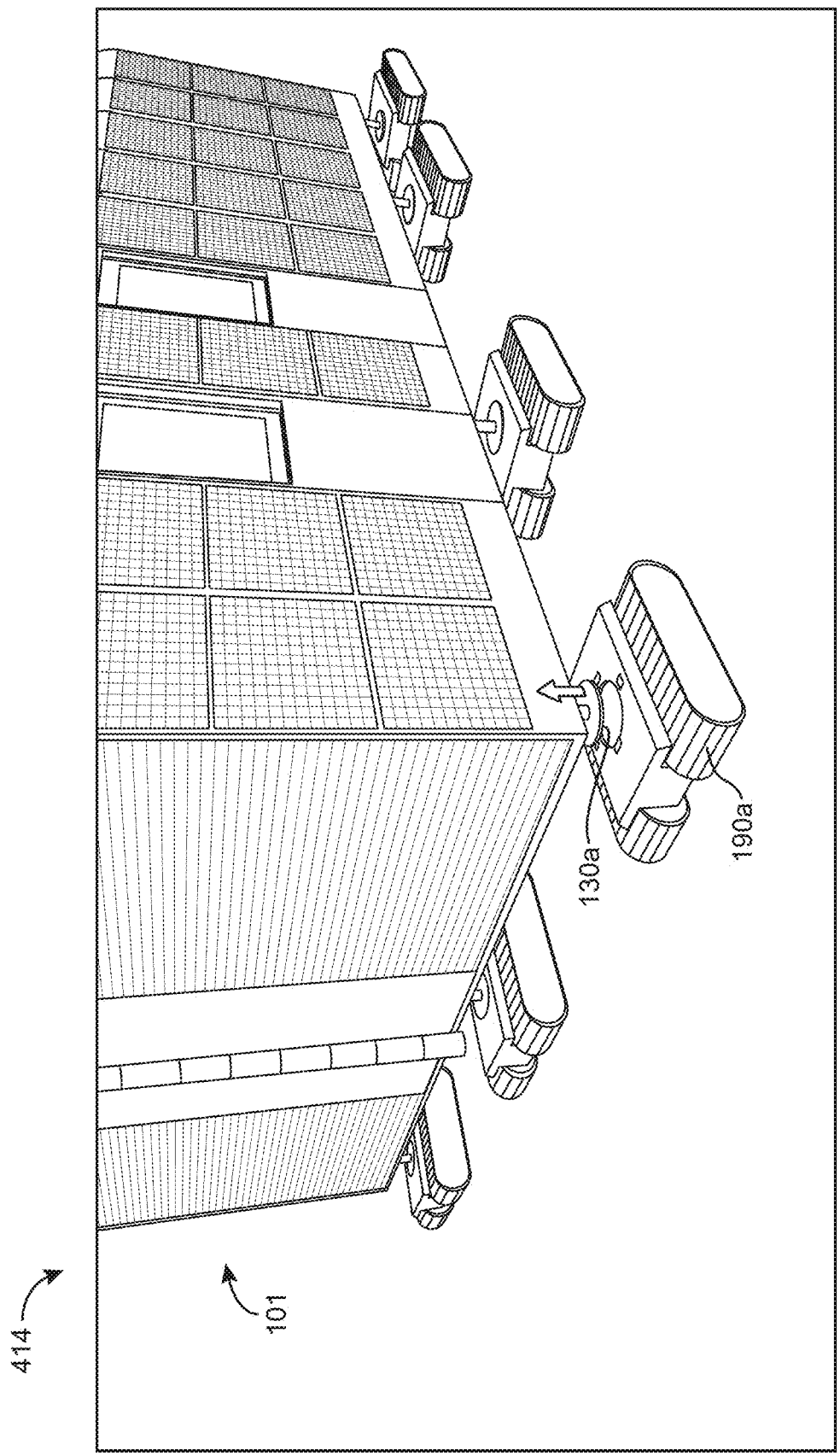

900

Transport a modular home from a first location to a second location with a hinge pin positioned in an upper bore of a first hinge leaf coupled to a first portion of the modular home while maintaining separation between the hinge pin and a second hinge leaf coupled to a second portion of the modular home — 902

Move the hinge pin to a position at which the hinge pin is partially received in the upper bore and partially received in a lower bore of the second hinge leaf — 904

Position a modular home on a surface comprising a plurality of ball transfer units with the modular home supported by at least one skid plate coupled to the modular home and with a rotation pin coupled to the surface inserted into a pin socket positioned above a first skid plate around a circular hole in the first skid plate

1454

Rotate the modular home about the rotation pin such that the at least one skid plate moves across the surface supported only by the ball transfer units

FIG. 14D

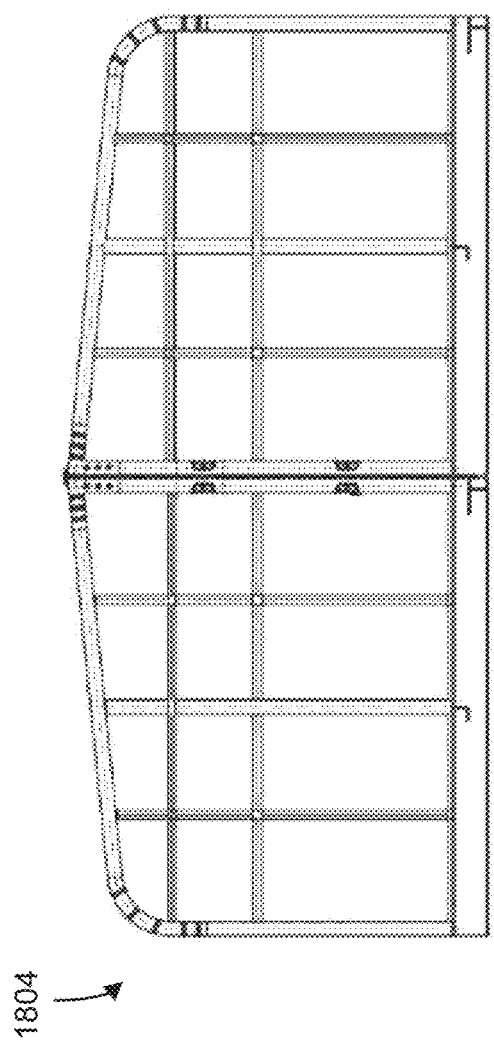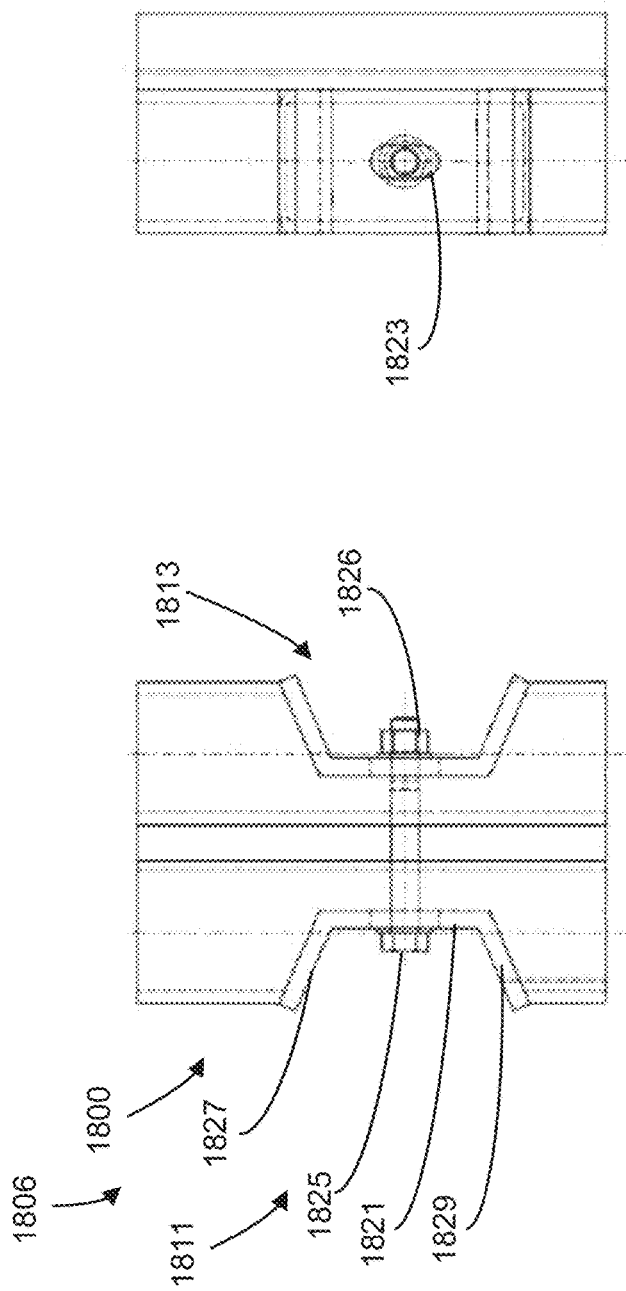

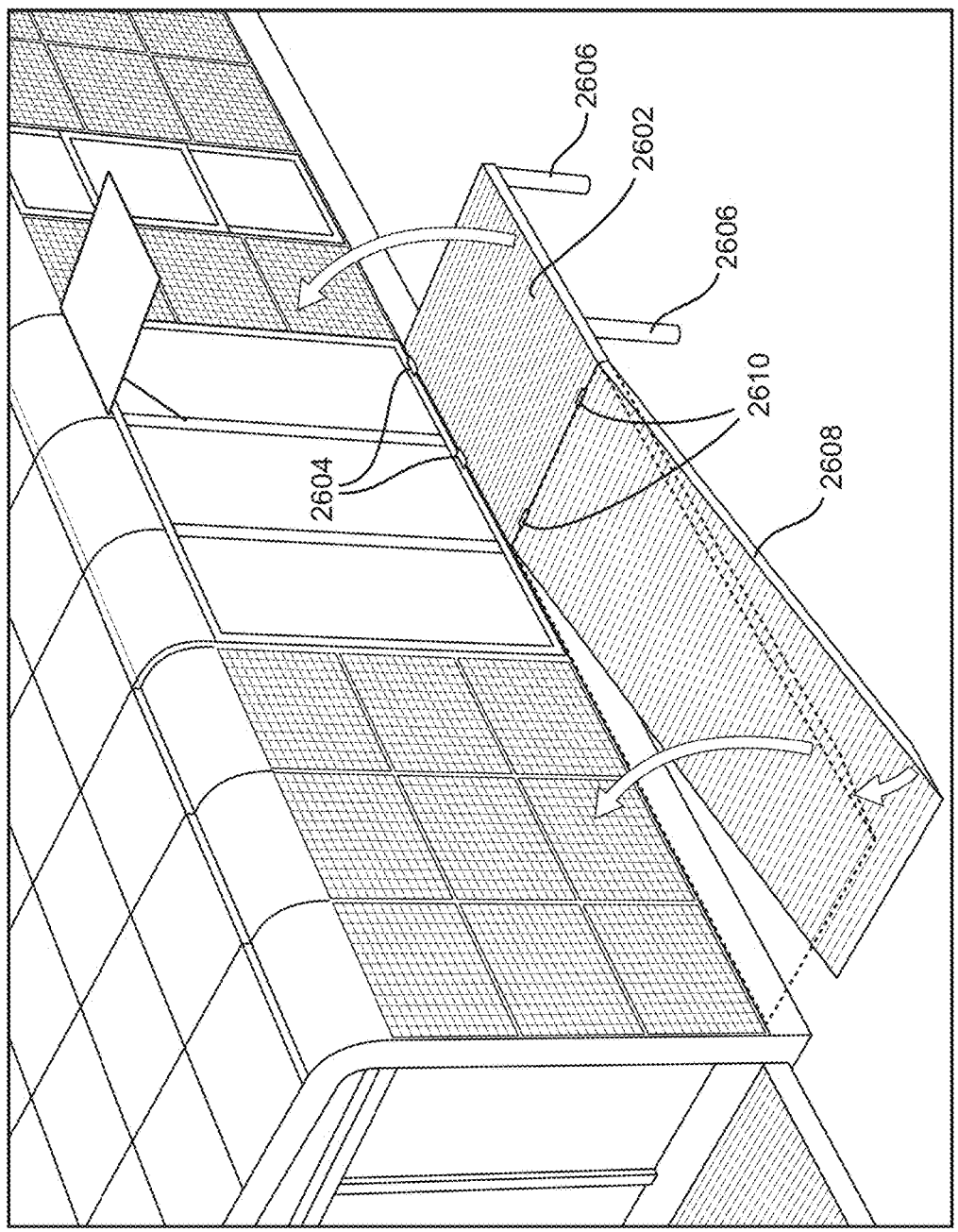

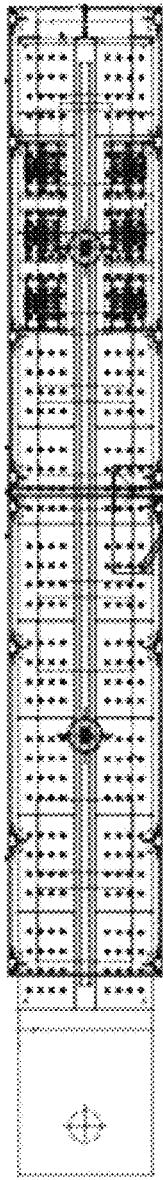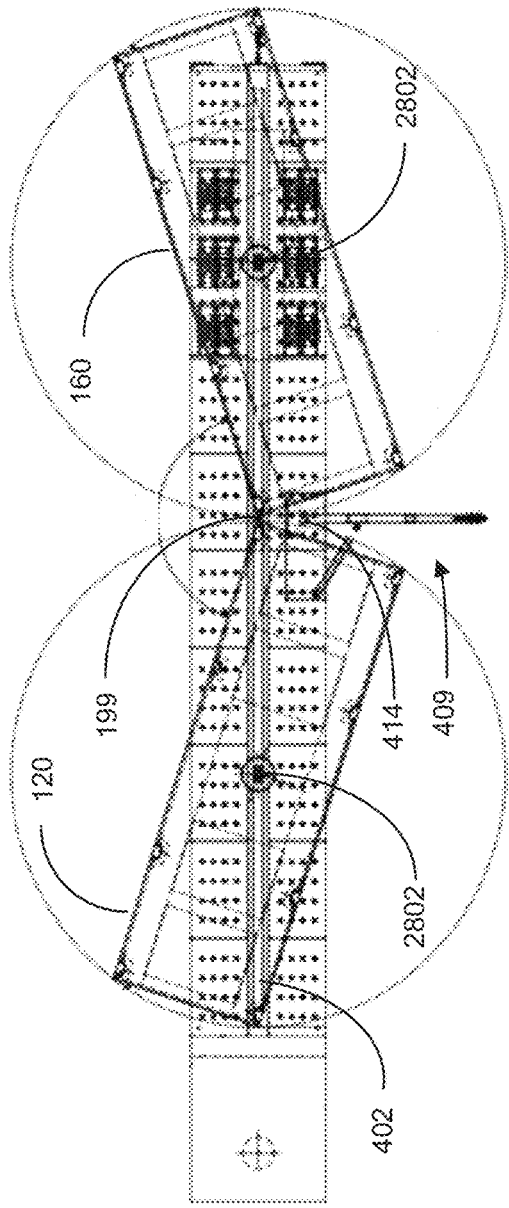
FIG. 29A
FIG. 29B

3200

3202 — Position a load on a trailer with a plurality of ball transfer units on a bed of the trailer, and rotatably couple the load to a rotation pin 3204 — Extend an extendable winch way from the trailer bed 3206 — Couple a rope to the load 3208 — Pull the rope with the winch to rotate the load about the rotation pin

FIG. 32

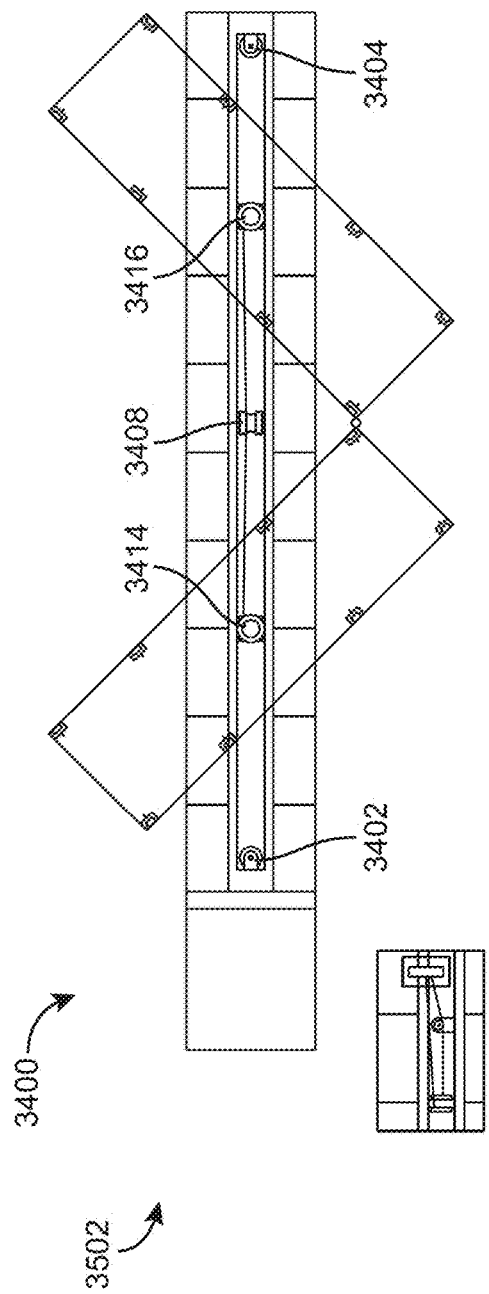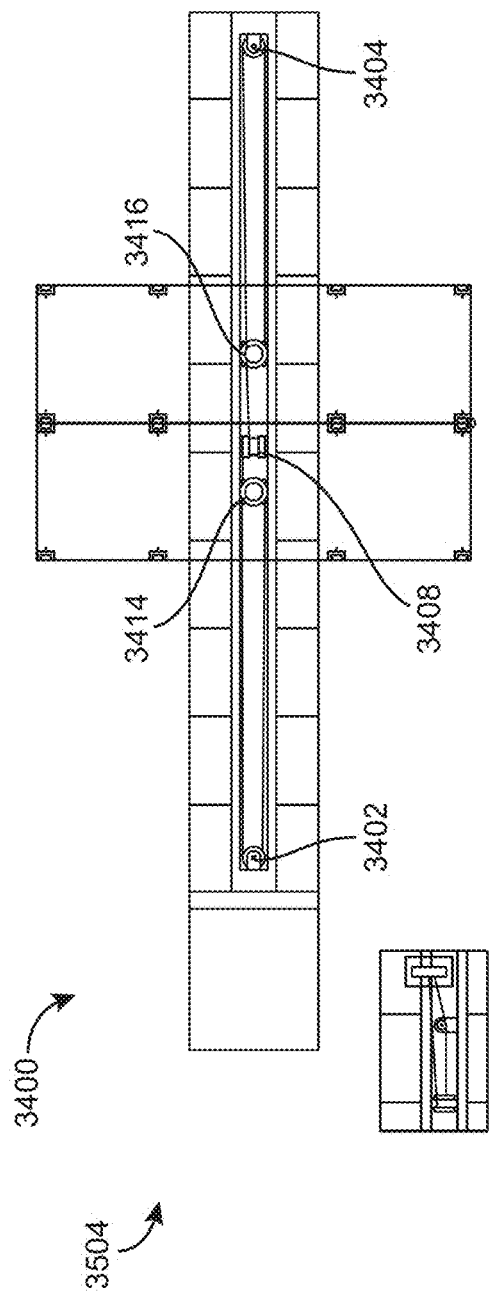

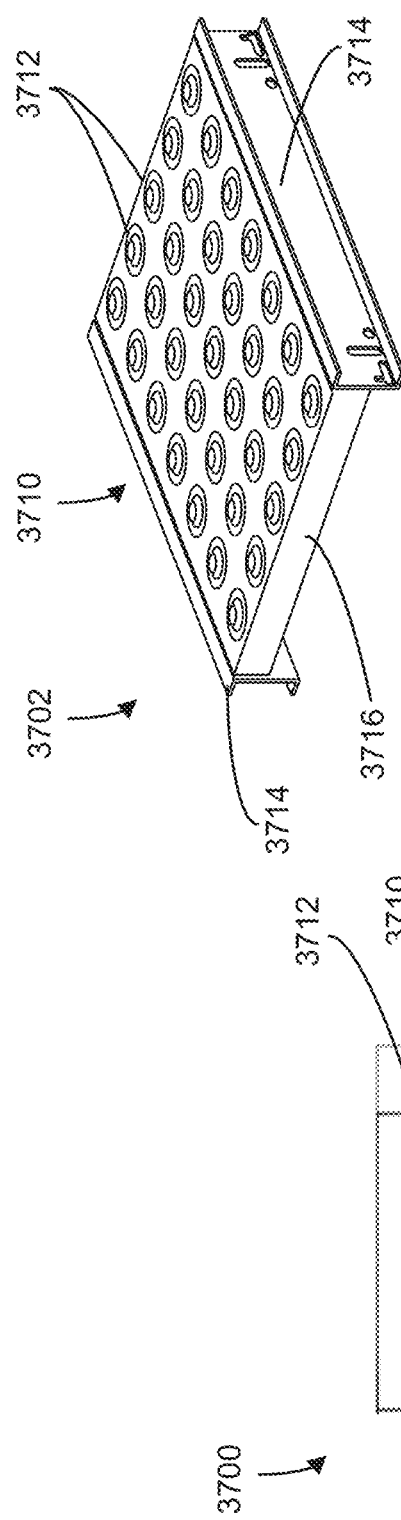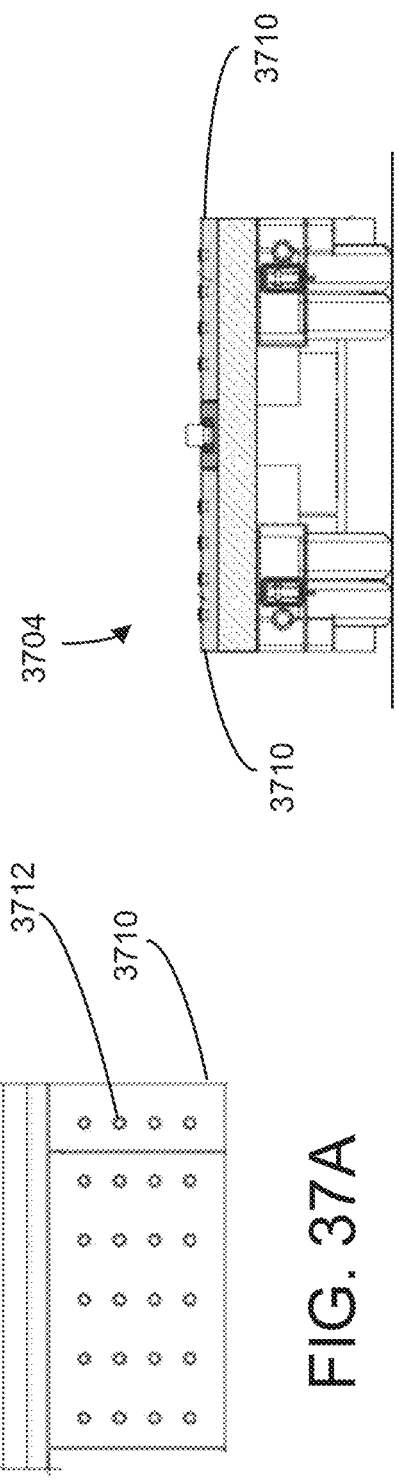
FIG. 37B
FIG. 37C
FIG. 37A

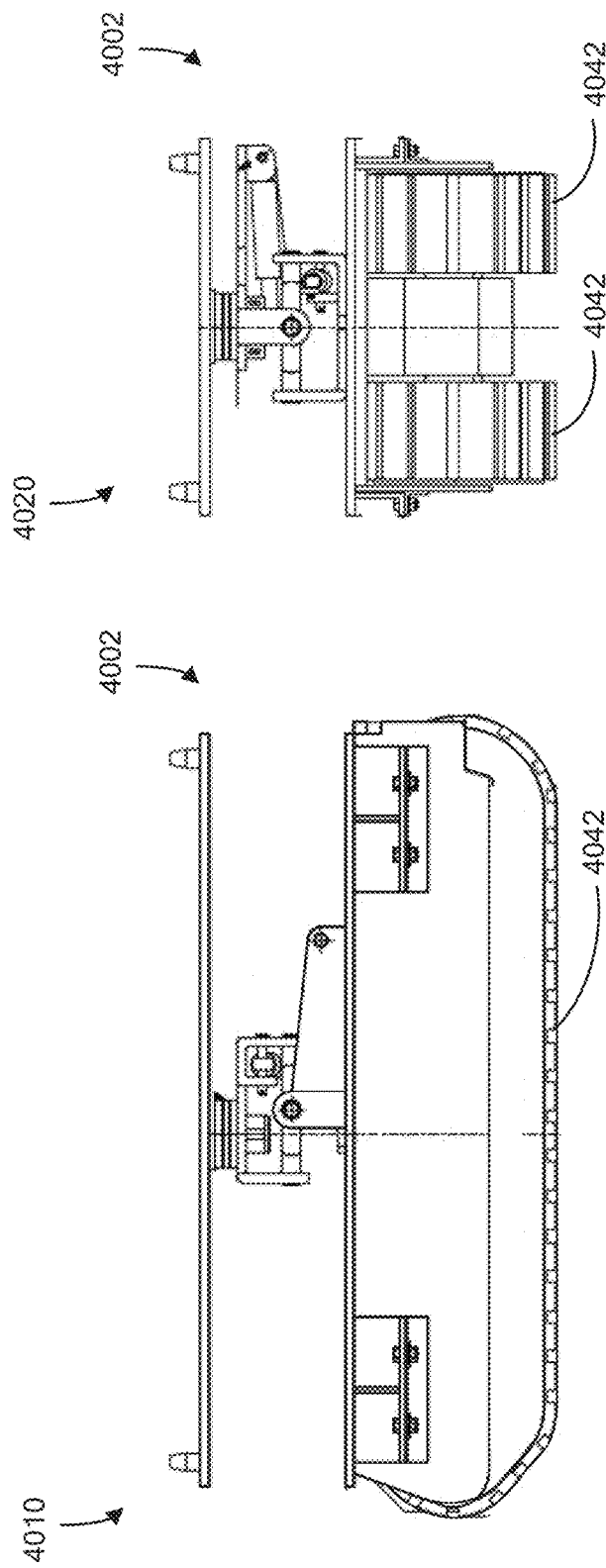
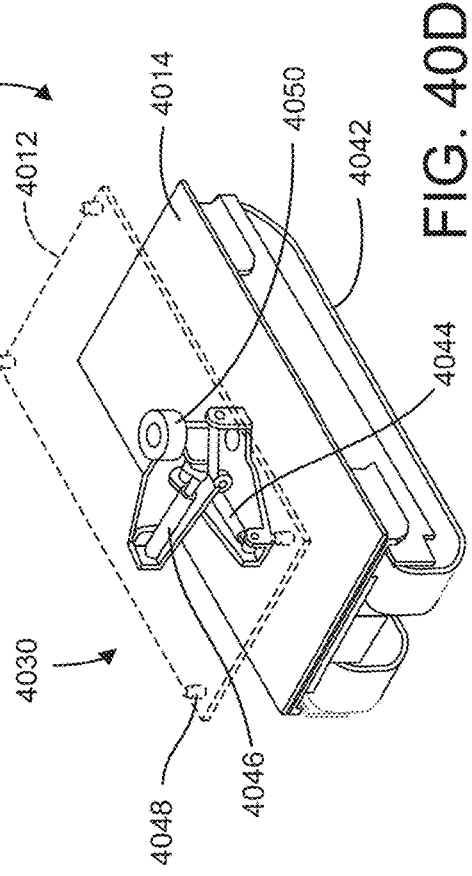
FIG. 40B
FIG. 40C
FIG. 40D

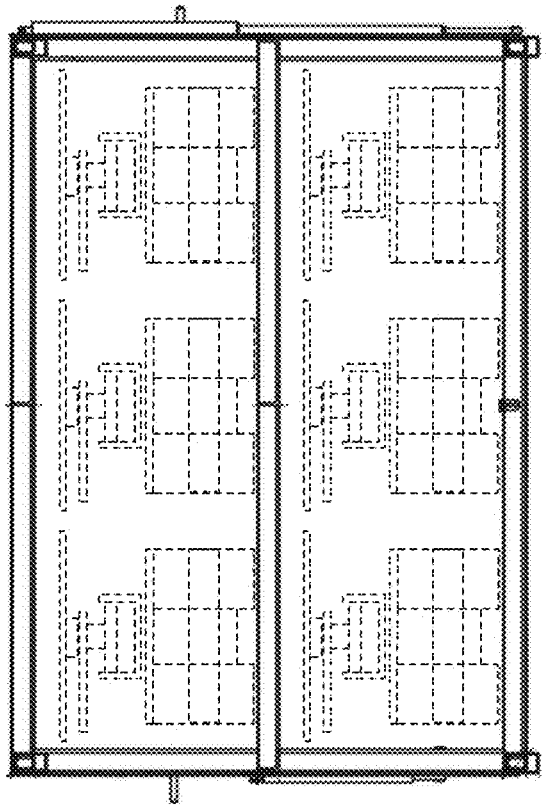
FIG. 43G

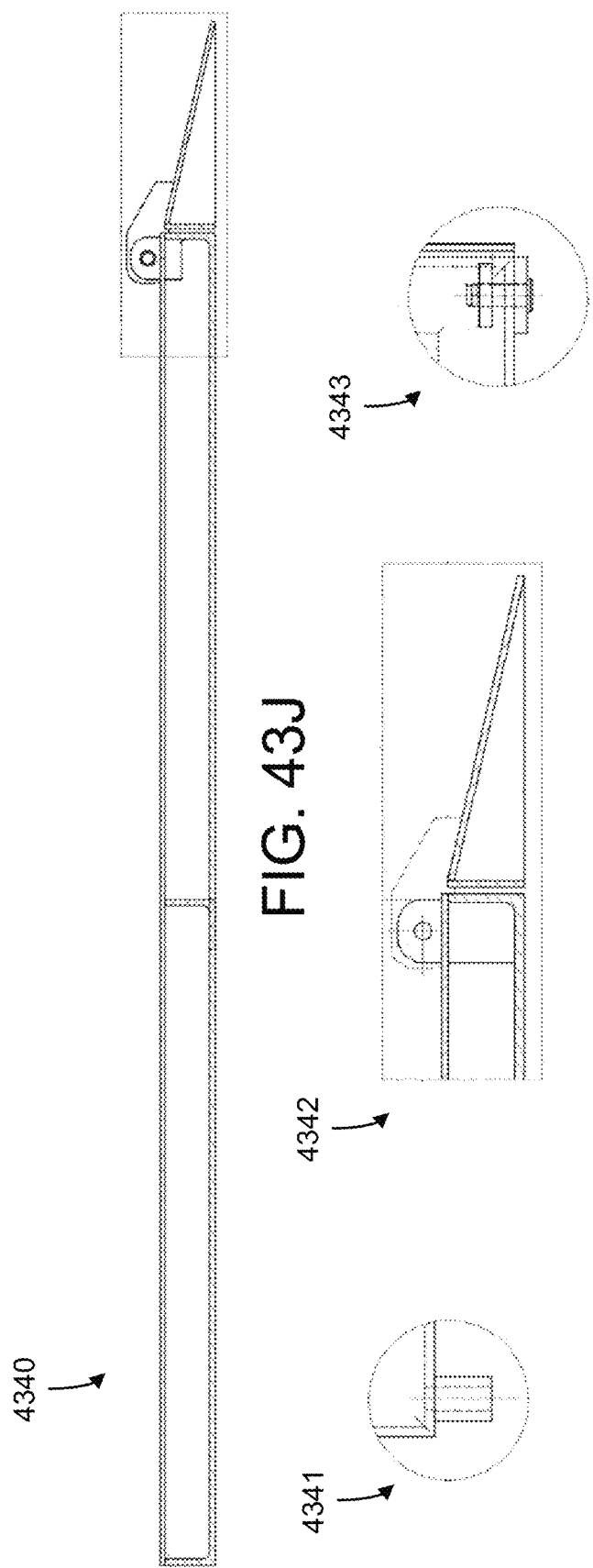

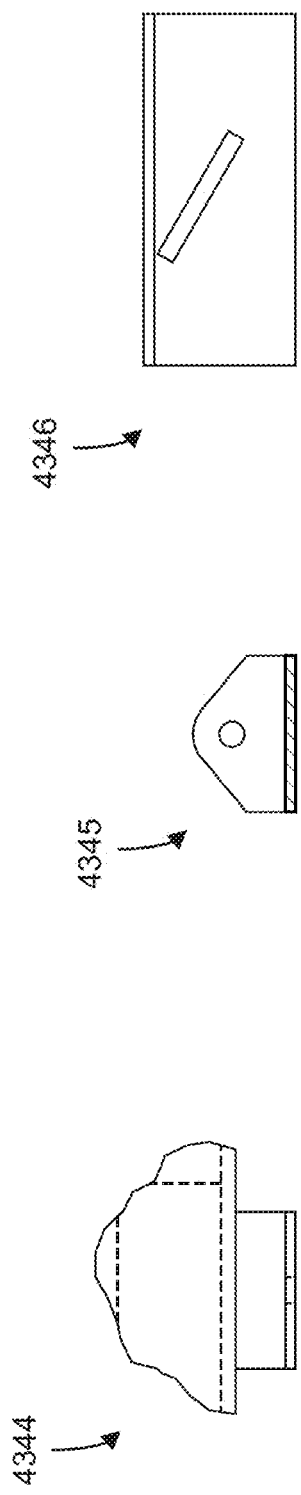
FIG. 43N
FIG. 43O
FIG. 43P
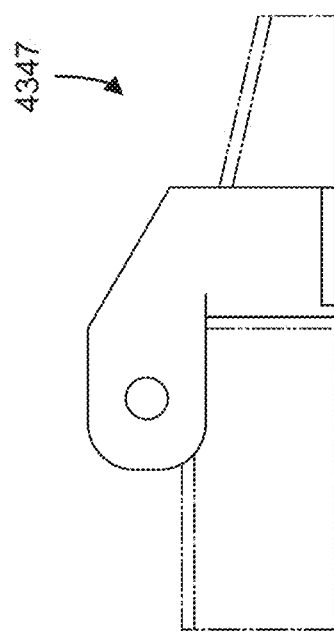
FIG. 43Q

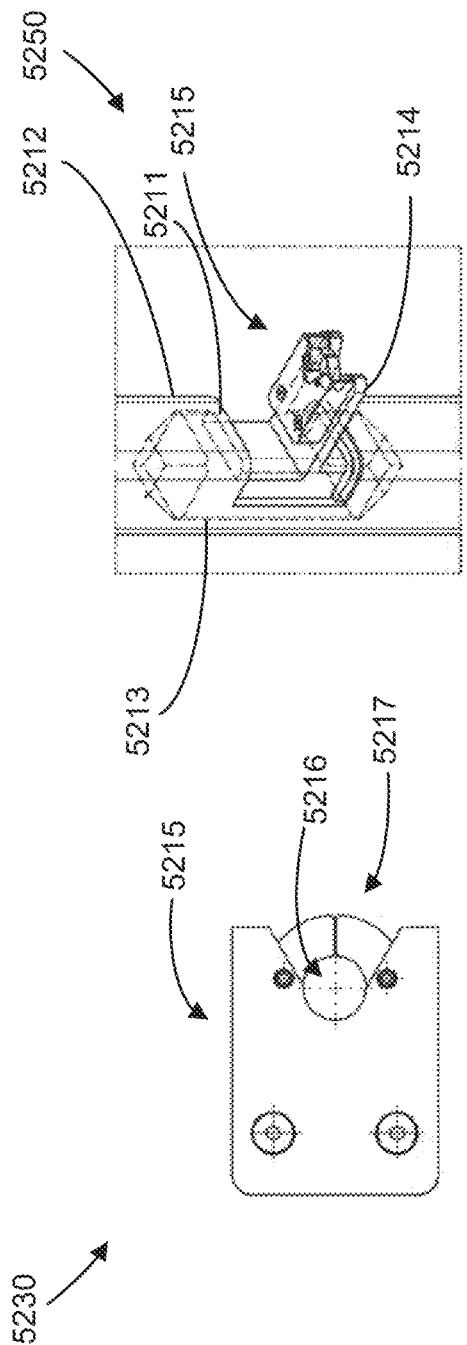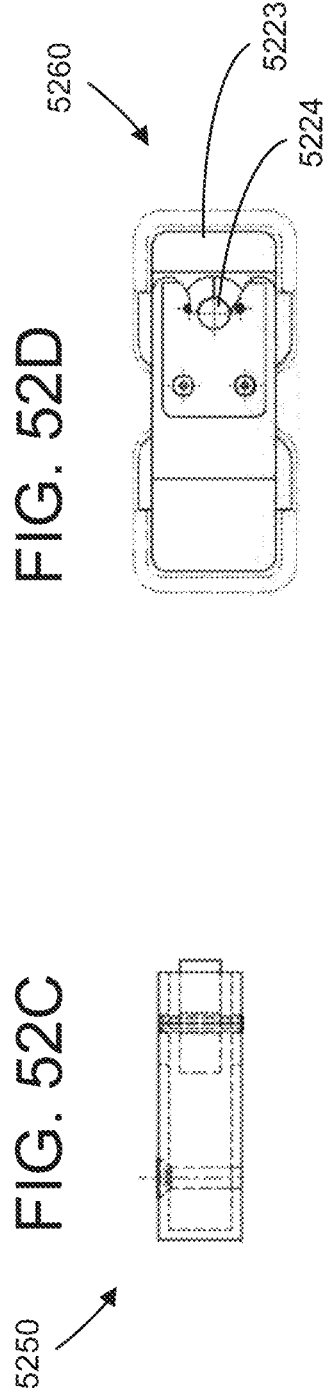

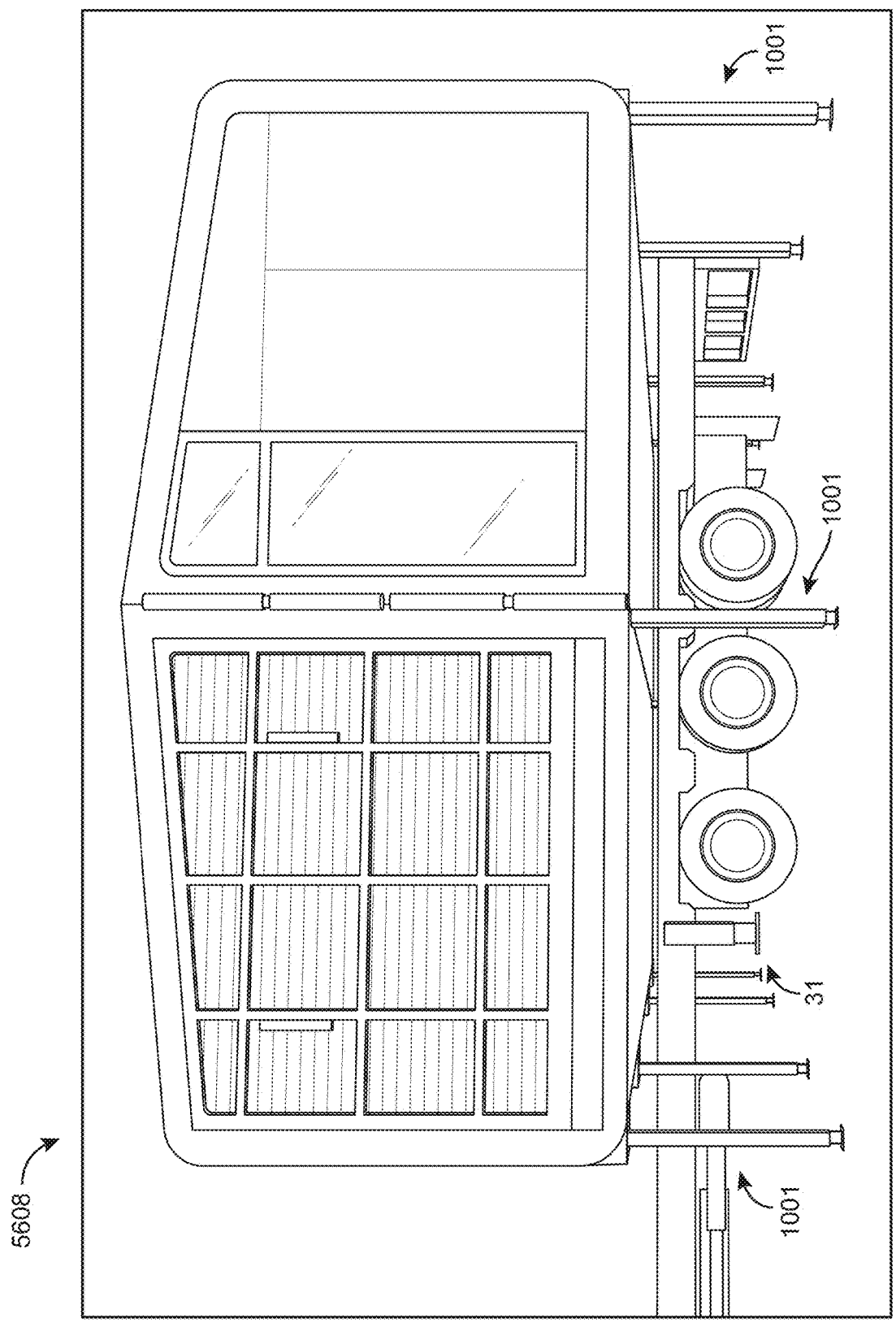

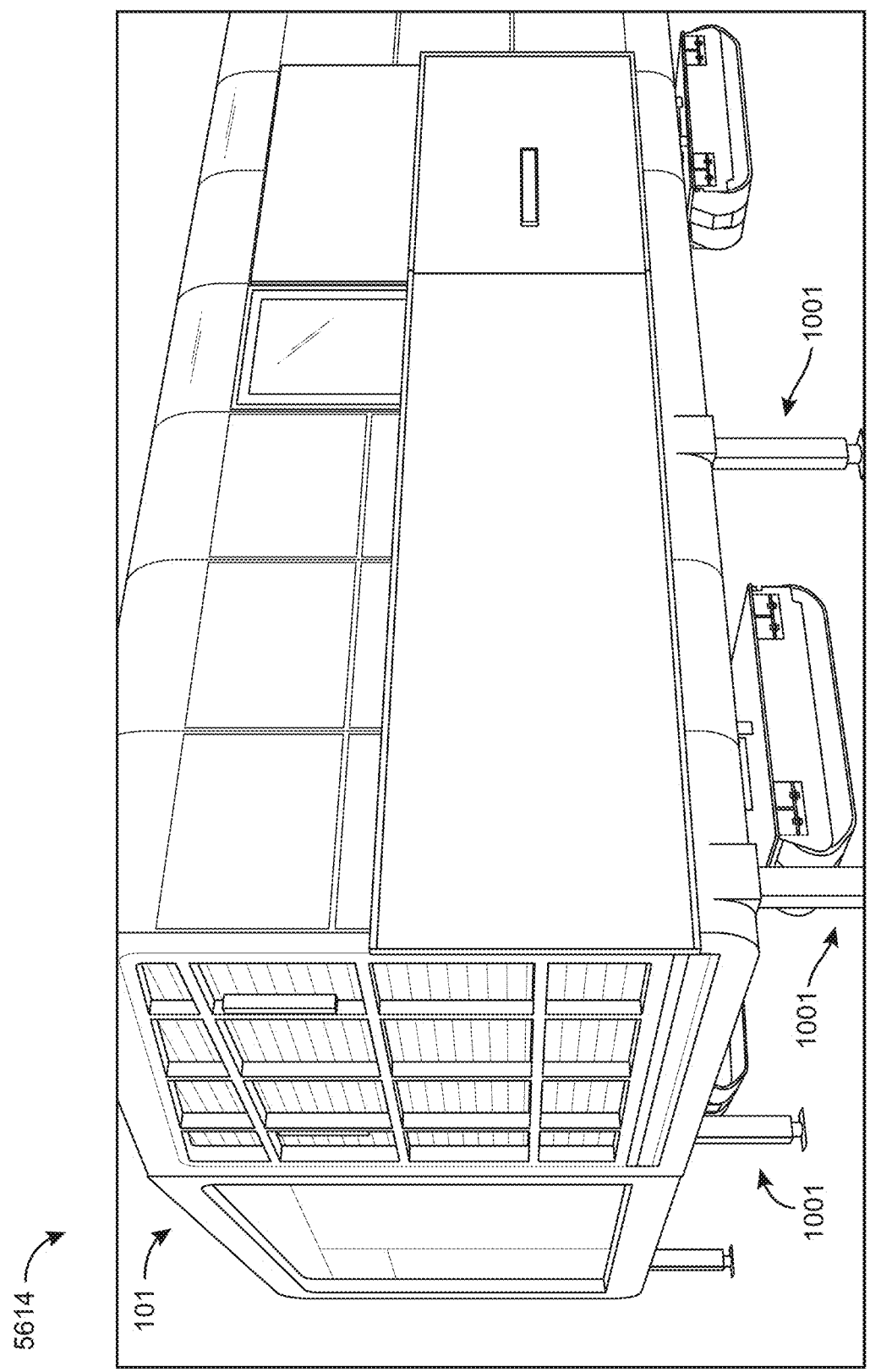

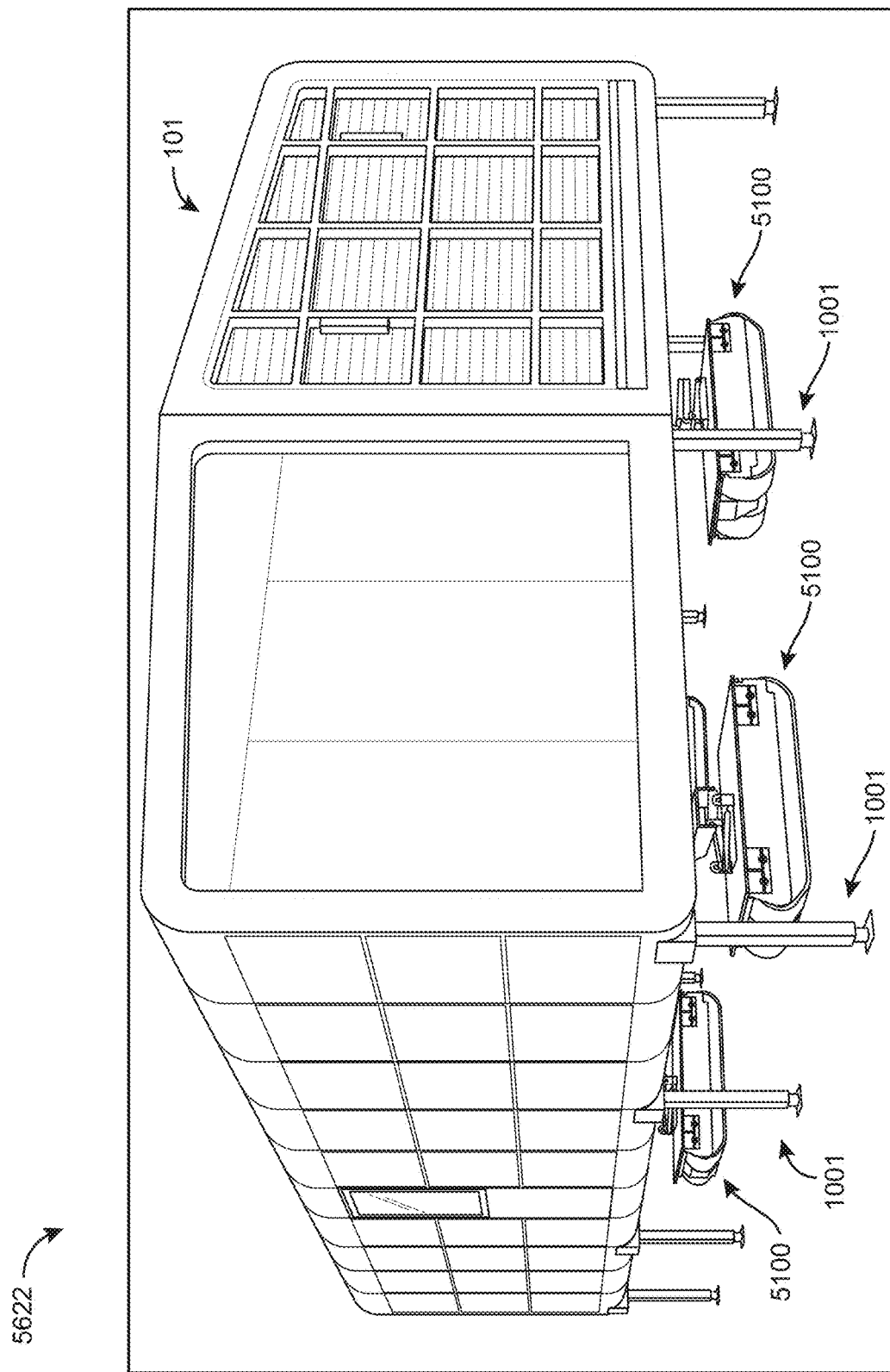

TRAILER WITH LOADING AND UNLOADING SYSTEM

CROSS-REFERENCE TO RELATED PATENT APPLICATIONS

The present application is a continuation of U.S. patent application Ser. No. 18/408,364, filed Jan. 9, 2024, which is a bypass continuation of International Application No. PCT/US2023/019581, filed Apr. 25, 2023, which claims the benefit of and priority as a continuation-in-part of U.S. patent application Ser. No. 17/949,477, filed Sep. 21, 2022, U.S. patent application Ser. No. 17/949,467, filed Sep. 21, 2022, U.S. patent application Ser. No. 17/940,357, filed Sep. 8, 2022, U.S. patent application Ser. No. 17/941,584, filed Sep. 9, 2022, U.S. patent application Ser. No. 17/940,643, filed Sep. 8, 2022, U.S. patent application Ser. No. 17/940,503, filed Sep. 8, 2022, and U.S. patent application Ser. No. 18/112,942, filed Feb. 22, 2023, which is a Continuation of U.S. patent application Ser. No. 17/941,631, filed Sep. 9, 2022, all of which claim the benefit of and priority to U.S. Provisional Patent Application No. 63/335,725, filed Apr. 27, 2022 and U.S. Provisional Patent Application No. 63/388,536, filed Jul. 12, 2022. All of the above-listed applications are hereby incorporated by reference herein in their entireties.

BACKGROUND

Modular housing has become more and more popular as a cost-effective and efficient method of constructing homes. Many construction companies are reverting to modular housing because the pre-fabricated modules of the houses can be assembled off-site in a repeatable and controlled manner such that each house does not have to have a bespoke design that varies between houses, even between those that have the same specifications. Further, because construction companies can manufacture the pre-fabricated modules off-site in a controlled environment, the companies may incur fewer construction flaws in the modules, thus providing cost savings for homeowners down the road as the construction flaws may need to be resolved or cause other issues that need to be resolved.

Despite the many benefits of manufacturing modular houses off-site, current modular housing manufacturers have issues transporting the different modular homes to their final destination. The manufacturers often need to load modules of the modular homes onto separate trucks and transport the modules separately. The manufacturers may then need to use a crane to lift the different modules off of the transport trucks and onto their final building site. This process can be prohibitively expensive and may cause the modular homes to be permanent fixtures at their off-loading site.

SUMMARY

Implementations of the systems and methods described herein overcome the aforementioned deficiencies through a sequence of dividing a modular home into unique portions and transporting the unique portions to a defined destination on a single trailer bed. For example, a manufacturer may fabricate two halves of a modular home at a manufacturing site. The manufacturer may load the two halves onto a trailer such that the two halves lay longitudinally flush to the trailer bed. The trailer may then transport the two halves of the modular home to a defined destination. Upon reaching the destination, an apparatus coupled to the trailer may rotate and fold the two housing portions together. The two portions may be connected after the apparatus completes rotation. In this way, a construction company can transport a modular home to a defined building site using a divided modular home and apparatus on a trailer bed.

To remove the modular home from the trailer bed, an implementation of the systems and methods described herein may use a series of load-bearing robotic crawlers. For example, in addition to loading the modular home onto the trailer, the manufacturer may also load a crawler housing (e.g., a crawler hotel) onto the trailer. After the trailer travels to and parks at the defined location and the two portions of the housing are coupled together, the robotic crawlers may leave the crawler hotel and park underneath areas of the now connected modular home that extend outside of the trailer. Legs from the modular home may extend onto the crawlers to lift the modular home off of the trailer. The crawlers may then move in unison to transport the modular home to a defined location. The crawlers may then individually move away from the modular home through a sequence of lifting one leg off a crawler at a time and extending the legs to rest on the ground to support the modular home. The legs may then retract, causing the modular home to lower and enter a final building site. In this way, a manufacturer may transport a modular home to its final resting position without using a crane and/or without human intervention.

In some embodiments, the legs from the modular home do not interface with the crawlers. Instead, when the modular home is positioned on the trailer, the legs extend from the modular home to the ground and lift the modular home off of the trailer. The trailer can then be driven out from under the modular home. Crawlers with upper support platforms may then move underneath the modular home, and the legs may retract to lower the modular home such that a lower surface of the modular home rests on and is supported by the support platforms. With the support platforms supporting the modular home, the crawlers may then move in unison to an installation site of the modular home. Once the modular home is positioned above the installation site, the legs may again extend form the modular home to the ground and lift the modular home off of the support platforms of the crawlers. The crawlers can then be moved out from under the modular home, and the legs can retract to lower the modular home to an installed height.

Methods of Unloading Modular Structure

In accordance with some aspects of the disclosure, method of unloading a modular structure from a trailer is disclosed. The method includes extending a plurality of linear actuators coupled to overhanging portions of a modular structure positioned on a bed of a trailer until the linear actuators engage the ground and lift the modular structure off of the trailer, the overhanging portions overhanging from edges of the bed of the trailer. The method further includes sending instructions to one or more crawlers, receipt of the instructions causing the one or more crawlers to move under the modular structure, retracting the plurality of linear actuators to lower the modular structure such that a lower surface of the modular structure rests on and is supported by a platform positioned on each of the one or more crawlers, sending instructions to the one or more crawlers, receipt of the instructions causing the one or more crawlers to move the modular structure to an installation location, extending the plurality of linear actuators until the linear actuators engage the ground and lift the modular structure off of the one or more crawlers, sending instructions to the one or more crawlers, receipt of the instructions causing the one or more crawlers to move out from under the modular structure, and retracting the plurality of linear actuators to lower the modular structure to an installed height.

In accordance with some aspects of the disclosure, another method of unloading a modular structure from a trailer is disclosed. The method includes extending a plurality of linear actuators coupled to and positioned around a perimeter of a modular structure positioned on a bed of a trailer until the linear actuators contact the ground and lift the modular structure off of the bed of the trailer. The method further includes sending instructions to one or more crawlers, receipt of the instructions causing each crawler to travel between the linear actuators to a position under a lower surface of the modular structure. The method further includes retracting the plurality of linear actuators to lower the modular structure such that the lower surface of the modular structure rests on and is supported by an upper platform of each of the one or more crawlers, and sending instructions to the one or more crawlers, receipt of the instructions causing the one or more crawlers to travel across the ground to carry the modular structure to an installation location.

In accordance with some aspects of the disclosure, a method of unloading a load from a trailer is disclosed. The method includes positioning a load on a bed of a trailer and extending a plurality of linear actuators coupled to the load until the linear actuators engage the ground and lift the load off of the trailer. The method further includes sending instructions to one or more crawlers, receipt of the instructions causing the one or more crawlers to move under the load, retracting the plurality of linear actuators to lower the load onto the one or more crawlers, and sending instructions to the one or more crawlers, receipt of the instructions causing the one or more crawlers to move the load to a destination location. The method further includes extending the plurality of linear actuators until the linear actuators engage the ground and lift the load off of the one or more crawlers, sending instructions to the one or more crawlers, receipt of the instructions causing the one or more crawlers to move out from under the load, and retracting the plurality of linear actuators to lower the load.

Structure of a Trailer for a Single-Portion Generic Load with No Hinge and Method of Rotating the Load Using the Boom and a Stationary Pin In accordance with some aspects of the disclosure, a trailer configured to transport a load comprising a lower surface and a pin socket is disclosed. The trailer includes a bed comprising an upper surface configured to support the load, a first rotation pin extending above the upper surface of the bed, and a winch assembly coupled to a first lateral side of the trailer and comprising a first winch and a boom. The boom is configured to extend outward from the first lateral side of the trailer, and the first winch is configured to be connected to the load and to rotate the load about the first rotation pin. When the load is positioned on the bed, a distance from the lower surface of the load to an upper surface of the pin socket is greater than a distance from the lower surface of the load to an upper surface of the first rotation pin.

In accordance with some aspects of the disclosure, a method of rotating a load comprising a lower surface and a pin socket on a trailer is disclosed. The method includes positioning the load on a bed of the trailer. The trailer includes a rotation pin coupled to the bed of the trailer, and a winch assembly coupled to a first lateral side of the bed of the trailer. The winch assembly includes a winch and a boom. Positioning the load on the trailer includes rotatably coupling the pin socket to the rotation pin. When the load is positioned on the bed of the trailer, a distance from the lower surface of the load to an upper surface of the pin socket is greater than a distance from the lower surface of the load to an upper surface of the rotation pin. The method further includes moving the boom to an extended position away from the bed of the trailer, coupling a rope to the load, and pulling the rope with the winch to rotate the load about the rotation pin.

In accordance with some aspects of the disclosure, another trailer configured to transport a load including a lower surface and a pin socket is provided. The trailer includes a bed comprising an upper surface configured to support the load, the upper surface including at least one of a plurality of ball transfer units or a low friction material. The trailer further includes a rotation pin coupled to the bed and extending above the upper surface and a winch assembly coupled to a first lateral side of the trailer and including a winch configured to be coupled to the load by a rope and to rotate the load about the rotation pin. The rotation pin is configured to be rotatably coupled to the pin socket to enable rotation of the load about the rotation pin. When the load is positioned on the bed, a distance from the lower surface of the load to an upper surface of the pin socket is greater than a distance from the lower surface of the load to an upper surface of the rotation pin.

Methods of Unloading Two-Portion Modular Structure

In accordance with some aspects of the disclosure, a method of unloading a modular structure from a trailer is disclosed. The method includes positioning a modular structure on a bed of a trailer, wherein the modular structure includes a first structure portion having a first vertical edge coupled to a second vertical edge of a second structure portion by a hinge, and wherein the first and second structure portions are arranged longitudinally on the trailer. The method further includes rotating the first structure portion and the second structure portion about the hinge such that the first and second structure portions overhang from first and second sides of the bed, forming a first overhanging portion and a second overhanging portion of the modular structure. The method further includes coupling at least one of (1) a first horizontal edge of the first structure portion to a second horizontal edge of the second structure portion, or (2) a third vertical edge of the first structure portion to a fourth vertical edge of the second structure portion upon completion of the rotating.

In accordance with some aspects of the disclosure, another method of unloading a modular structure from a trailer is disclosed. The method includes positioning a modular structure on a bed of a trailer, wherein the modular structure includes a first structure portion having a first vertical edge coupled to a second vertical edge of a second structure portion by a hinge and wherein the first and second structure portions are arranged longitudinally on the bed. The method further includes rotating the first structure portion and the second structure portion about the hinge and coupling a first horizontal edge of the first structure portion to a second horizontal edge of the second structure portion upon completion of the rotating.

In accordance with some aspects of the disclosure, another method of unloading a modular structure from a trailer is disclosed. The method includes positioning a first structure portion of a modular structure on a bed of a trailer with the first structure portion rotatably coupled to a first rotation pin positioned in a slot in the bed, positioning a second structure portion of a modular structure on a bed of a trailer with the second structure portion rotatably coupled to a second rotation pin positioned in the slot, coupling the first structure portion to the second structure portion with a hinge, rotating the first structure portion and the second structure portion about the hinge, the rotation causing the first rotation pin and the second rotation pin to move along the slot toward each other, and fixedly coupling the first structure portion to the second structure portion after rotating the first structure portion and the second structure portion.

Structure of the Modular Structure with Hinge

In accordance with some aspects of the disclosure, a modular structure is disclosed. The modular structure includes a first structure portion comprising a first floor, a first ceiling, a first set of at least three walls, a first vertical edge of a first wall of the first set, a second vertical edge of a second wall of the first set, and a first opening between a first horizontal edge of the first floor, a first horizontal edge of the first ceiling, the first vertical edge, and the second vertical edge. the modular structure further includes a second structure portion comprising a second floor, a second ceiling, a second set of at least three walls, a third vertical edge of a third wall of the second set, a fourth vertical edge of a fourth wall of the second set, and a second opening between a second horizontal edge of the second floor, a second horizontal edge of the second ceiling, the third vertical edge, and the fourth vertical edge. The first vertical edge is coupled to the third vertical edge by a hinge, and the second vertical edge is configured to be coupled to the fourth vertical edge.

In accordance with some aspects of the disclosure, another modular structure is disclosed. The modular structure includes a first structure portion comprising a first floor, a first ceiling, a first set of at least three walls, a first vertical edge of a first wall of the first set, a second vertical edge of a second wall of the first set, and a first opening between a first horizontal edge of the first floor, a first horizontal edge of the first ceiling, the first vertical edge, and the second vertical edge. the modular structure further includes a second structure portion comprising a second floor, a second ceiling, a second set of at least three walls, a third vertical edge of a third wall of the second set, a fourth vertical edge of a fourth wall of the second set, and a second opening between a second horizontal edge of the second floor, a second horizontal edge of the second ceiling, the third vertical edge, and the fourth vertical edge, wherein the first vertical edge is coupled to the third vertical edge by a hinge. The first structure portion is configured to be rotated relative to the second structure portion about the hinge between (a) a first position in which the first opening and the second opening face substantially the same direction; and (b) a second position in which the first opening faces the second opening to form a passageway between the first structure portion and the second structure portion.

In accordance with some aspects of the disclosure, another modular structure is disclosed. The modular structure includes a first structure portion comprising a first wall, a second structure portion comprising a second wall, the second structure portion configured to be coupled to the first structure portion such that the first wall is adjacent to the second wall, and a hinge that hingedly couples the first structure portion to the second structure portion. The hinge includes a first leaf coupled to the first wall, a second leaf coupled to the second wall, and a hinge pin coupling the first leaf to the second leaf.

Structure of the Trailer and Method of Assembling the Modular Structure Using the Boom/Pin/Slot In accordance with some aspects of the disclosure, a trailer configured to transport a load is disclosed. The trailer includes a bed including an upper surface configured to support the load, a slot positioned in the bed and extending from a front portion of the bed to a rear portion of the bed, and a first rotation pin configured to translate within the slot and extending from within the slot to above the upper surface of the bed.

In accordance with some aspects of the disclosure, a method of assembling a modular structure is disclosed. The method includes positioning a modular structure on a bed of a trailer. The modular structure includes a first structure portion coupled to a second structure portion by a hinge. The trailer includes an upper surface configured to support the modular structure, a first rotation pin and a second rotation pin each slidably coupled to a slot in the bed of the trailer, and a winch assembly coupled to the bed of the trailer, the winch assembly comprising a winch and a boom. Positioning the modular structure on the trailer includes rotatably coupling the first structure portion to the first rotation pin and rotatably coupling the second structure portion to the second rotation pin. The method further includes moving the boom to an extended position away from the bed of the trailer, coupling a rope to the modular structure, and pulling the rope with the winch to rotate each of the structure portions about the respective rotation pin, the pulling causing the rotation pins to slide along the slot.

In accordance with some aspects of the disclosure, another trailer configured to transport a load is disclosed. The trailer includes a bed including an upper surface configured to support the load, the upper surface comprising at least one of a plurality of ball transfer units or a low friction material, a slot positioned in the bed and extending from a front portion of the bed to a rear portion of the bed, a first rotation pin configured to translate within the slot and extending from within the slot to above the upper surface of the bed, and a winch configured to be coupled to the load by a rope and to rotate the load about the first rotation pin. The rotation pin is configured to be rotatably coupled to the load to enable rotation of the load about the rotation pin and translation of the load along the slot.

Structure of a Trailer for a Single-Portion Generic Load with No Hinge and Method of Rotating the Load Using the Boom and a Stationary Pin In accordance with some aspects of the disclosure, a trailer configured to transport a load is disclosed. The trailer includes a bed including an upper surface configured to support the load, a first rotation pin extending above the upper surface of the bed, and a winch assembly coupled to a first side of the trailer and including a first winch and a boom. The boom is configured to extend outward from the first side of the trailer and the first winch is configured to be connected to the load and to rotate the load about the first rotation pin.

In accordance with some aspects of the disclosure, a method of rotating a load on a trailer is disclosed. The method includes positioning a load on a bed of a trailer. The trailer includes a rotation pin coupled to the bed of the trailer, and a winch assembly coupled to the bed of the trailer. The winch assembly includes a winch and a boom. Positioning the load on the trailer includes rotatably coupling the load to the rotation pin. The method further includes moving the boom to an extended position away from the bed of the trailer, coupling a rope to the load, and pulling the rope with the winch to rotate the load about the rotation pin.

In accordance with some aspects of the disclosure, another trailer configured to transport a load is disclosed. The trailer includes a bed including an upper surface configured to support the load. The upper surface includes at least one of a plurality of ball transfer units or a low friction material. The trailer further includes a first rotation pin coupled to the bed and extending above the upper surface, and a winch configured to be coupled to the load by a rope and to rotate the load about the first rotation pin. The rotation pin is configured to be rotatably coupled to the load to enable rotation of the load about the rotation pin.

Modular Structure Including Lower Skid Plate

In accordance with some aspects of the disclosure, a floor assembly of a modular structure is disclosed. The floor assembly includes a frame including a plurality of floor joists, at least one upper plate coupled to a top of the frame, a skid plate coupled to a bottom of the frame, the skid plate including a circular opening, and a pin socket including a cylindrical pipe section positioned around the circular opening. The pin socket is configured to receive a rotation pin within the cylindrical pipe section and configured to cause the rotation of the floor assembly about the rotation pin when a force is applied to the floor assembly.

In accordance with some aspects of the disclosure, a method of rotating a modular structure including at least one skid plate coupled to a bottom end of the modular structure and a circular pin socket positioned above a first skid plate around a circular hole in the first skid plate is disclosed. The method includes positioning the modular structure on a surface comprising a plurality of ball transfer units with the modular structure supported by the at least one skid plate and with a rotation pin coupled to the surface inserted into the pin socket. The method further includes rotating the modular structure about the rotation pin such that the at least one skid plate moves across the surface supported only by the ball transfer units.

In accordance with some aspects of the disclosure, a modular structure is disclosed. The modular structure includes a first space defined by a plurality of walls and a floor assembly configured to support the walls. The floor assembly includes at least one upper plate defining a floor of the first space, the at least one upper plate including a first material, a frame supporting the at least one upper plate, and at least one skid plate coupled to a bottom of the frame by a plurality of fastening features. The at least one skid plate includes a second material different than the first material and forms a substantially flat lower surface of the modular structure, wherein none of the fastening features extend beyond a lower surface of the at least one skid plate.

Modular Structure Including Bladder Tank Support Assembly

In accordance with some aspects of the disclosure, a modular structure is disclosed. The modular structure includes a space inside the modular structure, a floor assembly including a frame with a plurality of floor joists, at least one upper plate coupled to a top of the frame and defining a floor of the space, and at least one lower plate coupled to a bottom of the frame and defining a lower surface of the floor assembly, the lower surface including an opening. The modular structure further includes a bladder tank support assembly coupled to the floor assembly, the bladder tank support assembly including a support platform configured to be lowered from an upper position in which the support platform is received within the opening to a lower position below the floor assembly, and an inflatable bladder tank positioned on the support platform. The inflatable bladder tank is structured to fit between the support platform and the floor of the living area when the inflatable bladder tank is deflated, and the support platform is in the upper position.

In accordance with some aspects of the disclosure a method of transporting a modular structure is disclosed. The method includes moving the modular structure from a first location to a second location with a deflated inflatable bladder tank positioned between an upper plate of a floor assembly of the modular structure and a support platform positioned below the floor assembly, with the support platform in an upper position supporting the inflatable bladder tank. The method further includes lowering the support platform to a lower position and inflating the inflatable bladder tank with the support platform in the lower position.

In accordance with some aspects of the disclosure a bladder tank support assembly for a modular structure is disclosed. The bladder tank support assembly includes a support platform configured to support a bladder tank, a plurality of cables configured to suspend the support platform from a floor of the modular structure, and a winch assembly configured to rotate a shaft. Each cable is routed through a pulley configured to be mounted to the floor, coupled to the shaft, and configured to wrap around the shaft when the shaft is rotated.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIGS. 2A-2C are illustrations of a sequence for transporting a modular home to a final destination, in accordance with some embodiments of the present disclosure.

FIGS. 4A-4I are illustrations of example operations for transporting a modular home to a final destination as described with reference to FIG. 3, in accordance with some embodiments of the present disclosure.

FIG. 9 is an example method for transporting a modular home coupled with a hinge to a building site, in accordance with some embodiments of the present disclosure.

FIG. 14D is an example method for rotating a modular home, in accordance with some embodiments.

FIGS. 18B-18C are illustrations of two portions of a modular home coupled at vertical edges of the two portions, in accordance with some embodiments of the present disclosure.

FIG. 26 is an illustration of a fold-down ramp coupled to a modular home, in accordance with some embodiments of the present disclosure.

FIGS. 29A-29B are illustrations of a sequence for rotating two portions of a modular home on a trailer bed, in accordance with some embodiments of the present disclosure.

FIG. 32 is an example method of rotating two portions of a modular home using ball transfer units and a winch, in accordance with some embodiments of the present disclosure.

FIGS. 35A-35B are illustrations of a sequence of using of a pulley system to rotate two portions of a modular home, in accordance with some embodiments of the present disclosure.

FIGS. 37A-37C are illustrations of different views of a trailer deck, in accordance with some embodiments of the present disclosure.

FIGS. 40B-40D are illustrations of a robotic crawler, in accordance with some embodiments of the present disclosure.

FIGS. 52C-52F are illustrations of different views of a latch assembly, in accordance with some embodiments of the present disclosure.

Figure 1B:
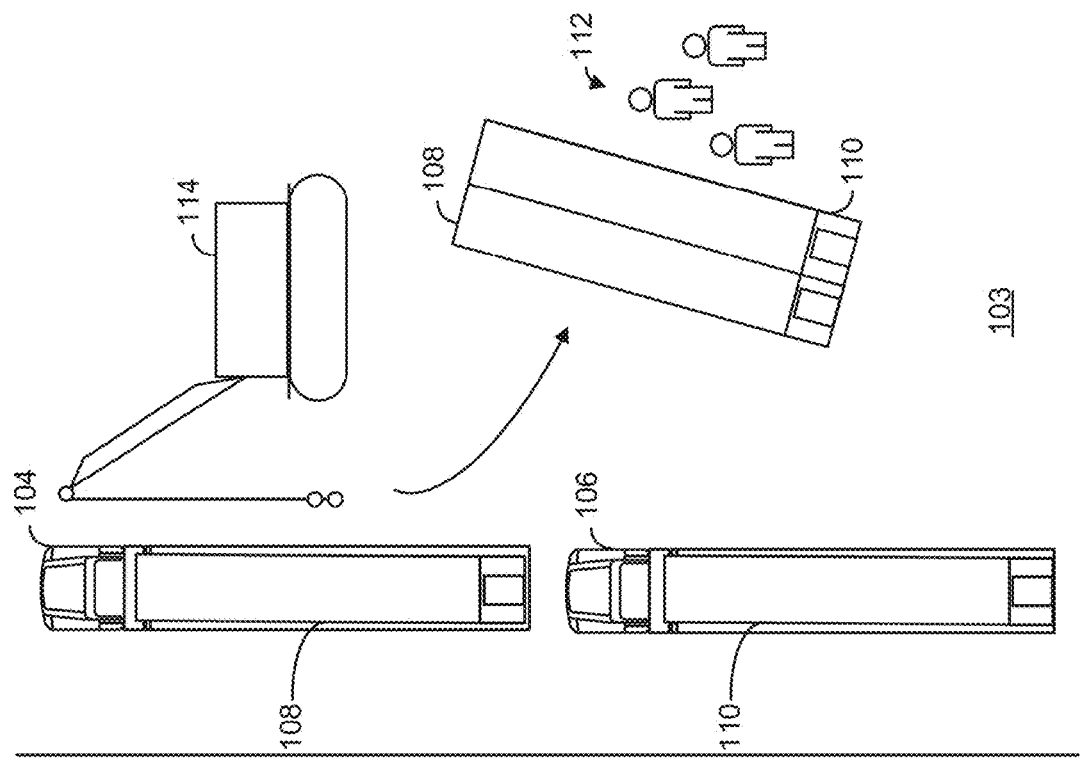
FIGS. 1A-1B are illustrations of a sequence for transporting modules of a modular house to a final destination.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

As mentioned above, despite the many benefits of manufacturing modular homes off-site, current modular housing manufacturers have issues transporting modular homes to their final destination (also described herein as installation site, building site, and final resting site). One issue that may arise when transporting modular homes to different sites is complying with local traffic laws. For example, many states have guidelines that limit the size of trailers to 12 feet, the typical size of a traffic lane. A home that is only 12 feet wide is often not desirable for purchasers, so complying with this guideline often requires dividing the homes into separate smaller modules and transporting the smaller modules on separate trailers and/or in multiple trips. Such division and transportation can add to the transportation and modular home assembly costs at the site. Another issue is once the portions of the modular homes arrive at their destinations, large cranes are often required to remove the homes from the trailers and then to place the homes at their final building site. The cranes can be clumsy to handle when putting together different modules, and it can be difficult to secure a crane when placing modular homes at different geographic locations. Yet another issue is removing modular homes from trailers and placing them at different locations can require a significant amount of manual labor. Such labor may include operating a crane to remove the modules, using a variety of manual equipment to connect the different modules, and placing the different housing components on the modules. Addressing each of these issues can add to the costs and length of time it takes to transport and construct a modular house at a final destination. Any reference to a modular home or housing herein can be a reference to a modular structure, which can include type of modular building or enclosed or semi-enclosed modular space.

Figure 1A:
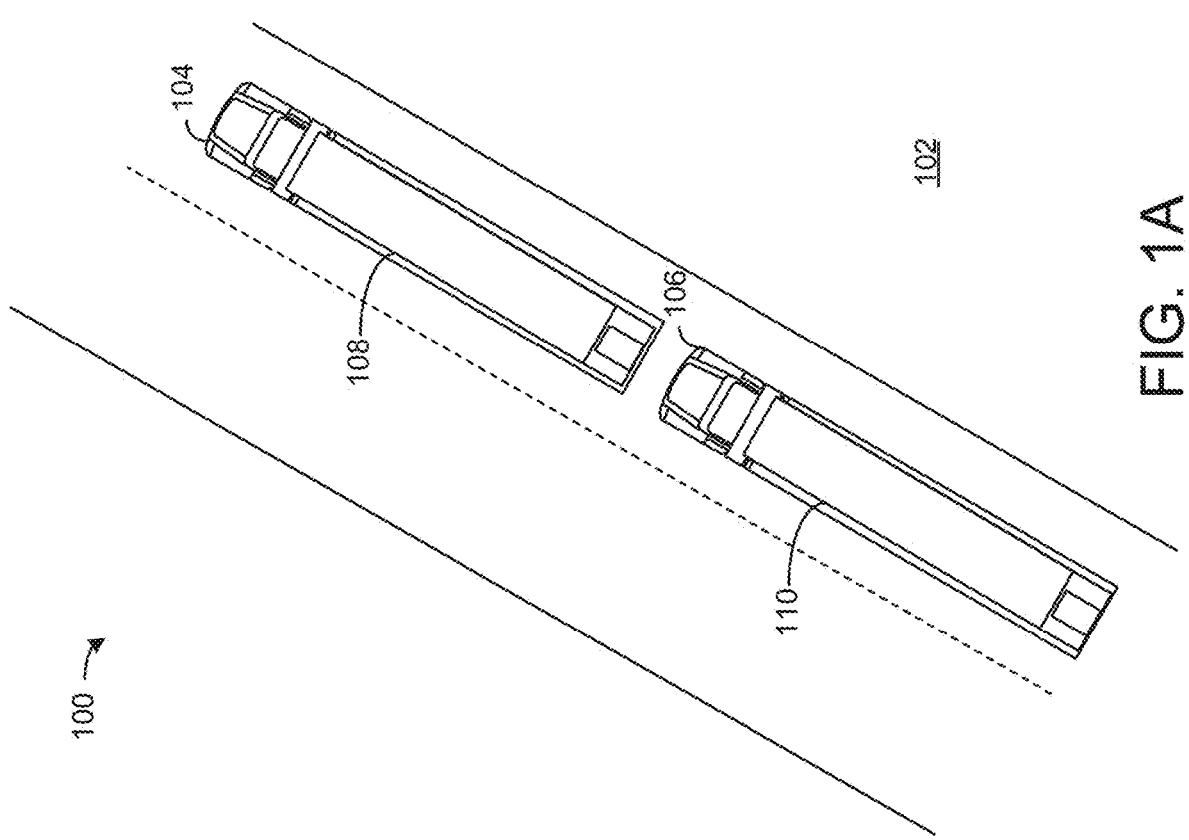

For example, referring now to FIGS. 1A-1B, a sequence 100 for transporting modules of a modular house to a building site is shown. Sequence 100 may be performed by an entity that is not performing the operations of the systems and methods described herein. In sequence 100, at operation 102, two trailers 104 and 106 may separately transport housing portions 108 and 110 to a building site. Housing portions 108 and 110 may be pre-fabricated housing portions designed according to specifications to be constructed together to form a single modular house. Housing portions 108 and 110 may have been designed to be separate rooms in a house or separate portions of the same room. Although not shown, when constructing such a modular home, more trailers may transport any number of housing portions according to the make and design of the home. By constructing portions of a modular home and transporting the portions to the building site in this way, a manufacturer can create reproducible housing portions in a controlled environment (e.g., at the manufacturing site), thus saving construction costs at the building site and reducing the chance for errors between houses that may be caused by constructing the modular home from its individual parts at the building site.

After transporting the housing portions to the building site, at operation 103, construction workers 112 may operate a crane 114 to remove housing portions 108 and 110 from trailers 104 and 106. In doing so, the constructions workers may individually attach housing portions 108 and 110 to crane 114, remove housing portions 108 and 110 from trailers 104 and 106 by operating crane 114, and place housing portions 108 and 110 on the ground. In some cases, crane 114 may place housing portions 108 and 110 onto a pre-laid foundation that can be used as a base for housing portions 108 and 110 to lay on. When using crane 114 to place housing portions 108 and 110 at a final resting place, construction workers 112 may maneuver housing portions 108 and 110 by hand to ensure housing portions 108 and 110 are properly aligned and connected. Using construction workers 112 and crane 114 in this manner can incur many expenses and opportunities for human error as each step in the process relies on a human to maneuver and/or align housing portions 108 and 110.

Referring now to FIGS. 2A-2C, a sequence 200 for transporting modules of a modular house to a building site in accordance with the systems and methods described herein is shown, in accordance with some embodiments. In sequence 200, at operation 202, two housing portions 204 and 206 may be loaded onto a trailer bed of a single trailer 208. Housing portions 204 and 206 may be two halves of a single modular home split down the middle of the modular home. On trailer 208, housing portions 204 and 206 may be connected to a winch 210 that is connected to at least one of housing portions 204 or 206 and the trailer bed of trailer 208. Housing portions 204 and 206 may also be connected to a winch 212 at a distal end of the trailer bed as compared to a driving compartment of trailer 208. Upon trailer 208 reaching a building site for the modular home, winch 212 may operate to pull housing portions 204 and 206 towards the distal end of the truck bed, thereby providing room to fold and rotate housing portions 204 and 206 on the truck bed. Winch 210 may then pull on housing portions 204 and/or 206 via a hinge to fold housing portions 204 and 206 such that the middle faces of housing portions 204 and 206 face each other while remaining on the trailer bed. An operator may then couple housing portions 204 and 206 together on the bottom and/or top edges of housing portions 204 and/or 206. In this way, a modular home may be transported to a building site and constructed while remaining on the bed of a trailer.

At operation 214, robotic crawlers may remove the modular home formed from housing portions 204 and 206 from the trailer bed. For instance, although not shown, robotic crawlers may be stored in a "crawler hotel" (e.g., a crawler storage container) on trailer 208 in addition to housing portions 204 and 206. The robotic crawlers may be motorized robots that are capable of carrying a large load or payload, such as portions of a modular home. After trailer 208 arrives at the building site and housing portions 204 and 206 are folded together, robotic crawlers 216 may drive out of the crawler hotel and off of trailer 208. Robotic crawlers 216 may then drive underneath portions of housing portions 204 and 206 that jut off of the sides of the trailer bed. Robotic crawlers 216 may be configured to stop at particular locations in relation to housing portions 204 and 206. Upon each crawler reaching a designated location (e.g., a defined location in relation to housing portions 204 and 206) underneath housing portions 204 and 206, legs (e.g., actuators) within the housing portions 204 and 206 may extend towards crawlers 216. Upon contacting robotic crawlers 216, the legs may fasten or be fastened to crawlers 216. The legs may then extend to cause the floors of housing portions 204 and 206 to rise into the air away from trailer 208. In some cases, trailer 208 may then drive away having delivered its load.

At operation 218, housing portions 204 and 206 may gradually be removed from crawlers 216. For example, one of housing portions 204 and 206 may lift a leg fastened to a crawler to not bear weight on the crawler. Upon sufficiently lifting the leg above the crawler, the crawler may drive away and the leg may extend towards the ground to support the weight of the respective housing portion or modular home while pressed against the ground. The legs of housing portions 204 and 206 may gradually be removed from crawlers 216 until there are not any crawlers supporting the weight of housing portions 204 and 206. As crawlers 216 leave the area underneath the modular home, each of the legs may retract so the modular home can be closer to the ground. In this way, the systems and methods described herein may enable a manufacturer to deliver a modular home to a building site without using a crane, substantially reducing the costs and the amount of work that is placed on construction workers to move and connect modules of a modular home together.

Housing Rotation System

Figure 3:
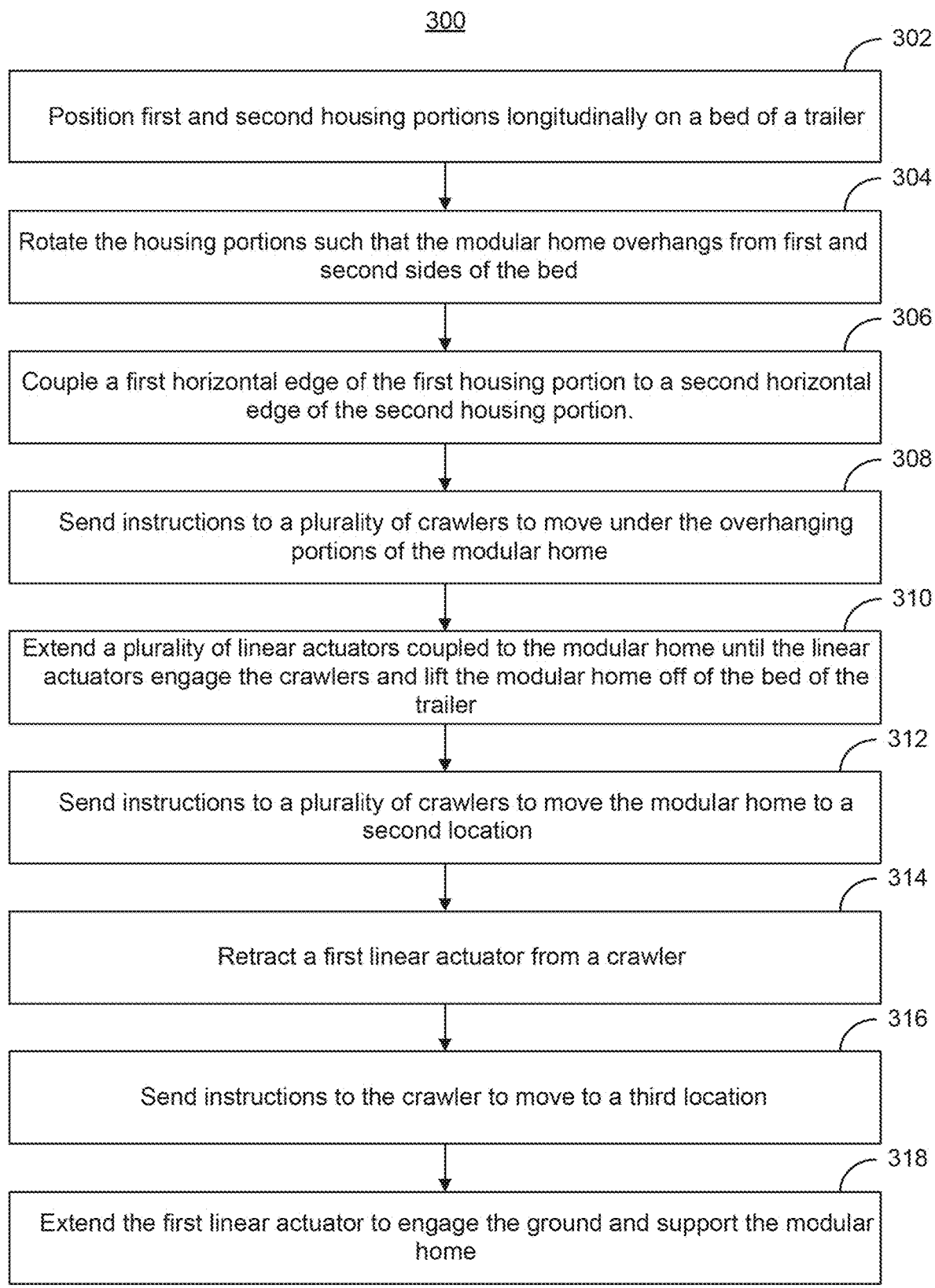
FIG. 3 illustrates an example method for transporting a modular home to a final destination, in accordance with some embodiments of the present disclosure.

Referring now to FIG. 3, a method 300 for transporting a modular home 101 is described, in accordance with some embodiments. Further reference is made to FIGS. 4A-4I, which illustrate the operations of the method 300, according to some embodiments. Method 300 may include any number of operations and the operations may be performed in any order. The method 300 may be performed by equipment of a modular home construction company (e.g., the components of system 4500, shown and described with reference to FIG. 45). Performance of method 300 may enable a modular home manufacturing company to remove a modular home 101 from a trailer bed without the use of a crane and with minimal to no human intervention. However, some operations of the method may be performed by people (e.g., employees of the modular home construction company), such as by operating machinery. For example, the method 300 may be performed after a modular home 101 divided into two halves has been placed on top of a truck trailer bed. The truck may transport the modular home 101 to its final destination, at which point the modular home 101 may be removed from the truck trailer bed by folding the two halves to create a connected modular home 101. The two halves may be folded and connected using one or more mechanisms or devices on or integrated into the truck bed such as a roller deck, side winches, and guide pins, as well as unique components in the modular home 101, such as a hinge and mechanical legs. The mechanical legs may be extended onto robotic crawlers that are configured to support and transport the modular home 101 to a final building site. In performing the method 300, a manufacturing company can transport a modular home 101 to a final building site without the use of a crane, follow traffic highway laws, and deliver a home 101 on-site without or with minimal manual labor.

Figure 4A:
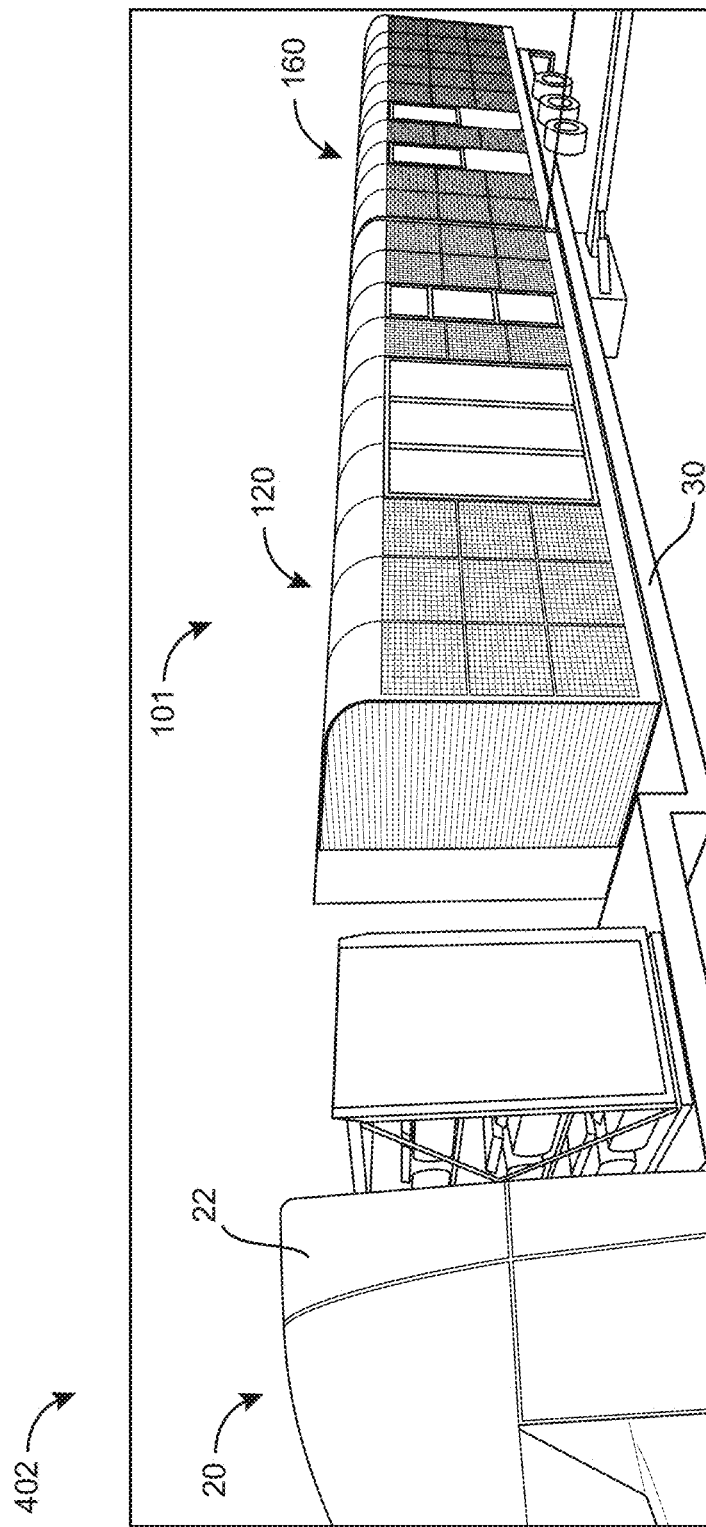
Figure 4B:
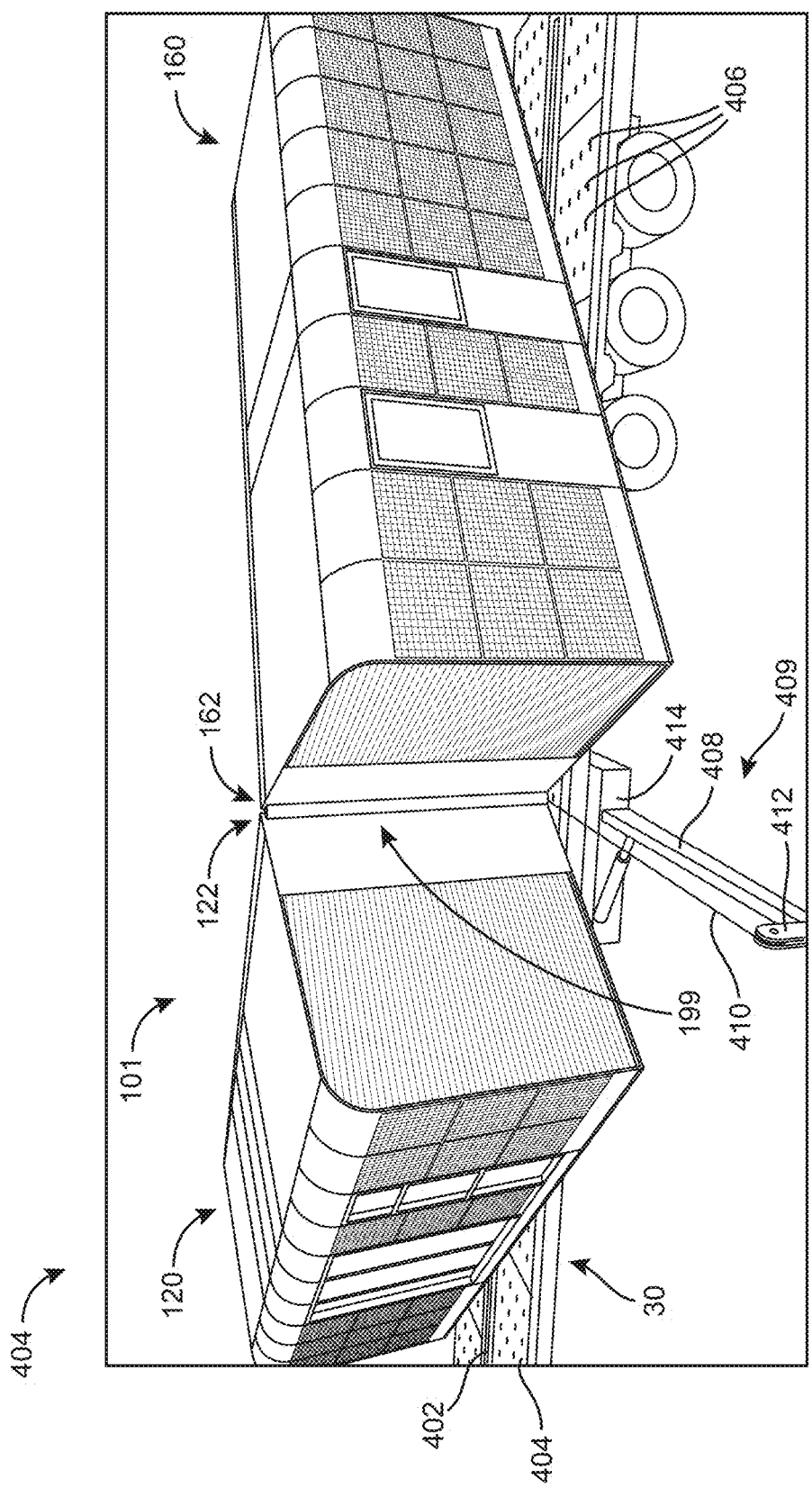

At operation 302 of the method 300, a first housing portion 120 and a second housing portion 160 are positioned longitudinally on the bed of a trailer 30. Operation 302 is illustrated in FIG. 4A, according to some embodiments. The first housing portion 120 and the second housing portion 160 may be positioned by workers at a manufacturing company. For example, each housing portion 120, 160 may be lifted onto the bed of the trailer 30 by a crane, forklift, or other lifting device. In doing so, the first housing portion 120 and the second housing portion 160 may be positioned longitudinally on the bed of the trailer 30. It will be understood that "longitudinally," as used herein, refers to arranging the housing portions 120, 160 such that they are aligned end to end such that the longer dimension of the footprints of each housing portion is arranged from front to back on the bed of the trailer 30. In this orientation, substantially the entire footprint of each housing portion 120, 160 can be supported by the bed of the trailer 30. As can be seen in FIG. 4B, a first vertical edge 122 of the first housing portion 120 may be coupled to a second vertical edge 162 of the second housing portion 160 by a hinge 199.

In some embodiments, the trailer 30 may include a slot 402 in the bed 404 that extends longitudinally from the front of the bed 404 to the rear of the bed 404. The bed 404 may include two rotation pins configured to roll, slide, or otherwise translate in the slot 402. In some embodiments, there may be two slots 402 arranged end to end, with one rotation pin in each. The rotation pins may each have a roller portion that fits into the slot and a pin portion that extends upward out of the slot 402 and above the bed 404. The pin portion may be cylindrical in shape and may include one or more roller bearing or a ball bearing. The bearing may have a substantially vertical axis of rotation, such that the housing portions or any other load can rotate on the bed 404 about the bearing. In some embodiments, the rotation pin does not include the bearing but provides the same function via sliding contact. Additional details of the slot 402 and the rotation pins are shown in FIGS. 28A-31C.

Figure 15A:
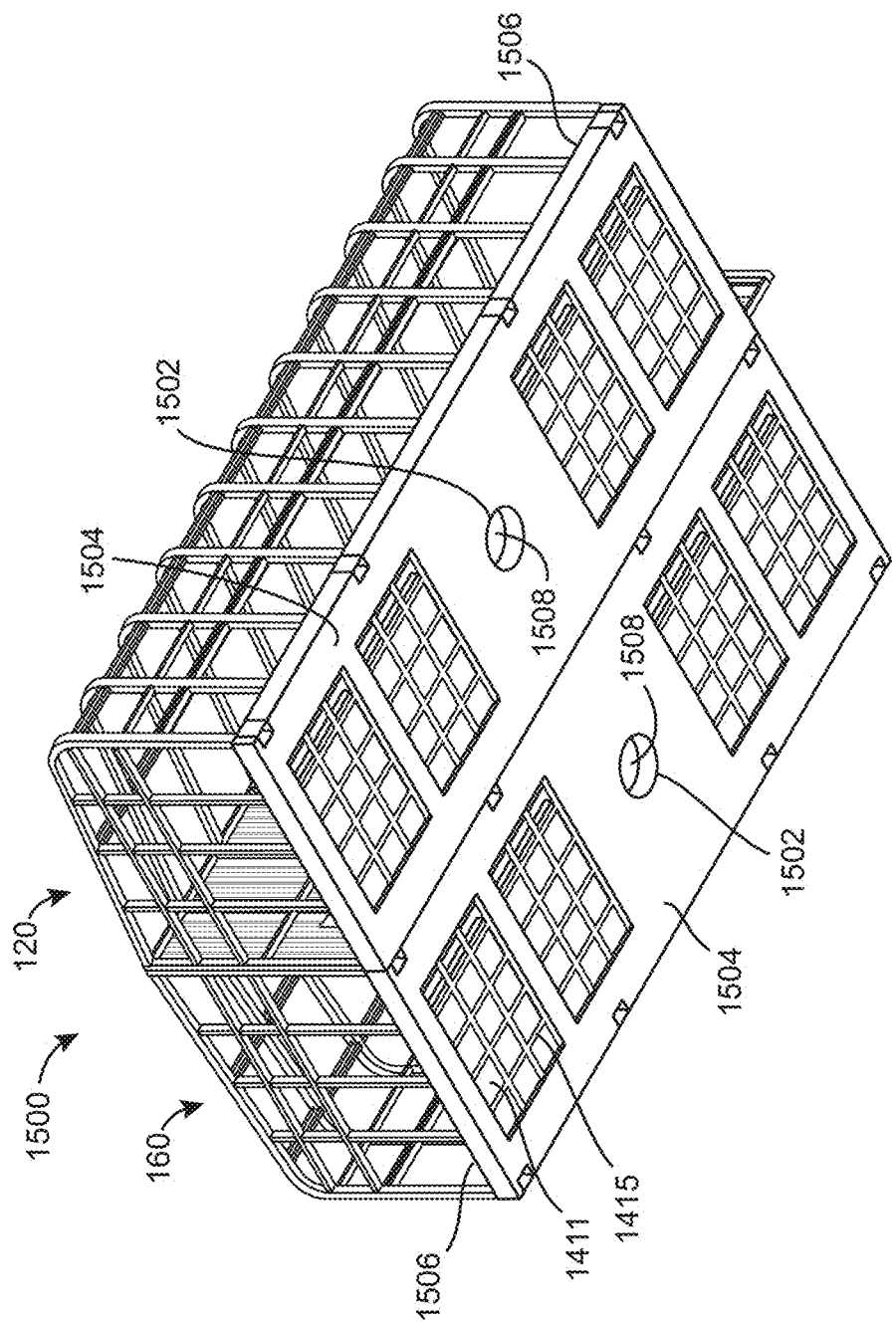
FIG. 15A is an illustration of a modular home including pinholes in a floor assembly of the modular home, in accordance with some embodiments of the present disclosure.

As shown in FIG. 15A, each housing portion 120, 160 may include a pin hole 1502 (e.g., a pin socket) that extends from the lower skid plate 1504 upward toward the inner floor 1506 of the housing portion 120, 160. The pin hole 1502 may be circular, with a diameter that is slightly larger than the diameter of the pin portion of the rotation pin. In some embodiments, positioning a housing portion 120, 160 on the bed 404 of the trailer 30 includes positioning the housing portion such that the pin extends into the pin hole 1502, and the pin hole 1502 surrounds the rotation pin (e.g., the pin portion of the rotation pin). For example, if the housing portions 120, 160 are positioned using a crane, the crane operator or a tag line operator may position the housing portion 120, 160 such that the pin hole 1502 is positioned directly over the rotation pin. The crane operator may then lower the housing portion 120, 160 onto the bed 404 such that the rotation pin extends into the pin hole. In some embodiments, the rotation pin does not provide any vertical (e.g., subjacent) support to the housing portion 120, 160. For example, there may be a gap between an upper surface of the pin and the upper surface 1508 of the pin hole. The housing portion 120, 160 may then rotate about (e.g., be rotatably coupled to) the pin while remaining secured to the trailer because the sides of the pin hole 1502 can contact the sides of the pin portion of the rotation pin, which stop the housing portion 120, 160 from sliding relative to the rotation pin. In some embodiments, a bearing (e.g., a roller bearing, a ball bearing, etc.) may be pressed or otherwise secured in the pin hole 1502 to reduce the friction between the pin hole and the rotation pin. The rotation pins keep the centers of the housing portions 120, 160 centered on the trailer bed while the housing portions 120, 160 rotate about the pins and translate along the slot 402, such that the housing portions 120, 160 can overhang from the edges of the bed 404 but remain balanced on the trailer 30.

In some embodiments, each housing portion 120, 160 includes a plurality of linear actuators 130 configured to extend downward from the housing portion 120, 160 to lift the housing portion 120, 160 above a surface (e.g., the ground, a factory floor, etc.). The linear actuators 130 are shown, for example, in FIGS. 4E and 4I. The linear actuators 130 may be used to position the housing portions 120, 160 on the trailer. For example, a housing portion 120, 160 may be lifted off the ground by linear actuators 130 positioned at each corner of the housing portion 120, 160. A trailer 30 positioned perpendicular to the housing portion may then back up underneath the housing portion 120, 160 between the linear actuators 130 until the rotation pin is positioned directly underneath the pin hole 1502. The linear actuators 130 may then lower the housing portion 120, 160 onto the bed 404 such that the rotation pin extends into the pin hole 1502, with the ends of the housing portion 120, 160 overhanging from each end of the bed 404. The housing portion 120, 160 may then be rotated ninety degrees such that it is positioned longitudinally on the bed 404 of the trailer 30. This process may be repeated for a second housing portion 120, 160 on a second rotation pin. The trailer 30 may include one or more winches or other actuators configured to move the rotation pin and the coupled housing portion 120, 160 toward the front or rear of the trailer 30. In some embodiments, similar operations may be performed using different lifting devices to lift the housing portion 120, 160 by each end. For example, crawlers as described herein may lift the housing portion 120, 160 at each end and lower the housing portion 120, 160 onto the trailer 30 perpendicular to the bed 404. The housing portion 120, 160 may then be rotated ninety degrees into a longitudinal position.

The housing portions 120, 160 may be coupled together by a hinge. In some embodiments, the housing portions 120, 160 are not coupled until they are on the bed 404 of the trailer 30. In some embodiments, the housing portions 120, 160 are positioned on the bed 404 of the trailer 30 without being connected. The trailer 30 then moves the housing portions 120, 160 to another location, where the housing portions 120, 160 are connected by the hinge 199 before being removed from the trailer. In some embodiments, each housing portion 120, 160 is positioned on the trailer 30 with one leaf of the hinge 199 attached, but no hinge pin coupling the leaves together. The hinge pin may then be installed in the leaves to couple the housing portions 120, 160 together. The hinge 199 may couple a first vertical edge 122 of a first housing portion 120 to a second vertical edge 162 of a second housing portion 160.

The trailer 30 may include a front winch (e.g., front winch 3032, shown in FIG. 30) positioned near the front of the trailer 30 (e.g., near the driving compartment) and a rear winch (e.g., rear winch 3034, shown in FIG. 30) positioned near the rear of the trailer 30. Each winch may be configured to pull a rope toward the winch. For example, the rear winch may be coupled to a housing portion 120, 160 or to a complete modular home (e.g., two housing portions 120, 160 that have been rotated and coupled together to form modular home 101) on the bed of the trailer to pull the housing portion 120, 160 or modular home 101 towards the rear of the trailer. Similarly, the front winch 3032 may pull the housing portion 120, 160 or modular home 101 towards the front of the trailer 30. The rope may be coupled to a housing portion 120, 160 or to one of the rotation pins. In some embodiments, it may be necessary to decouple the housing portions 120, 160 of a modular home 101 and rotate the portions 120, 160 back into a longitudinal arrangement. For example, if a complete modular home 101 needs to be moved to another location, the linear actuators 130 may lift the modular home 101, and the trailer 30 can be backed under the modular home between the linear actuators 130. Then, the linear actuators 130 can lower the modular home 101 onto the trailer bed 404, with the pin sockets 1502 of each housing portion 120, 160 surrounding a respective rotation pin. Next, the removable couplings (e.g., the fasteners or other coupling members that couple the first housing portion 120 to the second housing portion 160) can be removed, leaving the two housing portions 120, 160 coupled only by the hinge 199. The rope of the rear winch 3034 can then be coupled to a first housing portion 120, 160 or to the rear rotation pin, and the rope of the front winch 3032 can be coupled to the other housing portion 120, 160 or the front rotation pin. The rear winch 3034 can then pull the first housing portion 120, 160 towards the rear of the trailer 30 while the front winch 3032 pulls the other housing portion 120, 160 towards the front of the trailer 30. Because the two housing portions 120, 160 are still coupled by the hinge 199, the housing portions 120, 160 can rotate as they are pulled to their respective ends of the trailer 30 until each housing portion 120, 160 has rotated ninety degrees, returning to a longitudinal arrangement for shipping on the trailer 30.

Figure 4C:
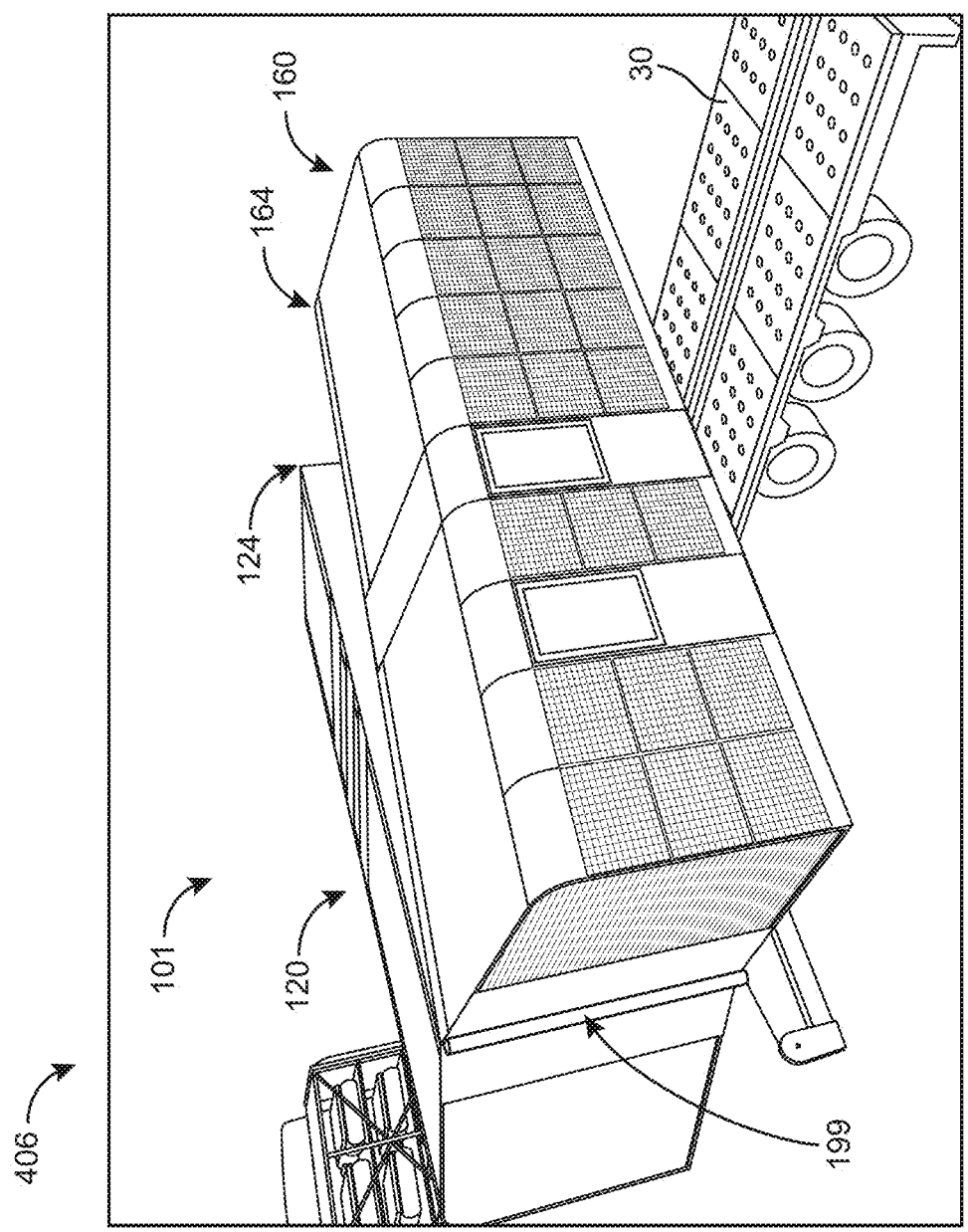

At operation 304 of the method 300, the first and second housing portions 120, 160 are rotated such that the modular home overhangs from first and second sides of the bed of the trailer, thus forming a first overhanging portion and a second overhanging portion of the modular home. Operation 304 is illustrated in FIGS. 4B and 4C, according to some embodiments. The first and second housing portions 120, 160 may be rotated using a rotation mechanism (e.g., winches, pulleys, guide pins, roller decks, a hinge, etc.) coupled to or otherwise integrated into the bed 404 of the trailer 30. The first housing portion 120 and second housing portion 160 may be rotated, causing each housing portion 120, 160 to overhang the edges of the bed 404 of the trailer 30.

Figure 4D:
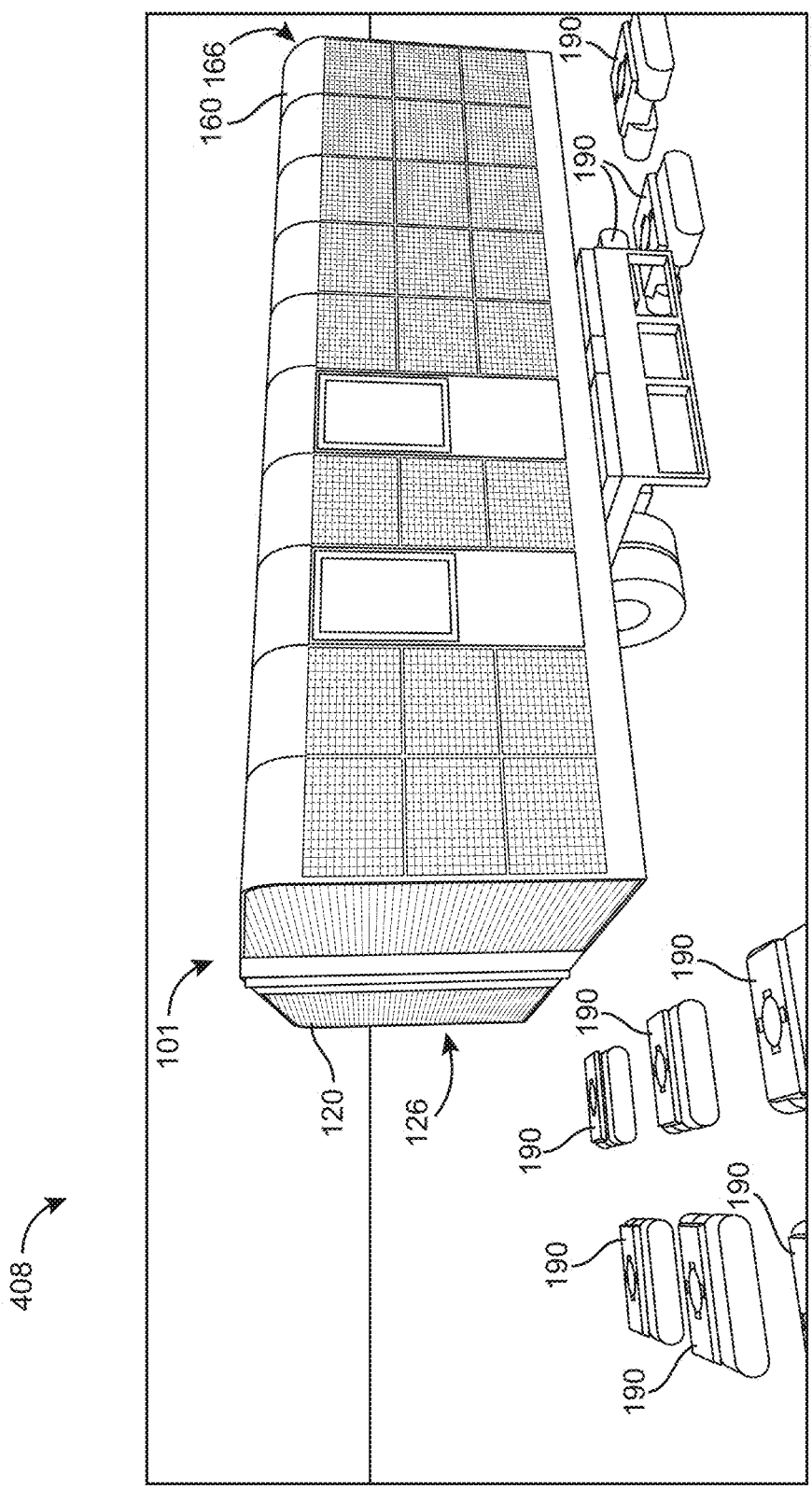

To rotate the housing portions 120, 160, a rotation mechanism may be used. For example, in some embodiments, the bed of the trailer may include ball transfer units 406 to reduce the friction between the housing portions 120, 160 and the bed of the trailer 30 to facilitate lower friction rotation. In some embodiments, the housing portions 120, 160 may each be rotatably coupled to a rotation pin positioned in a slot 402 in the bed of the trailer 30, such that the housing portions 120, 160 remain balanced and centered on the bed while overhanging the edges. In some embodiments, the rotation may be accomplished by extending a jib 408 (e.g., a boom) from an edge of the trailer 30, connecting a rope 410 to the modular home, and pulling the rope through a pulley 412 with a winch 414. In some embodiments, the winch may be positioned at the distal edge of the jib 408 and a pulley 412 may not be used. In other embodiments, one or more winches may be coupled to the rotation pins and may pull the rotation pins toward each other to rotate the housing portions 120, 160. The first overhanging portion 126 and the second overhanging portion 166 are shown in FIG. 4D, according to some embodiments. The housing portions 120, 160 may be rotated until the first housing portion and second housing portion meet. For example, each housing portion 120, 160 may rotate approximately 90 degrees such that the edges of each housing portion meet (e.g., contact each other or are within a predetermined distance of each other).

As described above, a winch assembly 409 including a winch 414 and a boom 408 may be used to rotate the housing portions 120, 160. Winch arrangements according to some embodiments are described in detail with regard to FIG. 27. The trailer 30 or the housing portions 120, 160 may include pins, locks, or other mechanisms that secure the housing portions 120, 160 in the longitudinal position on the bed 404 and resist any undesired rotation of the housing portions 120, 160. Before the housing portions 120, 160 are rotated, the locks, pins, or other mechanisms may be disengaged.

At operation 306 of the method 300, a first horizontal edge of the first housing portion 120 is coupled to a second horizontal edge of the second housing portion. For example, a top edge of the first housing portion 120 may be coupled to a top edge of the second housing portion 160 and/or a bottom edge of the first housing portion 120 may be coupled to a bottom edge of the second housing portion 160. Alternatively or in addition, a third vertical edge of the first housing portion may be coupled to a fourth vertical edge of the second housing portion. For example, the vertical edge of the first housing portion 120 and the vertical edge of the second housing portion 160 that meet after the housing portions are rotated on the deck may be coupled together. In some embodiments, conventional fastening methods may be used to couple the edges together. In some embodiments, a tapered pin in an edge of one housing portion may be inserted into a corresponding receiver latch in the edge of the other housing portion. This may allow the two edges to be coupled together automatically when the edges meet. In other embodiments (e.g., as shown in FIGS. 52A-52F), one of the housing portions 120, 160 may include one or more latch or clamp assemblies 5210 and the other housing portion may include a receiver assembly 5220. As the edges of the housing portions 120, 160 meet, the latch assemblies 5210 may engage and couple to the receiver assemblies 5220 automatically. For example, the receiver assembly 5220 may push open a spring-actuated clamp as it approaches the latch assembly 5210. When the edges of the housing portions 120, 160 meet, the clamp may close around a portion of the receiver assembly 5220, thus retaining the receiver assembly 5220 with the latch assembly 5210 such that the housing portions 120, 160 are unable to be pulled apart without releasing the clamps. In some embodiments, each housing portion 120, 160 may include at least one latch assembly 5210 and at least one receiver assembly 5220 that corresponds with the latch assembly 5210 of the other housing portion 120, 160. In some embodiments, one housing portion 120, 160 may include only latch assemblies 5210 and the other housing portion 120, 160 may include only receiver assemblies 5220.

At operation 308 of the method 300, instructions are sent to a plurality of crawlers, causing the plurality of crawlers to move under the first and second overhanging portions 126, 166 of the modular home 101. Operation 308 is illustrated in FIG. 4D, according to some embodiments. The instructions may be sent, for example, from a user device to the crawlers, or from a controller (e.g., controller 4502, shown and described with respect to FIG. 45) located on the trailer 30. The instructions may cause each crawler to move off of the trailer bed of the trailer and under a linear actuator coupled to the modular home 101. The crawlers may be configured to send and receive wireless communications. In some embodiments, the instructions may be stored on one or more of the crawlers (e.g., stored in memory of a computer having a processor to execute instructions in the memory on the crawlers), and the crawlers may communicate with the other crawlers to receive the instructions. The crawlers 190 may receive instructions from the controller or the other crawlers, causing the crawlers 190 to move under the overhanging portions 126, 166.

At operation 310 of the method 300, a plurality of linear actuators 130 coupled to the modular home (e.g., the housing portions 120, 160 after they have been rotated and coupled together to form modular home 101) extend downward towards the crawlers 190 until they engage the crawlers and lift the modular home 101 off of the bed of the trailer 30. Operation 310 is illustrated in FIG. 4E, according to some embodiments. The linear actuators 130 may include a housing coupled to the modular home 101 and a rod that extends downward from the housing. The rod may extend downward and engage the crawlers 190. The instructions may cause each crawler 190 to move under an actuator 130. Once the crawlers 190 are in position, the rod of each actuator 130 may extend downward and engage a respective crawler 190. The rod of each actuator 130 can continue to extend downward until the rod contacts a crawler 190, causing the modular home 101 to be lifted off the bed 404 of the trailer 30. The modular home 101 may then be fully supported by the actuators 130 and the crawlers 190. In other embodiments, crawlers 190 may not be used. For example, the linear actuators 130 may extend towards the ground and lift the housing portions 120, 160 off of the bed. The trailer 30 may then be driven out from underneath the housing portions 120, 160, and the linear actuators 130 can lower the housing portions 120, 160 to a desired height.

Figure 4F:
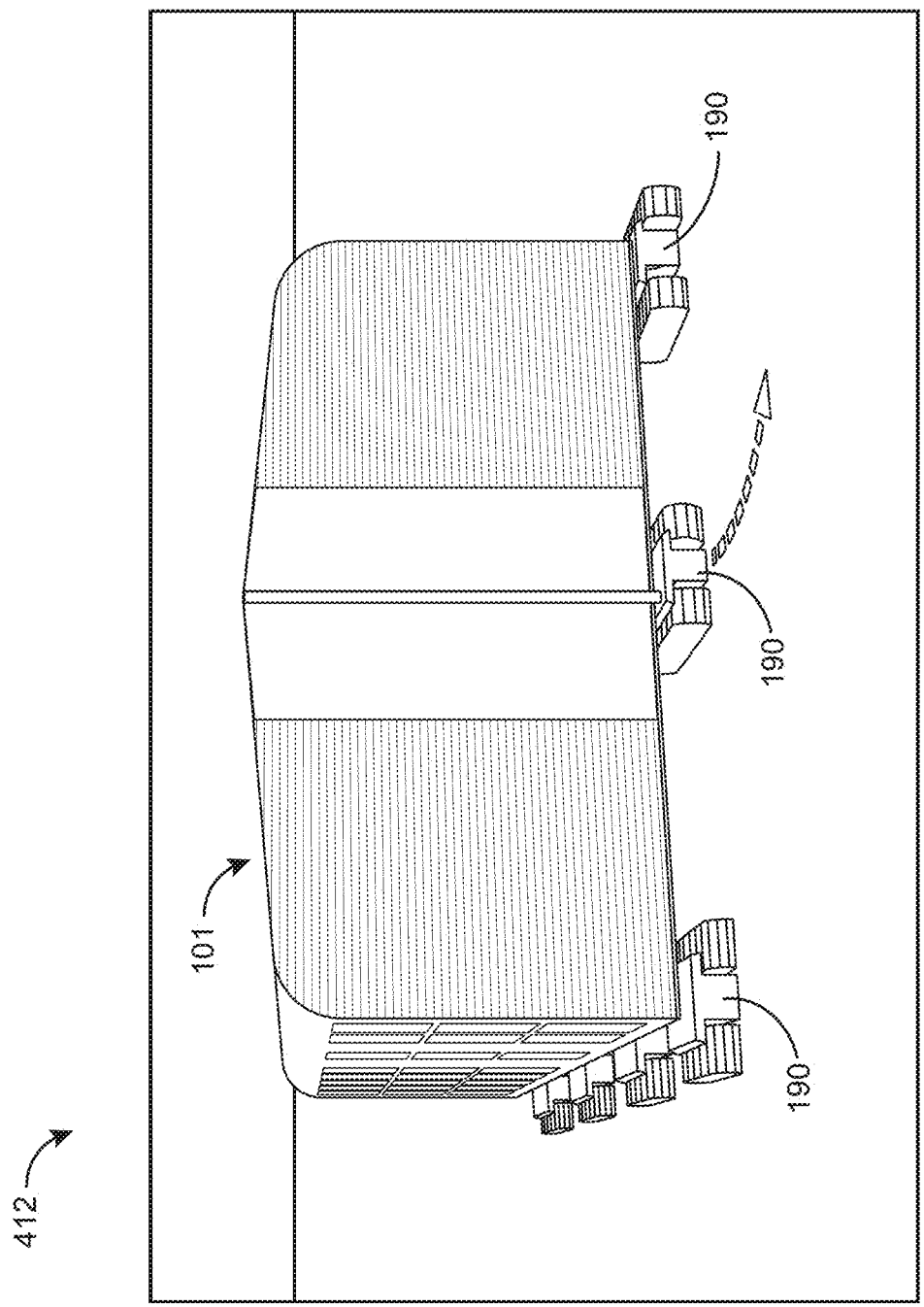

At operation 312 of the method 300, a second set of instructions are sent to the plurality of crawlers. Operation 312 is illustrated in FIG. 4F, according to some embodiments. The controller may generate and transmit the second set of instructions to the plurality of crawlers. The second set of instructions may cause the plurality of crawlers to move the modular home 101 away from the trailer 30 to a second location. The crawlers may cooperate to carry the modular home 101 across a surface to a predetermined or commanded location. A user may enter the location via a computing device such as a smart phone, the crawlers 190 may have previously been programmed with a location to which to carry the modular home 101, or the controller may include the location in the second set of instructions. The crawlers 190 may carry the modular home 101 away from the trailer 30 to a second location. Using the crawlers 190 may enable the modular home 101 to be positioned in a location that is not reachable by a trailer and, in some cases, without a trailer in general (e.g., crawlers can be used to transport a modular home 101 from one local location to another local location without the use of a trailer). It may also allow the modular home 101 to be placed in a location closer to other objects, such as additional modular homes, than would be possible to reach using only a trailer and a crane. Using the crawlers 190 may also obviate the need for a crane, which can greatly reduce installation costs.

At operation 314 of the method 300, once the modular home 101 is positioned in the second location, a first linear actuator of the plurality of linear actuators is retracted from a first respective crawler. The modular home 101 may include enough linear actuators such that the remaining linear actuators may support the modular home 101 when one linear actuator is retracted and not supporting the modular home 101. Operation 314 is illustrated in FIG. 4G, according to some embodiments. The first linear actuator 130a may be retracted from its respective first crawler 190a. The remaining linear actuators 130 may remain engaged with their respective crawlers 190, thus continuing to support the modular home 101. In some embodiments, the rod of each linear actuator 130 may couple to a pivotable base plate. The base plate may be fixedly coupled to the rod, or the rod may engage the base plate when it extends down to the crawler and may lift the base plate off the crawler when the rod retracts.

Figure 4H:
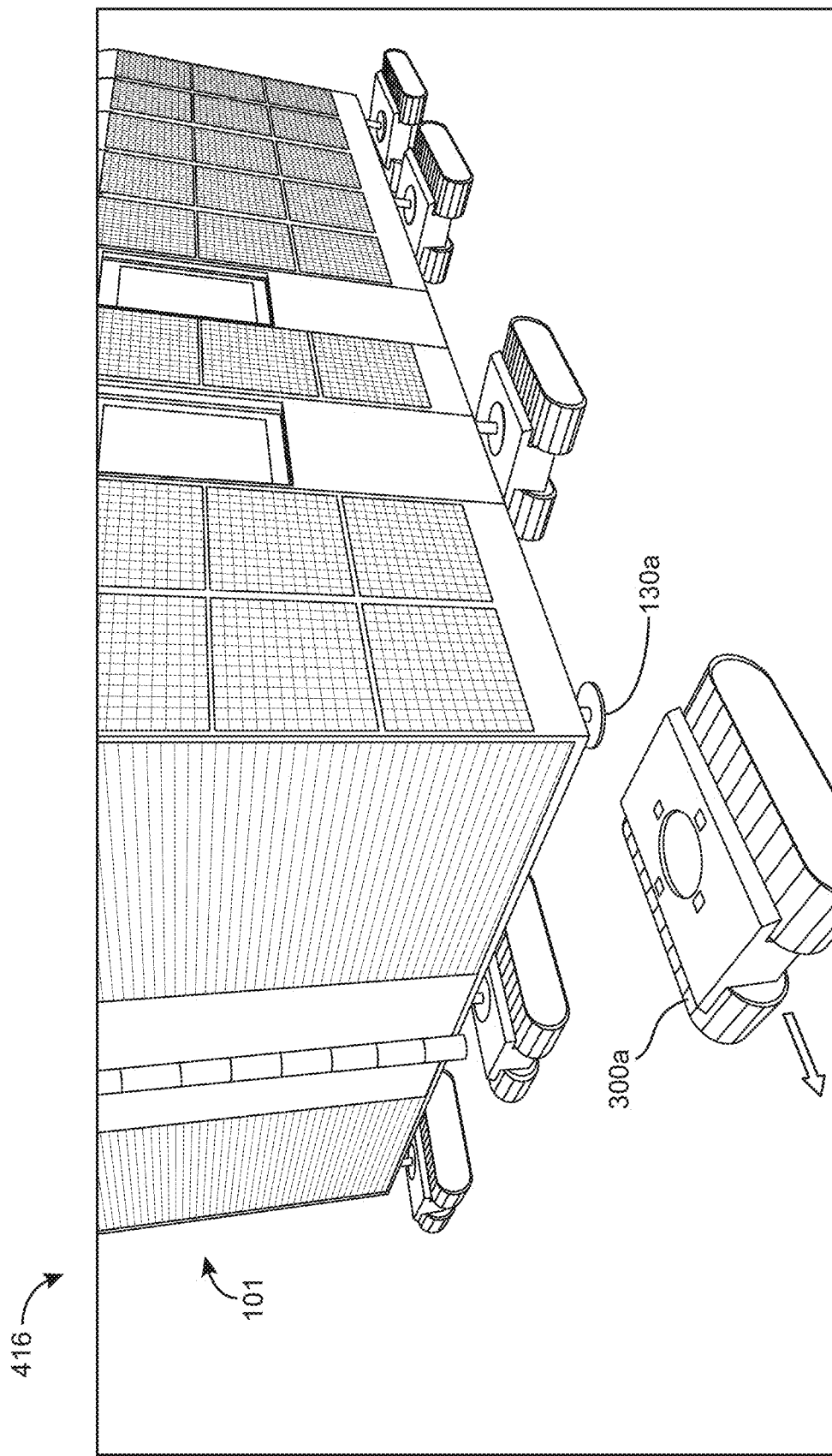

At operation 316 of the method 300, a third set of instructions are sent to the first crawler. Operation 316 is illustrated in FIG. 4H according to some embodiments. The controller may transmit the third set of instructions to the crawlers. Receipt of the third set of instructions may cause the crawler to move out from underneath the first linear actuator to a third location. Once the first linear actuator 130a is retracted from the first crawler 190a, the controller may transmit instructions to the first crawler 190a, causing the first crawler 190a to move out from underneath the first linear actuator 130a to a third location. The first linear actuator 130a may then be positioned directly above the ground.

Figure 4I:
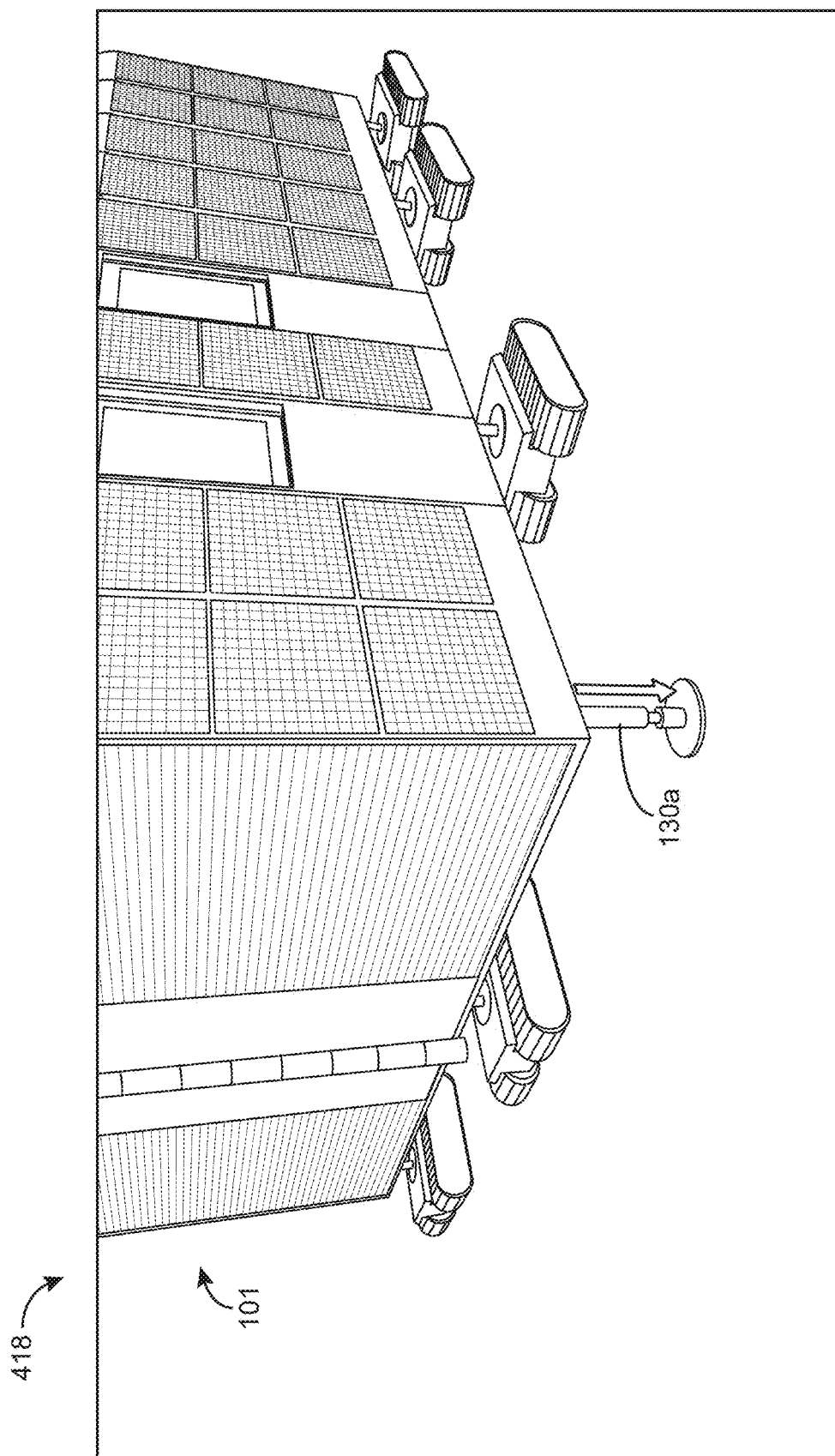
Figure 5A:
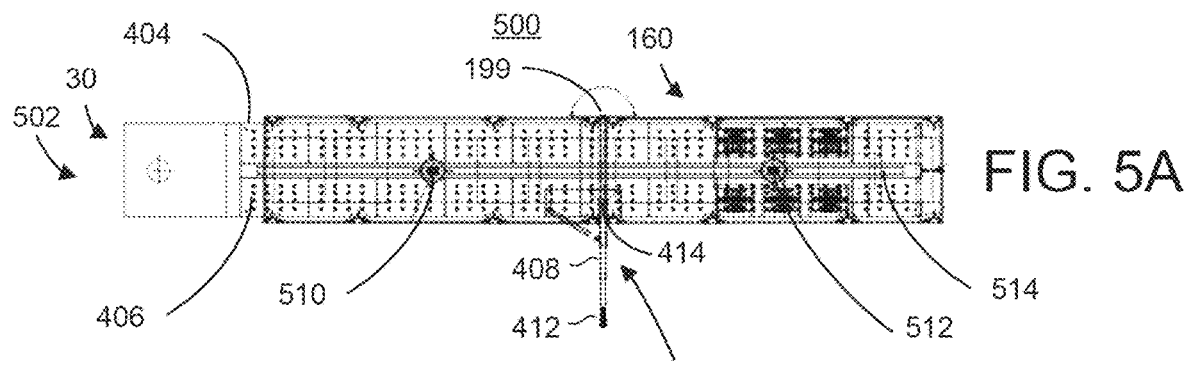
FIGS. 5A-5D are illustrations of a sequence for rotating two portions of a modular home into a single modular home, in accordance with some embodiments of the present disclosure.
Figure 5B:
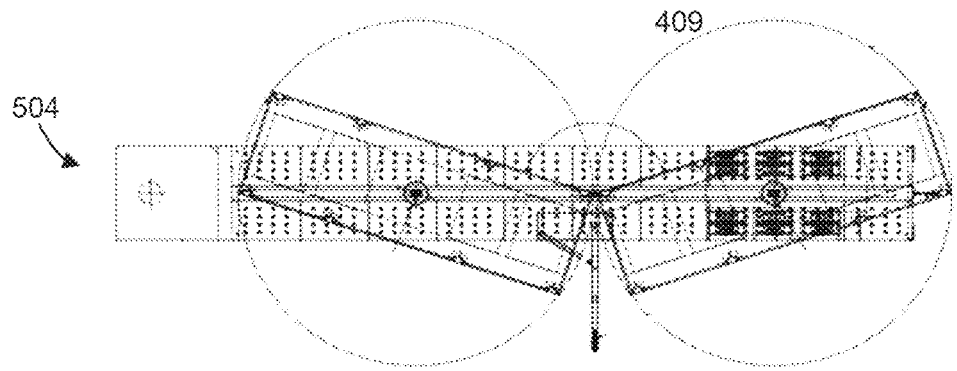
Figure 5C:
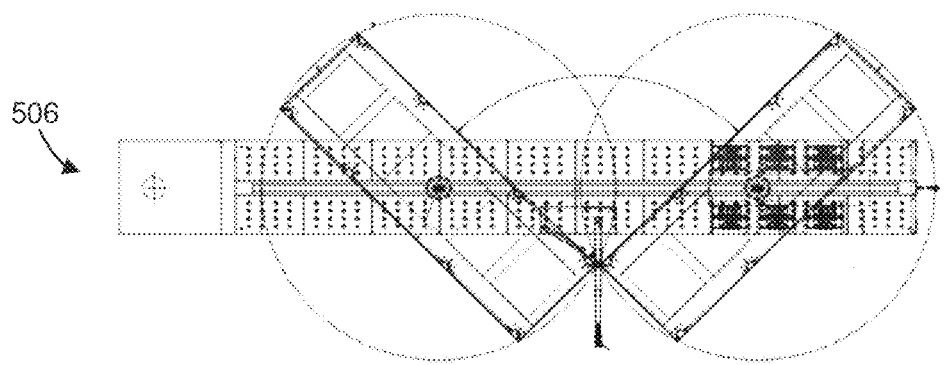
Figure 5D:
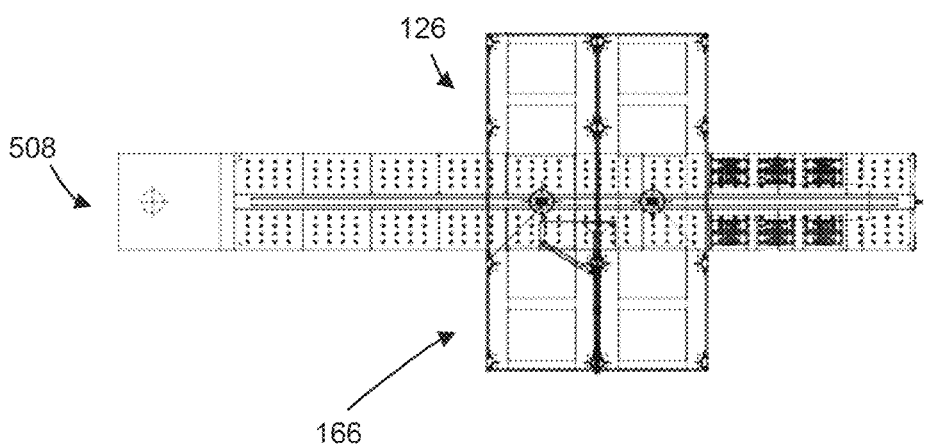

At operation 318 of the method 300, the first linear actuator is extended towards the ground and may support the modular home 101 upon engaging the ground. The modular home 101 may then be fully supported by the first linear actuator, which is engaged with the ground, and the remaining linear actuators, which are engaged with the remaining plurality of crawlers. Operations 314, 316, and 318 may be repeated sequentially for each of the linear actuators and the respective crawlers such that one linear actuator is retracted at a time, the respective crawler is moved to another location, and the linear actuator extends towards and engages the ground. The operations may be repeated until each of the actuators is engaged (e.g., directly contacting) with the ground and each of the crawlers has moved away from the modular home 101. Operation 318 is illustrated in FIG. 4I. The first linear actuator 130a, extends towards and engages the ground. As discussed above, each other near actuator 130 may be sequentially retracted from its respective crawler 190, the respective crawler 190 may be moved away, and the linear actuator 130 may extend toward and engage the ground. Once each of the linear actuators 130 are concurrently engaging the ground, the modular home 101 may be fully supported by the linear actuators 130 on the ground.

Figure 45:
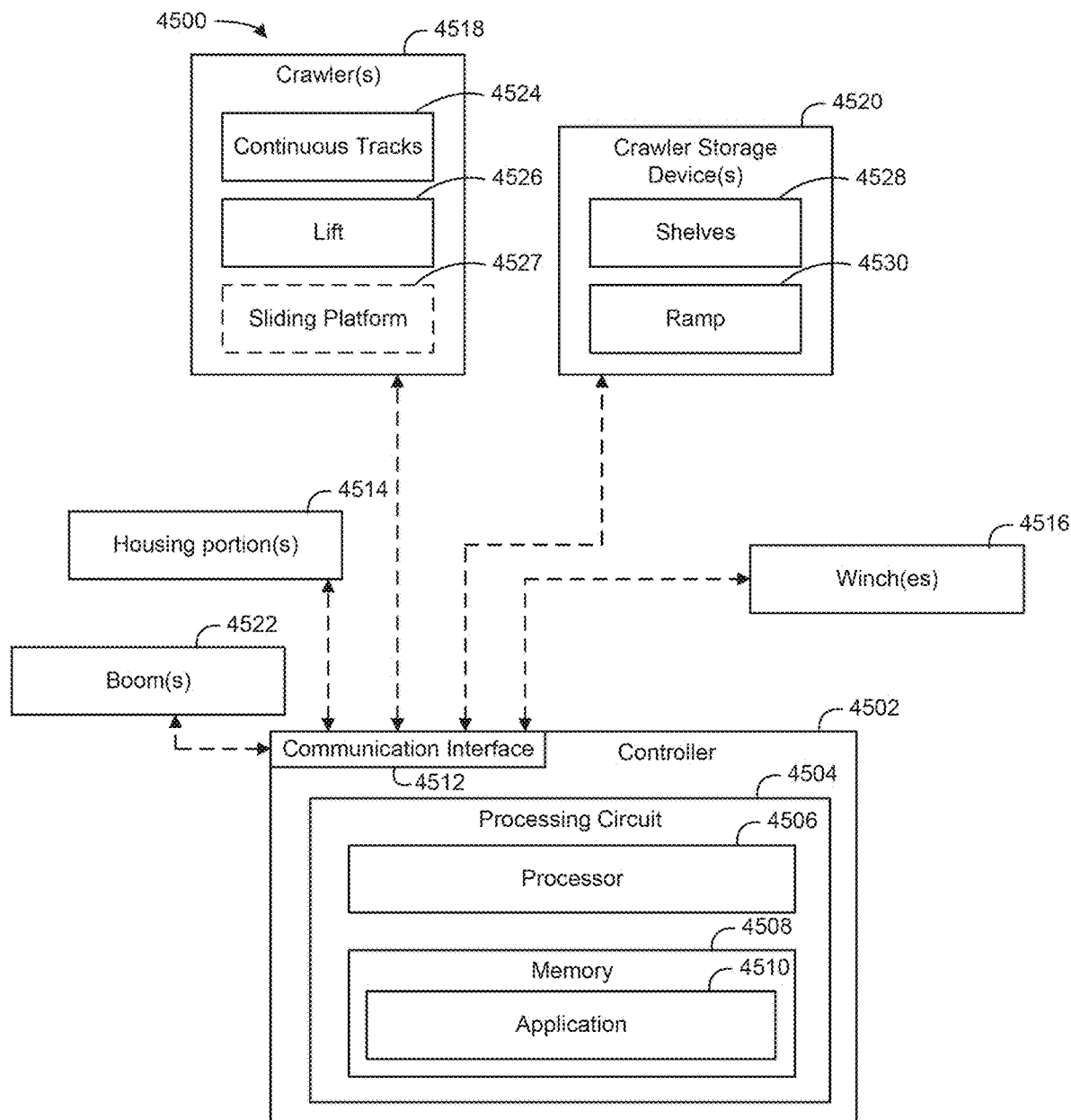
FIG. 45 is a block diagram of a control system, in accordance with some embodiments of the present disclosure.

In some embodiments, a controller (e.g., the controller 4502, shown and described with respect to FIG. 45) may be configured to control the operation of the various components of the rotation system by transmitting signals to components. For example, the controller 4502 may transmit a signal to an actuator of the winch assembly 409, causing the actuator to rotate or extend the boom 408 from the stowed position to the deployed or extended position. Once the rope 410 is connected to the housing portions 120, 160 or the hinge 199, the controller 4502 may transmit a signal to the winch 414, causing the winch 414 to rotate and coil the rope 410 to pull the housing portions 120, 160 toward the end of the boom 408. The controller 4502 may be configured to control other components of the system as well. For example, the controller may transmit signals to the front and rear winches 3032, 3034 (shown in FIG. 30) causing them to coil their respective ropes, to the crawlers 190, causing them to move to specified locations and/or adjust the height of the housing portions 120, 160, or to the linear actuators 130 coupled to the housing portions 120, 160, causing them to extend or retract to a specified length. The controller 4502 may be controlled via user input. For example, a user may input commands (e.g., via a graphical user interface on a user device such as a tablet computer) and the controller 4502 may execute the commands by transmitting signals to the various system components. For example, the graphical user interface may include a "Deploy Boom" button that, when pressed by the user, causes the controller to transmit a signal to an actuator of the winch assembly 409, causing the actuator to rotate or extend the boom 408 from the stowed position to the deployed or extended position.

In some embodiments, several commands may be programmed in advance, and the method 300 may be executed with none or minimal user input. For example, after the housing portions 120, 160 have been rotated by the winch assembly 409 and coupled together, and the rope 410 has been disconnected, the controller 4502 may transmit signals to the components in a predefined sequence. The user may, for example, select an "Unload" button on the graphical user interface, which may cause the crawlers 190 to deploy and position themselves under the overhanging portions 126, 166 of the modular home 101, the linear actuators 130 to extend down to engage the crawlers 190 and lift the modular home 101 off of the bed 404, the crawlers 190 to move the modular home 101 to the installation location, and the linear actuators 130 to disengage from the crawlers 190 one at a time, while the crawlers return to the trailer 30, and engage the ground to support the modular home. All of these steps may be performed without on-site human interaction based on preprogrammed instructions transmitted to or accessible by the controller 4502. The user device may be wirelessly coupled to the controller 4502 (e.g., via Wi-Fi, Bluetooth, a cellular connection, etc.), may be one or more components of the trailer 30 (e.g., physical buttons located on the trailer, a graphical user interface located on the trailer 30), or may be connected to the trailer via a wired connection (e.g., form the cab of the truck towing the trailer 30). The controller 4502 may be, for example, a component of the trailer 30 or a component of the user device. In some embodiments, there may be multiple controllers 4502. For example, the winch assembly 409 may have a different controller 4502 than the linear actuators 130, each crawler 190 may have a separate controller 4502, etc. In some embodiments, a central controller 4502 may be configured to transmit signals to separate controllers of the individual system components.

Referring now to FIGS. 5A-5D, a sequence 500 for rotating a modular home (e.g., modular home 101) on a trailer is described, in accordance with some embodiments. The sequence 500 may include more or fewer operations and the operations may be performed in any order. Performance of sequence 500 may enable a modular home 101 to be removed from a single trailer bed without the use of a crane. For example, the sequence 500 may involve a unique trailer bed (e.g., a trailer bed that includes a roller deck, side winches, guide pins, stabilizing landing gear, etc.) and unique components within or on the modular home 101 that allow the home 101 to fold in half (e.g., a hinge, a pin hole in the floor, etc.) and dismount from the truck (e.g., integrated mechanical lifting legs). The components of the trailer bed may fold two portions (e.g., housing portions 120, 160) of a modular home 101 laying on the trailer bed into a single modular home. For instance, side winches on the trailer bed may pull the modular home 101 from a central point hinge welded to the two portions' structural frames. A roller deck on the bed may allow the home to freely slide on the trailer deck. Holes in the modular home 101 may accept a sliding pin embedded in the trailer deck. The pin may guide the home 101 as the home folds in half. Quick connect bolts and gaskets may click the home together similar to how a car door shuts into the frame of a car. In this way and using the aforementioned components, a modular home 101 may be folded on a trailer bed while using minimal human effort.

At operation 502 of sequence 500, a modular home 101 is positioned on a bed of the trailer. The modular home 101 may include a first housing portion 120 and a second housing portion 160, which may be arranged longitudinally on the bed 404 of the trailer 30. The first housing portion 120 may include a first vertical edge that is coupled by a hinge 199 to a second vertical edge of the second housing portion 160. The hinge 199 may enable the two housing portions 120, 160 to be folded into a single modular home 101 while the two portions 120, 160 remain on the bed 404.

At operation 504 of sequence 500, the first housing portion 120 and the second housing portion 160 are rotated or folded such that the first and second housing portions 120, 160 each overhang first and second sides of the bed of the trailer, thus forming a first overhanging portion 126 and a second overhanging portion 166 of the modular home 101. In some embodiments, a boom or jib 408 may extend from one side of the bed 404 of the trailer 30, and a winch 414 may pull a rope 410 through a pulley 412 at the end of the boom 408 to pull the center of the modular home 101 away from the bed, causing the rotation of the first and second housing portions 120, 160. The bed 404 of the trailer 30 may include a plurality of ball transfer units 406 to reduce the friction between the modular home 101 and the bed 404. Each housing portion 120, 160 may be rotatably coupled to a rotation pin 510, 512 positioned in a slot 514 in the bed 404 of the trailer 30. By pulling the modular home 101 with the winch 414 through the pulley 412, the housing portions 120, 160 may rotate about the rotation pins 510, 512, and the rotation pins may slide along the slot toward each other as the housing portions rotate. More specifically, and as illustrated in FIGS. 29A-29B, the winch assembly 409 and the hinge 199 may be positioned on opposite sides of the trailer, the rope 410 may be extended between the housing portions 120, 160 and connected to the hinge 199 or to one of the housing portions 120, 160 in an area near the hinge 199. As the winch 414 retracts the rope 410, the hinge 199 is pulled toward the winch assembly 409. At first, the rotation pins 510, 512 may move away from each other, towards the front and rear of the trailer 30, respectively, until the hinge 199 crosses the centerline of the bed 404 above the slot 402. Then, as the hinge 199 is pulled beyond the centerline, the rotation pins 510, 512 may move toward each other and the center of the trailer bed 404.

In some embodiments, a winch may be coupled to the rotation pins and may pull the rotation pins toward each other, thus causing the rotation of the housing portions. In some embodiments, a first winch may begin the rotation of the housing portions 120, 160 using the boom and pulley as described above, and a second winch may complete the rotation by pulling the rotation pins 510, 512 toward each other. At operation 506 of sequence 500, the housing portions 120, 160 continue to rotate the pins continue to move toward each other.

At operation 508 of sequence 500, the two housing portions 120, 160 meet. A first horizontal edge of the first housing portion 120 may then be coupled to a second horizontal edge of the second housing portion 160. For example, the top and/or bottom edges of the housing portions 120, 160 may be coupled together. Alternatively or in addition, third vertical edge of the first housing portion 120 may be coupled to a fourth vertical edge of the second housing portion 160. Thus, the vertical edges opposite the vertical edges to which the hinge 199 is coupled may be coupled together. Then, a plurality of linear actuators 130 coupled to the first and second overhanging portions 126, 166 of the modular home 101 may be extended downward and may engage the ground or a plurality of crawlers to lift the modular home 101 off the bed of the trailer 30.

In some embodiments, the modular home 101 may include only one housing portion and may not include a hinge. The single housing portion may be rotatably coupled to a rotation pin and rotated in a manner similar to that of the modular home that includes two housing portions (e.g., using a winch to pull a rope through a pulley on the end of a boom). With no hinge coupling the single housing portion to another housing portion, the rotation pin may not be required to slide along a slot. Once the single housing portion is overhanging the first and second sides of the trailer, a plurality of linear actuators 130 may extend downward from the overhanging portions to engage the ground or a plurality of crawlers to lift the single housing portion off the bed of the trailer.

Figure 6A:
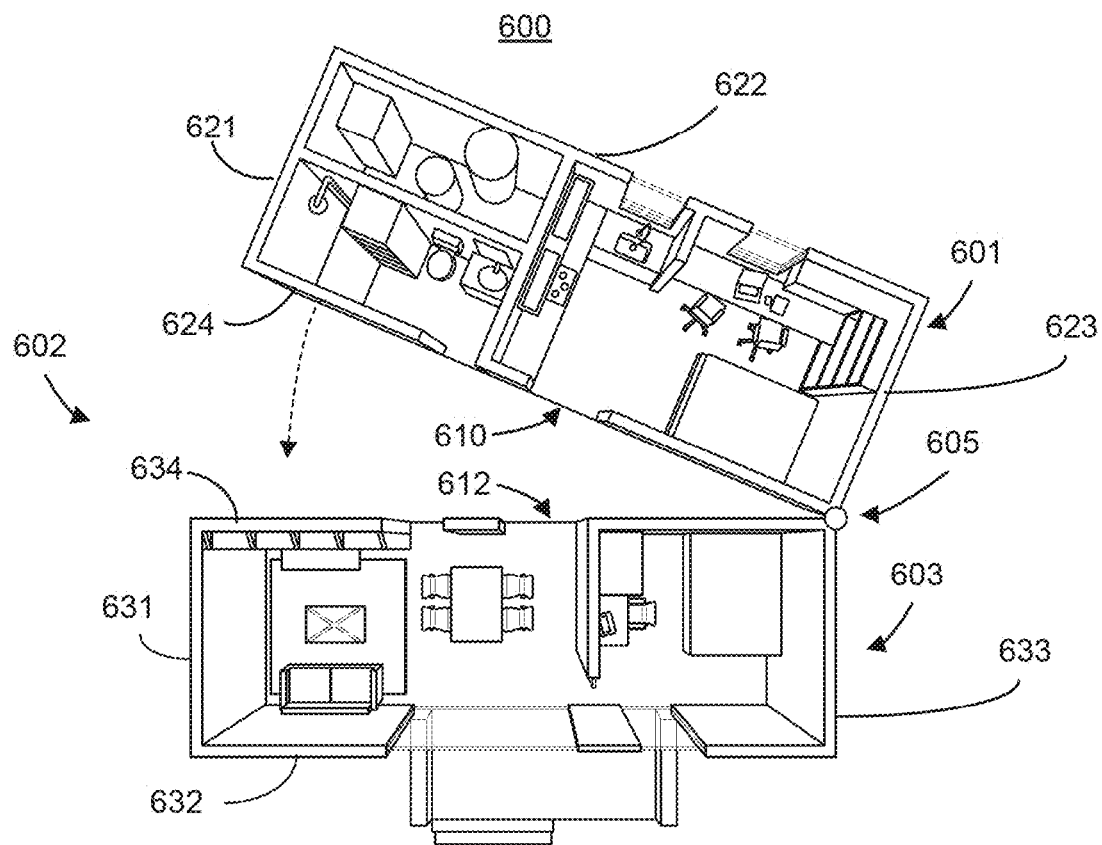
FIGS. 6A-6B are illustrations of a sequence for rotating two portions of a modular home into a single modular home, in accordance with some embodiments of the present disclosure.
Figure 6B:
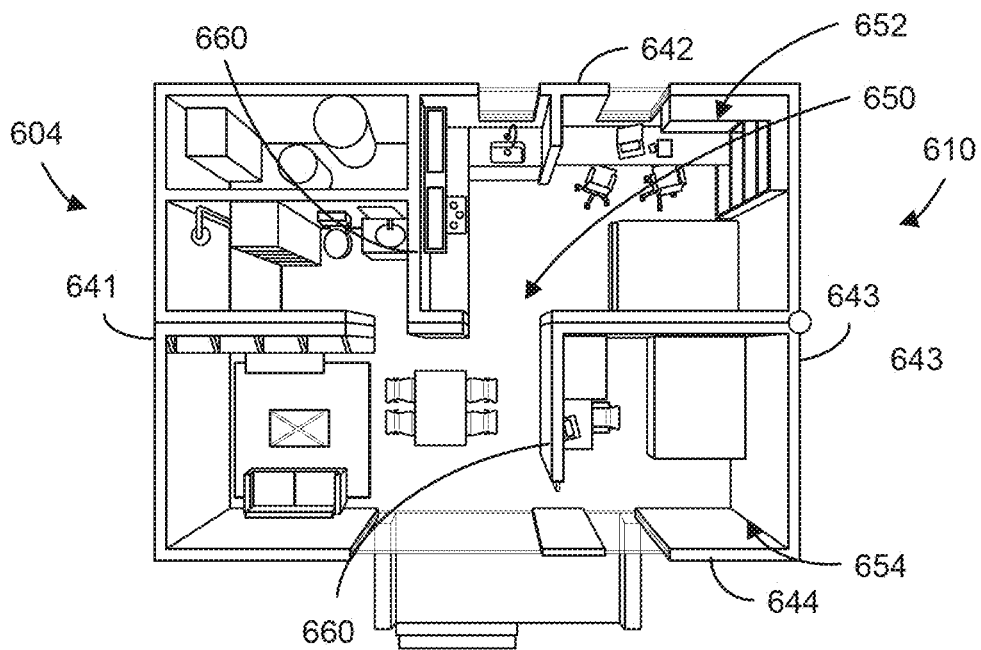

FIGS. 6A-6B illustrate a modular home 600, according to some embodiments. The modular home 600 may include a first housing portion 601 and a second housing portion 603. The structure of an individual housing portion is shown in further detail in FIGS. 7A-7F. The first housing portion 601 may include a first floor, a first ceiling, a first set of at least three walls, a first vertical edge of a first wall of the first set, and a first opening between a first horizontal edge of the first floor, a first horizontal edge of the first ceiling, and the first vertical edge. The second housing portion 603 may include a second floor, a second ceiling, a second set of at least three walls, a second vertical edge of a second wall of the second set, and a second opening between a second horizontal edge of the second floor, a second horizontal edge of the ceiling, and the second vertical edge.

The first vertical edge may be coupled to the second vertical edge by a hinge 605. The first horizontal edge of the first housing portion 601 may be configured to be coupled to a second horizontal edge of the second housing portion 603. The first housing portion 601 may rotate about the hinge 605 relative to the second housing portion 603 from an open position 602 to a closed position 604. The first housing portion 601 may be rotated relative to the second housing portion 603 as much as about 175-185 degrees from the closed position, such that in the open position, the housing portions 601, 603 are arranged longitudinally and a first opening 610 in the first housing portion 601 is facing substantially the same direction as a second opening 612 and the second housing portion 603. In the closed position 604, the first opening 610 in the first housing portion 601 and the second opening 612 in the second housing portion 603 meet and form the passageway between the housing portions 601, 603.

Three walls of the first housing portion 601 and three walls of the second housing portion 603 may form the outer walls of the completed modular home 600 when the two housing portions 601, 603 are coupled together (e.g., in the closed position 604). In some embodiments, the housing portions 601, 603 are configured to fit onto a flatbed trailer that may be approximately 8 feet in width with 40 feet of usable length. The first walls 621, 631 and third walls 623, 633 of each respective housing portion 601, 603 may thus be roughly 8 feet wide, and the second wall 622, 632 of each housing portion may be roughly 20 feet wide, such that when the housing portions 601, 603 are arranged end-to-end, they occupy substantially all of the usable area of the trailer bed. When the housing portions 601, 603 are rotated and coupled into the closed position 604 shown in FIGS. 6A-6B, the first walls 621, 621 of each housing portion 601, 603 combine to form the first\outer wall 641 of the modular home 600, and the third walls 623, 623 of each housing portion 601, 603 combine to form the third outer wall 643 of the modular home 600. When the trailer bed is 8 feet wide, the first and third outer walls of the modular home may be approximately 16 feet long. The second wall 622 of the first housing portion 601 may form the second outer wall 642 of the modular home 600, and the second wall 632 of the second housing portion 603 may form the fourth outer wall 644 of the modular home 600. It should be understood that the dimensions discussed above are exemplary only, and the trailers and/or housing portions may be larger or smaller depending on the desired size of the modular home.

As shown in FIGS. 6A-6B, in some embodiments, each housing portion 601, 603 includes a fourth wall 624, 634. The fourth wall 624, 634 of each housing portion 601, 603 may include at least one opening 610, 612. When the housing portions 601, 603 are rotated and coupled together, the fourth walls 624, 634 of each housing portion 601, 603 may cooperatively form interior walls of the housing portion. The openings 610, 612 may be aligned to form at least one passageway 650 between a first living area 652 (e.g., a first space within the first housing portion 601, an interior space, etc.) defined by the four walls 621-624 of the first housing portion 601 and a second living area 654 (e.g., a second space within the second housing portion 603, an interior space, etc.) defined by the four walls 631-634 of the second housing portion 603, such that a single contiguous living area is formed between the first and second living areas 652, 654 joined by the passageway 650. Each of the first and second living area 652, 654 may itself include additional internal walls 660 to separate rooms within the living area 652, 654. Thus, when the housing portions 601, 603 are arranged longitudinally on the trailer bed 404, the openings 610, 612 may be arranged to face the same direction (e.g., both openings 610, 612 may be positioned on and face the area to the left side of the trailer 30). The openings 610, 612 may be positioned the same distance away from the hinge pin, such that when each housing portion 601, 603 is rotated ninety degrees about the hinge pin, the openings 610, 612 align.

In some embodiments, the wall 621 may be referred to as a first wall, the wall 623 may be referred to as a second wall, the wall 631 may be referred to as a third wall, the wall 633 may be referred to as a fourth wall, the wall 624 may be referred to as a fifth wall, and the wall 634 may be referred to as a sixth wall. The fifth wall 624 may be defined between vertical edges of the first wall 621 and the second wall 623, a horizontal edge of the first floor, and a horizontal edge of the first ceiling. The sixth wall 634 may be defined between vertical edges of the third wall 631 and the fourth wall 633, a horizontal edge of the second floor, and a horizontal edge of the second ceiling.

In some embodiments, each housing portion 601, 603 may not include a fourth wall 624, 634. Instead, where there would be a fourth wall, there may be an opening defined by vertical edges of the first and third walls 621, 623, 631, 633 and horizontal edges of the floor and ceiling. When the housing portions 601, 603 are rotated and coupled together, they may form a single living area bounded by the three walls 621, 622, 623, 631, 632, 633 of each housing portion 601, 603, with the first and third walls 621, 623, 631, 633 of each housing portion combining to form first and third outer walls 641, 643 of the modular home, the second wall 622 of the first housing portion 601 forming the second outer wall 642 of the modular home, and the second wall 632 of the second housing portion 603 forming the fourth outer wall 644 of the modular home. Similar to the embodiments in which each housing module includes a fourth outer wall that becomes an inner wall of the completed modular home, each housing portion may include internal walls 660 to separate rooms within the living area.

The vertical and horizontal edges that meet when the housing portions 601, 603 are rotated and coupled together may form a rectangular frame. For example, the first and second vertical edges, the horizontal edge along the floor, and the horizontal edge along the ceiling may form the frame. The frame may surround a wall that becomes an internal wall when the housing portions 601, 603 are coupled together, or may surround an open side of the housing portion 601, 603. The frames may be substantially flat, such that each frame can be coupled to the flat frame of the other housing portion 601, 603 to form a contiguous seal around the entire side of the housing portion 601, 603. This may keep water and debris out of the living area 652, 654 and may improve heating and cooling efficiency.

Housing Portion Frame

FIGS. 7A-7F illustrate different view of a structural frame of a housing portion, according to some embodiments. In some embodiments, the structural frame may be organized into a grid (e.g., a three foot grid) with four primary 'moment frames' to create a rigid tube structure. The entire frame may be welded aluminum as a cheap light material. The floor structure of the frame may include special provisions for penetrating support legs and holes for guiding pins used in offloading the frame from a truck bed using the systems and methods described herein.

The structural frame may be structured to be a lightweight frame that can fold in half to form a single modular home with another similar frame, have a rigid thin structure, and have a floor diaphragm that can withstand shear forces resulting from scraping against a truck bed during rotation. To be structured in such a manner, the structural frame may have transverse spacing (e.g., three foot transverse spacing) that maintains fabrication redundancy and cost efficiency. The frame may also be built using welded aluminum framing and thin corrugated shear panels to reduce the weight of the structure. A hinge may be welded to the frame for folding of the frame with another similar frame. Primary and secondary members may be bent to form a unique home shape. Additionally, the floor of the frame may have a rigid diaphragm with a central reinforced pin hole to enable the frame to rotate on a truck bed. Lifting leg housing sleeves may penetrate the perimeter of the floor to allow lifting legs (e.g., mechanical actuators) to pass through to the ground. The structural frame may also have a concept recess design structure to house front and rear hinge assemblies for fold-down decks. Finally, the different components of the structural frame may be bolted together through a bolting system that provides rigidity to the frame.

Figure 7A:
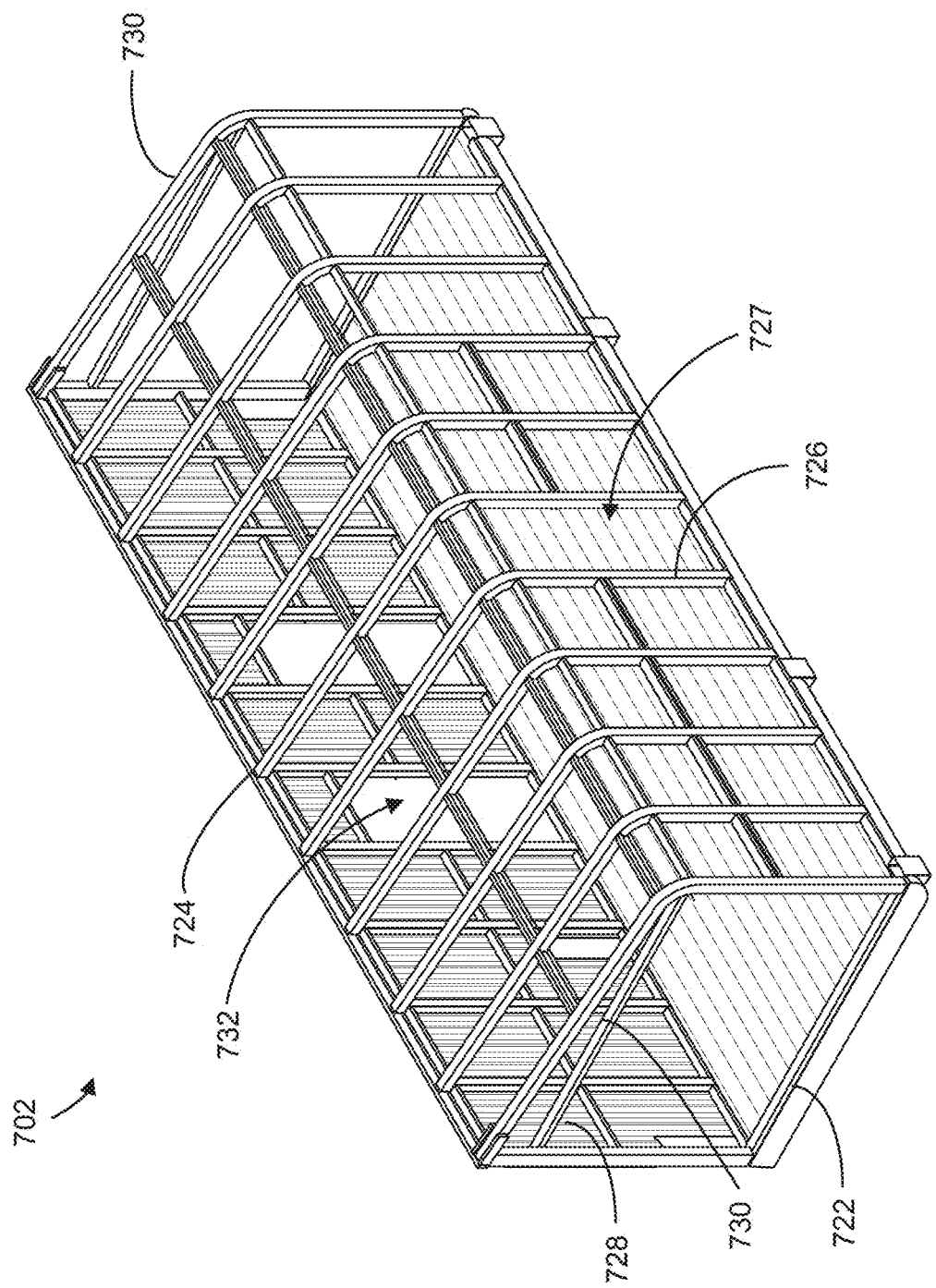
FIGS. 7A-7H are illustrations of different views of a housing portion, in accordance with some embodiments of the present disclosure.
Figure 7B:
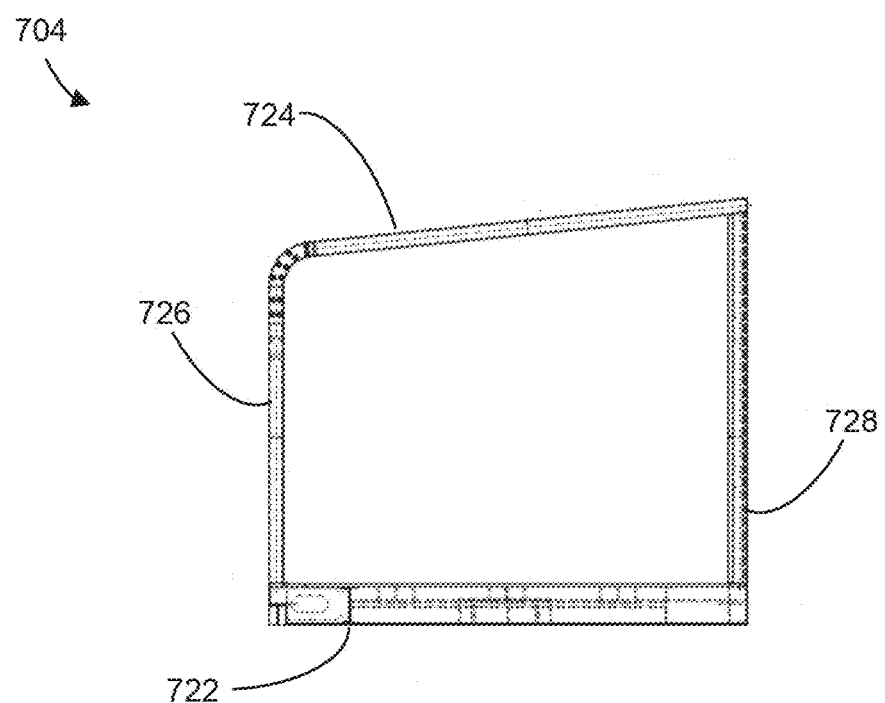

For example, in FIG. 7A, a perspective view of a housing portion frame 702 is shown, according to some embodiments. The frame 702 may include a floor panel assembly 722 and a roof panel assembly 724 supported by an outer side panel assembly 726, an inner side panel assembly 728, and two end panel assemblies 730. The outer side panel assembly 726 may include one or more outer doorways 727 and the inner side panel assembly 728 may include one or more inner doorways 732 to allow passage between housing portions 601, 603 when two housing portions 601, 603 are joined. FIG. 7B is a side view of a frame 704. The roof panel assembly 724 may be sloped towards the outer side panel assembly 726 to allow water to flow off of the roof, which may include solar panels for self-sustainability.

Figure 7D:
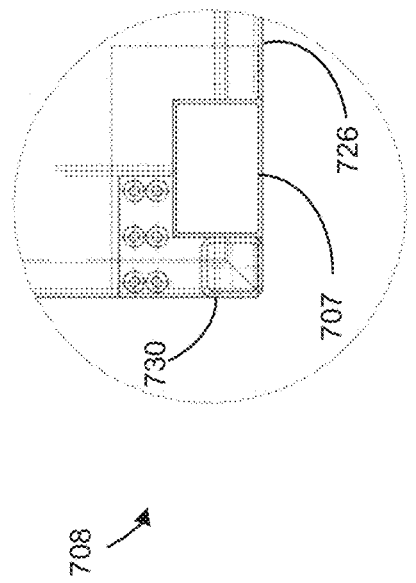
Figure 7E:
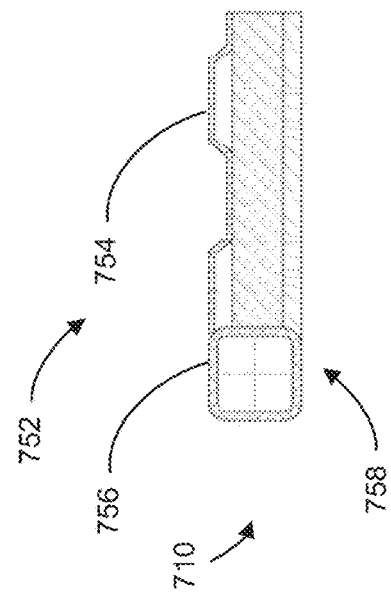
Figure 7C:
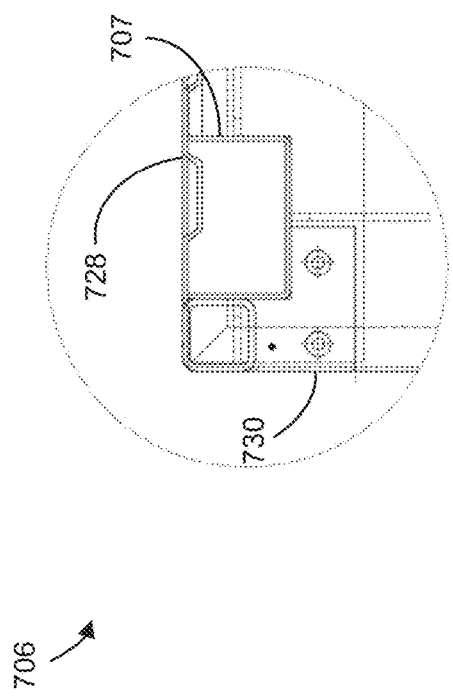

FIG. 7C is a detailed view of a portion of a frame 706 of a modular home housing portion 601, 603, according to some embodiments. The frame 706 may include a floor panel assembly 722, an inner side panel assembly 728 and an outer side panel assembly 726 extending vertically from the floor panel assembly 722, and a roof panel assembly 724 supported by the side panel assemblies 726, 728. Each panel assembly 722-730 may include panel portions coupled to the frame portions. The panel portions may be, for example, sheets of glass, metal, wood, or other materials. The frame 706 may also include a plurality of housing sleeves 707 coupled to the floor panel assembly. Each housing sleeve may be configured to receive a linear actuator for lifting and lowering the frame 706. The housing of a linear actuator, (e.g., linear actuators 130) may be coupled to the housing sleeve 707 such that when the rod of the linear actuator extends towards and engages the ground, the linear actuator lifts the frame 706 (e.g., the entire housing portion 601, 603) off the ground. FIG. 7D shows a similar detailed view of a portion of a frame 708 at an outer wall of the frame 708, rather than the inner wall shown in FIG. 7C, according to some embodiments. The housing sleeves 707 may be positioned at various locations around the housing portion 601, 603 of the modular home such that linear actuators may be coupled to the housing portion 601, 603 to cooperatively support the housing portion 601, 603. Housing sleeves according to some embodiments are shown in further detail in FIG. 10A.

FIG. 7E is a section view of a portion of an inner side panel assembly 710, according to some embodiments. The outer wall 752 of the inner side panel assembly 710 may include a corrugated panel 754 coupled to one or more vertical pillars 756. The inner wall 758 of the inner side panel assembly 710 may include wood or a medium density fiberboard panel. Thermal insulation may be positioned between the inner wall 758 and the outer wall 752.

Figure 7F:
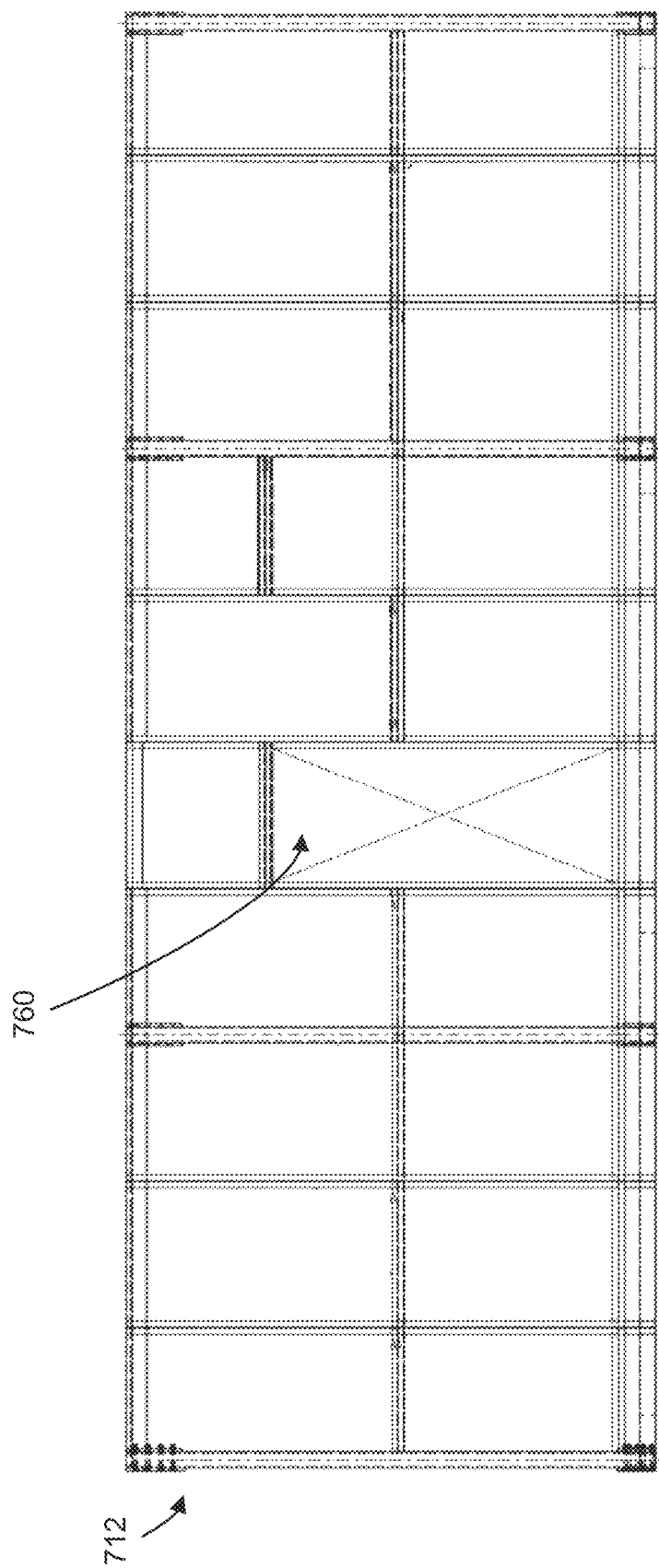
Figure 7G:
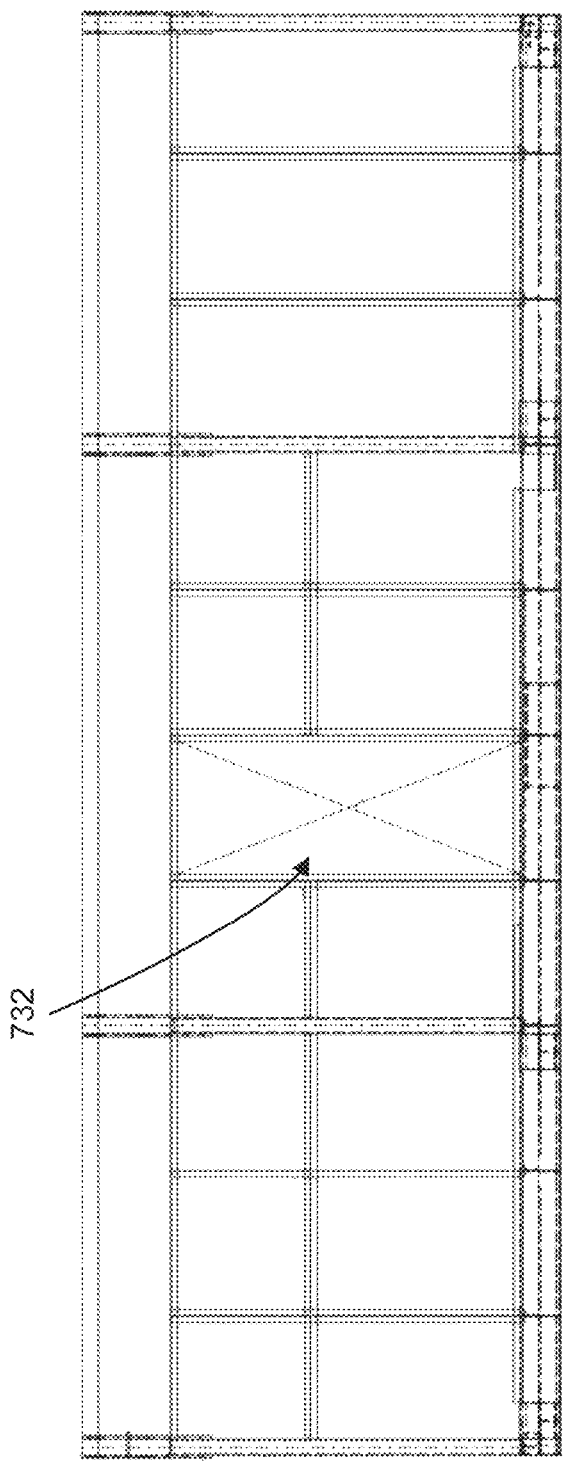

FIG. 7F shows the structural frame of a roof panel assembly 712, according to some embodiments. The structural frame may accommodate the installation of one or more skylights 760 in the roof panel assembly 712. FIG. 7G shows the structural frame of a side panel assembly 714, according to some embodiments. The structural frame may include one or more openings forming doorways 732 in the side panel assembly 714.

Figure 7H:
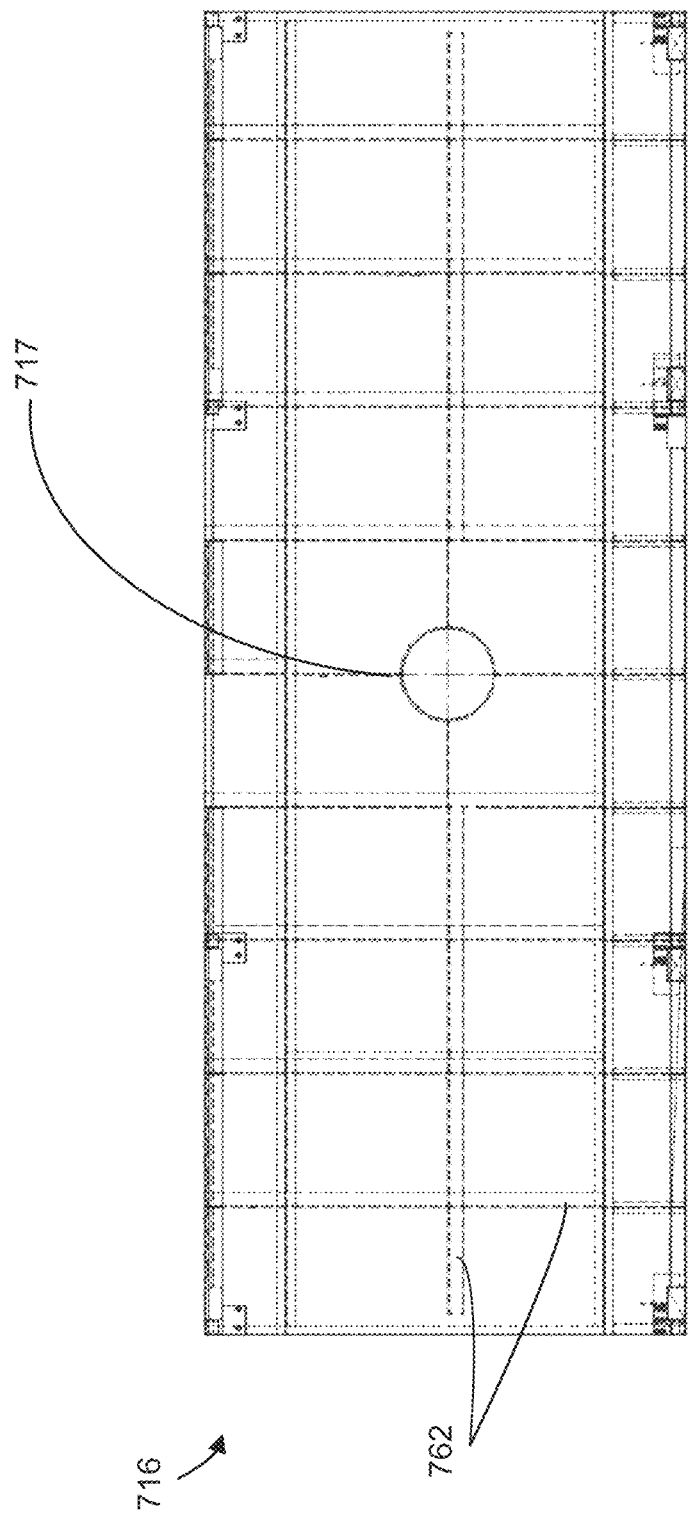

FIG. 7H shows the structural frame of a floor panel assembly 716 of a modular home housing portion, according to some embodiments. The floor panel assembly 716 may include a plurality of structural members 762 that support the floor of the housing portion. At least one side panel assembly 716 can be coupled to and can extend vertically from the floor panel assembly 716 to support a roof panel assembly 712. The modular housing portion frame 706 may include a pin hole 717 (e.g., pin socket, etc.) positioned below and coupled to the floor panel assembly 716. In some embodiments, the pin hole 717 may be welded to structural members of the floor panel assembly 716. In some embodiments, the pin hole 717 may be coupled to the floor panel assembly 716 using fasteners or other fastening devices. The pin hole 717 may be cylindrical in shape and open on the bottom, such that the pin hole 717 is configured to receive a rotation pin in the bed 404 of a trailer 30. The rotation pin is described according to some embodiments with reference to FIGS. 28A and 28B. Coupling the pin hole 717 (e.g., positioning the pin hole 717 around the pin) to the rotation pin enables rotation of the modular home about the pin.

Hinge

To fold two portions of a modular home in half, a hinge coupled to vertical edges of each portion may be used. For example, two leaves of a hinge may be coupled to vertical edges of portions of a modular home. The hinge may be designed to fold the two portions without breaking or bending during transportation (e.g., while the trailer transports the two portions of the modular home to the home's final building site) and/or to be aesthetically pleasing and expressive on the modular home building façade. For example, the hinge may be a large (e.g., eight feet and higher, depending on the scale of the modular home) hinge that connects two portions of a modular home. The hinge may be welded or bolted to the main structural framing of each portion of the modular home. The hinge may be formed of a combination of one or more of aluminum, carbon steel, and/or nylon. The hinge may operate to guide the two portions as the portions fold similar to a closing door. The leaves of the hinge may lay flush against the outside layer of the structure frames of the two portions, thus enabling the hinge to be visually pleasing and expressive on the façade of the home while still enabling the modular home to be folded together.

Figure 8A:
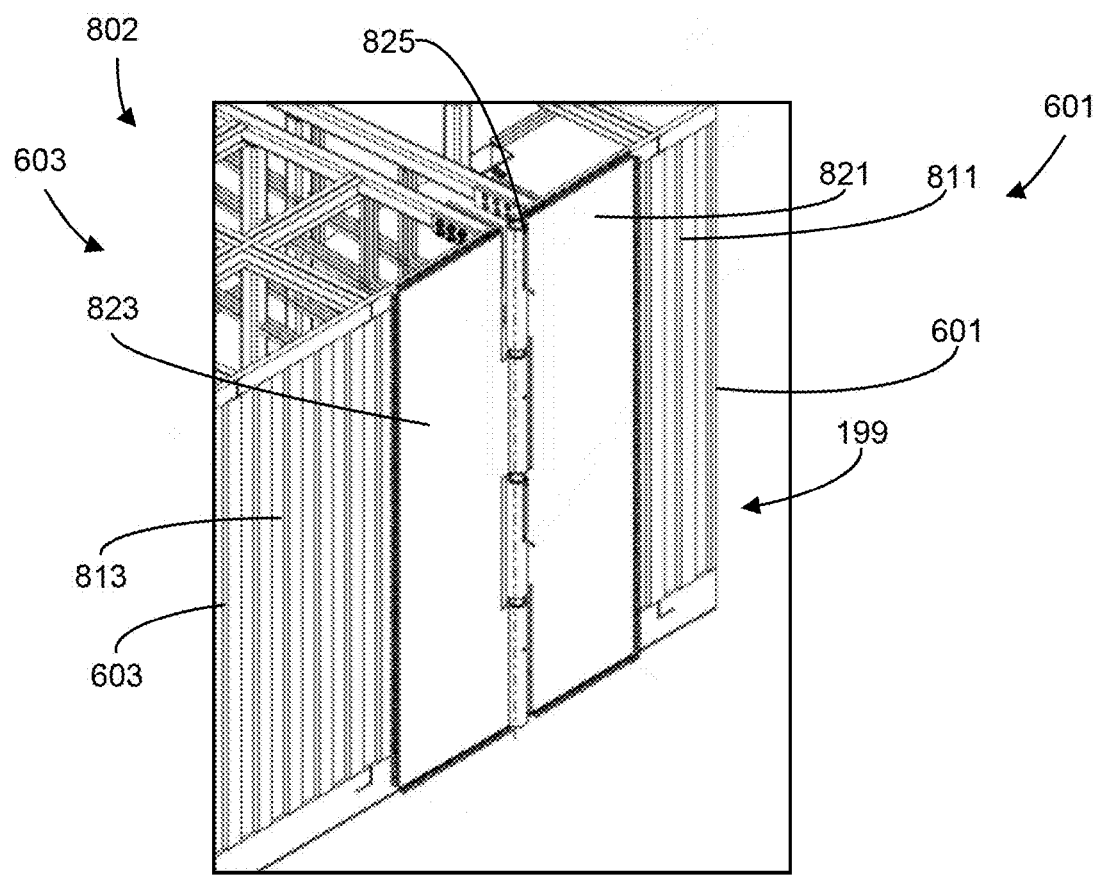
FIG. 8A is an illustration of a hinge coupled to a modular home, in accordance with some embodiments of the present disclosure.

For example, referring now to FIG. 8A, a modular home 802 with a hinge 199 coupling a first housing portion 601 of the modular home 802 to a second housing portion 603 is shown, according to some embodiments. The first housing portion 601 may include a first inner wall 811, and the second housing portion 603 may include a second inner wall 813. For clarity, the inner walls 811, 813 are positioned on the outsides of each housing portion 601, 603, but when the housing portions 601, 603 are coupled together, the inner walls 811, 813 face each other and become inner walls of the complete modular home 802. The second housing portion 603 may be configured to be coupled to the first housing portion 601 such that the first inner wall 811 is adjacent to the second inner wall 813. Each inner wall 811, 813 is shown with a respective corrugated outer panel. The modular home may include a hinge 199 that hingedly couples the first housing portion 601 to the second housing portion 603. The hinge 199 may include a first leaf 821 coupled to the first inner wall 811 and a second leaf 823 coupled to the second inner wall 823. The hinge 199 may include a hinge pin 825 that couples the first leaf 821 to the second leaf 823 such that the first housing portion 601 may be able to rotate relative to the second housing portion 603 about the hinge pin 825. The hinge leaves 821, 823 may be welded to the housing portions 601, 603, fastened to the housing portions 601, 603 with fasteners, or coupled to housing portions 601, 603 using any other fastening methods.

Figure 8B:
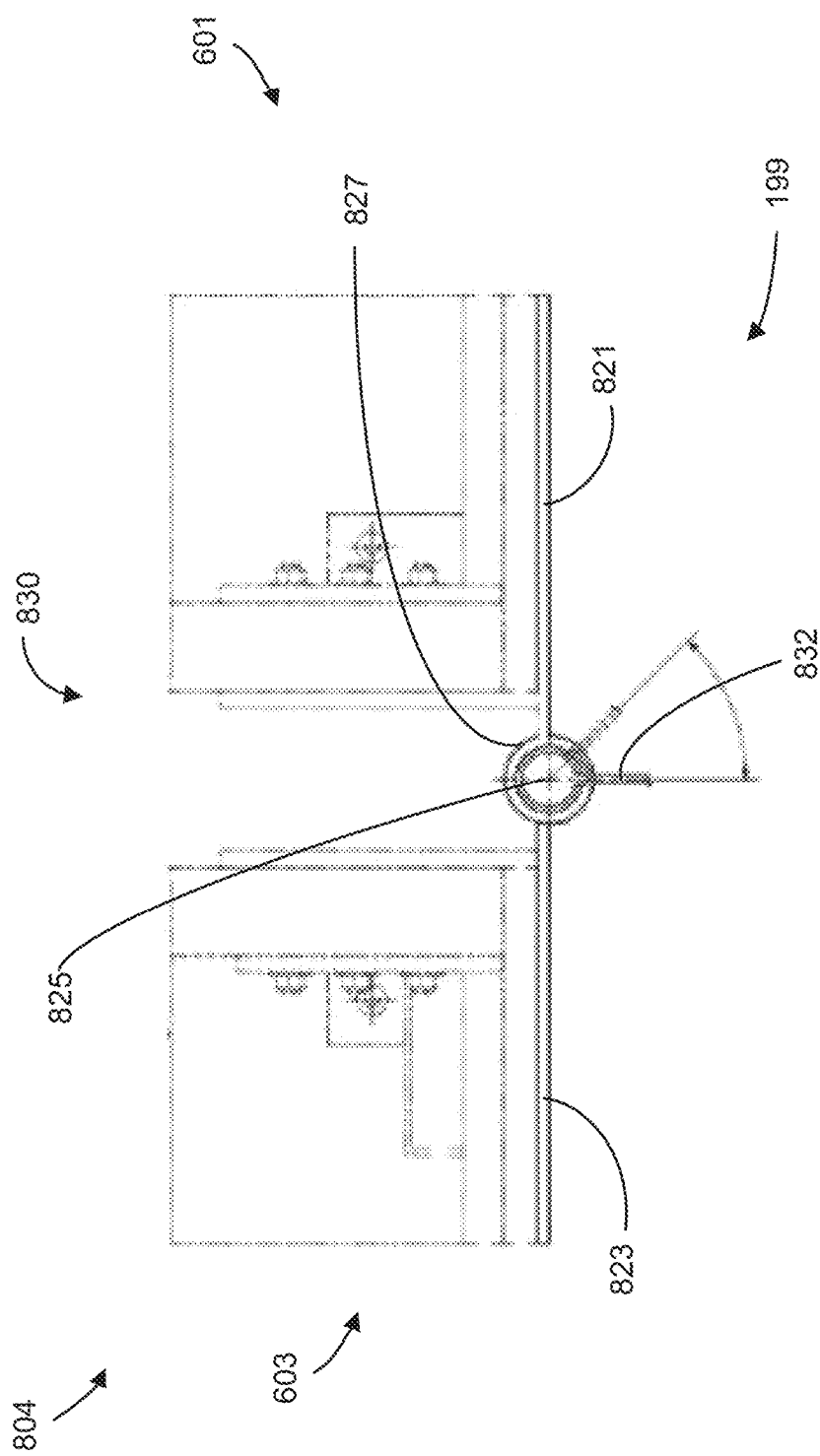
FIG. 8B is another illustration of a hinge coupled to a modular home, in accordance with some embodiments of the present disclosure.

FIG. 8B shows a plan view of a modular home 804 including a hinge 199, according to some embodiments. When the housing portions 601, 603 are arranged longitudinally for transportation on the bed 404 of a trailer 30, there may be a gap 830 between the first and second housing portions 601, 603 to accommodate the hinge bores 827 and the hinge pin 825, as well as to prevent the housing portions 601, 603 from contacting one another during shipping. When the housing portions 601, 603 are rotated and coupled together, the hinge leaves 821, 823 may rotate about the hinge pin 825 until they contact each other. The hinge leaves 821, 823 may be recessed into the inner walls 811, 813 of the housing portions 601, 603 such that the housing portions 601, 603 are flush against each other when the hinge leaves 821, 823 contact each other.

Figure 8C:
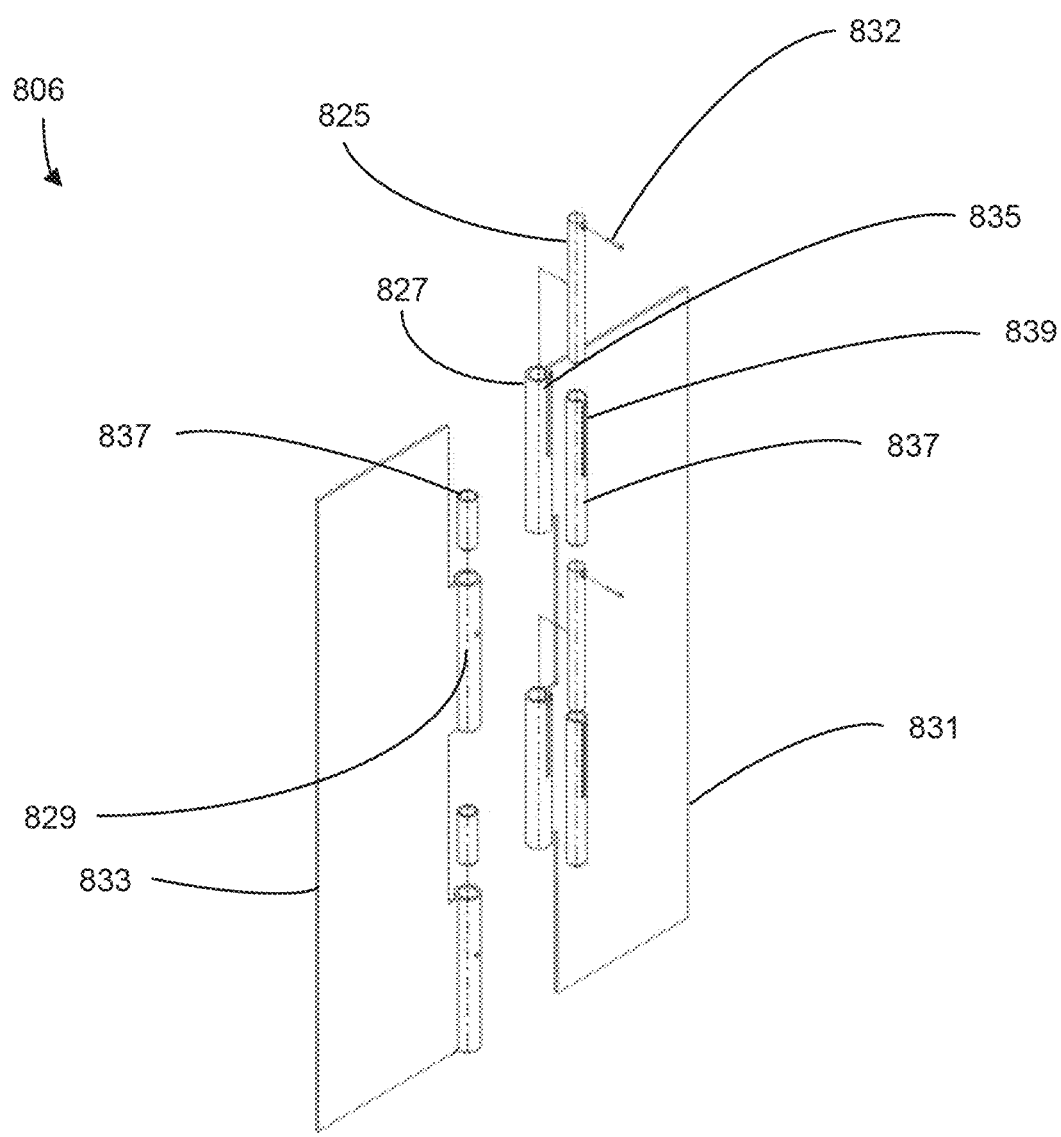
FIGS. 8C-8G are illustrations of different views of a hinge, in accordance with some embodiments of the present disclosure.
Figure 8F:
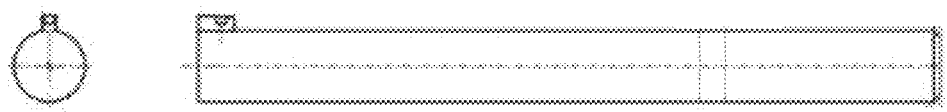

FIG. 8C is an exploded view of a hinge 806 (e.g., similar to the hinge 199) for coupling a first housing portion to a second housing portion of a modular home (e.g., housing portions 120, 160 of the modular home 101), according to some embodiments. The hinge 806 may include a first hinge leaf 831 with a first upper bore 827 and a second hinge leaf 823 with a first lower bore 829. As described herein, "bore" refers to a structural portion of the hinge 806 that includes an opening for a hinge pin (e.g., hinge pin 825), rather than referring to only the opening itself. The first upper bore 827 may include a slot 835 that includes an upper shoulder (e.g., a widening of the slot 835 near the top of the slot 835) and a lower shoulder (e.g., the bottom of the slot). The first upper bore 827 may be configured to slidably receive a first hinge pin 825. The hinge 806 may also include the first hinge pin 825, which may be received in the first upper bore 827. The handle 832 may be coupled to and extend away from the first hinge pin 825. The handle 832 may be configured to slide within the slot 835 between the upper shoulder and the lower shoulder to move the first hinge pin 825 between an upper position and a lower position. The first lower bore 829 may be configured to receive the first hinge pin 825 when the first hinge pin 825 is in the lower position. The hinge 806 may include a second (and a third, etc.) hinge pin 825, a second upper bore, and a second lower bore that function similarly to the first hinge pin 825, first upper bore 827, and first lower bore 829.

During shipping of the modular home, the hinge pin 825 may be positioned in the upper position with the hinge pin handle 832 on the upper shoulder of the slot 815, such that the hinge pin 825 does not extend into the lower bore 807 and is thus disengaged from the second leaf 833. Thus, the first housing portion 120 may not be coupled to the second housing portion 160 by the hinge 806 when the modular home 101 is being shipped on the bed 404 of the trailer 30. This may prevent damage to the hinge 806 due to vibration and shifting of the modular home 101 due to, for example, bumpy roads, potholes, etc. When the trailer 30 arrives at the unloading zone, a user may move the hinge pin handle 832 from the upper shoulder to the lower shoulder to drop the hinge pin 825 partially into the lower bore 829, thus coupling the first leaf 831 to the second leaf 833. The hinge 806 may include nylon bushings 837 positioned between the hinge pin 825 and the bores 827, 829 to reduce friction in the hinge 806. A bushing 837 may include a slot 839 that corresponds with the slot 835 in the upper bore 827, such that the handle 832 may slide through both slots 839 to the lower shoulder.

Figure 8D:
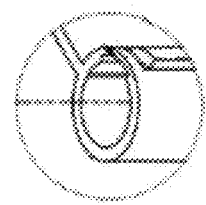
Figure 8E:
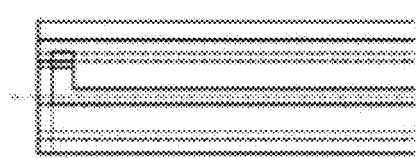
Figure 8G:
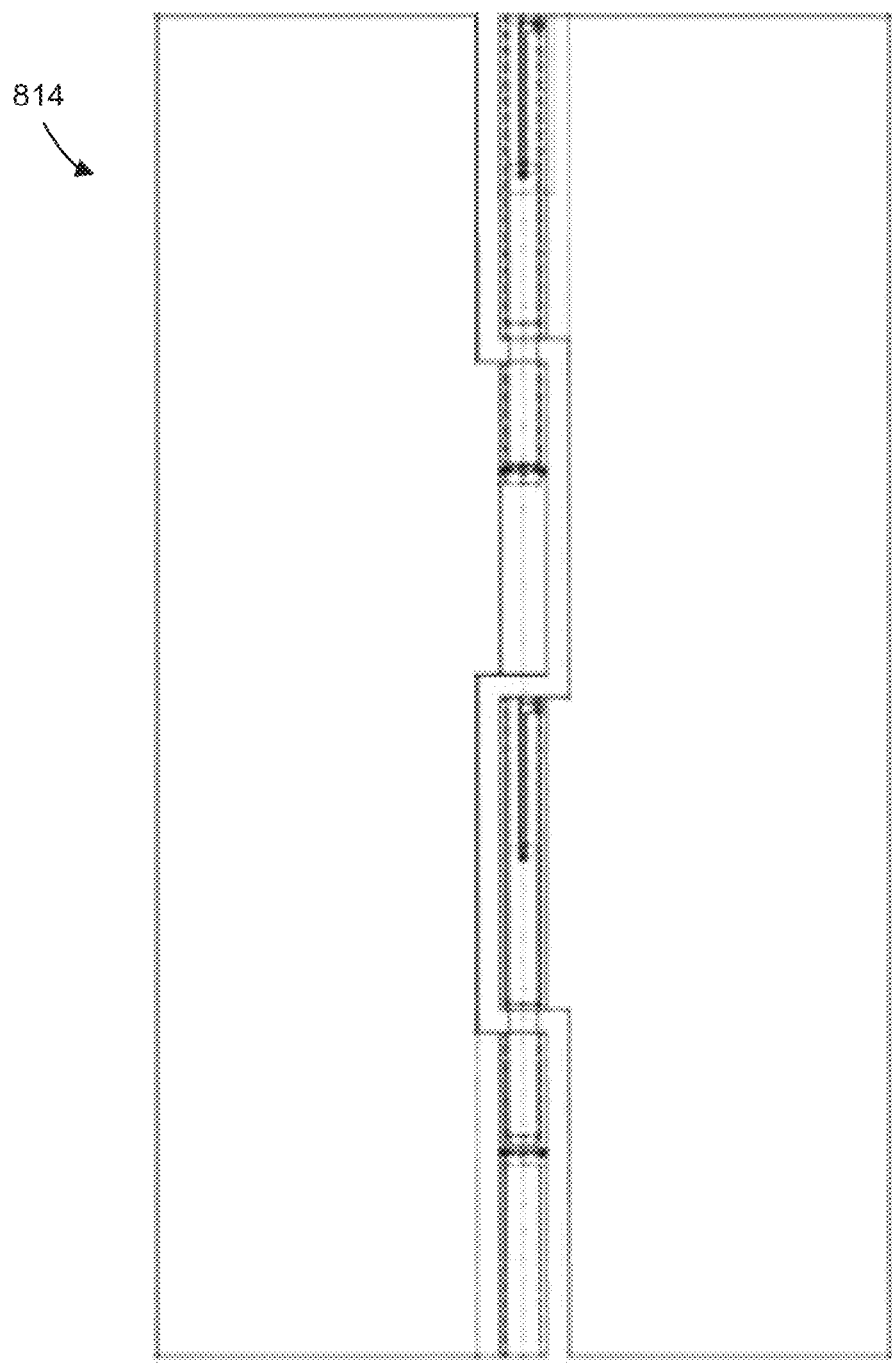

FIGS. 8D-8E illustrate components of hinges 808, 810, 812, 814 as different views of a hinge (e.g., hinge 199), according to some embodiments. Hinges 808, 810, 812, 814 may be similar to or the same as hinges 199, 806, as described above. As mentioned, a hinge that can be used in the systems and methods described herein may be designed to avoid breaking while the hinge is coupled to two portions of a modular home and there is deflection and bouncing in the trailer 30. A hinge that is coupled to both portions 120, 160 at the same time may break as the trailer 30 goes over bumps in the road. To overcome this problem, a hinge 199 may be designed with connection pins in upper bores of the hinge and such that the two leaves of the hinge are not coupled with each other. When the trailer 30 arrives at the final destination, the pins may drop from the upper position down into the bore holes below, thus coupling the leaves of the hinge together to form a single hinge or hinge assembly. Upon being coupled, the hinge may help facilitate folding the two portions of the modular home together.

Referring now to FIG. 9, a method 900 for transporting assembling a hinge (e.g., hinge 806) of a modular home 101 is described, in accordance with some embodiments. The method 900 may include any number of operations and the operations may be performed in any order. The method 900 may be performed by equipment of a construction company (e.g., the components of system 4500, shown and described with reference to FIG. 45). At operation 902 of the method 900, a modular home 101 is transported from a first location to a second location. The modular home 101 may be transported on the bed 404 of a trailer 30. The modular home 101 may include a first housing portion 120 and a second housing portion 160. A first leaf 831 of a hinge 806 may be coupled to a vertical edge of the first housing portion 120 and a second leaf 833 of a hinge 806 may be coupled to a vertical edge of the second housing portion 160. The first leaf 831 of the hinge 806 may include an upper bore 827. The second leaf 833 of the hinge 806 may include a lower bore 829. A hinge pin 825 may be positioned within the upper bore 837. During operation 902, while the modular home 101 is being transported from the first location to the second location, the hinge pin 825 and the second leaf 833 may be separated (e.g., the hinge pin may be disengaged from and remain above the second leaf 833). At operation 904 of the method 900, when the modular home 101 is at the second location, the hinge pin 825 is moved (e.g., dropped by an individual) into the lower bore 829 of the second leaf to a position at which the hinge pin 825 is partially received within the upper bore 827 and partially received within the lower bore 829.

Mechanical Legs and Leveling System

Figure 10A:
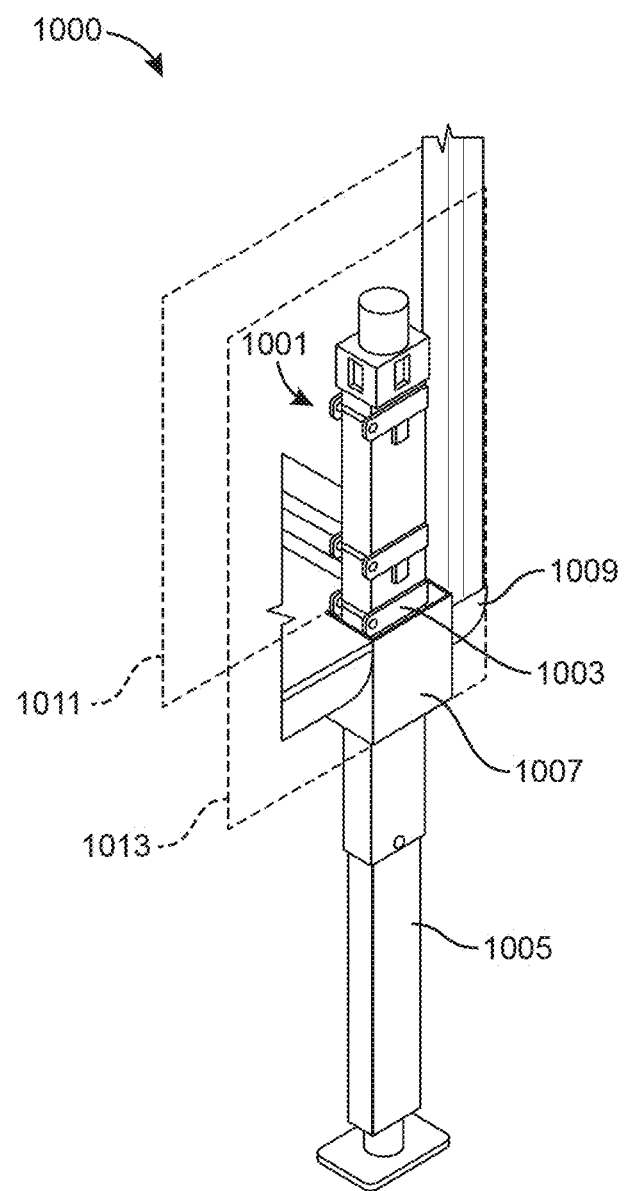
FIGS. 10A-10E are illustrations of an example leg of a modular home, in accordance with some embodiments of the present disclosure.

Referring now to FIG. 10A, a linear actuator 1001 is shown coupled to a modular home 1000, according to some embodiments. The linear actuator 1001 may include a rod 1005 that extends from a housing 1003. The linear actuator 1001 may be an electromechanical actuator that includes, for example, a ball screw, a lead screw, or an acme screw. In some embodiments, the linear actuator 1001 may be a hydraulic or pneumatic actuator. The rod 1005 may be a telescoping rod that includes multiple members that nest inside one another. The housing 1003 of the linear actuator 1001 may be coupled to a housing sleeve 1007. The housing sleeve 1007 may be coupled to a floor panel assembly 1009 of the modular home 1000. The housing 1003 of the linear actuator 1001 may extend above the floor panel assembly into a cavity between an inner panel 1011 of a wall of the modular home 1000 and an outer panel 1013 of the wall. The outer panel 1013 may define an outside surface of the modular home 1000, and the inner panel 1011 may define an inside surface of the modular home. The rod 1005 may extend downward from the floor panel assembly 1009 to engage (e.g., contact) an installation site surface. The modular home may include a plurality of linear actuators 1001 positioned within the cavity between the inner panel 1011 and the outer panel 1013 or within a similar cavity of one of the other walls of the modular home. When the rods 1005 of each of the plurality of linear actuators 1001 engage the installation site surface, the linear actuators 1001 support the modular home 1000 above the site surface.

Figure 10B:
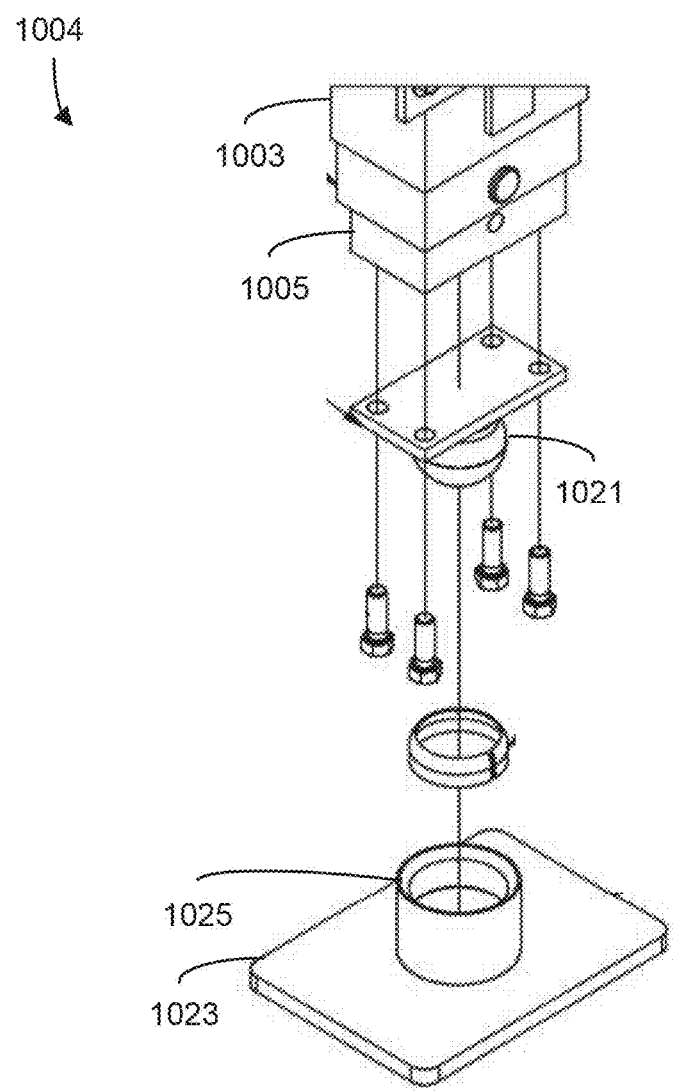

FIG. 10B shows an exploded view of a base plate assembly 1020 of a linear actuator 1004. The linear actuator 1004 may include a rod 1005 that extends downward from a housing 1003 and may be configured to extend and retract. The linear actuator 1004 may include a ball stud 1021 coupled to a distal end of the rod 1005 and a base plate 1023 with a ball socket 1025 configured to receive the ball stud 1021. The base plate 1023 may be configured to rotate about the ball stud 1021 to allow the linear actuator 1004 to engage angled or uneven surfaces. When a modular home (e.g., modular home 802) is being supported by the plurality of linear actuators 1004, the installation site surface may be angled or uneven in certain portions where the linear actuators 1004 engage. The ball stud 1021 and ball socket 1025 provide angular compliance of the base plate 1023 to allow the base plate 1023 to sit flat on surfaces that are not perpendicular to the rod 1005 of the linear actuator 1004. In some embodiments, the base plate 1023 may be configured to tilt up to 8 degrees in any direction. The base plate 1023 may have a sufficiently large surface area such that, when the modular home is installed, the base plate 1023 may rest on surfaces such as grass or soil without sinking into the surface. Thus, a concrete or stone foundation may not be required for the modular home 802.

Figure 10D:
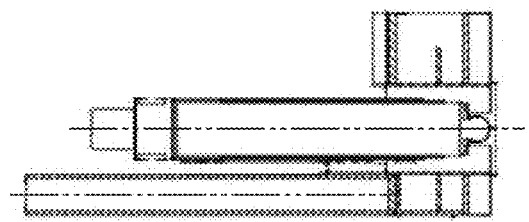
Figure 10C:
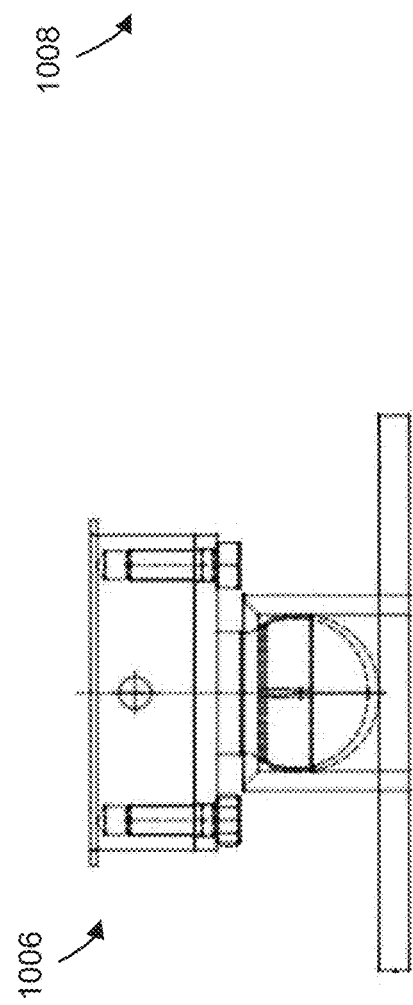
Figure 10E:
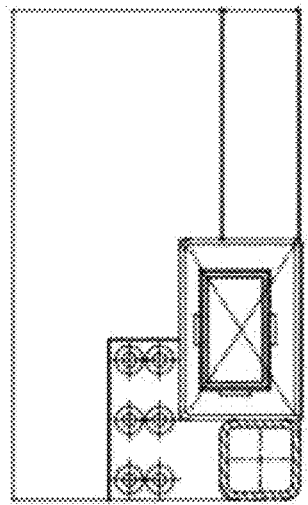

FIGS. 10C-10E illustrate the mounting and components of linear actuators 1006, 1008, 1010 in further detail, according to some embodiments. Linear actuators 1006, 1008, 1010 may be similar to or the same as linear actuators 1002, 1004, 1006, as described above. As mentioned, a linear actuator that can be used in the systems and methods described herein may be designed to lift a modular home off of a trailer without the use of a crane and to have a "self-leveling" mechanism to level the modular home on uneven terrain. The linear actuator 1006, 1008, 1010 may be an electrical mechanical extender that can be installed into a cavity of a frame of a divided modular home. The linear actuator 1006, 1008, 1010 may be configured to raise and lower the modular home in conjunction with other linear actuators that are coupled to the floor assembly to raise the modular home (e.g., modular home 802) off of a trailer bed and/or level the modular home (e.g., modular home 802) on uneven terrain. The linear actuators 1006, 1008, 1010 may have integral footing (e.g., base plate 1023) to help enable the linear actuators 1006, 1008, 1010 to press against the ground without breaking, bending, or sliding.

Figure 11:
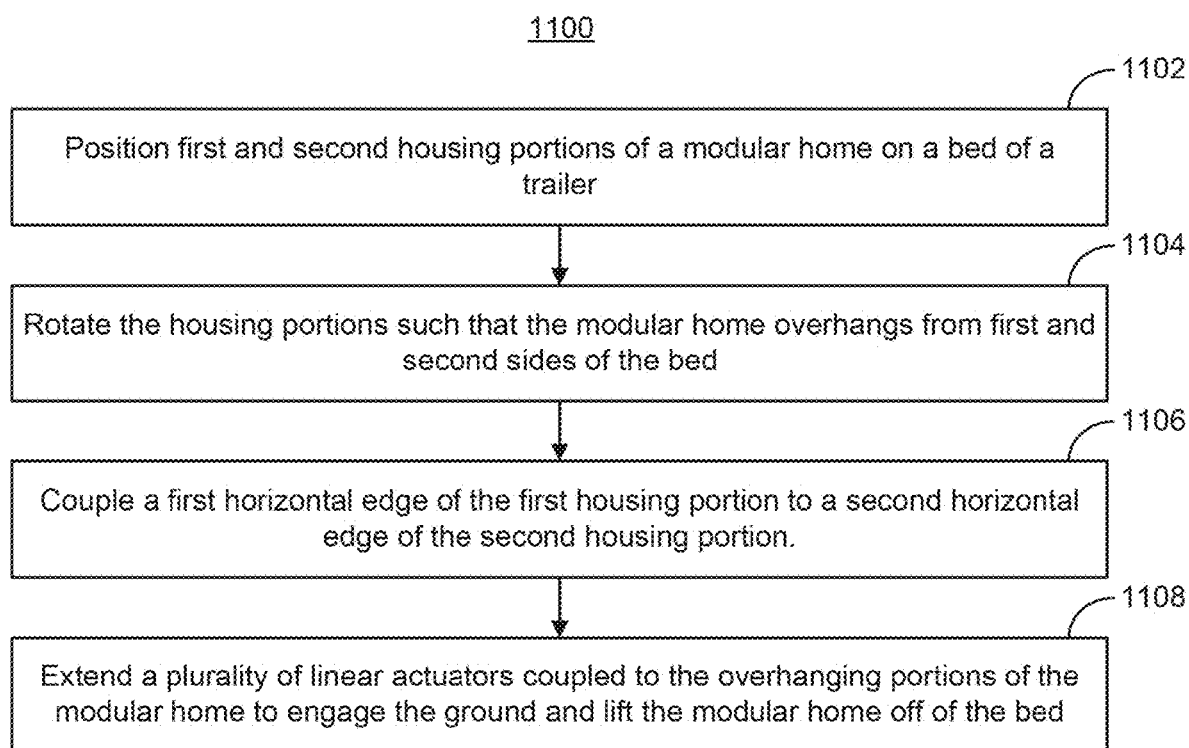
FIG. 11 is an example method for lifting a modular home off a trailer bed, in accordance with some embodiments of the present disclosure.

Referring now to FIG. 11, a method 1100 of unloading a modular home (e.g., modular home 101) from a trailer (e.g., trailer 30) is described, according to some embodiments. The method 1100 may include any number of operations and the operations may be performed in any order. The method 1100 may be performed by equipment of a construction company (e.g., the components of system 4500, shown and described with reference to FIG. 45). At operation 1102 of the method 1100, a modular home 101 is positioned on the bed of a trailer 30. The modular home may include a first housing portion (e.g., housing portion 120) having first vertical edge coupled to a second vertical edge of the second housing portion (e.g., housing portion 160) by a hinge (e.g., hinge 199). The first and second housing portions 120, 160 may be arranged longitudinally on the bed 404 of the trailer 30. At operation 1104 of the method 1100, the first housing portion 120 and the second housing portion 160 are rotated such that the first and second housing portions 120, 160 each overhang from the first and second sides of the bed 404, thus forming a first overhanging portion and a second overhanging portion (e.g., overhanging portions 126, 166) of the modular home 101. At operation 1106 of the method 1100, a first horizontal edge of the first housing portion 120 is coupled to a second horizontal edge of the second housing portion 160 upon completion of the rotating of the housing portions 120, 160. In some embodiments, another vertical edge of the first housing portion 120 may be coupled to another vertical edge of the second housing portion 160 instead of or in addition to coupling the first horizontal edge to the second horizontal edge. At operation 1108 of the method 1100, a plurality of linear actuators (e.g., linear actuator 1001) coupled to the first and second overhanging portions 126, 166 of the modular home 101 extend downward towards the ground. The plurality of linear actuators 1001 may engage the ground and lift the modular home 101 off the bed 404 such that the plurality of linear actuators 1001 support the modular home 101.

Figure 12:
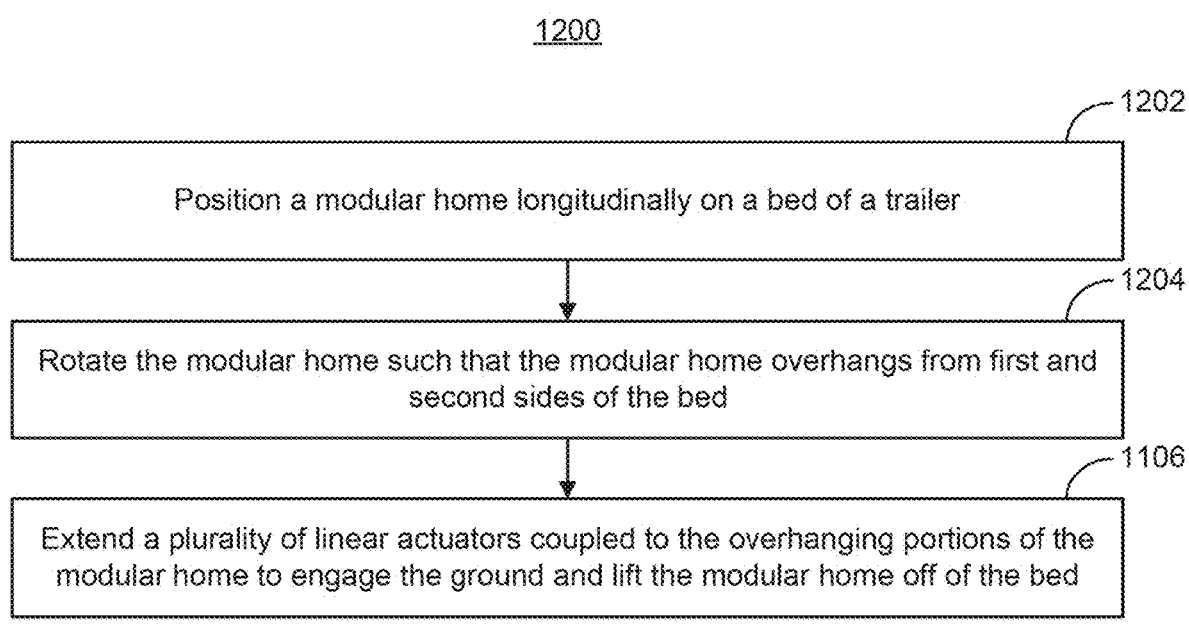
FIG. 12 is another example method for lifting a modular home off a trailer bed, in accordance with some embodiments of the present disclosure.

Referring now to FIG. 12, a method 1200 of unloading a modular home from a trailer (e.g., trailer 30) is described, according to some embodiments. The method 1200 may include any number of operations and the operations may be performed in any order. The method 1200 may be performed by equipment of a modular home construction company (e.g., the components of system 4500, shown and described with reference to FIG. 45). At operation 1202 of the method 1200, a modular home is positioned longitudinally on a bed 404 of a trailer 30. The modular home may include only one housing portion and may not be hingedly coupled to a second housing portion. At operation 1204 of the method 1200, modular home is rotated such that the modular home overhangs from first and second sides of the bed of the trailer, thus forming a first overhanging portion and a second overhanging portion (e.g., similar to overhanging portions 126, 166 but with only a single housing portion) of the modular home. At operation 1206 of the method 1200, a plurality of linear actuators (e.g., linear actuator 1001) coupled to the first and second overhanging portions of the modular home extend downward towards the ground. The plurality of linear actuators 1001 may engage the ground to lift the modular home off the bed such that the plurality of linear actuators support the modular home. The method 1200 may not be limited to unloading modular homes. For example, other types of loads, including shipping containers, may be positioned longitudinally on the bed of a trailer, rotated such that the load overhangs from the first and second sides of the trailer, and a plurality of linear actuators coupled to the load may extend towards and engage the ground to lift the load off of the trailer. An embodiment of the method 1200 is shown in further detail in FIGS. 27B-27C.

Figure 13:
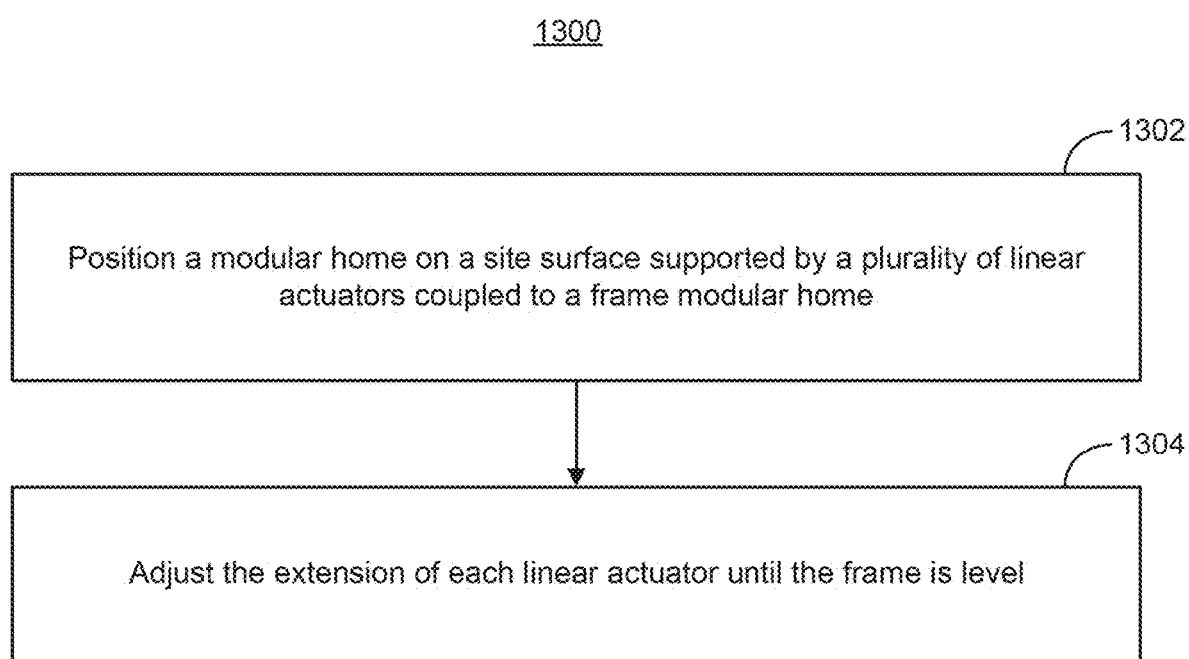
FIG. 13 is an example method for leveling a modular home by actuating legs coupled to a floor assembly of the modular home, in accordance with some embodiments of the present disclosure.

Referring now to FIG. 13, a method 1300 of leveling a modular home (e.g., modular home 101) on a site surface is described, according to some embodiments. The method 1300 may include any number of operations and the operations may be performed in any order. The method 1300 may be performed by equipment of a modular home construction company (e.g., the components of system 4500, shown and described with reference to FIG. 45). At operation 1302 of the method 1300, the modular home 101 is positioned on the site surface and supported by a plurality of linear actuators (e.g., linear actuators 1001) coupled to a frame of the modular home 101. Each linear actuator 1001 may include a rod 1005 that extends downward from the frame to engage the site surface. At operation 1304 of the method 1300, the extension of each linear actuator 1001 is adjusted until the frame is level. The modular home 101 may include sensors to determine the relative elevation of the site surface under each of the linear actuators 1001. The linear actuators 1001 may be mounted to housing sleeves (e.g., sleeves 707) coupled to a floor assembly of the modular home 101. The modular home 101 may include sensors configured to determine the elevation of one housing sleeve 707 relative to the other housing sleeves 707. A controller may determine, based on the data from the sensors, whether each housing sleeve 707 should be raised or lowered by the respective linear actuator 1001. For example, the controller may determine, based on sensor data, that a first corner of the modular home 101 is at a higher elevation than the other areas of the modular home 101. The controller may control the actuator 1001 at the first corner to retract to lower first corner to level the modular home 101. Each linear actuator 1001 may be adjusted until the modular home 101 is level.

Floor Assembly

The floor assembly of a portion of a modular home may be configured to operate as a skid surface under the modular home to help enable rotation of the portion on trailer ball bearings on a trailer bed. The floor assembly may be made of, comprise, or be clad with an aluminum plate (e.g., a skid plate). The plate may be aluminum because aluminum does not scrape easily and is generally flexible. However, the plate may be made of, comprise, or be clad with other metals with similar properties. The aluminum plate may be fixed or coupled to panels or other structures at the bottom of the floor assembly to protect the floor assembly from scraping as the modular home rotates on a trailer bed. The aluminum may additionally provide the benefit of providing a flat surface to enable such rotation. Alternatively, the skid plate may be made of plastic, such as nylon (e.g., Nylon 6, Nylon 6/6, etc.) or another low friction material in order to reduce the friction between the housing portions and the surface of the trailer bed when the modular home is rotated or translated along the bed.

Figure 14A:
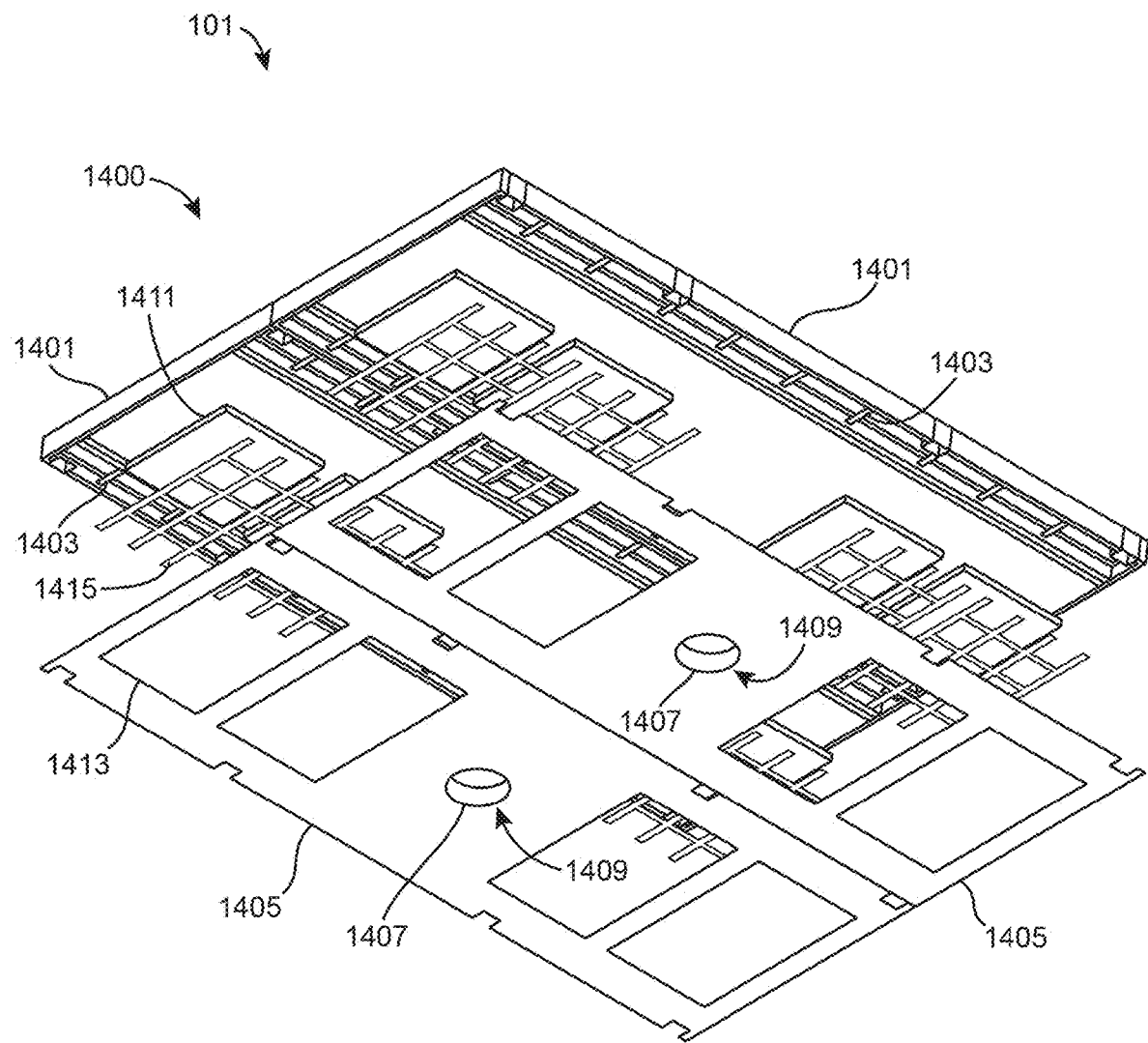
FIG. 14A is an illustration of a floor assembly including a skid plate, in accordance with some embodiments of the present disclosure.

For example, referring now to FIG. 14A, a partially exploded view of a floor assembly 1400 of a modular home 101 is shown, according to some embodiments. The floor assembly 1400 may include an upper plate 1401 that defines the floor of a living area inside the modular home 101. It should be understood that the upper plate 1401 may be a single plate or several plates arranged to form a single surface. The floor assembly 1400 may include a frame 1403 that supports the upper plate 1401. The floor assembly 1400 may also include a skid plate 1405 coupled to the bottom of the frame 1403. Each housing portion (e.g., housing portions 120, 160) of the modular home 101 may include an upper plate 1401, a frame 1403, and a skid plate 1405. The skid plate 1405 may be made of a material having rigidity and a friction coefficient enabling the skid plate 1405 to slide across a surface comprising an array of ball transfer units or a low-friction surface (e.g., the bed 404 of the trailer 30) without substantially deforming. The skid plate 1405 may provide a large surface area allowing the housing portions 120, 160 of the modular home 101 to rotate on the bed 404 of the trailer 20 that includes a plurality of ball transfer units or a low-friction upper surface. For example, at least one of the skid plate 1405 or the upper surface of the trailer bed may be a low-friction surface, such as nylon. The skid plate 1405 may be made from several pieces of material (e.g., sheets of metal) for ease of manufacturing, rather than a single sheet. In some embodiments, the modular home 101 may be referred to as having multiple skid plates 1405 forming a lower surface of the modular home. The upper plates 1401 and the skid plates may be made from different materials. For example, the upper plates 1401 may be sheets of wood, wood composite, or vinyl, which are more commonly associated with home flooring. The skid plates 1405 may be, for example, sheets of metal, such as aluminum, or sheets of plastic, such as nylon. The skid plates 1405 may be configured to reduce the amount of friction between the modular home and a surface on which the modular home is positioned (e.g., the bed of the trailer 30) compared to a modular home in which the floor joists 5504 directly contact the support surface. On a surface such as the bed of the trailer 30 that includes a plurality of ball transfer units (e.g., ball transfer units 1457), the skid plates 1405 may allow the modular home to roll across the plurality of ball transfer units 1457. Without skid plates 1405 forming a flat lower surface, the floor joists 5504 of the frame 1403 may fit between the ball transfer units 1457 rather than being supported by and rolling across the ball transfer units 1457. The skid plates 1405 may enable the modular home to be supported by and move across an array of ball transfer units 1457 spaced at least six inches apart. The skid plates 1405 may be thick and strong enough so as to not plastically deform when the modular home 101 is supported only by the ball transfer units 1457 spaced at least six inches apart. It should be understood that plastic deformation refers to bending of the skid plates 1405 and excludes minor scratches that can be expected to occur when two materials come into contact. In some embodiments, instead of a plurality of ball transfer units, the bed of the trailer 30 may include a flat, low-friction upper surface. For example, the upper surface of the bed of the trailer 30 may be a flat sheet of metal, such as aluminum, or plastic, such as nylon. In these embodiments, the skid plates 1405 may be configured to reduce the friction between the modular home 101 and the trailer 30. These embodiments are discussed in further detail with respect to FIG. 36.

Figure 55A:
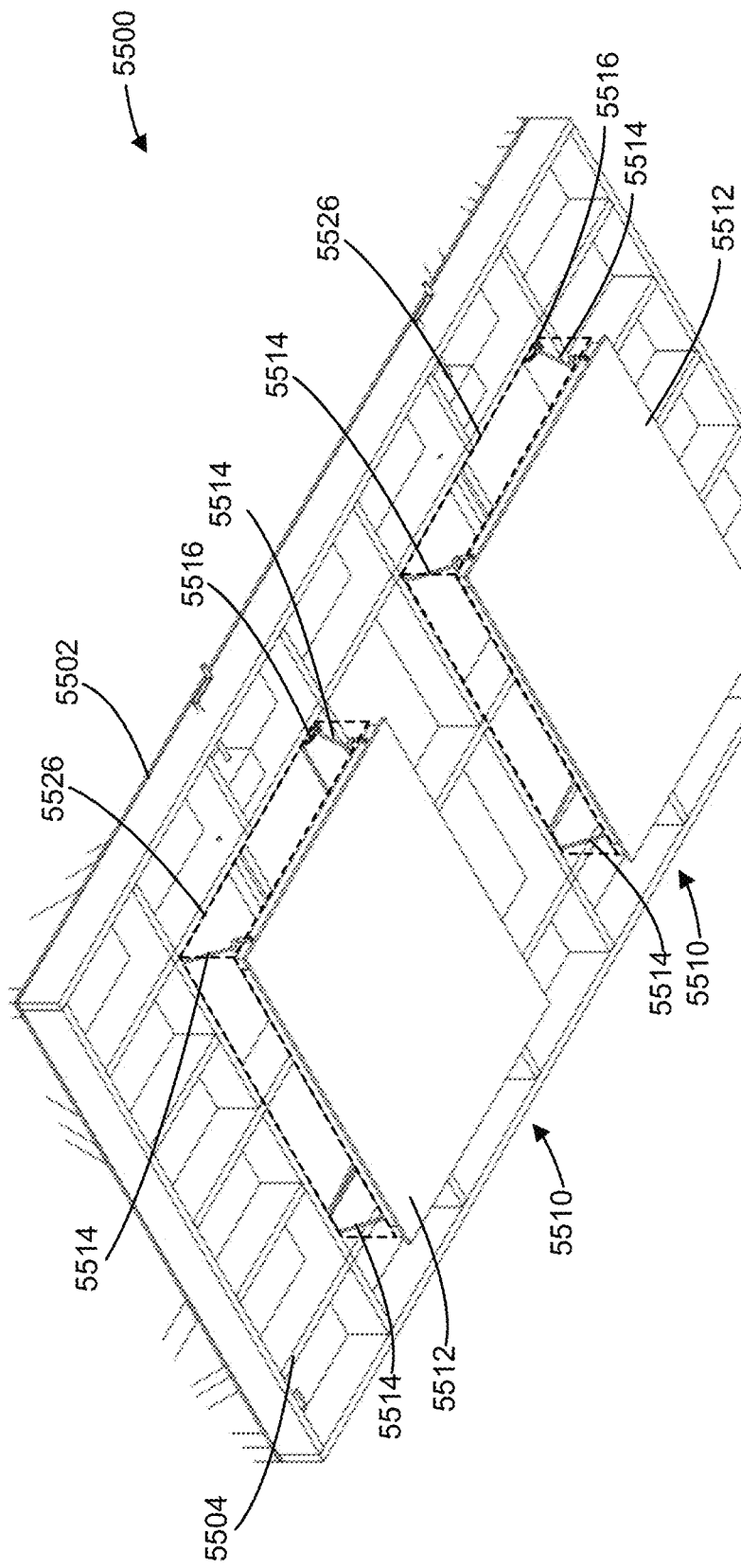
FIGS. 55A-55D illustrate a floor assembly of a housing portion of a modular home including two bladder tank support assemblies, in accordance with some embodiments of the present disclosure.

The skid plates 1405 may be directly coupled to the frame 1403 of the floor assembly. More specifically, the frame 1403 may include a plurality of floor joists, for example, the floor joists 5504 as shown in FIG. 55A. The floor joists may be, for example I-beams with vertically oriented webs, C-channels with vertically oriented webs, or vertically oriented plates. The skid plates 1405 may be directly coupled to the floor joists 5504. For example, the skid plates may be welded to the lower flanges of the I-beams or C-channels or to the lower edges of the vertically oriented plates. In some embodiments, fasteners such as screws or bolts may be used to couple the skid plates 1405 to the frame 1403. The large surface area of the skid plate 1405 more evenly distributes the weight of the modular home 101 on the upper surface of the trailer bed 404, thus minimizing the friction between the two. If the housing portions 120 160, for example, had floor joists or other frame members of the frame 1403 supporting the upper plate 1401 of the floor assembly 1400 without the skid plate 1405, the weight of the housing portions 120, 160 would be concentrated on the frame members, resulting in higher levels of friction. The skid plate 1405 may include openings for bladder tanks as described below and the circular opening 1407 (e.g., the pin hole, pin socket), but otherwise may cover the entire footprint of the housing portion 120, 160.

Figure 14B:
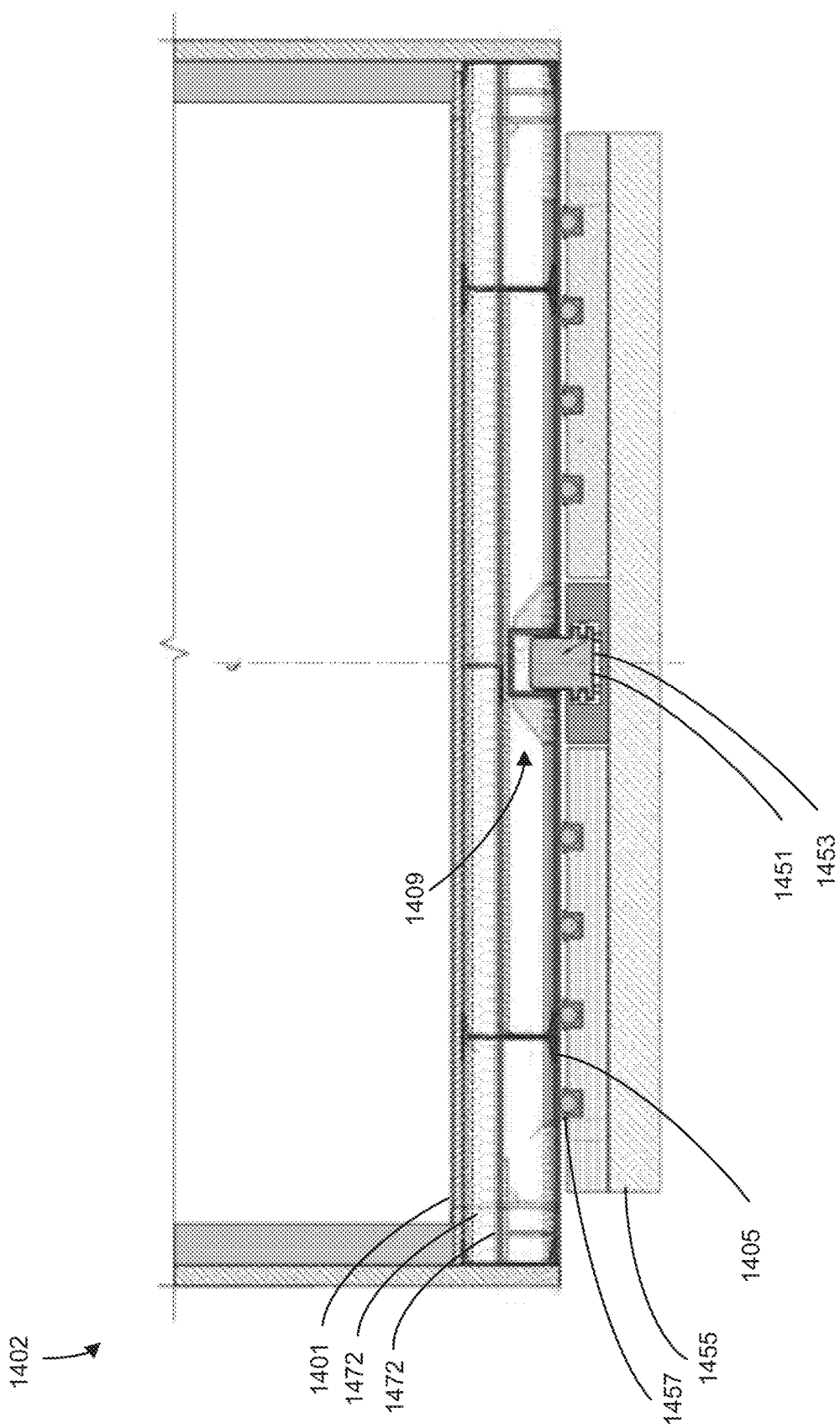
FIG. 14B is an illustration of a floor assembly of a modular home, in accordance with some embodiments of the present disclosure.

In some embodiments, the fasteners (e.g., fastening features such as welds) may not extend beyond a lower surface of the skid plates 1405. For example, if the skid plates 1405 are welded to the frame 1403, the weld bead may be applied only to the upper surface of the skid plates 1405 and may not extend past the lower surface of the skid plates 1405. If threaded fasteners are used to couple the skid plates 1405 to the frame 1403, the skid plates 1405 may include counterbored or countersunk holes such that the heads of the fasteners no not extend beyond the lower surface of the skid plates 1405. If countersunk holes are used, the holes may be cut such that the fastener heads are substantially flush with the lower surface of the skid plates 1405 when the skid plates 1405 are coupled to the frame 1403. In some embodiments, the skid plates 1405 may include threaded holes configured to receive threaded fasteners from above. The fasteners may be short enough that they do not extend past the lower surface of the skid plates 1405. Because the fastening features do not extend beyond the lower surface of the skid plates 1405, the lower surface of the modular home 101 may be substantially flat, which may improve the ability of the modular home to slide across the surface of the trailer bed, whether the bed is flat or includes a plurality of ball transfer units 1457. For example, on a flat trailer bed, fasteners extending below the lower surface of the skid plates 1405 may cause a pressure concentration that increases friction and may damage the bed of the trailer 30. When the bed of the trailer 30 includes ball transfer units 1457, fasteners extending below the lower surface of the skid plates 1405 may not be able to roll over the ball transfer units 1457 without substantial force, which may cause damage to the ball transfer units 1457 or the modular home 101. The skid plate 1405 may include a substantially circular opening 1407 configured to allow a circular rotation pin on the bed of a trailer to be inserted into the circular opening 1407. The floor assembly 1400 may include a socket (e.g., a pin hole as described above) positioned around the circular opening 1407 configured to receive the rotation pin 1451. The circular opening 1407 in the skid plate 1405 may define an opening of the pin socket. The circular opening 1407 and pin socket may have substantially the same diameter, which may be slightly larger than a rotation pin 1451 as described above. The upper surface of the pin socket may be defined by a lower surface of the upper plate 1401 of the floor assembly 1400. For example, the sides of the pin socket may extend from the skid plate 1405 to the upper plate 1401. In some embodiments, the pin socket may include a separate plate defining its upper surface. The separate plate may be positioned below the upper plate 1401 and may be separated from or coupled to the upper plate 1401. The upper surface of the pin socket may be a distance from the skid plate 1405 that is lower than the height that rotation pin 1451 above the skid plate. Thus, there may be a gap between the upper surface of the pin socket and the top of the rotation pin 1451, such that the rotation pin 1451 does not provide subjacent support to the housing portion 120, 160. Because the diameter of the pin socket may be only slightly larger than the diameter of the rotation pin 1451, the housing portion 120, 160 may be substantially prevented from translating relative to the rotation pin. For example, if the diameter of the pin socket 1409 is one inch larger than the rotation pin, the housing portion 120, 160 may only move one inch in any direction relative to the rotation pin. Because the rotation pin is retained in the slot at the center of the trailer 30, the housing portion 120, 160 can be retained by the pin with the center of the housing portion 120, 160 centered on the trailer's centerline. In some embodiments, the pin socket 1409 may be larger and can be configured to receive a bearing or liner, for example, a roller bearing, a ball bearing, or a plane bearing. In these embodiments, the inner diameter of the bearing or liner may be slightly larger than the diameter of the rotation pin. The interface 1402 of a rotation pin 1451 with the socket 1409 is shown in further detail in FIG. 14B, according to some embodiments. The bed 1455 of the trailer may include a plurality of ball transfer units 1457 on which the skid plate 1405 may roll. The rotation pin 1451 may roll along a slot 1453 in the bed 1455 to allow translation of the housing portions when they are rotated.

In some embodiments, the pin socket 1409 includes a cylindrical pipe section 1410 extending upward form the circular opening 1407 in the skid plate 1405 or skid plates 1405. The cylindrical pipe section 1410 may have a diameter approximately equal to the diameter of the circular opening 1407 and may be coupled at its lower perimeter to the perimeter of the circular opening 1407. In some embodiments, the cylindrical pipe section 1410 may extend all the way to and be coupled to the upper plate 1401 of the floor assembly 1400. In some embodiments, the pin socket 1409 may include an upper cap 1406 coupled to the top of the cylindrical pipe section 1410. The upper cap 1406 may seal the upper end of the cylindrical pipe section 1410. In some embodiments, the floor assembly 1400 may include thermal insulation 1472 positioned between the upper plate 1401 and a second plate 1474. In some embodiments, the cylindrical pipe section 1410 may extend to and be coupled to the second plate 1474 of the floor assembly 1400. Flanges 1476 may couple the cylindrical pipe section 1410 to the skid plate 1405 to provide additional support to the pin socket 1409. In some embodiments, the modular home may include one or more bladder tank support assemblies 5510, as described with reference to FIGS. 55A-55C. The skid plate 1405 may include an opening 1413 shaped to receive the support platform 5512 of the bladder tank support assembly 5510 (e.g., an opening that is slightly larger than a footprint of the support platform 5512). The skid plates 1405 may cover substantially the entire footprint of the modular home 101 with the exception of the circular opening 1407 configured to receive a rotation pin and one or more of the openings 1413 configured to receive one of the one or more support platforms 5512. When the support platforms 5512 are in the upper position, the base plates 5542 of the support platforms 5512 and the skid plates may form a substantially flush lower surface of the modular home 101 covering substantially the entire footprint of the modular home 101 with exception of the circular opening 1407.

Figure 14C:
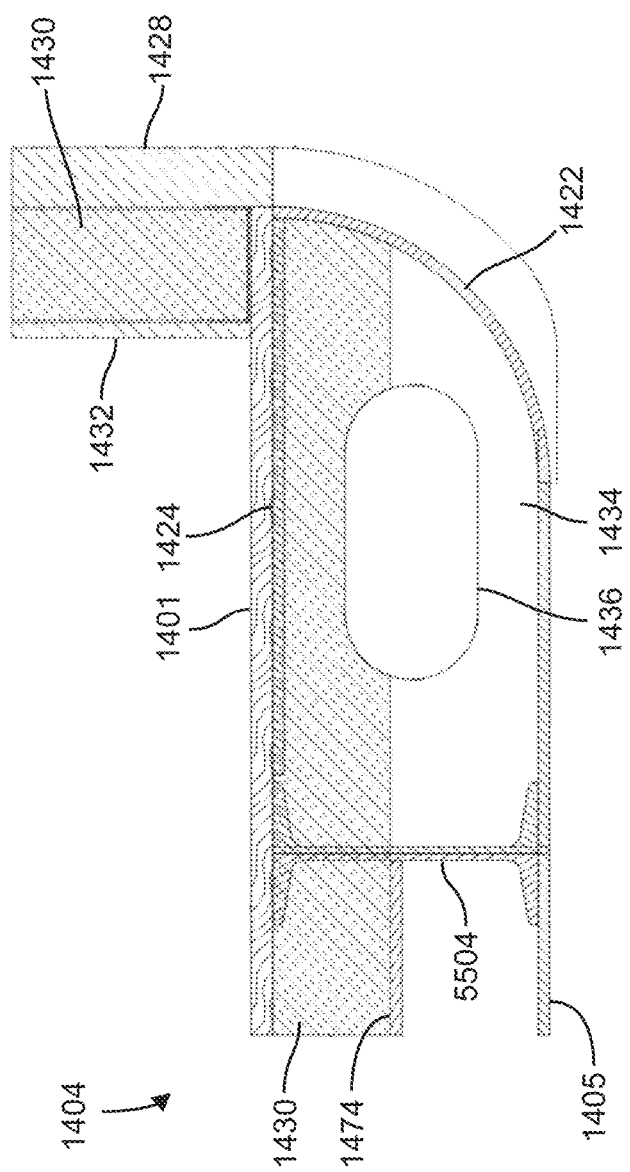
FIG. 14C is another illustration of a floor assembly of a modular home, in accordance with some embodiments of the present disclosure.

FIG. 14C is a section view of a portion of a floor assembly 1404, according to some embodiments. The floor assembly 1404 may include one or more skid plates 1405 coupled to a floor joists 5504 of the frame 1403. The second plate 1474 (e.g., the intermediate plate 1705) may be coupled to the web of the floor joists 5504. The upper plate 1401 may sit on top of the upper flange of the joists 5504. A curved plate 1422 may form the lower edge of the modular home 101. Additional support plates 1424 may be coupled to the upper end of the curved plate 1422 and to the upper flange of the floor joists 5504 to provide additional structural support to the modular home 101 and the upper plate 1401. An exterior edge panel 1426 may cover the curved plate 1422 and, at one end, may be flush with the outer surface 1428 of the modular home 101. The outer surface 1428 of the modular home 101 may be or may include solar panels. The modular home 101 may include thermal insulation 1430 between the inner surface 1432 of the walls and the outer surface 1428, as well as below the upper plate 1401. At the end of the modular home 101, an end plate 1434 sealing the inside of the frame 1403 may include an access hole 1436 to access plumbing and electrical components. The access hole 1436 may include a removable cover to reseal the inside of the frame 1403.

Referring now to FIG. 14D, a method 1450 for rotating a modular home (e.g., the modular home 101) comprising at least one skid plate (e.g., a the skid plate 1405) coupled to a bottom end of the modular home 101 and a circular pin socket (e.g., pin socket 1408) positioned above the skid plate around a circular hole (e.g., circular opening 1407) in the skid plate 1405 is described, in accordance with some embodiments. The method 1450 may include any number of operations and the operations may be performed in any order. The method 1450 may be performed by equipment of a modular home construction company (e.g., the components of the trailer 30, shown and described with reference to FIG. 45). At operation 1452 of the method 1450, a modular home (e.g., modular home 101) is positioned on a surface comprising a plurality of ball transfer units (e.g., the ball transfer units 1457 on the bed of the trailer 30) with the modular home 101 supported by the at least one skid plate skid plate 1405 and with a rotation pin (e.g., the rotation pin 1451) coupled to the surface inserted into the pin socket 1408. At operation 1454 of the method 1450, the modular home 101 is rotated about the rotation pin 1451 such that the at least one skid plate 1405 moves across the surface supported only by the ball transfer units 1457. As described above, the ball transfer units 1457 may be spaced at least 6 inches apart. The skid plates 1405 may have sufficient strength and thickness to support the modular home 101 without plastically deforming while the modular home moves across the surface supported only by the ball transfer units.

Bladder Tanks

As described herein, to enable a modular home (e.g., modular home 101) as described herein to process and store waste, a bladder tank may be stored in compartments within a floor assembly of a modular home 101 or portion (e.g., housing portions 120, 160) of a modular home 101. However, it may be difficult to transport bladder tanks stored in the floor of a modular home during transportation of the modular home to a building site because bladder tanks can be heavy, take up a large amount of space, and may be amenable to breaking or ripping during transportation and rotation of the modular home 101 on the trailer bed 404. To account for these issues, before transportation of a portion 120, 160 of a modular home 101 on a trailer 30, a manufacturer may insert a deflated bladder tank into a floor assembly of the portion of the modular home and secure the bladder tank with a flexible security net. Once the portion 120, 160 of the modular home 101 has been transported and the portion 120, 160 rotated and removed from the trailer 30, air may be forced into the bladder tank to inflate the bladder tank. The bladder tank may be inflated until the bladder tank rests on the ground to avoid adding extra weight on the mechanical legs (e.g., linear actuators 1001) of the modular home 101 when waste and water is added to the bladder tank.

The bladder tanks in the modular home may operate as water storage and a bio-digester of waste. For example, each bladder tank may store clean water, recycled water, and gray water. A bladder tank may also break down solid waste through a temperature-controlled system in which an electric warming blank surrounds the bladder tank and heats the bladder tank to maintain a constant temperature.

For example, referring again to FIG. 14A, the floor assembly 1400 may include one or more inflatable bladder tanks 1411 positioned between the upper plate 1401 and the skid plate 1405. In some embodiments, the inflatable bladder tank 1411 may be positioned above the opening 1413 in the skid plate 1405, and may be configured to expand outward from the opening 1413 when inflated. Netting 1415 may be used to keep the bladder tank 1411 in place between the upper plate 1401 and the skid plate 1405 to protect the bladder tank 1411 during shipping. The netting 1415 may be removed when the modular home is in place at the installation site, and the inflatable bladder tank 1411 may inflate through the opening 1413 to expand the size of the bladder tank 1411. Forced air may be pumped into the bladder tanks 1411 to inflate them. Once inflated, the bladder tanks 1411 may rest on the ground at the installation site. Because the bladder tanks 1411 rest on the ground, no additional weight is added to the structure of the modular home 101 when the bladder tanks 1411 are filled. In some embodiments (as described below with reference to FIGS. 55A-55C), a bladder tank support assembly 5510 is configured to lower the bladder tanks 1411 from the floor assembly 1400. The openings 1413 may instead be sized to receive a support platform 5512 of the bladder tank support assembly 5510. The bladder tanks 1411 may be used to store clean water, recycled water, rainwater, and/or gray water. A bladder tank 1411 may be used as a bio-digester that breaks down waste from the housing module. In some embodiments, a bladder tank 1411 may be positioned on top of a support platform of a bladder tank support assembly configured to raise and lower the bladder tank 1411 at an installation site. The bladder tank support assemblies 5510 are described in further detail below with reference to FIGS. 55A-55C.

Figure 15B:
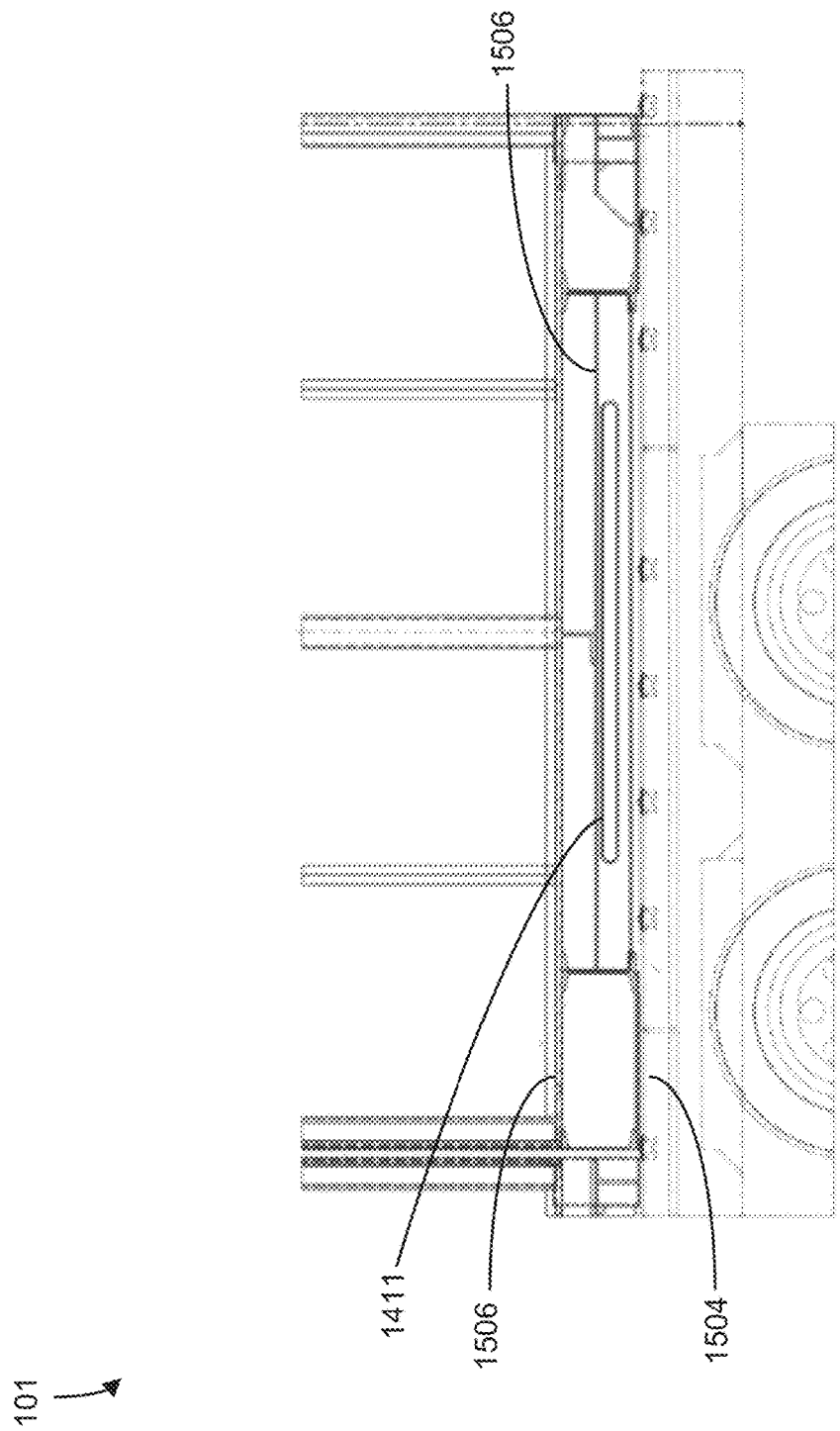
FIG. 15B is an illustration of a modular home including a deflated bladder tank in the floor assembly, in accordance with some embodiments of the present disclosure.

For example, FIG. 15A is a perspective view of a modular home 1500 showing two skid plates 1504, bladder tanks 1411, and netting 1415, according to some embodiments. FIG. 15A is discussed in further detail above. FIG. 15B is a detailed view of a bladder tank 1411 of a modular home 101 positioned between an upper plate 1506 of the floor assembly 1400 and a skid plate 1503 of the floor assembly 1400 while being shipped on the bed 404 of a trailer 30, according to some embodiments. An additional bladder housing plate 1555 may be positioned between the upper plate 1506 of the floor assembly 1400 and the skid plate 1503. The bladder tank 1411 may be mounted to the underside of the bladder housing plate 1555.

Figure 16:
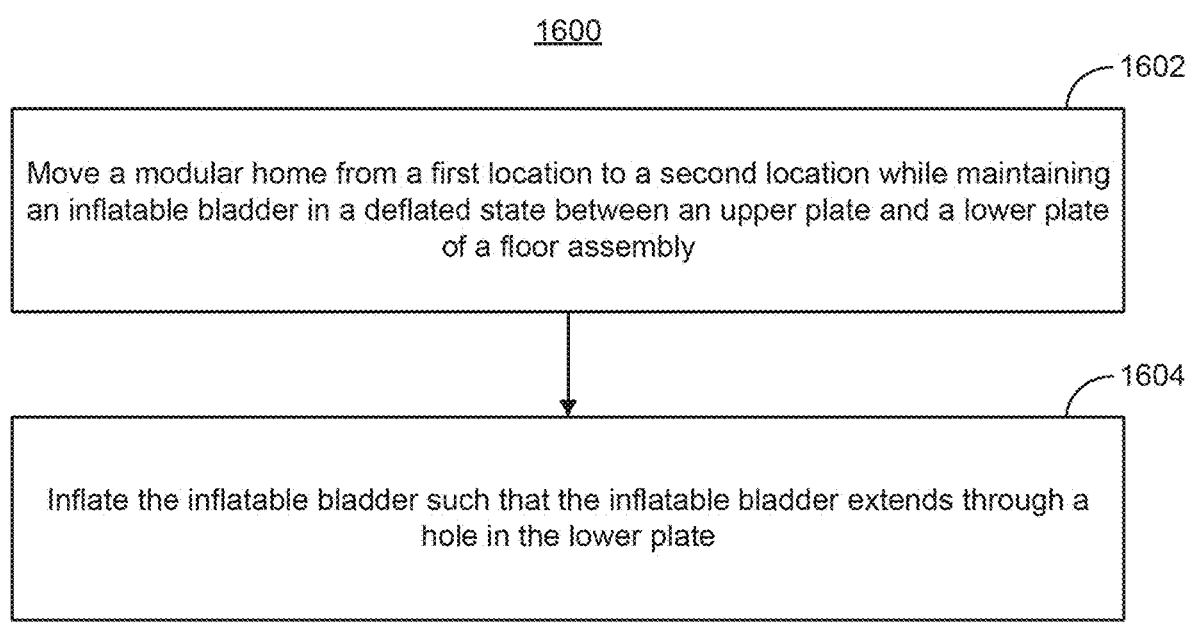
FIG. 16 is an example method for transporting a modular home with an inflatable bladder tank, in accordance with some embodiments of the present disclosure.

Referring now to FIG. 16, a method 1600 of transporting a modular home (e.g., modular home 101) on a site surface with an inflatable bladder tank (e.g., bladder tank 1411) is described, according to some embodiments. The method 1600 may include any number of operations and the operations may be performed in any order. The method 1600 may be performed by equipment of a modular home construction company (e.g., the components of system 4500, shown and described with reference to FIG. 45). At operation 1602 of the method 1600, the modular home 101 is moved from a first location to a second location. The modular home may include an inflatable bladder tank 1411 positioned between an upper plate 1506 and a lower plate 1405, 1504 (e.g., a skid plate) of a floor assembly 1400. The inflatable bladder tank 1411 may be positioned above an opening 1413 in the lower plate 1405 and may be maintained in a deflated state between the upper plate 1505 and the lower plate 1405 while the modular home 101 is moved. At operation 1604 of the method 1600, after arriving at the second location (e.g., the installation site), the inflatable bladder tank 1411 is inflated such that the inflatable bladder tank 1411 extends through the opening 1413 in the lower plate 1405.

Figure 17:
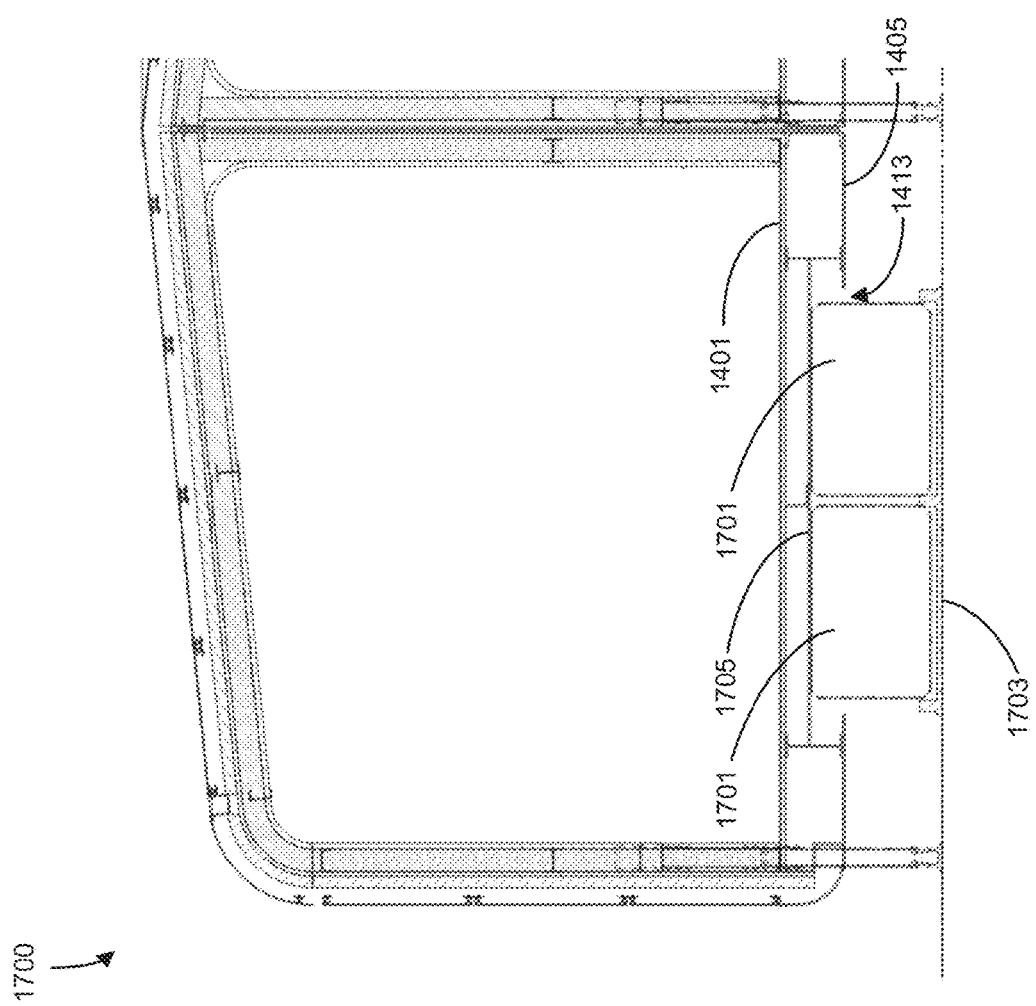
FIG. 17 is an illustration of a modular home with a bladder tank and a warming blanket, in accordance with some embodiments of the present disclosure.

FIG. 17 shows a modular home 1700 with an inflatable bladder tank that may be used as a bio-digester 1701, according to some embodiments. The bio-digester 1701 may be configured to receive and break down (e.g., digest) solid waste from a living area of the modular home 1700. A warming blanket 1703 (e.g., a blanket that contains integrated electrical heating wires) may be positioned around the bio-digester 1701 and may maintain a consistent elevated temperature in the bio-digester 1701 to accelerate the digestion of solid waste. In some embodiments, the warming blanket 1703 may be powered by solar panels positioned on the modular home, such that no electricity from external sources is required to be provided the warming blanket. In some embodiments, heaters may be integrated into the support platform of a bladder tank support assembly as described below with reference to FIG. 55A-55C, instead of or in addition to a heating blanket.

Coupling Housing Portions Together

After folding two portions of a modular home together (e.g., housing portions 120, 160 of modular home 101), the two portions may need to be coupled together to create a single modular home. To do so, in one embodiment, loose bolts may be inserted into vertical and/or horizontal edges of the two portions (e.g., the vertical portions opposite to the vertical portions connected to a hinge). After the two portions are folded, the bolts may be tightened to cause the edges to be coupled together. Thus, the two portions may be securely coupled or fastened together in a seal-proof manner to stop atmospheric particles (e.g., rain or snow) and/or critters around the modular home from entering the modular home.

Figure 18A:
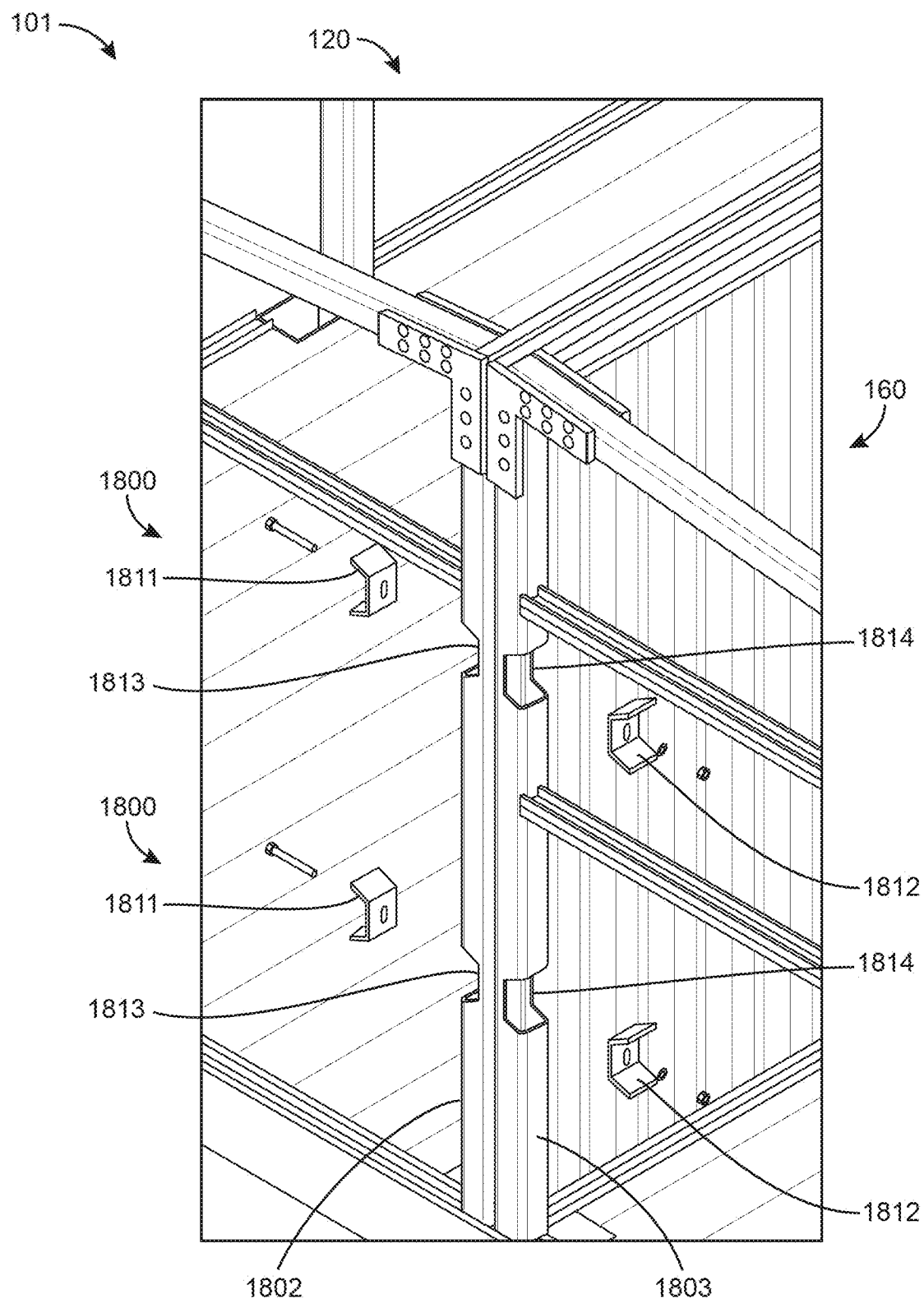
FIG. 18A is an illustration of two coupling assemblies for coupling a first housing portion to a second housing portion of a modular home, in accordance with some embodiments of the present disclosure.

For example, referring now to FIG. 18A, two coupling assemblies 1800 for coupling a first housing portion 120 to a second housing portion 160 of a modular home 101 are shown, according to some embodiments. FIG. 18B shows an elevation view 1804 of the coupling assemblies 1800 in position coupling a first structural member to a second structural member, according to some embodiments. FIG. 18C shows detailed views 1806 of a coupling assembly 1800, according to some embodiments. The assembly 1800 may couple a first structural member 1802 defining a vertical edge of the first housing portion 120 to a second structural member 1804 defining a vertical edge of the second housing portion 160. These vertical edges of the housing portions 120, 160 may be opposite the vertical edges that are joined by a hinge (e.g., hinge 199), as described above. For example, the hinge 199 may join a first edge of the first housing portion 120 to a second edge of the second housing portion 160. The first structural member 1802 may be positioned at a third vertical edge of the first housing portion 120 and the second structural member 1804 may be positioned at a fourth vertical edge of the second housing portion 160. Each coupling assembly 1800 may include a first plate 1811 and a second plate 1812 shaped to fit into a corresponding cutout 1813, 1814 in the first or second structural member 1802, 1804. As shown in FIG. 18C, the first plate and second plate 1811, 1812 may each include a vertical portion 1821 with an opening 1823 (e.g., a hole, a slot, etc.) configured to receive a fastener 1825 and top and bottom flanges 1827, 1829 coupled respectively of the top and bottom edges of the vertical portion 1821 and extending diagonally away from the vertical portion 1821. The cutouts 1813, 1814 in the structural members 1802, 1803 may have a profile configured to receive the shape of the plates. The coupling assembly 1800 may include a fastener 1825 (e.g., a bolt) that extends through the openings in each plate and a corresponding opening in each structural member 1802, 1803. The fastener 1825 may be threaded into a nut 1826 such that the fastener 1925 pulls the plates 1811, 1813 together to couple together the structural members. The coupling assembly 1800 may further include one or more washers positioned between the fastener 1825 or the nut 1826 and the opening 1823 in the vertical portion 1821 of the plates 1811, 1813. In some embodiments, more or less than two coupling assemblies 1800 may be used to join the structural members 1802, 1803. In some embodiments, the coupling assemblies 1800 may be used to join horizontal structural members, for example along the top edge or the bottom edge of each housing portion 120, 160.

Figure 19:
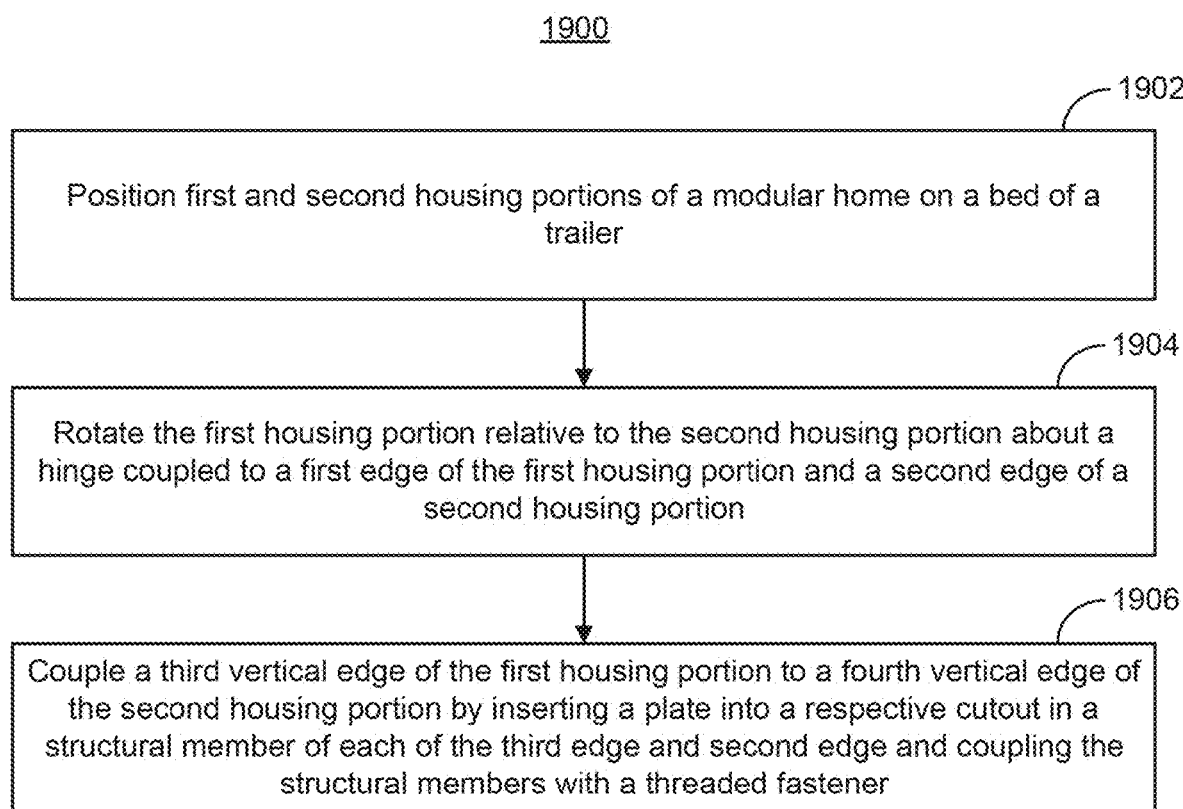
FIG. 19 is an example method for coupling two portions of a modular home at vertical edges of the modular home, in accordance with some embodiments of the present disclosure.

Referring now to FIG. 19, a method 1900 of assembling a modular home (e.g., modular home 101) using the coupling assembly 1800 is described, according to some embodiments. The method 1900 may include any number of operations and the operations may be performed in any order. The method 1900 may be performed by equipment of a modular home construction company (e.g., the components of system 4500, shown and described with reference to FIG. 45). At operation 1902 of the method 1900, the modular home 101 is positioned on the bed of a trailer (e.g., the bed 404 of the trailer 30). The modular home 101 may include a first housing portion 120 with the first vertical edge and a second housing portion 160 with a second vertical edge. The first and second vertical edges may be coupled by a hinge (e.g., hinge 199). The first and second housing portions 120, 160 may be arranged longitudinally on the bed 404 of the trailer 30. At operation 1904 of the method 1900, the first housing portion 120 is rotated relative to the second housing portion 160 until a third vertical edge of the first housing portion 120 meets a fourth vertical edge of the second housing portion 160. At operation 1906 of the method 1900, a first structural member 1802 at the third vertical edge of the first housing portion 120 is coupled to a second structural member 1803 at the fourth vertical edge of the second housing portion. The coupling of operation 1906 may include inserting a first plate (e.g., plate 1811) into a first cutout 1813 in the first structural member 1802. The first plate 1811 may have a vertical portion 1825, an upper flange 1827 extending diagonally from the top edge of the vertical portion 1825, and a lower flange 1826 extending diagonally from the lower edge of the vertical portion 1825. A second plate (e.g., plate 1812) may be inserted into a second cutout 1814 of the second structural member 1803. The second plate 1812 may be substantially similar to the first plate 1811. The first and second cutouts 1813, 1814 may be shaped to respectively receive the first and second plates 1811, 1812. A threaded fastener (e.g., fastener 1825) may be inserted through holes in the first plate 1811, the first structural member 1802, the second structural member 1803, and the second plate 1812. The threaded fastener 1825 may be coupled to a nut 1826 to couple the first structural member 1802 to the second structural member 1803.

In another embodiment of coupling two portions of a modular home together (e.g., coupling housing portion 120 to housing portion 160 to form modular home 101), a pin and latch system may be used. Pins and latches may be used to instantly close and lock the portions 120, 160 together. For instance, one housing portion 120 may contain protruding tapered pins on one or more edges. Another portion 160 may contain a receiving latch including one or more edges. After folding the two portions 120, 160 together, the pins may extend into the latch, causing the latch to automatically close around the pins. Accordingly, the two portions may be coupled together without using bolting and through an automatic locking mechanism.

Figure 20:
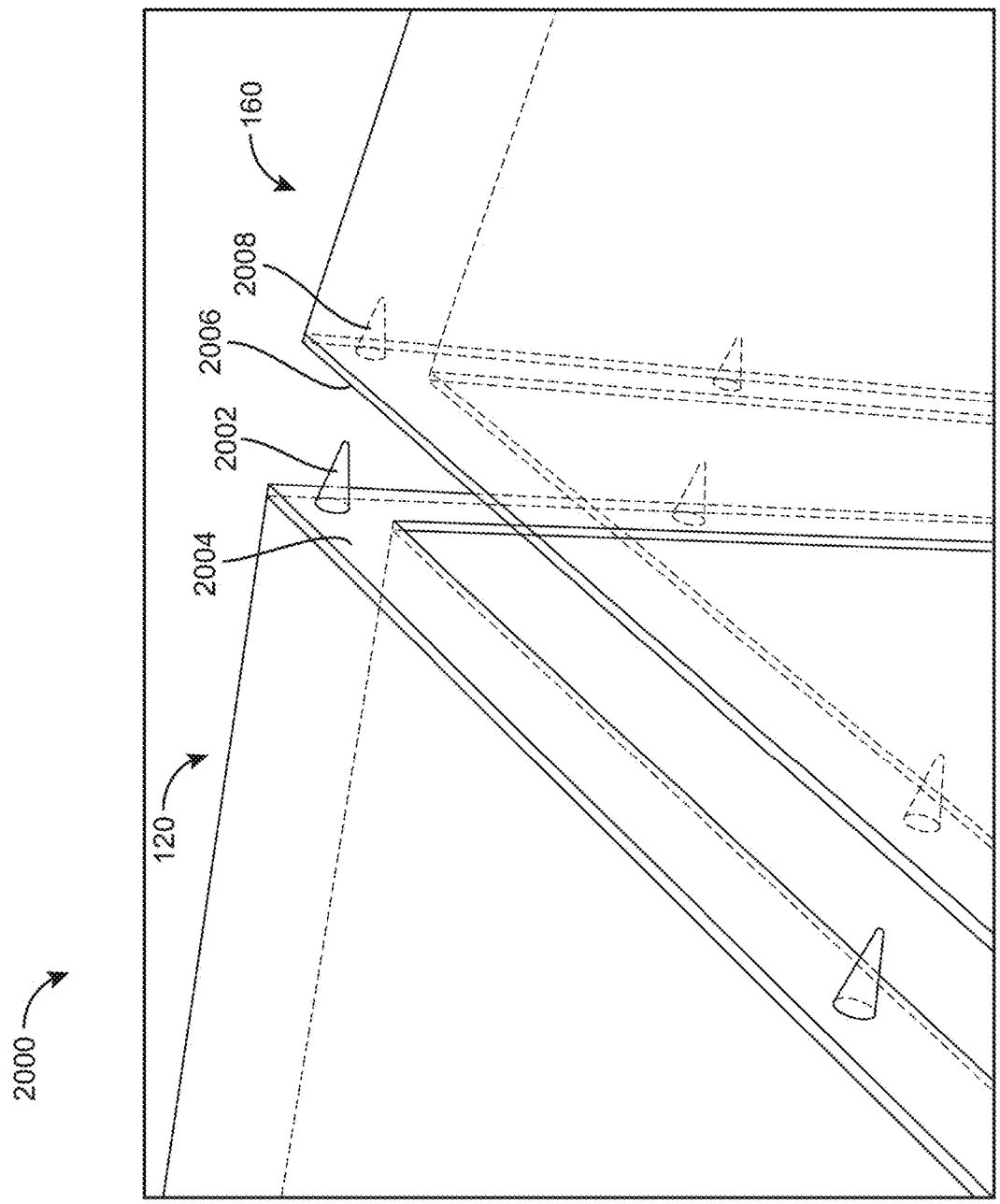
FIG. 20 is an illustration of coupling two portions of a modular home at vertical edges of the two portions, in accordance with some embodiments of the present disclosure.

For example, referring now to FIG. 20, a coupling assembly 2000 for coupling a first housing portion to a second housing portion of a modular home (e.g., coupling housing portion 120 to housing portion 160 to form modular home 101) is shown, according to some embodiments. The first housing portion 120 may include one or more tapered pins 2002 coupled to one or more of the edges 2004 of the first housing portion 120 that meet edges 2006 of the second housing portion 160. The second housing portion 160 may include one or more receiver latches 2008 coupled to one or more of the edges 2006 of the second housing portion 160 that meet the edges 2004 of the first housing portion 120. The receiver latches 2008 may be configured to receive and couple to a corresponding tapered pin 2002 coupled to an edge of the first housing portion. When the first housing portion 120 is rotated relative to the second housing portion 160 and the edges 2004 of the first housing portion 120 meet the edges 2006 of the second housing portion 160, the tapered pins 2002 may be received by the receiver latches 2008 which may automatically latch the tapered pins 2002 to the receiver latches to couple the first housing portion 120 to the second housing portion 160 without additional fastening steps.

Figure 21:
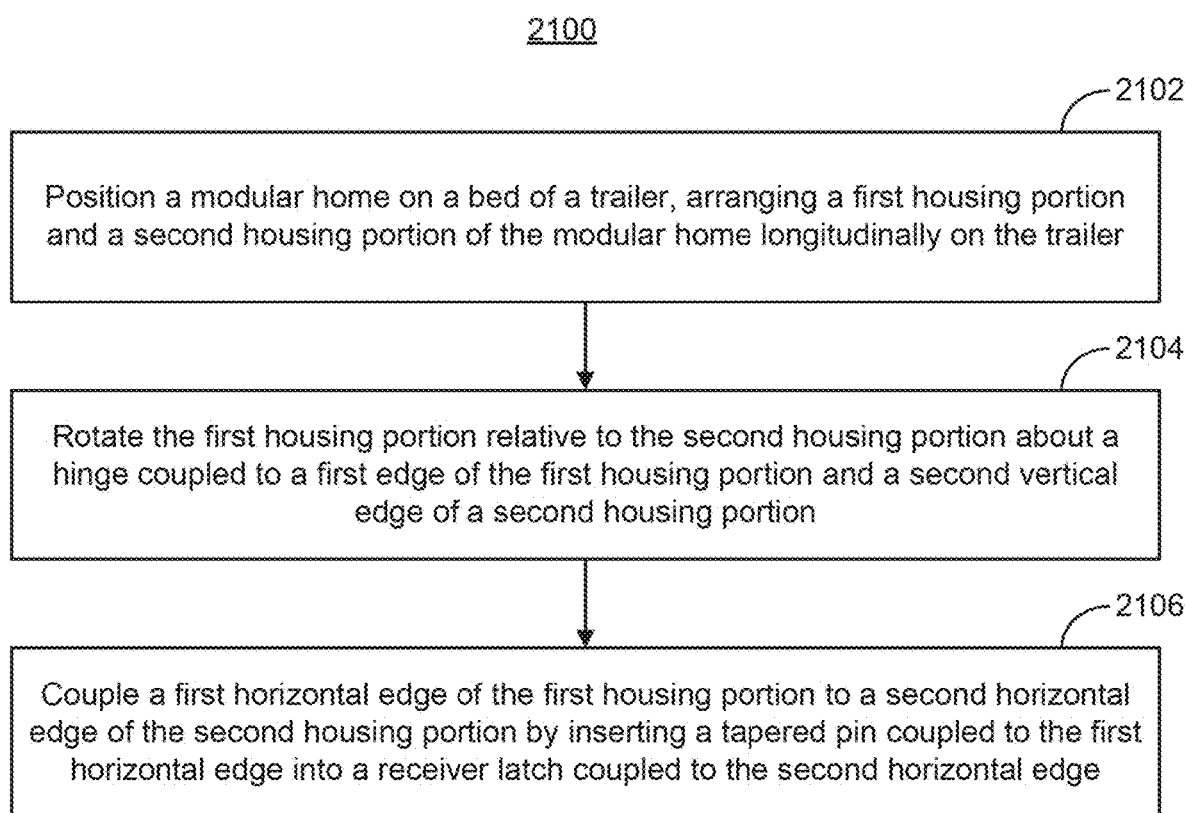
FIG. 21 is an example method of coupling two portions of a modular home at vertical edges of the two portions, in accordance with some embodiments of the present disclosure.

Referring now to FIG. 21, a method 2100 of assembling a modular home (e.g., modular home 101) using the coupling assembly 2000 is described, according to some embodiments. The method 2100 may include any number of operations and the operations may be performed in any order. The method 2100 may be performed by equipment of a modular home construction company (e.g., the components of system 4500, shown and described with reference to FIG. 45). At operation 2102 of the method 2100, the modular home 101 is positioned on the bed of a trailer. The modular home 101 may include a first housing portion 120 having a first vertical edge and a second housing portion 160 having a second vertical edge. The first and second vertical edges may be coupled by a hinge (e.g., hinge 199). The first and second housing portions 120, 160 may be arranged longitudinally on the bed 404 of the trailer 30. At operation 2104 of the method 2100, the first housing portion 120 is rotated relative to the second housing portion 160 until a first horizontal edge (e.g., one of edges 2004) of the first housing portion 120 meets a second horizontal edge (e.g., one of the edges 2006) of the second housing portion 160. The first horizontal edge may include a tapered pin 2002, and the second horizontal edge may include a receiver latch 2008 configured to receive and couple to the tapered pin 2002. At operation 2106 of the method 2100, the first horizontal edge is coupled to the second horizontal edge by inserting the tapered pin 2002 into the receiver latch 2008.

Gasketing

Figure 22A:
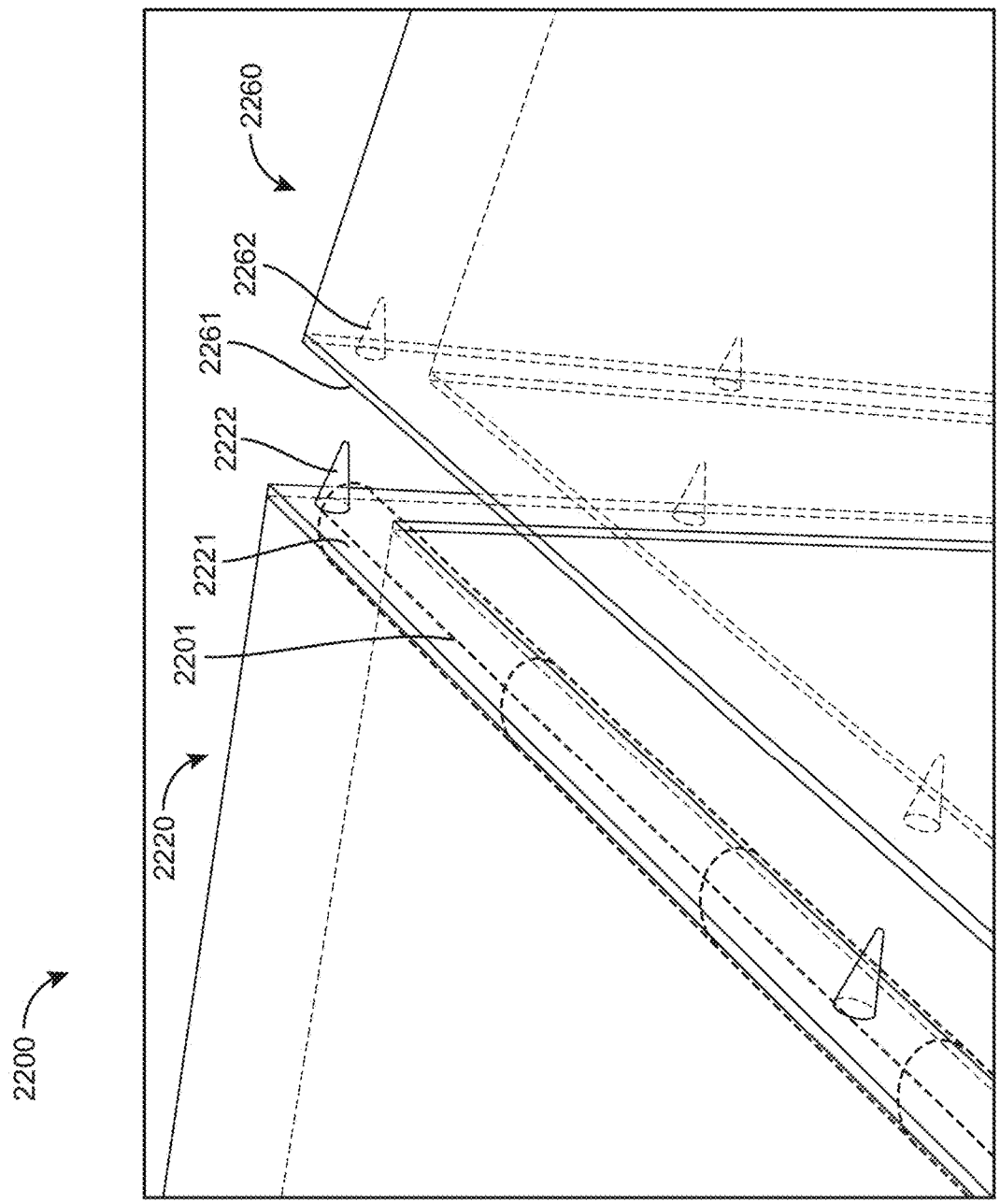
FIG. 22A is an illustration of an example gasket for coupling two portions of a modular home, in accordance with some embodiments of the present disclosure.
Figures 22B, 22C, 22D:
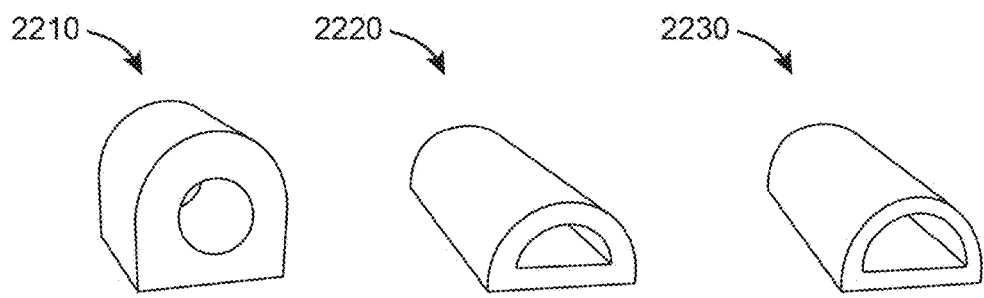
FIGS. 22B-22F are illustrations of various example gaskets and methods of mounting the gaskets, in accordance with some embodiments of the present disclosure.
Figures 22E, 22F:
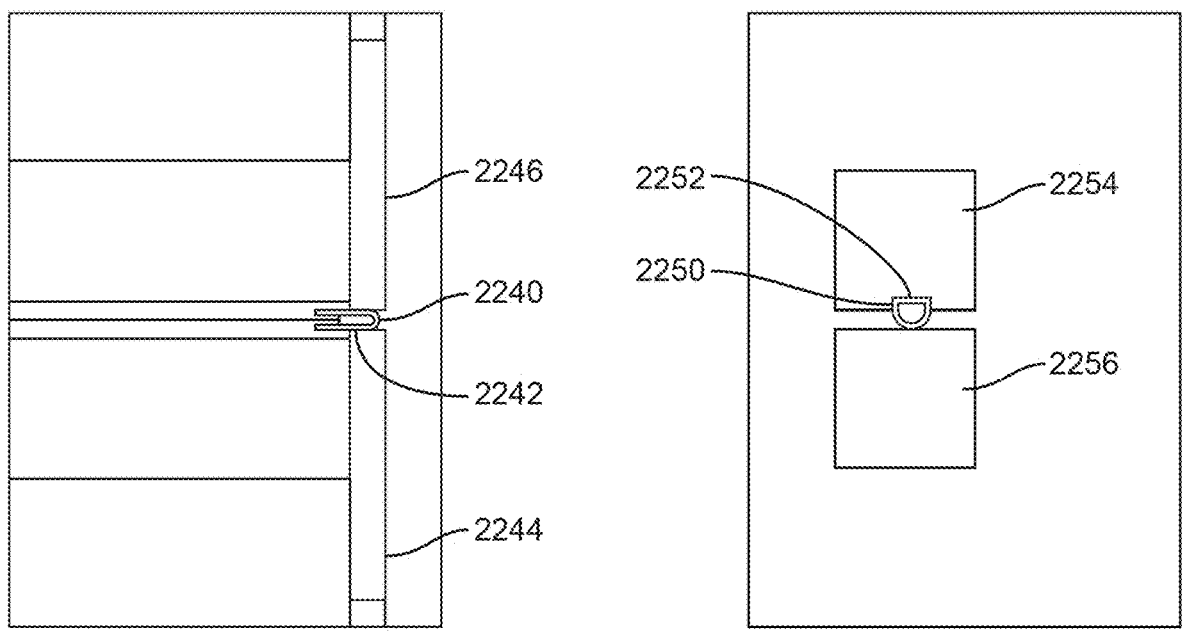

To secure two portions of a modular home together in a weatherproof manner, a gasketing process may be used. For example, referring now to FIG. 22A, a modular home 2200 (e.g., similar to modular home 101) is shown with a gasket 2201 coupled to an edge of a first housing portion 2220, according to some embodiments. A compression gasket 2201 may be positioned along an edge 2221 of the first housing portion 2220 that meets an edge 2261 of a second housing portion 2260 in order to weatherproof the modular home 2200. The seam between the meeting edges 2221, 2261 of the first housing portion 2220 and the second housing portion 2260 may be sealed by a gasket, such as gasket 2201, to prevent water from getting into a first living area of the first housing portion and/or a second living area of the second housing portion, and to improve the thermal insulation of the home by reducing or eliminating air leaks. The gasket 2201 may be, for example, a rubber gasket similar to a gasket used on a car door. The gasket 2201 may be compressed when the edges 2221, 2261 meet, sealing the seam between the edges 2221, 2261. The gasket 2201 may extend around the entire perimeter of a frame surrounding a first wall of the first housing portion 2220 and may contact the perimeter of a frame surrounding a second wall of the second housing portion 2260 such that the entire seam is sealed. The gasket 2201 may include openings surrounding tapered pins 2222 to allow the tapered pins 2222 to engage receiver latches 2262 on the second housing portion 2260. By designing gaskets 2201 in this way, gasketing and weather-stripping may be performed without the use of manual labor at the installation site.

FIGS. 22B-22F show three gaskets 2210, 2220, 2230 that may be used to seal the seams between the edges of the housing portions. A gasket 2240 (e.g., any of gaskets 2210, 2220, 2230) may be coupled along a first edge 2242 to a housing portion 2244 and may be compressed horizontally when a second housing portion 2246 is coupled to the first housing portion 2244. Alternatively, a gasket 2250 (e.g., any of gaskets 2210, 2220, 2230) may be coupled along its base 2252 to a housing portion 2254 and may be compressed vertically when a second housing portion 2256 is coupled to the first housing portion 2254.

Various gaskets may have different compressibility properties. For example, gasket 2230 may compress more than gaskets 2210, and 2220. Further, the gasket 2210 may be easier to install along an edge than the gaskets 2220, 2230. The gasket may be made from a compressible, flexible material, such as rubber or foam, for example, the gasket may be made from EPDM rubber. The gaskets may generally take the shape of a capital "D". The gasket used may be preferably compress between 25% and 40% from its original size for optimal sealing. Accordingly, the gasket may be sized according to the tensile force coupling together the housing portions.

Ridge Cap

Figure 23:
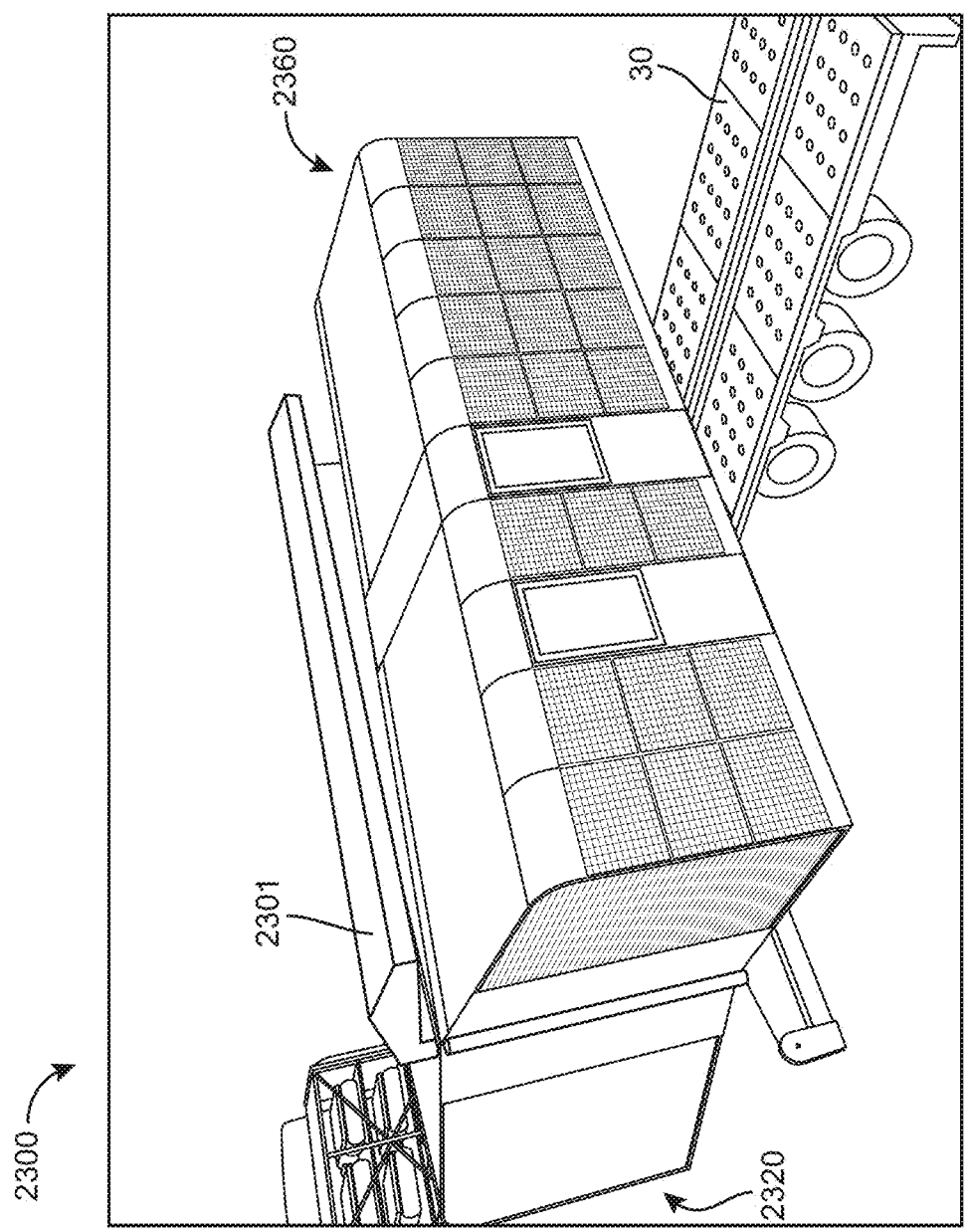
FIG. 23 is an illustration of a ridge cap coupled to a portion of a modular home, in accordance with some embodiments of the present disclosure.

To cover the gap between two housing portions of a modular home (e.g., the housing portions 120, 160 of modular home 101), a ridge cap may be installed on one of the two housing portions. For example, referring now to FIG. 23, a modular home 2300, similar to modular home 101, is shown with a ridge cap 2301 coupled to a first housing portion 2320, according to some embodiments. The first housing portion 2320 may include a first living area and a first wall surrounded by a first frame. A second housing portion 2360 may include a second living area at a second wall surrounded by a second frame. The ridge cap 2301 may be coupled to the first housing portion 2320 above the first frame and may be configured to allow the second frame to slide (e.g., automatically slide without human intervention) under the ridge cap 2301 such that the ridge cap 2301 can be positioned above the seam between the first and second housing portions 2320, 2360 when the first frame is coupled to the second frame. The ridge cap 2301 may prevent rainwater from getting into the living areas through the seam between the first and second frames. In some embodiments, the ridge cap 2301 may also help ventilate a BIPV (Building Integrated Photovaltaics) roof of the modular home 2300.

Fold-Down Deck

In some embodiments, a modular home configured as described herein may include a fold-down deck. To help facilitate travel (e.g., ensure the trailer transporting the modular home does not exceed any width limits with the modular home), the fold-down deck may be coupled to the end structure of one of the housing portions. The fold-down deck may be coupled with a hinge that is attached to the end structure. During travel, the fold-down deck may be folded to be flesh against the modular home. Upon reaching a final destination, the fold-down deck may rotate away from the modular home and rest on legs that fold out to support the fold-down deck when the fold-down deck is horizontal.

Figure 24A:
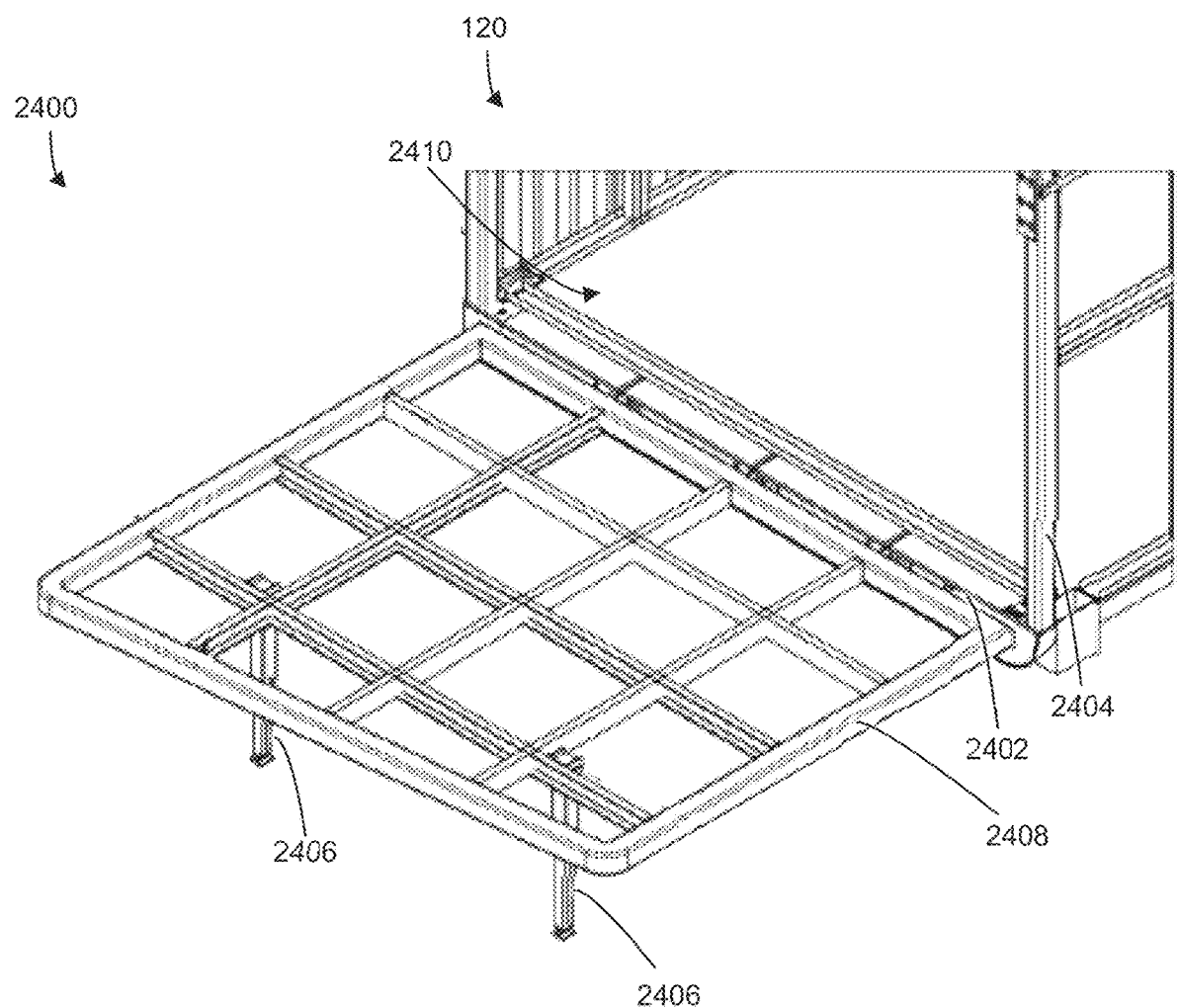
FIGS. 24A-24D are illustrations of different views of a fold-down deck, in accordance with some embodiments of the present disclosure.
Figure 24B:
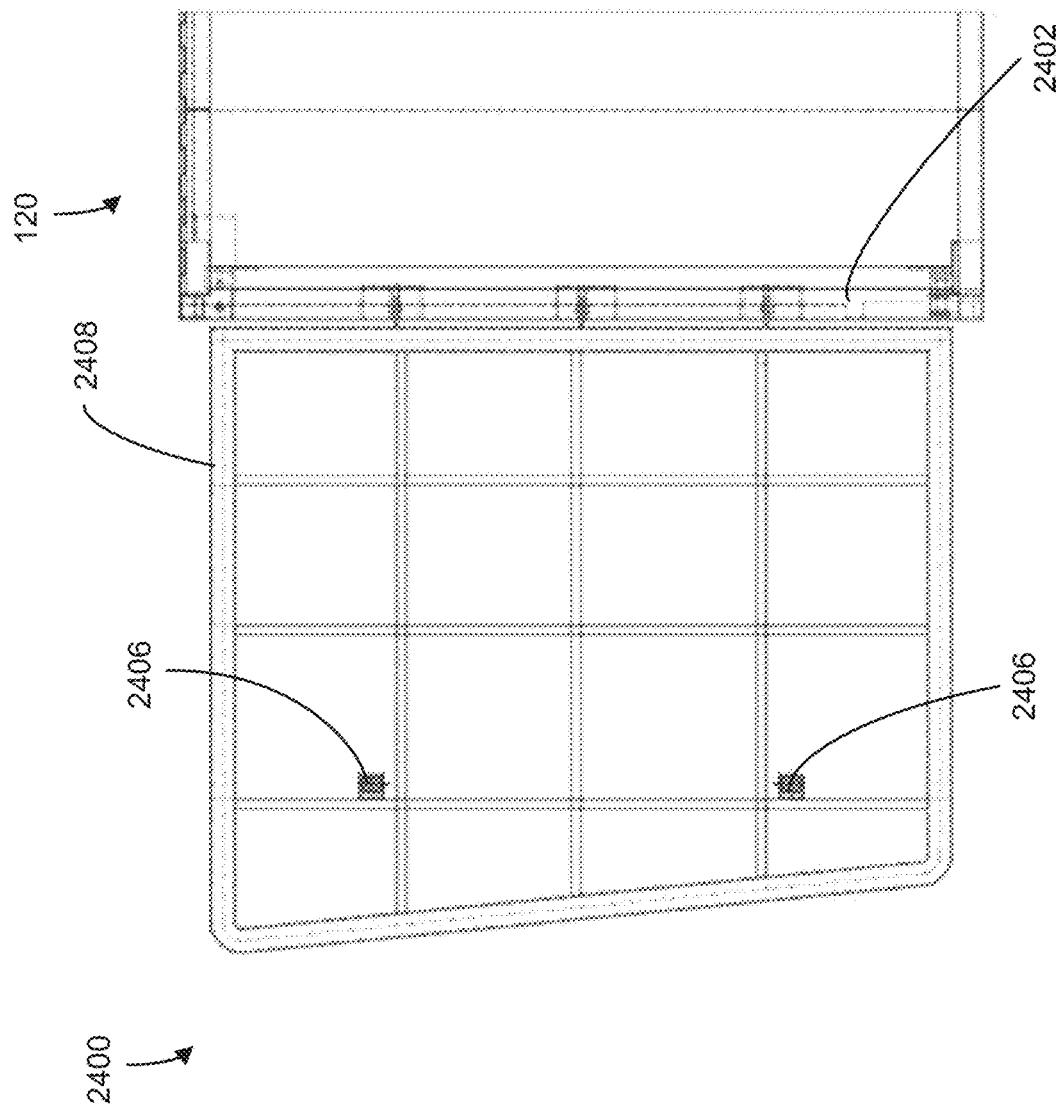
Figure 24C:
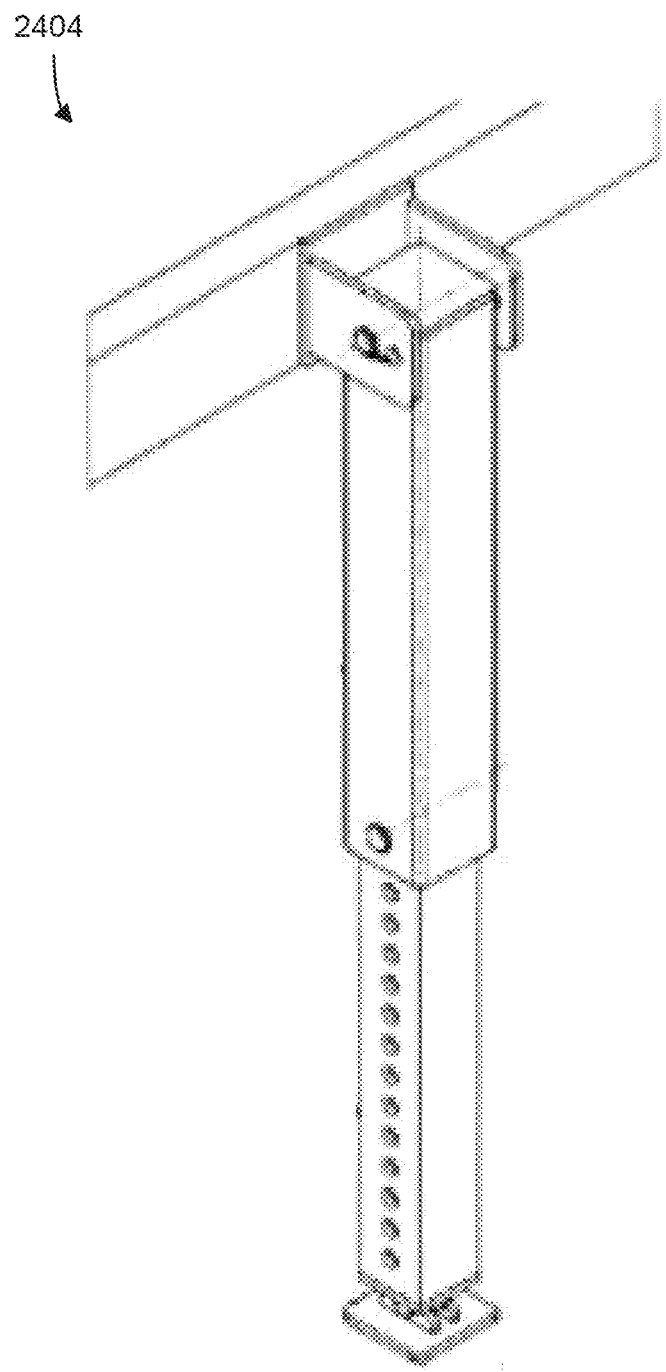
Figure 24D:
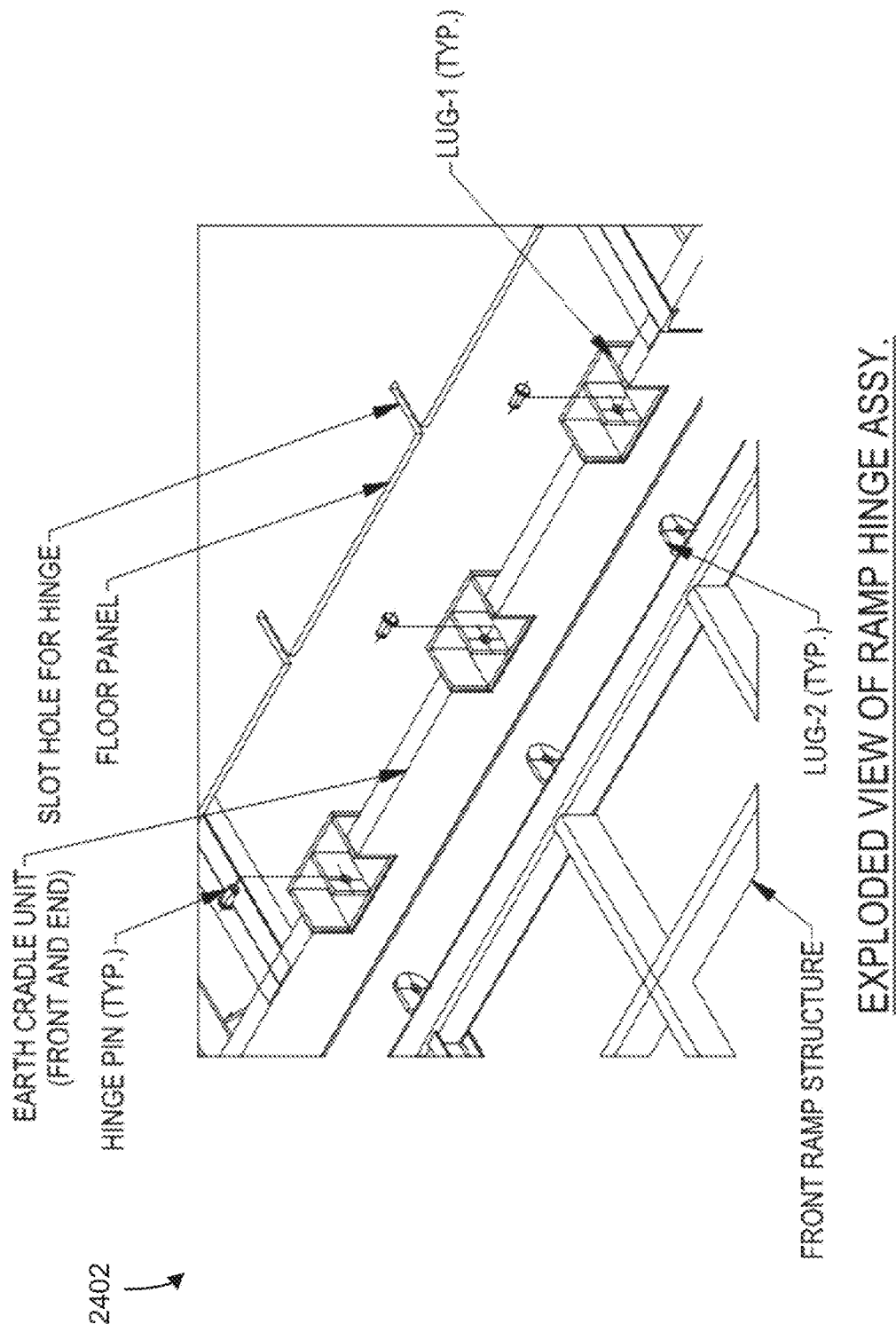
Figure 25A:
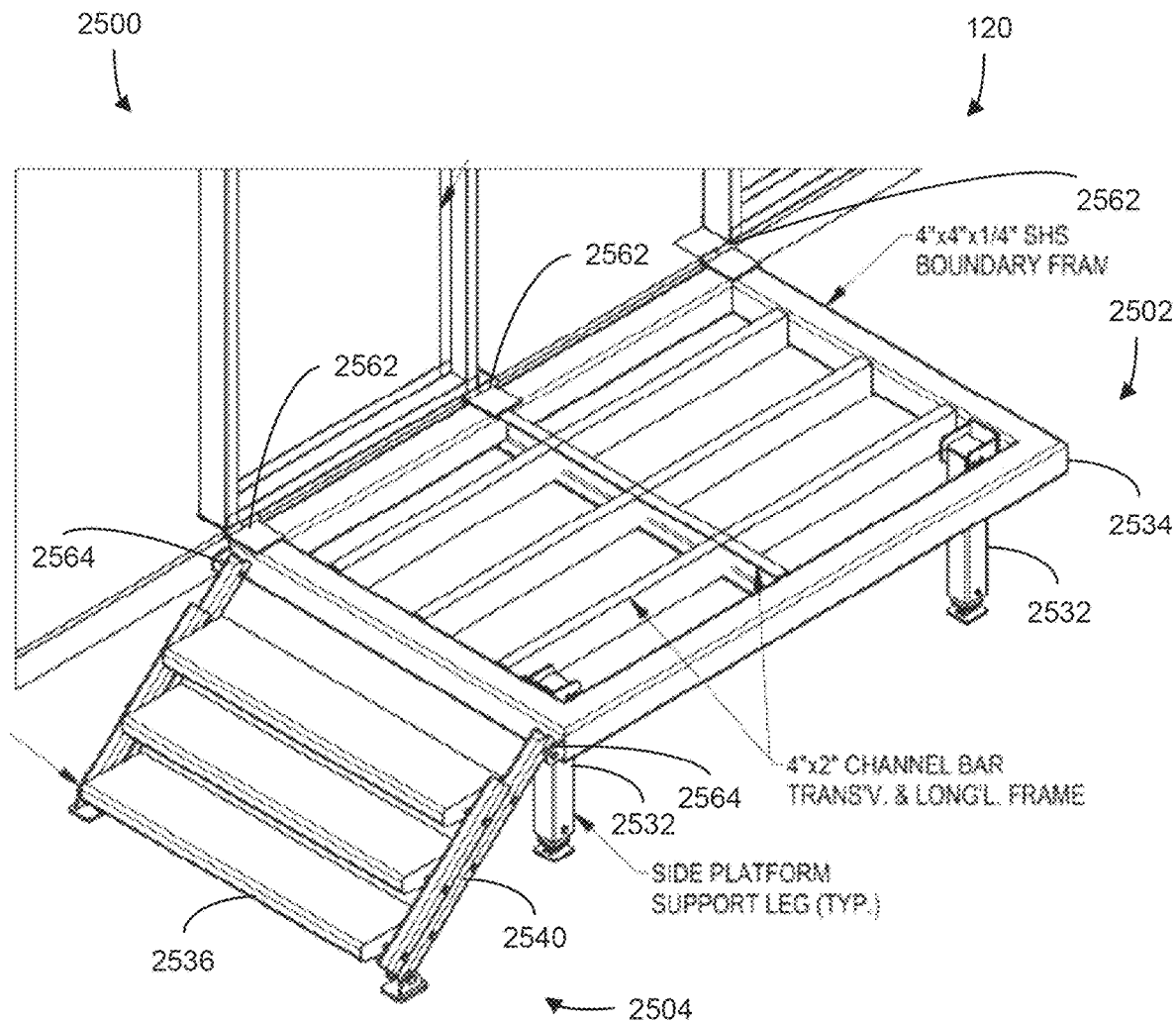
FIGS. 25A-25E are illustrations of different views of fold-down stairs, in accordance with some embodiments of the present disclosure.
Figure 25B:
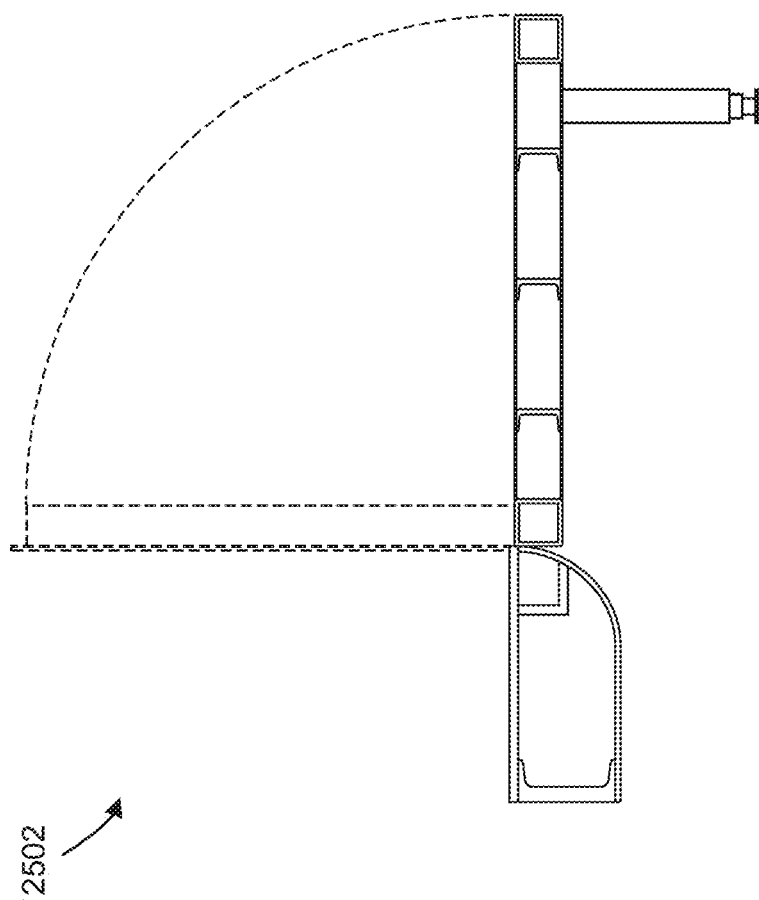
Figure 25D:
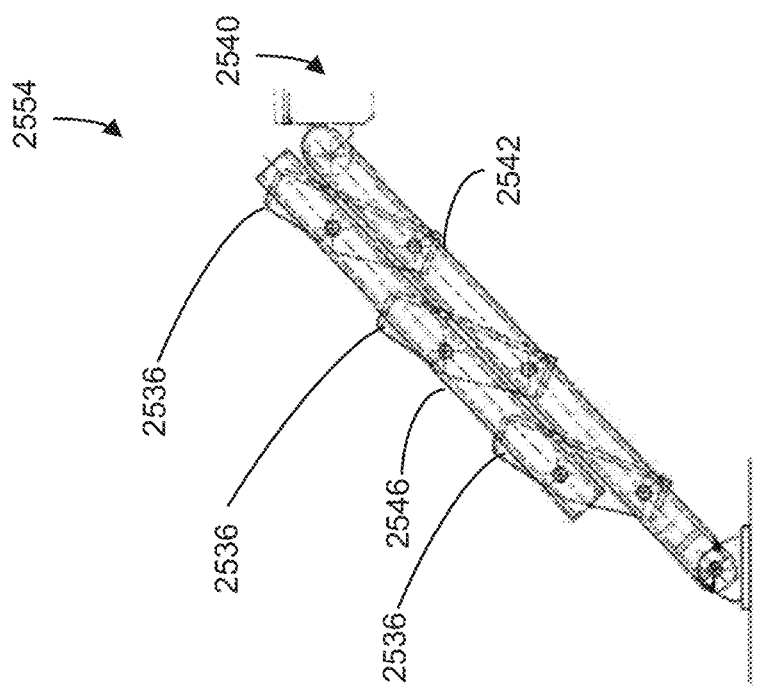
Figure 25C:
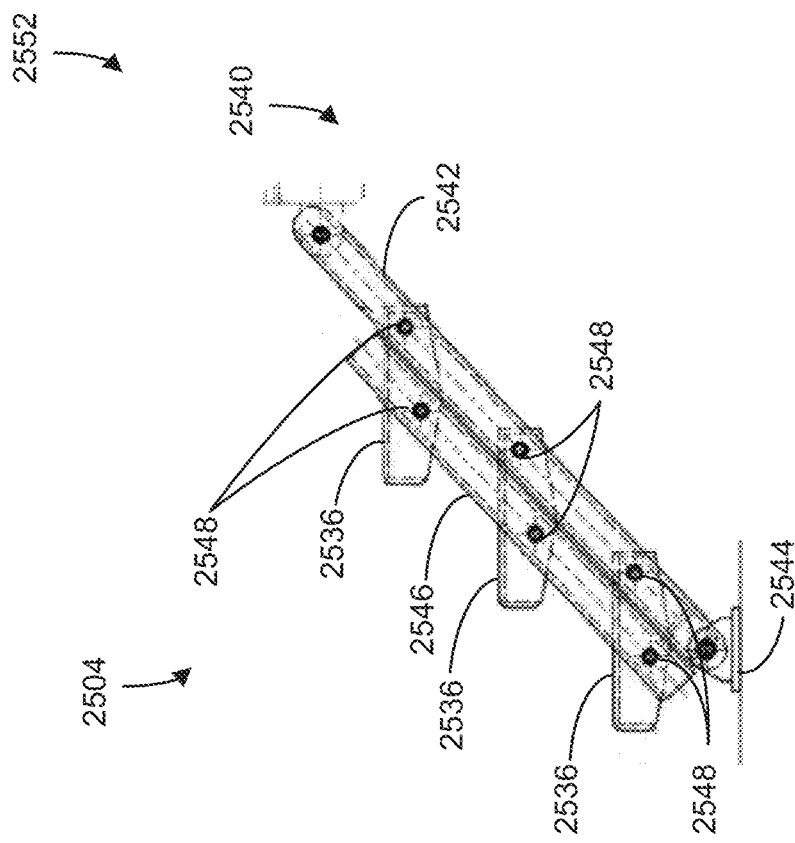
Figure 25E:
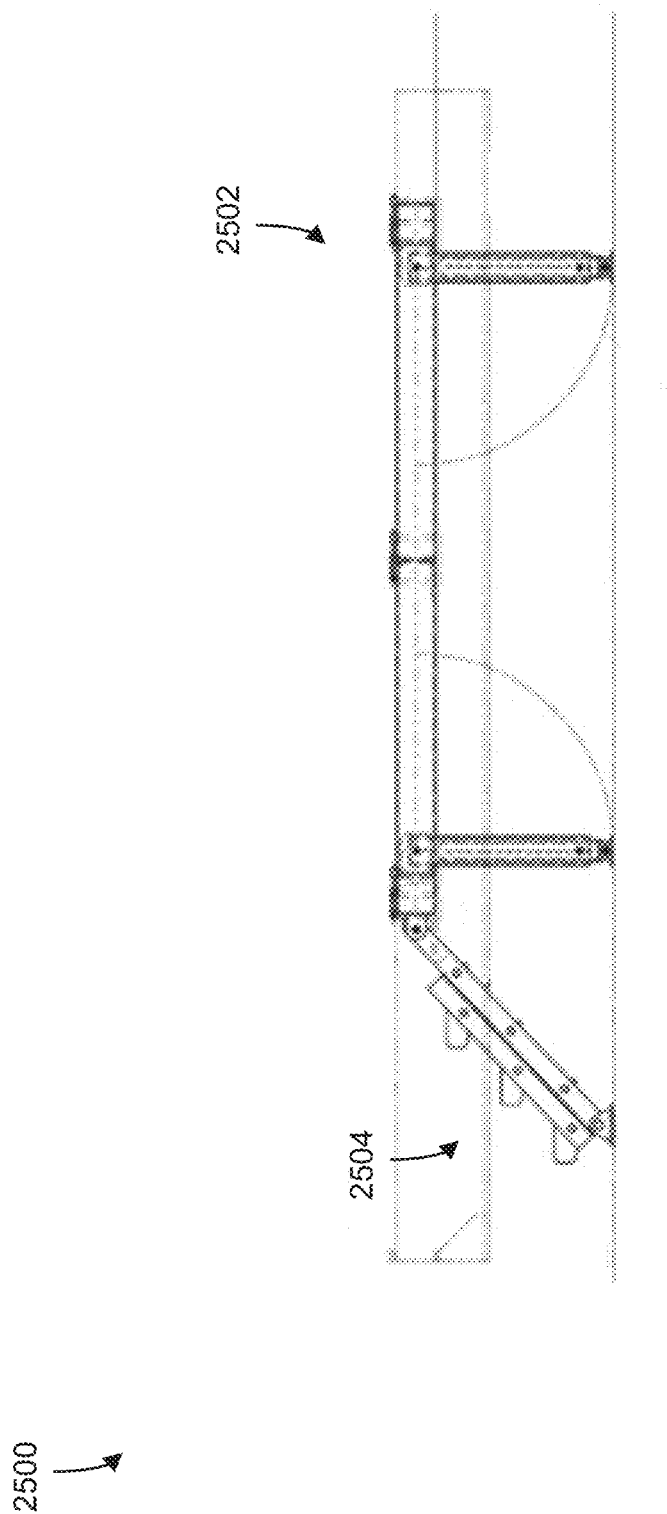

Referring now to FIGS. 24A and 24B, a perspective view and a plan view of a fold-down deck 2400 are respectively shown, according to some embodiments. The deck 2400 may be coupled to a housing portion of a modular home (e.g., to housing portion 120 or 160 of modular home 101) by a hinge 2402. When the housing module 101 is being transported, the deck 2400 may be folded up flat against a wall 2404 of the housing portion into a stowed position to reduce the footprint of the housing portion. The deck 2400 may include one or more legs 2406 each coupled to a frame of the deck 2400 by a hinge. When the housing portion 120, 160 is being transported, the deck legs 2406 may be folded down into a stowed position against the frame 2408 of the stowed deck 2400, to reduce the footprint of the housing portion 120, 160. When the housing portion 120, 160 is in position at the installation site, the deck 2400 may rotate about the hinge 2402 into an extended position, and the legs 2406 may be rotated down to a deployed position. When the deck 2400 is in the extended position, and the legs 2406 are in the deployed position, the legs 2406 may support the deck 2400. A user may exit a living area 2410 of the housing portion, for example via a door, and walk onto the deck 2400. FIG. 24C shows a detailed view of a leg 2406, according to some embodiments. The height of the legs 2406 may be adjustable based on the height of the deck 2400 above the installation site surface. For example, if the modular home is positioned on uneven ground, a first leg 2406 may be extended to a different length than a second leg 2406 such that the deck 2400 remains level. FIG. 24D shows the hinge 2402 that couples the deck 2400 to the housing portion 120 in further detail, according to some embodiments.

Entryway Assembly

In some embodiments, a modular home configured as described herein may include fold-down stairs. The fold-down stairs may be hingedly coupled to a fold-down deck as described above. The fold-down stairs may fold up to be flesh against the fold-down deck during transportation of the modular home. The fold-down stairs may then fold down to rest against the ground after folding out from the fold-down desk. The fold-down stairs may be used for easier access to the modular home when the modular home is constructed at its final destination.

Referring now to FIG. 25A-25E, an entryway assembly 2500 coupled to a housing portion of a modular home (e.g., housing portion 120 of modular home 101) is shown, according to some embodiments. The entryway assembly 2500 may include a deck 2502 and a stair assembly 2504 hingedly coupled to the deck 2502 (e.g., by pins 2564). The deck 2502 may be hingedly coupled to the housing portion 120 (e.g., by hinges 2562) and may be configured to rotate between an extended position and a stowed position, similar to the deck 2400. The deck 2502 may include one or more legs 2532 hingedly coupled to the deck frame 2534 and configured to rotate between a stowed position and a deployed position and to support the deck 2502 when in the deployed position, similar to the legs 2406 of the deck 2400. The stair assembly 2504 may include at least two stair treads 2536 and a stringer assembly 2540 on each end of the treads 2636. The stringer assembly 2540 may include a first stringer member 2542 rotatably pinned to each stair tread 2536 (e.g., by pins 2548). The first stringer member 2542 may be coupled to a foot 2544 that rests on the installation site surface when the stair assembly 2504 is deployed. The stringer assembly 2540 may include a second stringer member 2546 rotatably pinned to each stair tread (e.g., by pins 2548). The first stringer member 2542, the second stringer member 2546, and the stair treads 2536 may form a four-bar linkage configured to transition between a first position 2552 and a second position 2554. In the first position 2552, the second member 2546 contacts and rests on the first member 2542 with the stair treads 2536 in a substantially level orientation. The first position 2552 may also be referred to as a deployed position, in which a user may be able to walk up the stair assembly 2504 on the stair treads 2536. In the second position 2554, the second member 2546 may be rotated upward about the pins 2648 between the first and second members 2542, 2546 and the treads 2536 until the second member 2546 again contacts the first member 2542. The second position 2554 may also be referred to as a stowed position, in which the stair treads 2536 are angled upward to minimize the profile of the stair assembly 2504. The stair assembly 2504 may be hingedly coupled to the deck 2502 and can be rotated into a stowed position against a wall of the housing portion 120 when the deck assembly 2502 is in the stowed position to minimize the profile of the housing portion 120 when the modular home 101 is being transported. Thus, during transportation, the entire entryway assembly 2500 may be rotated about the hinge that couples the deck 2502 to the housing portion 120 until the deck 2502 is positioned against a wall of the housing portion 120. The legs 2532 of the deck 2502 may be folded into the deck frame 2534, the second stringer member 2546 of the stair assembly 2504 may be moved into the second position 2554 to minimize the profile of the stair assembly 2504, and the entire stair assembly 2504 may be rotated about the pins 2564 that couple the stair assembly 2504 to the deck 2502 until the stair assembly 2504 is positioned against the wall of the housing portion 120. Thus, the entire entryway assembly 2500 may be folded against the wall of the housing portion 120, adding only about the thickness of the deck frame 2534 to the width of the housing portion 120 during transportation of the modular home 101.

Ramp Assembly

In some embodiments, a modular home configured as described herein may include a fold-down ramp. The fold-down ramp may be hingedly coupled to a fold-down deck as described above. The fold-down ramp may fold up to be flesh against the fold-down deck during transportation of the modular home. The fold-down ramp may then fold down to rest against the ground after folding out from the fold-down desk. The fold-down ramp may be used for easier access to the modular home when the modular home is constructed at its final destination.

Referring now to FIG. 26, a ramp assembly 2600 is shown coupled to a housing portion of a modular home (e.g., housing portion 120 of modular home 101), according to some embodiments. The ramp assembly 2600 may include a landing 2602 that is hingedly coupled (e.g., by hinges 2604) to a structural frame of the modular home 101. The ramp assembly 2600 may be configured to rotate between a stowed position and an extended position in a manner similar to that of the deck 2400 and the deck 2502. The landing 2602 may include legs 2606 hingedly coupled to a frame of the landing 2602 and configured to fold up similar to the legs 2406, 2532 of the deck 2400 and the deck 2502. The ramp assembly 2600 may also include a ramp 2608 that is hingedly coupled (e.g., by hinges 2610) to the landing 2602. The ramp 2608 may be configured to transition from a stowed position to a deployed position (shown). In the deployed position, the ramp 2608 may be angled downward and may rest on the installation site surface to allow a user to walk up the ramp 2608 into the housing portion 120. In the stowed position, the ramp 2808 may be flush with the landing 2602 and may be folded up against a wall of the housing portion 120 along with the landing 2602. The landing 2602 and the ramp 2608 may be folded against the wall of the housing portion 120 to minimize the footprint of the modular home 101 during transportation of the modular home 101.

Modular Home Rotation

After transporting a modular home to a building site in two portions on a trailer bed in a position in which the portions of the modular home are positioned longitudinally on the trailer bed, the two portions may be rotated on the trailer bed to form a modular home. To rotate the two portions on the trailer, a rotation assembly coupled to the trailer bed may be used. In some cases, the rotation assembly may include the trailer bed itself. In some embodiments, the rotation assembly may include a number (e.g., four) of outrigger supports installed along the trailer bed, one or more slot opening in the middle of the trailer bed configured to receive a number (e.g., two) of trailer pins on the bottom of the portions, a telescopic winch attached on a side (e.g., a bottom left side) of the trailer bed, a number (e.g., two) of winches installed on the front and rear of the trailer bed, and a crawler storage device. To fold two portions of a modular home on the trailer bed, the outrigger supports may retract outward, thus providing stabilization during un-hauling activities. The telescopic side winch may also be attached to a hinge coupling the two portions of the modular home together and retracted. The two trailer pins may move in slots on the trailer bed to guide two portions to be closed. The rear winch may pull the combined unit to the rear of the trailer for offloading (e.g., offloading using crawlers from the crawler storage device on the trailer bed, as described herein). In this way, the modular home may be automatically removed from the trailer bed without the use of a crane.

Figure 27A:
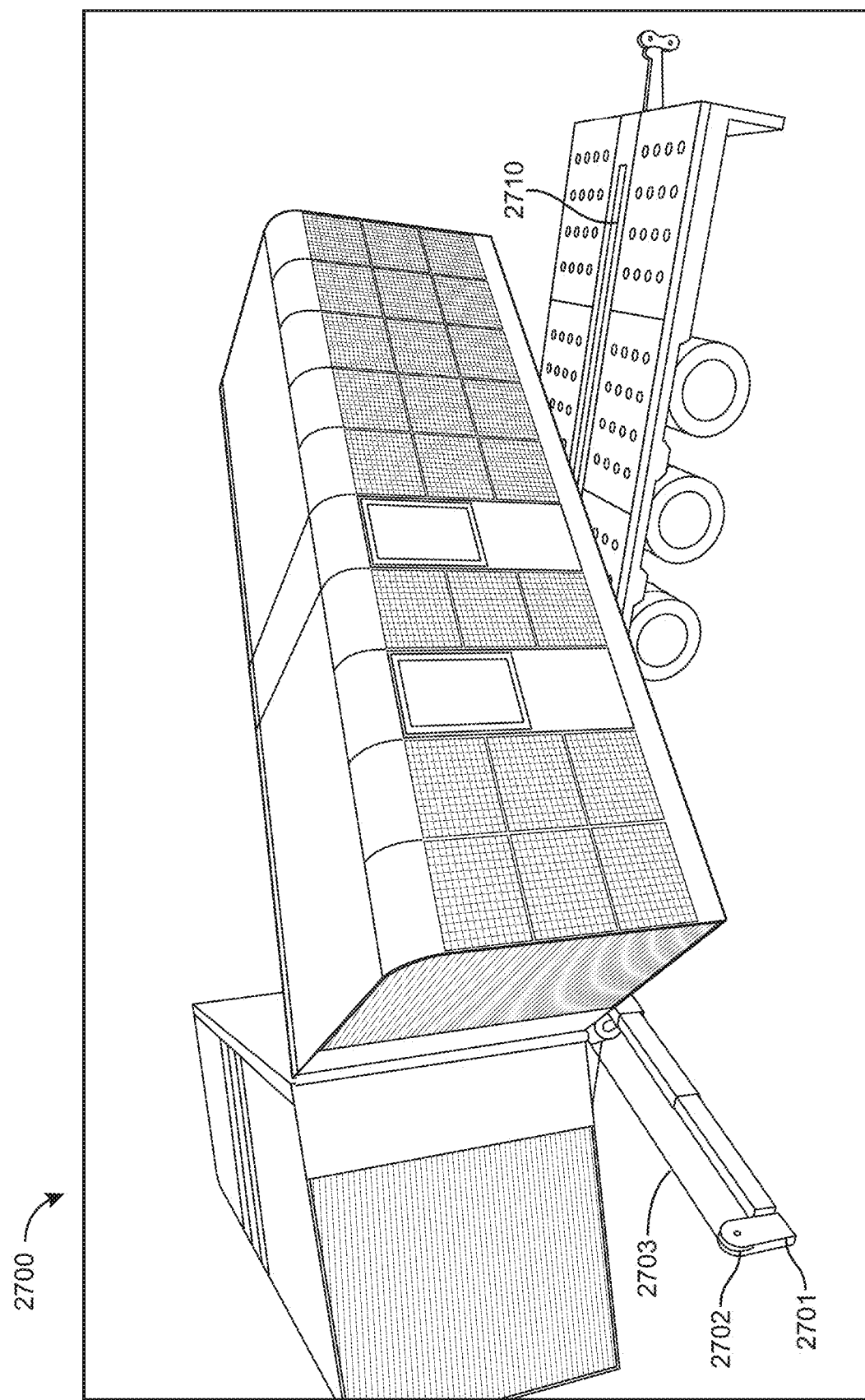
FIG. 27A is an illustration of a rotation of two portions of a modular home using ball transfer units and a winch, in accordance with some embodiments of the present disclosure.

Referring now to FIG. 27, a modular home 2700 is shown being rotated on the bed of a trailer, according to some embodiments. The bed of the trailer may include a plurality of ball transfer units that reduce the friction between the bed and the modular home 2700 to allow the modular home to rotate and slide across the bed. The trailer may include a boom 2701 (e.g., a jib) configured to extend away from the bed. The boom 2701 may include a pulley 2702 at the distal end of the boom 2701. The trailer may include a winch configured to pull and coil a rope 2703. The winch, boom and pulley may be referred to as a winch assembly. The rope 2703 may be fed through the pulley 2702 and coupled to the modular home 2700. When the winch coils the rope 2703, the modular home may be pulled in the direction of the pulley 2702. The rope 2703 may be coupled to the hinge of the modular home 2700 or to one of the housing units of the modular home 2700. In some embodiments, a winch may itself be coupled to the distal end of the boom and a pulley may not be required.

In some embodiments, the boom 2701 may extend telescopically from a stowed position to an extended away from the bed. In the stowed position, distal members of the boom may telescope into larger, more proximal members of the boom, such that the boom collapses into a smaller footprint that can fit below the bed of the trailer without sticking out from either side of the trailer. When the boom is needed, the smaller members can extend out form the larger members such that the boom extends out from the side of the trailer. The boom may be arranged perpendicular to the longitudinal direction of the trailer. The boom may be positioned at the midpoint of the trailer bed (e.g., between the front and the rear of the bed), such that the boom is aligned with a hinge coupling two housing portions arranged longitudinally on the bed. The boom may extend a length from the centerline of the slot that is longer than half the length of the housing portion. For example, if the housing portion is 30 feet long, the boom may extend such that the pulley is more than 15 feet from the centerline of the slot. This may ensure that the winch assembly can rotate the housing portions ninety degrees without the housing portions contacting the pulley. The rope may be coupled to the hinge or to an area of the housing portion near the hinge such that the pulley continues to pull the rope in the direction of rotation until the housing portions rotate ninety degrees. For example, one of the leaves of the hinge may include an eyebolt or hoist ring to which a hook at the end of the rope can be coupled. In some embodiments, the roper may be coupleable to a vertical edge of one of the housing portions near the hinge. In some embodiments, the boom may be configured to electromechanically retract or extend based upon a user input or preprogrammed instructions.

In some embodiments, the boom 2701 may be hingedly coupled to the bed and may rotate from a stowed position parallel to the bed to an extended position perpendicular to the bed. For example, the boom may be rotatably coupled to a vertical pin near the edge of the bed. In the stowed position, the boom may be rotated such that it is positioned against the edge of the bed and increases the width of the trailer only by the width of the boom. The distal end of the boom may be removably coupled to the bed to hold the boom in place in the stowed position. For example, the boom may snap into a holding bracket or other retaining feature when moved into the stowed position, and a user may disengage the bracket or retaining feature to rotate the boom into the extended position. In some embodiments, the boom may be configured to electromechanically retract or extend based upon a user input. In some embodiments, the boom may be configured to electromechanically rotate based upon a user input or preprogrammed instructions. The boom may include a support member to hold the boom in place in the extended position. For example, the support member in FIG. 29 may be rotatably coupled at its proximal end to another vertical pin positioned along the edge of the trailer bed. The distal end of the support member may be coupled to the boom. The support member may be a linear actuator (e.g., an electromechanical actuator). The linear actuator may extend to rotate the boom into the stowed position and may retract to rotate the boom into the extended position. In some embodiments, the boom may be a telescoping extendable boom that also rotates and may be supported by the support member. The support member may be connected to the largest, most proximal member of the boom.

The trailer may include a slot 2710 in which rotation pins are configured to slide or roll. A first housing portion may be coupled to a first rotation pin and a second housing portion may be coupled to a second rotation pin. When the rope 2703 pulls the modular home, the housing portions may rotate about the rotation pins, and the rotation pins may slide along the slot 2710 toward each other. In some embodiments, there may be a separate slot for each rotation pin. In some embodiments, the rotation pin may not be positioned in a slot and may not be configured to slide along the bed of the trailer. A modular home that does not include a hinge, for example, a modular home with a single housing portion, may be rotatably coupled to the rotation pin. The rope coupled to the winch may be attached to the housing portion and the housing portion may be rotated without the pin having to slide along a slot. This method may be used for other types of loads positioned on the bed of a trailer, such as shipping containers.

Figure 27C:
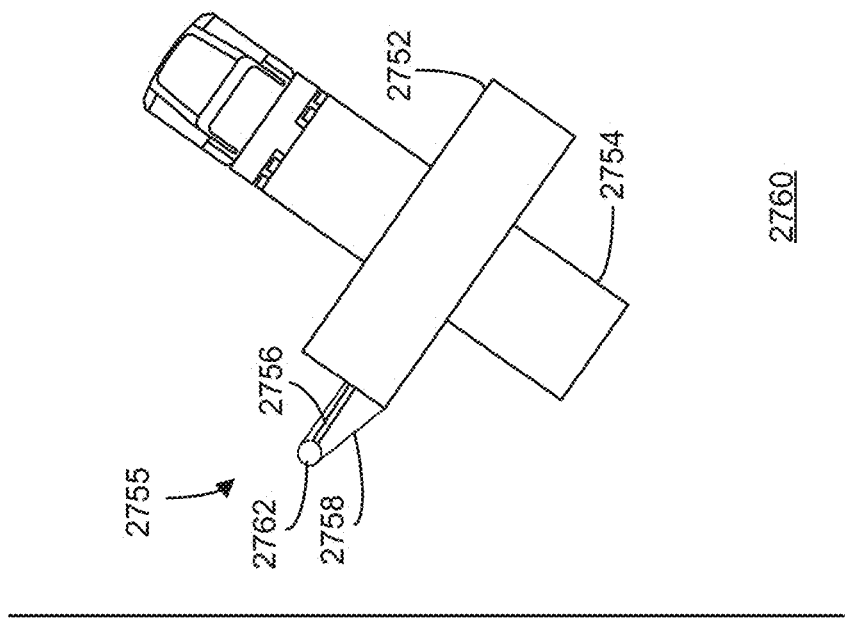
FIGS. 27B-27C are illustrations of a sequence for rotating of a load on a trailer using ball transfer units and a winch, in accordance with some embodiments of the present disclosure.
Figure 27B:
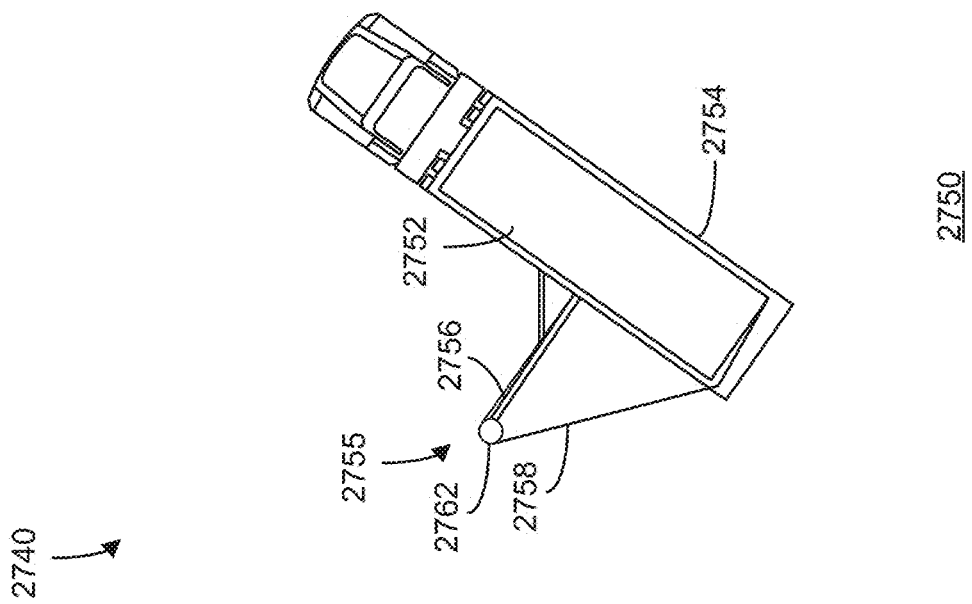

In some embodiments, similar methods may be used to rotate and unload a load having only a single portion and no hinge from a trailer. The load may be, for example, a shipping container or a modular home having a single housing portion. Referring now to FIGS. 27B-27C, a sequence 2740 for unloading a single-portion load from a trailer is provided, according to some embodiments. The load 2752 is first positioned on the trailer 2754 in a conventional shipping position. Similar to the trailers described above, the trailer 2754 has a bed with an upper surface that includes a plurality of ball transfer units and/or a low friction material, such that the load 2752 can rotate and slide on the bed. The load 2752 is coupled to a rotation pin (e.g., via a pin socket positioned on the underside of the load 2752) that extends above the upper surface of the bed similar to the rotation pins described herein. In some embodiments, the rotation pin may be positioned in a static position in the bed (e.g., in the center of the bed), and not in a slot. The trailer 2754 may include a winch assembly 2755 with a winch and a boom 2756 as described above. At operation 2750, the boom 2756 is extended away from the side of the trailer 2754. A rope 2758 coupled to the winch may be run through a pulley 2762 and coupled to a corner of the load 2752. At operation 2760, the winch may then pull the rope 2758 through the pulley 2762 to rotate the load 2752 about the rotation pin. The load 2752 may be rotated about 90 degrees such that it is perpendicular to the trailer 2754 forming an overhanging portion on each side of the trailer 2754. Next, the load 2752 can be lifted by the overhanging portions. For example, a plurality of crawlers can move under the overhanging portions and lift the load 2752 off of the trailer 2754 and carry the load 2752 to another location. Alternatively, linear actuators coupled to the overhanging portions of the load 2752 can extend downward from the load 2752 and lift the load off of the trailer 2754, which can then be driven out from underneath the load 2752. Like the trailers described above, the trailer 2754 may include outriggers coupled to the trailer bed that support and stabilize the bed when the load 2752 is rotated.

In some embodiments, the unloading process may be reversed to load the load 2752 on to the trailer 2754. For example, if the load 2752 includes linear actuators, the linear actuators may lift the load 2752 off of the ground. The trailer 2754 may then be backed under the load 2752 between the linear actuators and perpendicular to the load 2752. The linear actuators may then lower the load 2752 onto the trailer such that a pin socket surrounds the rotation pin. The winch assembly 2755 may then be used to rotate the load 2752 ninety degrees into the conventional shipping orientation. For example, the rope 2758 may be coupled to a corner of the load 2752 on the opposite side of the trailer 2754. In some embodiments, the trailer may include a front winch (e.g., front winch 3032 shown in FIG. 30) coupled to the front end of the trailer bed. The front winch 3032 can be used to rotate the load 2752 from the loading position (e.g. in which the load is perpendicular to the trailer bed) to the shipping position. In some embodiments, the trailer may include a rear winch coupled to the aft end of the trailer bed. The front winch 3032 can be used to rotate the load 2752 from the loading position to the shipping position. In some embodiments, the trailer 2754 may include a slot as described above, in which the rotation pin can translate along the bed. The front and rear winches can be used to pull the load toward the front or rear of the trailer bed, respectively. In some embodiments, the trailers described above (e.g., that are configured to rotate a two-portion modular home in which the housing portions are coupled by a hinge) may be used to rotate a single-portion load (e.g., load 2752).

Figure 28B:
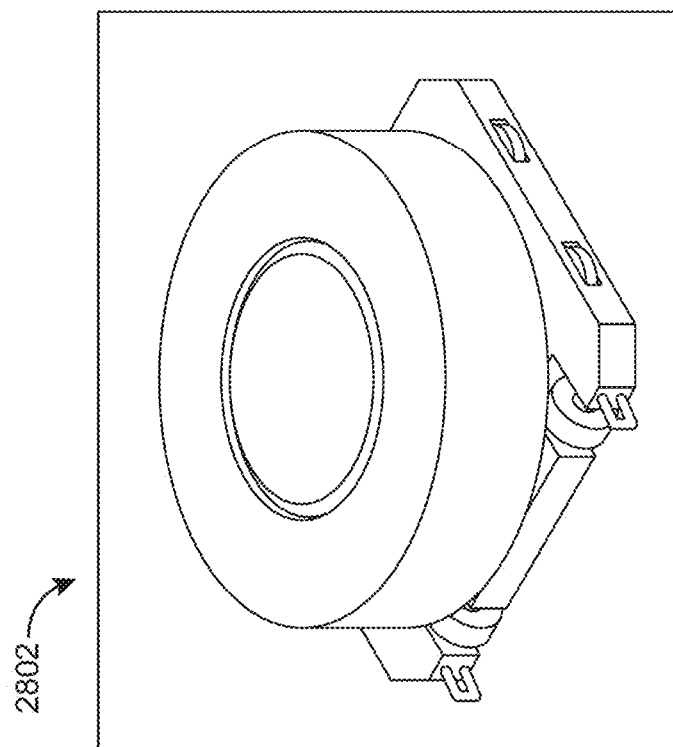
FIGS. 28A-28B are illustrations of an example pin for rotating portions of a modular home on a trailer bed, in accordance with some embodiments of the present disclosure.
Figure 28A:
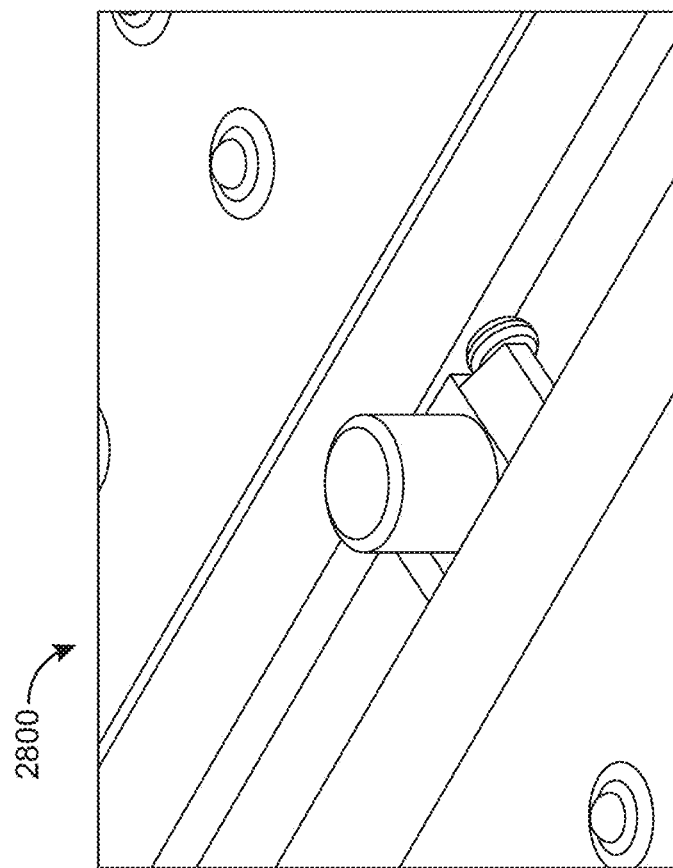

FIGS. 28A and 28B show rotation pins 2800, 2802, according to some embodiments. As shown in FIG. 28A, the rotation pin may be configured to roll along the slot on a plurality of wheels coupled to a base portion. The slot may include an upper flange at each side of the slot to prevent the rotation pin 2800 from being lifted out of the slot. The rotation pin 2800 may include a cylindrical (e.g., pin) portion extending from the base (e.g., roller) portion. The roller portion may include several wheels or rollers arranged about a horizontal axis of rotation. For example, as shown in FIG. 28B, there may be two rollers on each side arranged to allow the rotation pin 2802 to roll along a slot. The rollers may extend both above and below a lower frame or plate, so that if there are any upward forces on the pin 2802, the rollers will contact the flanges of the slot, and the frame will not contact the flanges. In some embodiments, the roller portion may include one or more hooks that allow the pin to be pulled along a slot, for example, by a rope coupled to a winch. There may be hooks on each side of the frame so that the pin 2802 can be pulled in either direction along the slot. The roller portion may also include rollers with vertical axes of rotation arranged on the sides of the frame. These rollers may contact the side of the slot to prevent the frame form contacting the side of the slot in order to reduce friction caused by any side loading, for example, when the housing portions are being rotated. When a housing portion is loaded onto the bed of the trailer, a pin hole (e.g., a pin socket) coupled to a floor assembly of the housing portion may be located onto the pin 2800 such that the housing portion may be able to rotate about the pin 2800. In some embodiments, as shown by the rotation pin 2802, a bearing may be arranged around the cylindrical portion to reduce the rotational friction between the housing portion and the rotation pin 2802. In some embodiments, the bearing may have a larger diameter than the width of the slot and may be positioned above the slot. For example, the rotation pin may be inserted into the slot with the pin portion of the rotation pin extending through the slot, and the bearing may be pressed on to the pin portion above the surface of the trailer bed. The pin portion may include a shoulder to prevent the bearing from being pushed so far sown the pin portion as to contact the trailer bed. The bearing may be encased in an additional covering to further protect the bearing. As discussed above, in some embodiments, the pin portion of the rotation pin (e.g., rotation pin 2800) is a solid cylinder. The pin socket of the housing portion may function as a plane bearing around the rotation pin. In some embodiments, the housing portion Amy have a ball bearing or roller bearing in the pin socket to reduce the rotational friction between the rotation pin and the housing portion.

Figure 30:
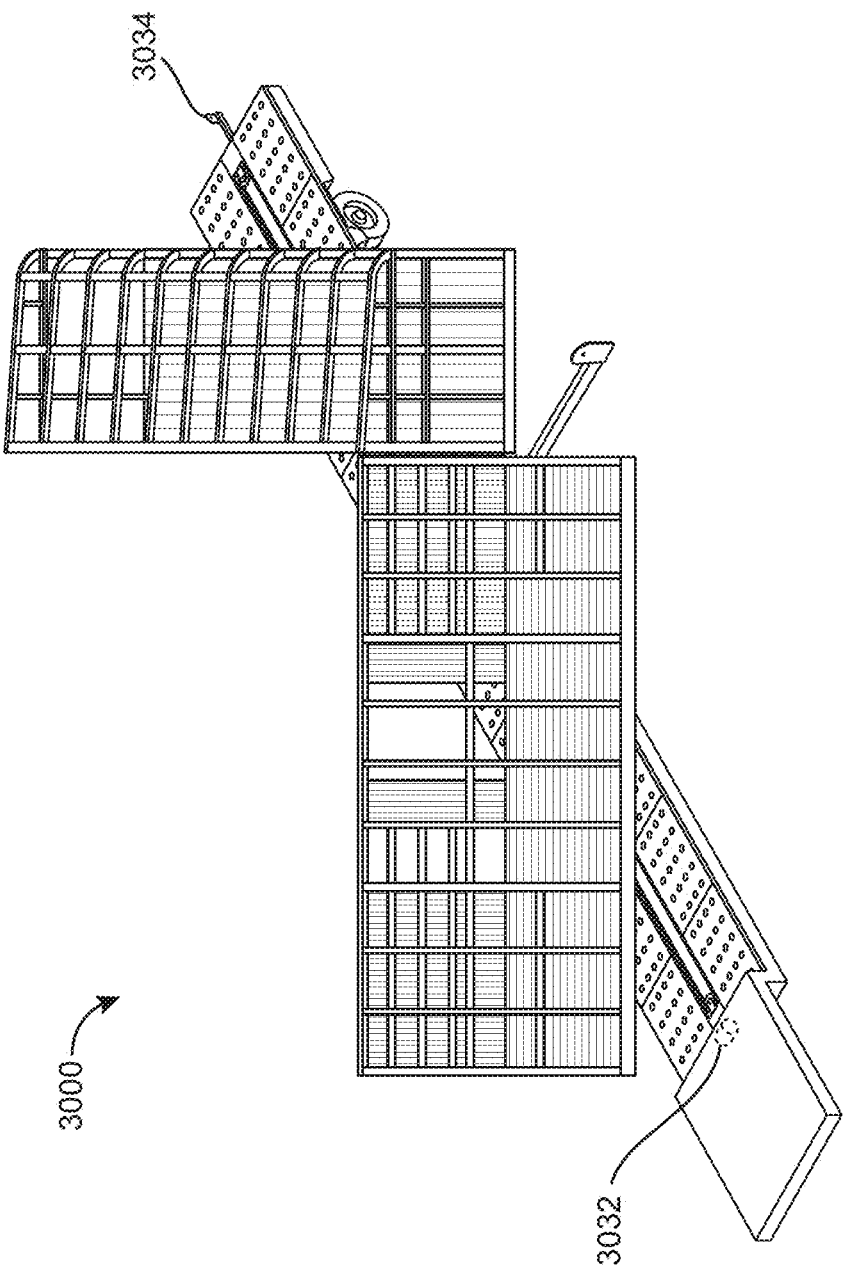
FIG. 30 is an illustration of two portions of a modular home rotated on a trailer bed via a winch, in accordance with some embodiments of the present disclosure.
Figure 31:
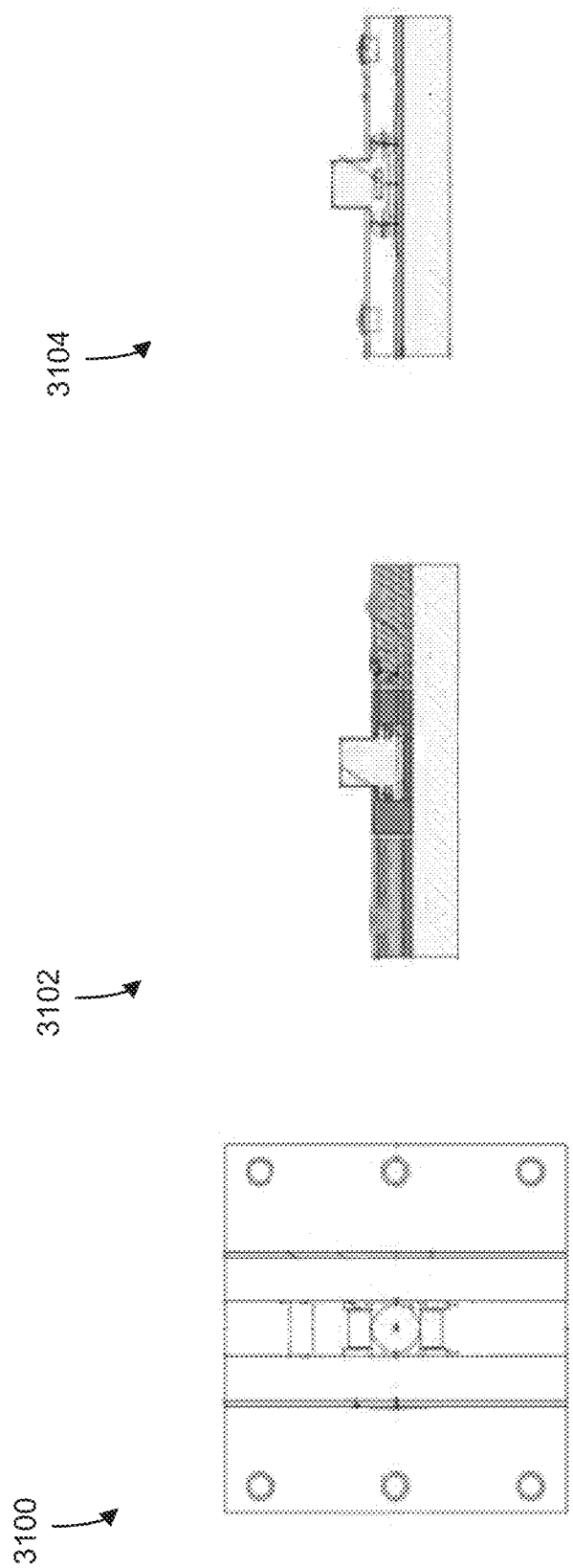
FIGS. 31A-31C are illustrations of different views of a trailer bed, in accordance with some embodiments of the present disclosure.

FIG. 29 shows plan views of a sequence 2900 for rotating the housing portions of the modular home using a boom is shown, according to some embodiments. The sequence 2900 may include any number of operations and the operations may be performed in any order. In a first operation 2902 of the sequence 2900, housing portions (e.g., housing portions 120, 160) are arranged longitudinally on the bed of the trailer (e.g., the bed 404 of the trailer 30) and the boom (e.g., the boom 408 of winch assembly 409) is extended from the side of the trailer 30. In a second operation 2904, a winch (e.g., winch 414) may coil a rope, which may be pulled through a pulley (e.g., pulley 412) at the end of the boom 408, thus rotating the housing portions 120, 160 about the rotation pins and causing the rotation pins 2802 to move along the slot toward each other. FIG. 30 shows a perspective view of a modular home 3000 with its housing portions being rotated on the bed of a trailer using a boom and winch as described above. FIGS. 31A-31C show a plan view 3100, an end view 3102, and side view 3104 of the rotation pin in the slot.

In some embodiments, the rotation assembly may include a series of pulleys and winches within a trailer bed. In the rotation assembly, a winch may be mounted below the trailer deck. Two pulleys may be placed at each end of the trailer bed. Cables connected to the winch may noose around the pulleys and connect to trailer pins embedded in the trailer bed. As the winch motor moves in the forward direction, the two pins will move together. Running the winch motor in reverse may cause the two pins to separate the pins. A separated modular home positioned on top of the pins may fold into a whole modular home as the pins move.

Referring now to FIG. 32, a method 3200 of rotating a load on a trailer (e.g., load 2752 on trailer 2754) is described, according to some embodiments. In some embodiments, the load 2752 may be a modular home, for example, a modular home including a single or two housing portions. The method 3200 may include any number of operations and the operations may be performed in any order. The method 3200 may be performed by equipment of a modular home construction company (e.g., the components of system 4500, shown and described with reference to FIG. 45). At operation 3202 of the method 3200, a load is positioned on a trailer 2754. The trailer 2754 may include a plurality of ball transfer units on a bed of the trailer. The plurality of ball transfer units may be configured to support the load. The trailer 2754 may include a rotation pin coupled to the bed of the trailer. Positioning the load 2752 on the trailer 2754 may include rotatably coupling the load to the rotation pin. The trailer 2754 may also include an extendable winch assembly (e.g., winch assembly 2755) coupled to the bed of the trailer 2754. At operation 3204 of the method 3200, the extendable winch assembly 2755 is extended away from the trailer bed. In some embodiments, the winch itself may be extended from the bed of the trailer 2754 at a distal end of a boom 2756. In some embodiments, the boom 2756 may include a pulley 2762 at the distal end of the boom 2756, and the winch may be positioned on the trailer 2754. At operation 3206 of the method 3200, a rope 2758 coupled to the winch is coupled to the load 2752. When the winch is positioned on the trailer 2754, the rope 2758 may be fed through the pulley 2762 before being attached to the load 2752. At operation 3208 of the method 3200, the rope 2758 is pulled with the winch toward the distal end of the boom 2756 to rotate the load 2752 about the rotation pin.

Figure 33:
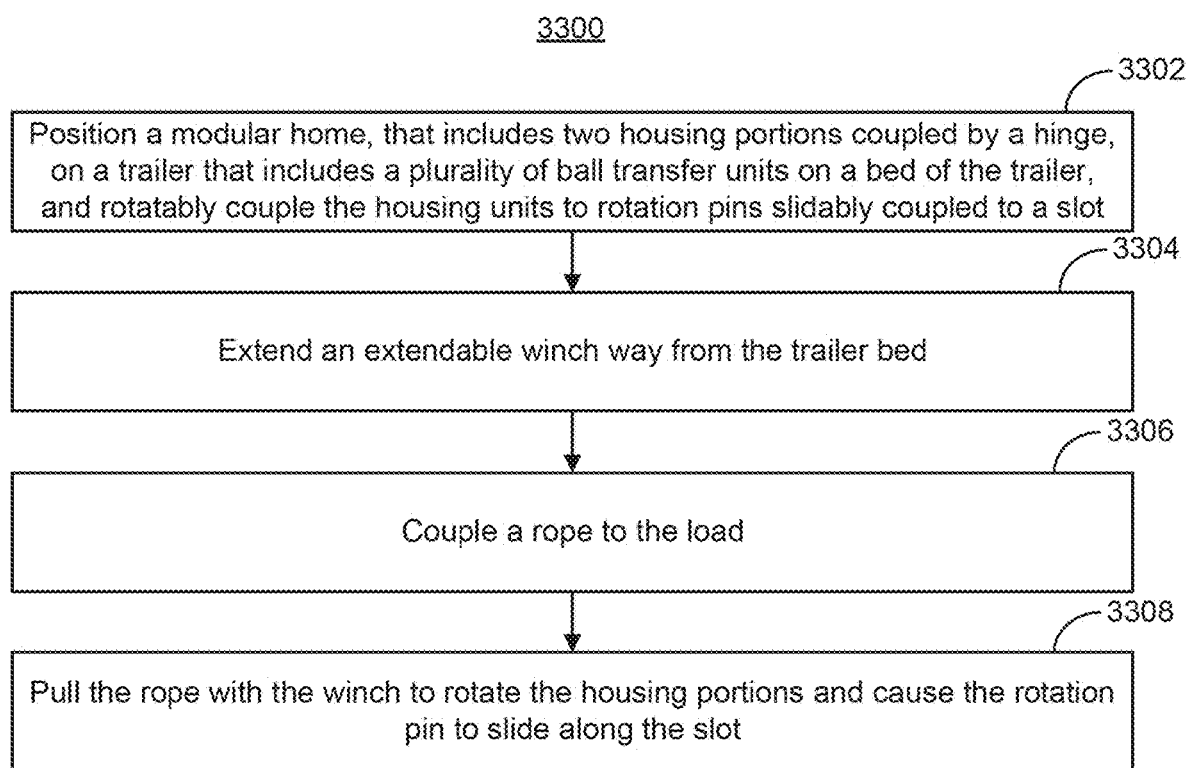
FIG. 33 is an example method of rotating two portions of a modular home using ball transfer units and a winch, in accordance with some embodiments of the present disclosure.

Referring now to FIG. 33, a method 3300 of assembling a modular home is described, according to some embodiments. The method 3300 may include any number of operations and the operations may be performed in any order. The method 3300 may be performed by equipment of a modular home construction company (e.g., the components of system 4500, shown and described with reference to FIG. 45). At operation 3302 of the method 3300, a modular home (e.g., modular home 101) is positioned on a trailer bed (e.g., bed 404 of trailer 30). The modular home may include a first housing portion (e.g., housing portion 120) coupled to a second housing portion (e.g., housing portion 160) by a hinge (e.g., hinge 199). The trailer 30 may include a plurality of ball transfer units on a bed 404 of the trailer 30. The plurality of ball transfer units may be configured to support the modular home 101. The trailer 30 may include a first rotation pin slidably 510 coupled to a slot in the bed 404 of the trailer 30 and a second rotation pin 512 slidably coupled to a slot 514 in the bed of the trailer 30. In some embodiments, the first and second rotation pins 510, 512 may be slidably coupled to the same slot 514. The first housing portion 120 may be rotatably coupled to the first rotation pin 510, and the second housing portion 160 may be rotatably coupled to the second rotation pin 512. The trailer 30 may include an extendable winch assembly 409 coupled to the bed 404 of the trailer 30. At operation 3304 of the method 3300, the extendable winch assembly 409 is extended away from the trailer bed 404. In some embodiments, the winch 414 itself may be extended from the bed 404 of the trailer 20 at a distal end of a boom 408. In some embodiments, the boom 408 may include a pulley 412 at the distal end of the boom 408, and the winch 414 may be positioned on the trailer 30. At operation 3306 of the method 3300, a rope 410 coupled to the winch 414 is coupled to the modular home 101. When the winch 414 is positioned on the trailer 30, the rope 410 may be fed through the pulley 412 before being attached to the modular home 101. At operation 3308 of the method 3300, the rope 410 is pulled by the winch 414 toward the distal end of the boom 408 to rotate the first and second housing portions 120, 160 about their respective rotation pins 510, 512. The pulling of the rope 410 may cause the rotation pins 510, 512 to slide toward each other along the slot 514 as the housing portions 120, 160 rotate.

Figure 34:
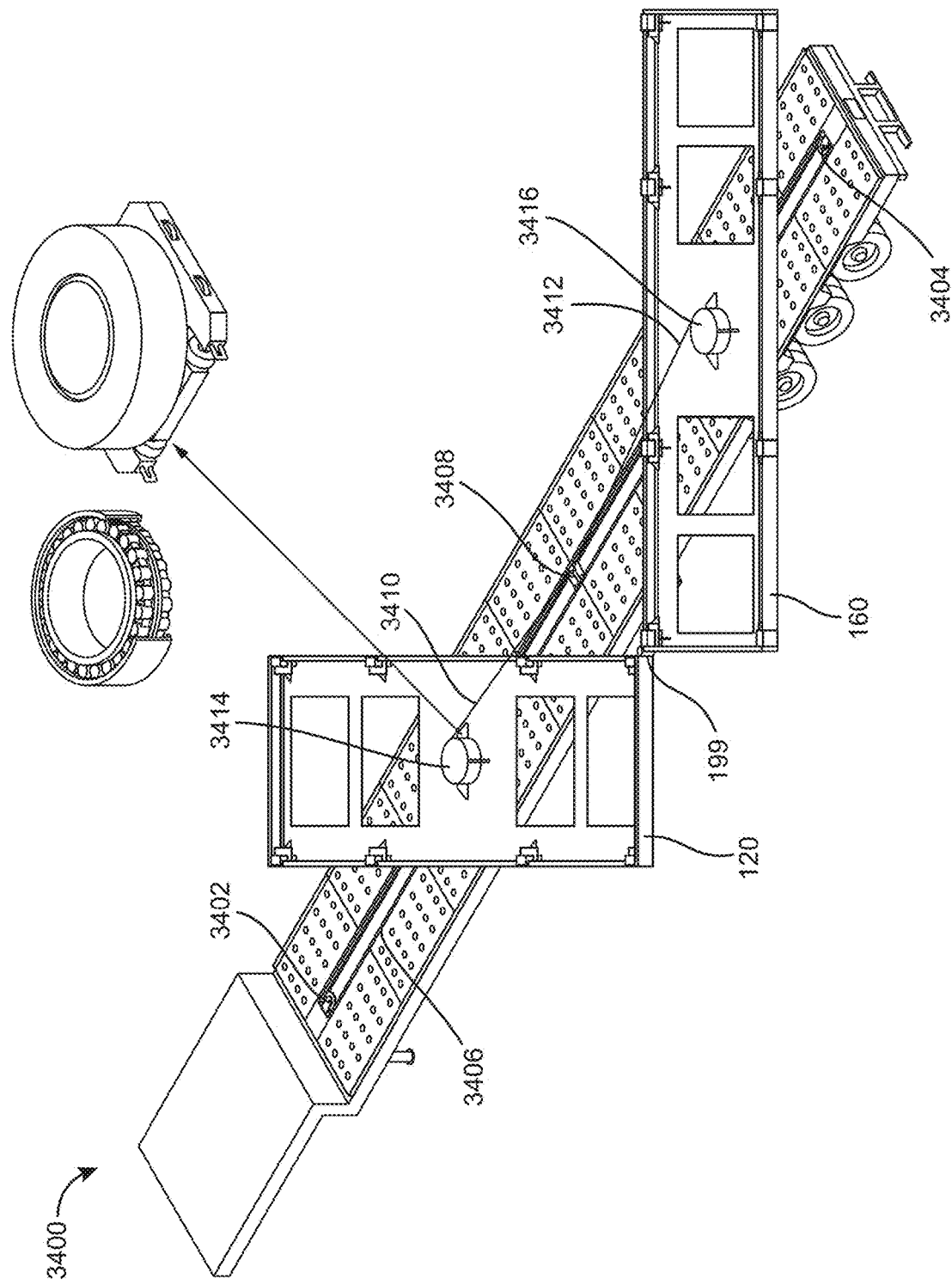
FIG. 34 is an illustration of use of a pulley system to rotate two portions of a modular home, in accordance with some embodiments of the present disclosure.

Referring now to FIG. 34, a trailer 3400 is shown, according to some embodiments. The trailer 3400 may not include a boom that extends from the side of the trailer and is used to rotate the housing portions of a modular home (e.g., housing portions 120, 160 of modular home 101). Instead, the trailer 3400 may include a winch 3408 positioned below a slot 3406 (e.g., a channel). The winch 3408 may be coupled to first and second ropes 3410, 3412 that are respectively coupled to two rotation pins 3414, 3416. The rotation pins 3414, 3416 may be configured to roll or slide along the slot 3406. When the winch 3408 is rotated in a first direction, the first and second ropes 3410, 3412 may coil around the winch 3408 and pull the rotation pins 3414, 3416 towards each other and the center of the trailer. As the rotation pins 3414, 3416 move toward each other, the housing portions of the modular home may rotate about the rotation pins 3414, 3416 and a hinge (e.g., hinge 199) that couples the first housing portion 120 to the second housing portion 160. The trailer 3400 may also include two pulleys 3402, 3404, positioned in the slot 3406. A third rope 3418 and a fourth rope 3420, may be respectively coupled to the rotation pins 3414, 3416 and fed respectively through the pulleys 3402, 3404. When the winch 3408 is rotated in a second direction opposite the first direction, the third and fourth ropes 3418, 3420 may be pulled through the pulleys 3402, 3404, pulling the rotation pins 3414, 3416 apart to rotate the housing portions in the opposite direction. This may allow the modular home 101 to be positioned on the deck of the trailer with the housing portions in a side-by-side orientation. The housing portions 120, 160 may then be rotated into a longitudinal arrangement for shipping (e.g., end-to-end) using the winch 3408 and the pulleys 3402, 3404. Thus, the winch 3408 may be configured to pull the rotation pins 3414, 3416 along the slot 3406 in a first direction (e.g., towards the center of the trailer 3400), and the pulleys 3402, 3404 may be configured to cooperate with the winch 3408 to pull the rotation pins 3414, 3416 along the slot 3406 in a second direction (e.g., away from the center). FIGS. 35A-35B show a first plan view 3502 of the winch 3408 coiling a first set of ropes to pull the rotation pins 3414, 3416 towards the center of the trailer 3400, and a second plan view 3504 of the winch 3408 coiling a second set of ropes that have been fed through pulleys 3402, 3404 at either end of the trailer 3400 to pull the rotation pins 3414, 3416 towards either end of the trailer 3400.

Trailer Roller Deck

To help enable the rotation of the housing portions of the modular home on a trailer bed, the trailer bed may be configured to minimize the friction that is imposed on the skid plate on the bottom of the portions of the modular home. Typical trailer decks may have a steel or wood surface that can cause a significant amount of friction. The friction may require lifting items on the surface to move or remove the items because it is not feasible or is otherwise difficult to slide any items on the surface. To overcome this friction and enable rotation of portions of a modular home on a trailer bed, in some embodiments, a trailer bed may be outfitted with a custom modular roller deck. The modular roller deck may be equal in dimension and bolted to the trailer bed. Ball bearings (e.g., ball transfer units) may be embedded in the roller deck in an even grid pattern, thus distributing the weight of a load rolling on the ball bearings. The roller deck may contain ball bearings that help the portions of the modular home rotate freely on the roller bed, in some cases in conjunction with one or more trailer pins coupled to the portions of the modular home.

Figure 36:
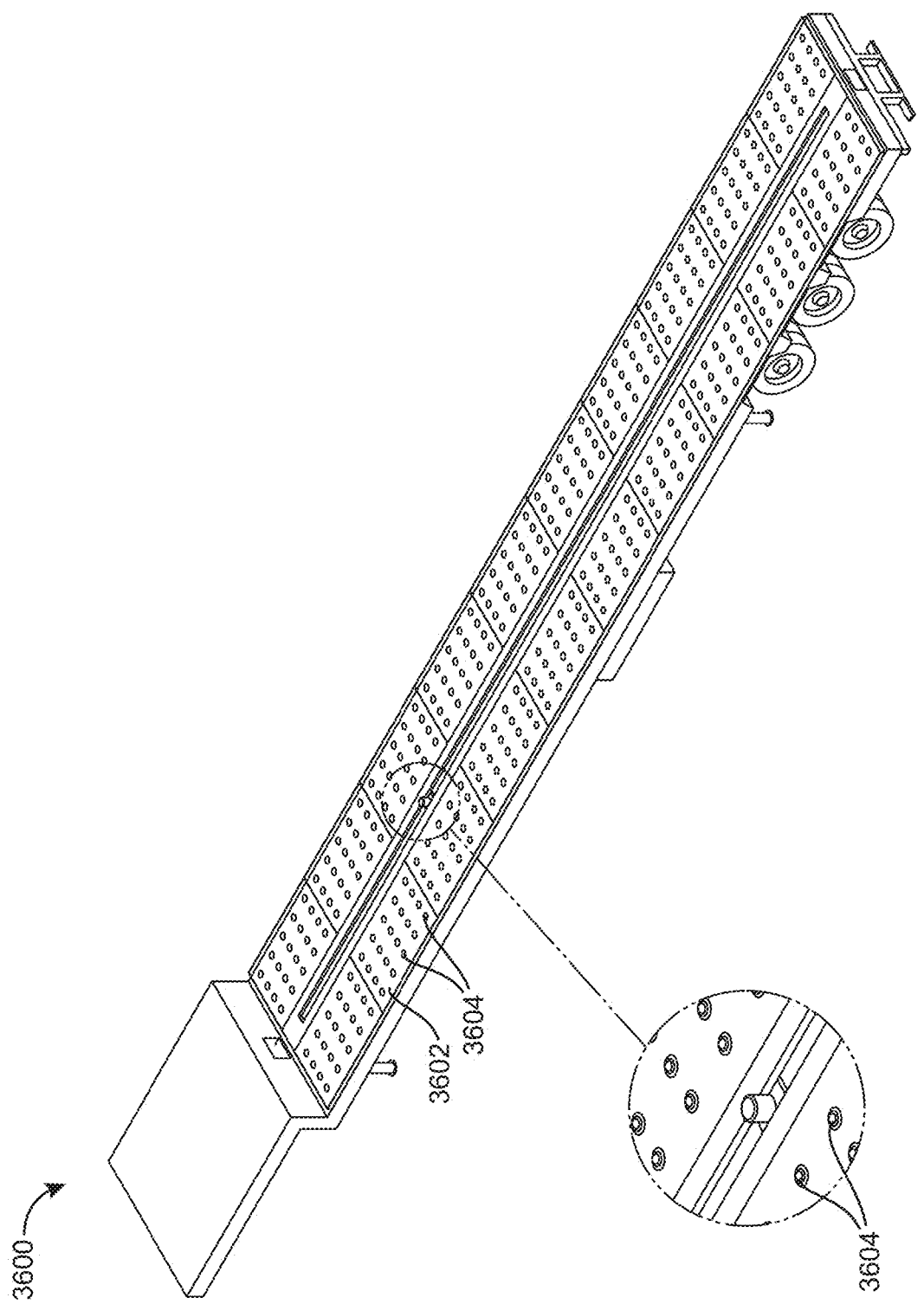
FIG. 36 is an illustration of a trailer deck with ball transfer units, in accordance with some embodiments of the present disclosure.

For example, referring now to FIG. 36, a trailer 3600 is shown, according to some embodiments. The trailer 3600 may include a deck 3602 and a plurality of ball transfer units 3604. The ball transfer units 3604 may be positioned on the deck 3602 and configured to support a load and to allow the load to move across the deck 3602. The ball transfer units 3604 may reduce the friction between the deck 3602 and the load, so that the load can be translated and/or rotated on the deck 3602. For example, a modular home (e.g., modular home 101) may be rotated or translated along the deck 3602. A ball transfer unit 3604 may include a load-bearing spherical ball mounted inside a restraining housing. The ball may rotate to allow a load to pass over the ball transfer unit 3604 with minimal friction. The housing of the ball transfer unit 3604 may include a cylindrical base configured to be inserted in a hole in a surface and may include a flange positioned around the base configured to rest on the edge of the hole such that the ball may be positioned at a predetermined height above the surface. The trailer 3600 may include an array of ball transfer units 3604 that cooperate to support a large load, such as a modular home 101. In some embodiments, the bed may include a low friction surface instead of, or in addition to the ball transfer units 3604. For example, the upper surface of the bed may be made from a low friction material, such as a hard plastic material like nylon. In some embodiments, a "low friction" material may be material with a lower coefficient of friction when contacting aluminum than the coefficient of friction when steel, aluminum, or wood contacts aluminum. For example, aluminum positioned on an aluminum deck may have a coefficient of static friction of about 0.70, and aluminum positioned on wood may have a coefficient of static friction of about 0.30. A material that has a coefficient of static friction when contacting aluminum of less than 0.30, or less than 0.20 may be referred to as a "low friction material." Aluminum positioned on a nylon deck, for example, may have a coefficient of static friction of about 0.10. Therefore, nylon may be considered a low-friction material. As the skid plates (e.g., skid plates 1405, 1504) of the housing portions 120, 160 may be made from aluminum, the low friction materials allow the housing portions 120, 160 to be rotated on the trailer bed 404 with less force than on a traditional trailer bed that may be made from steel, aluminum, or wood. This reduces the power required from the winch to rotate the housing portions 120, 160 and reduces stress on the housing portions 120, 160 themselves when they are rotated.

Referring now to FIGS. 37A-37C, a top view 3700, a perspective view 3702, and a side view 3704 of a panel assembly 3710 including a plurality ball transfer units 3712 are shown, according to some embodiments. The panel assembly 3710 may include a mounting bracket 3714 on each side and a deck plate 3716 coupled to the mounting bracket. The plurality of ball transfer units 3712 may be positioned on the deck plate 3716 and configured to support a load and to allow the load to move across the panel assembly 3710. The deck or bed of a trailer may be made up of a plurality of these panel assemblies 3710. For example, a plurality of the panel assemblies 3710 can be coupled to the deck of a traditional trailer by fastening the mounting brackets 3714 to the bed of the trailer, thus converting the traditional trailer to a trailer having a plurality of ball transfer units 3712 configured to support a load and allow load to rotate and translate across the trailer.

Robotic Crawlers

After two portions of a modular home have completed rotation on a trailer bed, robotic crawlers may be used to transport the modular home to a defined destination away from the trailer bed. For example, robotic crawlers may be stored in a crawler storage device or container on the trailer that transported the modular home to the modular home's current location. Upon completion of rotation of two portions of the modular home into a single modular home on the trailer bed of the trailer, a controller (e.g., a controller stored or positioned on the trailer and/or operated by a human) may transmit instructions to the crawlers (e.g., 12 crawlers) to drive out of the crawler storage device or container and underneath portions of the modular home that extrude away from the trailer bed. Processors on the crawlers may receive the instructions and operate according to the instructions, positioning themselves in an evenly spaced pattern underneath the modular home. The controller may then transmit or send signals to mechanical legs (e.g., linear actuators) within wall and/or floor of the modular home to cause the mechanical legs to extend onto the crawlers. The controller may then lift the mechanical legs up one by one to enable the crawlers to drive away (e.g., back into the crawler storage device or container) and subsequently extend the mechanical legs to rest on the ground. Accordingly, the robotic crawlers may automatically facilitate the final transportation operation of removing a modular home from a trailer bed and to the home's final destination. Through this control, the controller may cause the mechanical legs to lift the modular home off of the trailer bed and then cause the crawlers to transport the lifted modular home to a final destination.

As described herein, crawlers may be portable in size and build with robust/heavy duty design. The crawlers may have crawler wheels on the side for traveling in different ground terrains and a flat top deck surface for integrating the legs of the housing portions for locking and securing.

Figure 38:
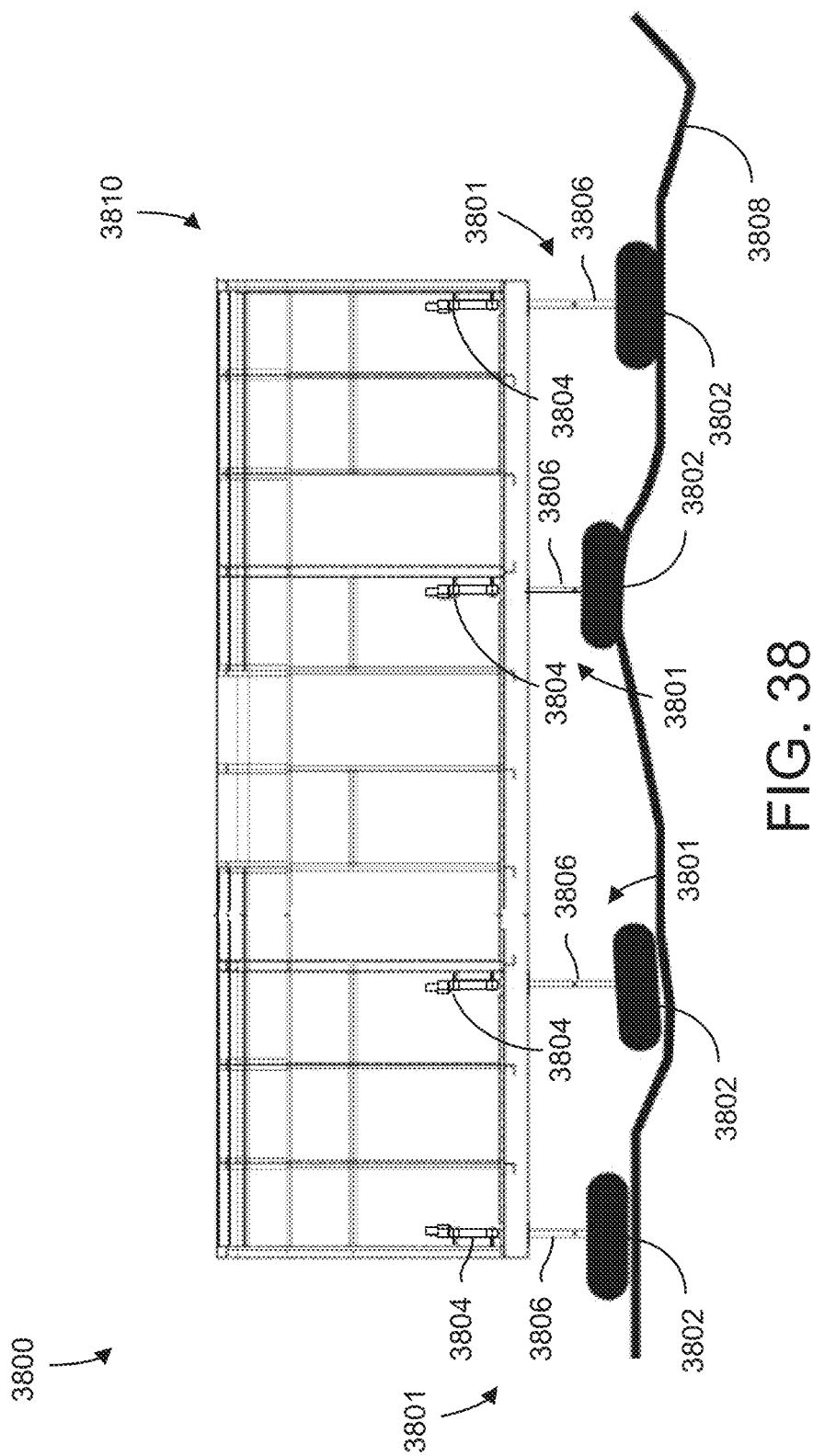
FIG. 38 is an illustration of a modular home transporting system with multiple robotic crawlers, in accordance with some embodiments of the present disclosure.

Referring now to FIG. 38, a system 3800 for transporting a load 3810 using a plurality of crawlers 3802 (e.g., similar to the crawlers 190) is shown, according to some embodiments. The system 3800 may include a plurality of linear actuators 3801. Each linear actuator 3801 may include a housing 3804 configured to be coupled to a load 3810 and a rod 3806 that extends from the housing and may be configured to support the load 3810. The system 3800 may include a plurality of crawlers 3802 each configured to receive a respective rod 3806 of the linear actuator 3801 and to move the load 3810 along a surface 3808. The system may include a controller configured to adjust the extension of each rod 3806 such that the load 3810 remains substantially level as a plurality of crawlers 3802 move along the surface 3808. The load 3810 may be, for example, a modular home (e.g., modular home 101) or a container. The load 3810 may be positioned on the bed of a trailer and rotated such that each end of the load overhangs the edges of the trailer. The linear actuators 3801 may be coupled to the load 3810 and may actuate to extend the rod 3806 down to the crawlers 3802 positioned on the ground underneath the overhanging ends of the load 3810. The rods may engage the crawlers 3802 and lift the load 3810 off of the trailer such that the load 3810 is fully supported by the crawlers 3802. The crawlers 3802 may then cooperate to move the load 3810 away from the trailer to a second location.

The crawlers 3802 may travel across a surface that may not be even or level (e.g., surface 3808). The controller may receive data from one or more sensors indicating the elevation of each crawler 3802 relative to the other crawlers 3802. The controller may then control the extension of each rod 3806 such that the load 3810 remains level. For example, if a first crawler 3802 is on a portion of the surface 3808 that is higher than the rest of the surface 3808, the actuator 3801 coupled to the first crawler 3802 may retract its rod 3806 such that the load 3810 remains level. If a second crawler 3802 is on a portion of the surface 3808 that is lower than the rest of the surface 3808, the actuator 3801 coupled to the second crawler 3802 may extend its rod 3806 such that the load 3810 remains level. Each actuator 3801 may extend or retract its rod 3806 to varying degrees as necessary to keep the load 3810 level.

Figure 39:
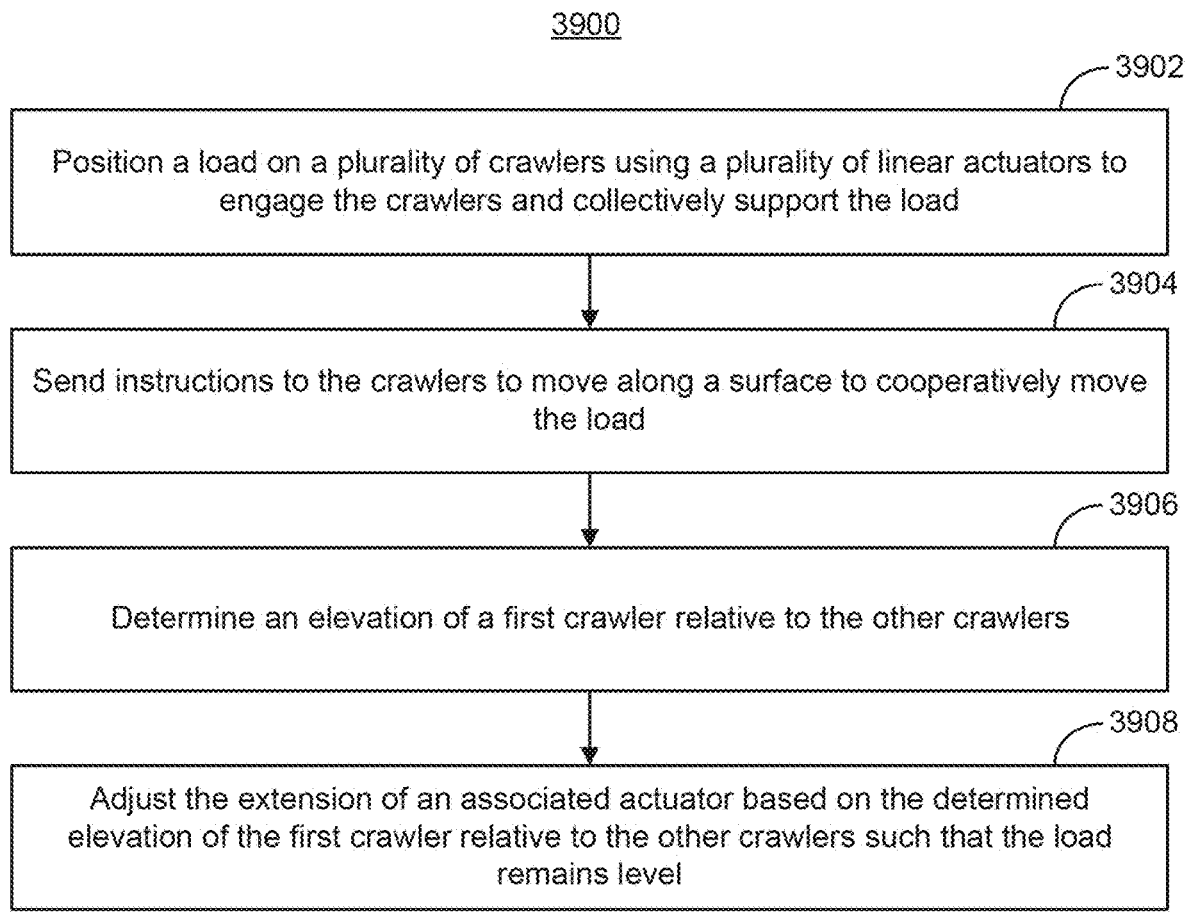
FIG. 39 is an example method of leveling a modular home on one or more crawlers, in accordance with some embodiments of the present disclosure.

Referring now to FIG. 39, a method 3900 of controlling a plurality of linear actuators (e.g., linear actuators 3801 is described, according to some embodiments. The method 3900 may include any number of operations and the operations may be performed in any order. The method 3900 may be performed by equipment of a modular home construction company (e.g., the components of system 4500, shown and described with reference to FIG. 45). At operation 3902 of the method 3900, a load (e.g., the load 3810) is positioned on a trailer bed. The load 3810 may be, for example, a modular home or a shipping container. The load 3810 may include a plurality of linear actuators 3801 each comprising a rod 3806 configured to extend to and engage a respective crawler 3802 to cooperatively support a load 3810. At operation 3904 of the method 3900, instructions are sent to the crawlers 3802. A controller may transmit the instructions to the crawlers 3802. The instructions may cause the crawlers 3802 to move along a surface to cooperatively move the load 3810. At operation 3906 of the method 3900, an elevation of a first crawler 3802 relative to the other crawlers 3802 is determined. The elevation of the first crawler 3802 relative to the other crawlers 3802 may be determined using data from sensors. For example, optical sensors, pressure sensors, or ultrasonic distance sensors may be used to determine the relative elevation of the crawlers. At operation 3908 of the method 3900, the extension of an actuator 3801 associated with the first crawler 3802 may be adjusted, based on the determined elevation of the first crawler 3802 relative to the other crawlers 3802, such that the load 3810 remains level. As described above, an actuator 3801 may retract when its associated crawler 3802 is relatively higher than the other crawlers 3802, and an actuator 3801 may extend when its associated crawler 3802 is relatively lower than the other crawlers 3802. Each actuator 3801 may be controlled simultaneously according to the method 3900 such that the entire load 3810 remained level as the crawlers 3802 move across an uneven or non-level surface 3808.

In some embodiments, instead of extending mechanical legs (e.g., the rods 3806) from the modular home to transport the modular home, crawlers with an automatic leveling deck may be used to transport the modular home. For example, a number of crawlers (e.g., four crawlers) may each be fitted with a leveling deck that extends from the bases of the crawlers. The crawlers may be controlled to move in unison to go underneath a modular home on a trailer bed. The crawlers may then extend their respective leveling decks towards the modular home to lift the modular home off of the trailer bed. The crawlers may then transport the modular home to its final site location, as the leveling decks raise and/or lower to maintain a constant level of the modular home.

Figure 40A:
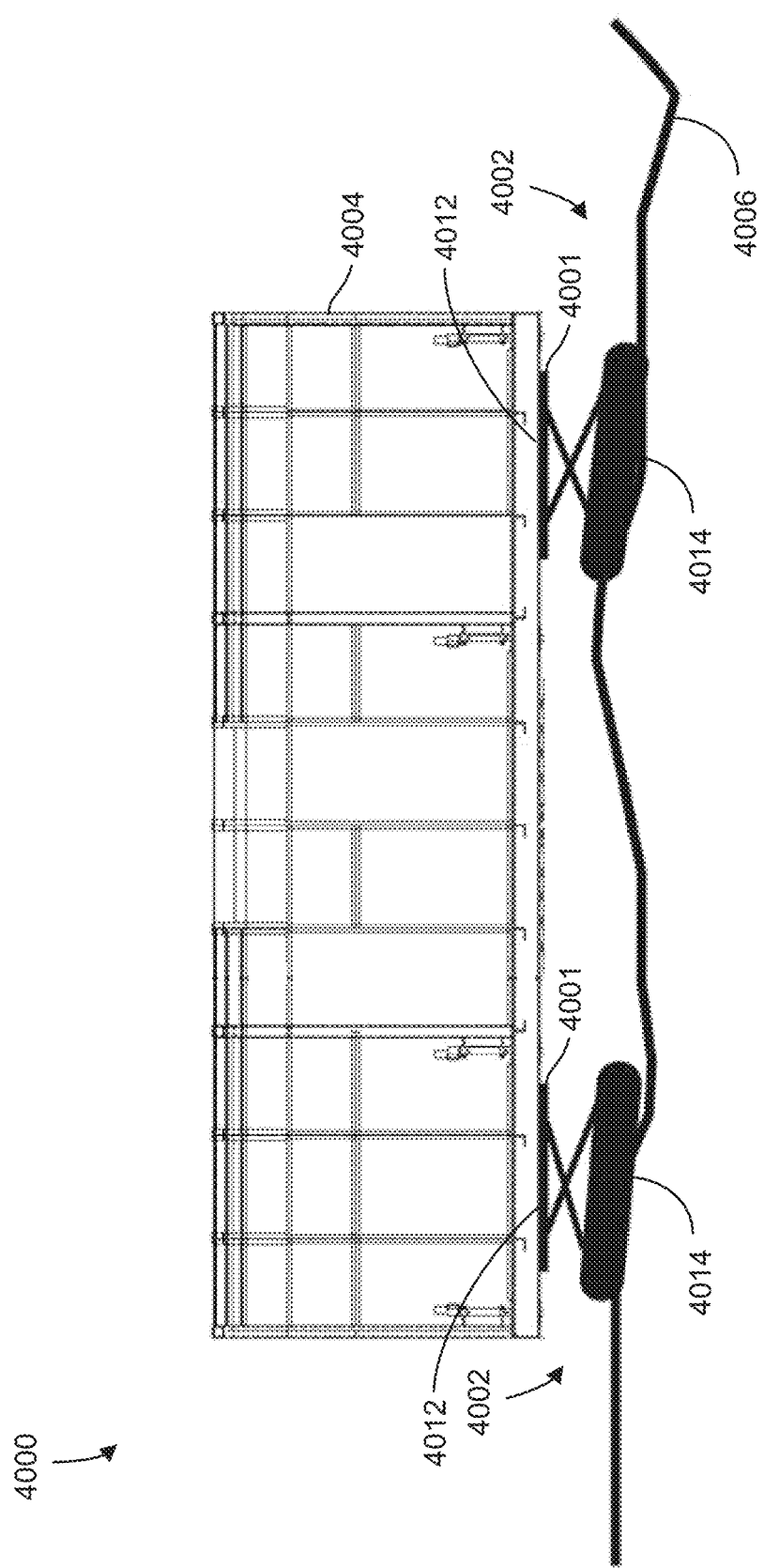
FIG. 40A is an illustration of another modular home transporting system with multiple robotic crawlers, in accordance with some embodiments of the present disclosure.

Referring now to FIG. 40A, a system 4000 for transporting a load using a plurality of crawlers is shown, according to some embodiments. The system 4000 may include a plurality of crawlers 4002 configured to support a load and move the load across a surface, similar to the crawlers 3802. The crawlers 4002 may each include a self-leveling lift 4001. The self-leveling lift 4001 may raise and lower the load 4004. The height of each self-leveling lift 4001 of each crawler 4002 may be adjusted based on the elevation of the respective crawler relative to the other crawlers. For example, if a first crawler 4002 is on a portion of a surface 4006 that is higher than the rest of the surface, the self-leveling lift 4001 coupled to the first crawler 4002 may lower, such that the load 4004 remains level. If a second crawler 4002 is on a portion of the surface 4006 that is lower than the rest of the surface 4006, the self-leveling lift 4001 coupled to the second crawler 4002 may rise, such that the load 4004 remains level. Thus, the self-leveling lifts 4001 cooperatively keep the entire load 4004 level, similar to the linear actuators 3801 in the system 3800.

The angle of the support surface 4012 of the self-leveling lift 4001 may be adjustable relative to the crawler base 4014 (e.g., the crawler body), such that the support surface 4012 may remain level even when the crawler 4002 is on a non-level surface 4006. The self-leveling lift 4001 may include a plurality of actuators configured to adjust the angle and support surface 4012. For example, when a crawler 4002 is moving forward down a sloped surface, a forward end of the support surface 4012 may be raised by an actuator and/or an aft end of the support surface 4012 may be lowered by another actuator, thus maintaining a level support surface 4012 even when the crawler 4002 is moving up or down an angled surface.

In some embodiments, the self-leveling lifts 4001 of the crawlers 4002 may operate according to sensor data on the lifts or on the crawlers 4002 themselves. Sensors coupled to the crawler bases 4014 and/or the support surfaces 4012 may detect the levels of the crawler bases 4014 and/or the levels of the support surface 4012. The sensors may transmit the detected levels to processors on the crawlers 4002 and/or to the controller controlling the crawlers 4002. The processors on the crawlers 4002 or the controllers may receive the sensor data, identify one or more adjustments for one or more of the crawlers 4002 from memory (e.g., identify an adjustment from a lookup table using the sensor data as an index), and transmit the adjustments to the respective crawlers 4002 and/or cause the support surfaces 4012 on the crawlers 4002 to remain level. The sensors may continuously generate and transmit sensor data to the controller and/or the processors on the crawlers 4002 to enable the load 4004 (e.g., the modular home 101) to remain level throughout transportation to its final destination.

In some embodiments, the self-leveling lifts 4001 of the crawlers 4002 may contain analog equipment that causes the support surfaces on the crawlers to remain level. For instance, the lifts 4001 may contain a resistance device that shifts weight according to the angle of the terrain the crawlers 4002 are traveling on. For example, as a crawler 4002 travels uphill, the weight may shift forward to cause the surface 4012 to push forward. Each crawler 4002 that transports the modular home 101 may have such a mechanism to help enable the modular home 101 to remain level during transportation.

Referring now to FIGS. 40B-40D a side view 4010, an end view 4020, and a perspective view 4030 of a crawler 4002 are shown, according to some embodiments. The crawler may include one or more tractive elements 4042 (e.g., continuous tracks) or wheels configured to propel the crawler 4002 over a surface. The crawler 4002 may include a first linear actuator 4044 configured to control the tilt of the support surface 4012 along a longitudinal axis of the crawler and a second linear actuator 4046 configured to control the tilt of the support surface 4012 along a transverse axis. The crawler 4002 may include one or more guide pins 4048 positioned on the support surface 4012 that may be inserted into receivers on a load, such as a modular home 101, to accurately position the load on the support surface 4012. For example, each of the four corners of the support surface may include a guide pin 4048. The crawler 4002 may include a thrust bearing 4050 positioned between the actuators 4044, 4046 and the support surface 4012, such that the support surface 4012 may be allowed to rotate about a vertical axis relative to the crawler body 4014. This may allow the crawlers 4002 to turn and rotate the load while the guide pins remain engaged with the load. The linear actuators 4044, 4046 may extend or retract to adjust the tilt of the support surface 4012 relative to the crawler body 4014, in order to keep the support surface 4012 and the load level.

Figure 41:
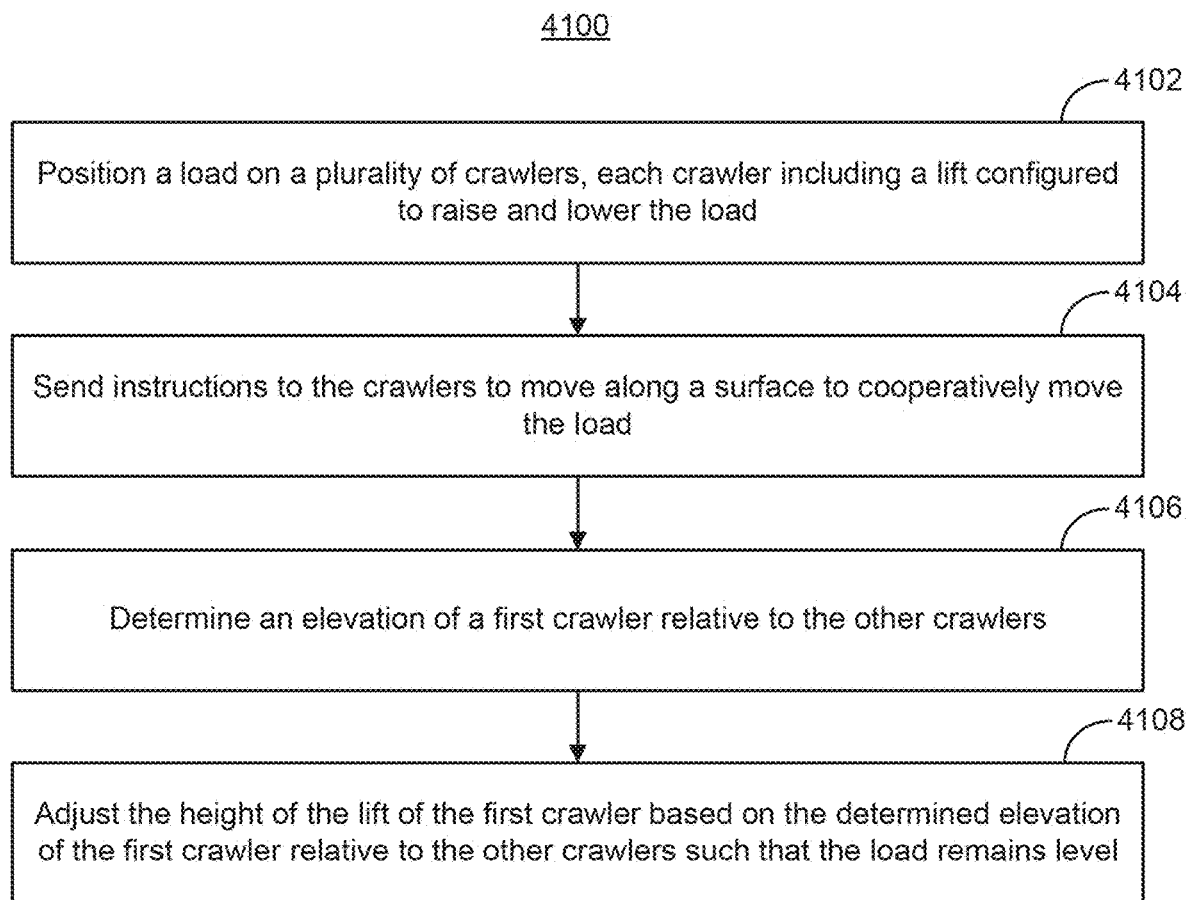
FIG. 41 is an example method of leveling a modular home on one or more crawlers, in accordance with some embodiments of the present disclosure.

Referring now to FIG. 41, a method 4100 of controlling a plurality of linear actuators (e.g., the linear actuators 4044, 4046) is described, according to some embodiments. The method 4100 may include any number of operations and the operations may be performed in any order. The method 4100 may be performed by equipment of a modular home construction company (e.g., the components of system 4500, shown and described with reference to FIG. 45). At operation 4102 of the method 4100, a load (e.g., the load 4004) is positioned on a plurality of crawlers (e.g., the crawlers 4002). Each crawler 4002 may include a lift 4001 configured to raise and lower a portion of the load 4004. At operation 4104 of the method 4100, instructions are sent to the crawlers 4002. The instructions may cause the crawlers 4002 to move across a surface (e.g., surface 4006) to cooperatively move the load 4004. At operation 4106 of the method 4100, an elevation of the first crawler 4002 is determined relative to the elevation of the other crawlers 4002. The elevation of the first crawler 4002 relative to the other crawlers 4002 may be determined using data from sensors. For example, optical sensors, pressure sensors, or ultrasonic distance sensors may be used to determine the relative elevation of the crawlers 4002. At operation 4108 of the method 4100, the height of the lift 4001 of the first crawler 4002 is adjusted based on the determined elevation of the first crawler 4002 relative to the elevation of the other crawlers 4002, such that the load 4004 remains level. In some embodiments of the method 4100, an angle of the body 4014 of the crawler 4002 may be determined, and the angle of the lift 4001 relative to the body 4014 of the crawler may be adjusted such that a support surface 4012 of the lift 4001 remains level, even when the crawler 4002 is not on a level surface. Data from tilt sensors may be used to determine the angle of the bodies 4014 of the crawlers 4002 and to calculate the amount that the lifts 4001 must be tilted to provide a level support surface 4012.

Crawler Hotel

To transport crawlers (e.g., crawlers 4002) that can be used to transport a modular home (e.g., modular home 101) in a manner that the crawlers 4002 may be contained during transport on a trailer bed (e.g., the bed 404 of the trailer 30) and then removed from the trailer bed after transport is complete, the crawlers 4002 may be stored in a unique crawler storage device. Such a crawler storage device may be or include a crawler elevator and ramp system that is installed onto a step-deck portion of the trailer bed. The crawler storage device may be built to store a number of crawlers 4002 (e.g., twelve crawlers 4002). The crawler storage device may include three levels that may move up and down, thus allowing crawlers 4002 on the respective levels to access side ramps of the crawler storage device. Upon completion of transport, the side ramps may fold towards the ground to enable the crawlers 4002 to drive away from the crawler storage device towards a modular home. Upon completion of the transport of the modular home 101 to its final destination, the crawlers 4002 may then travel back to the crawler storage device and up the ramps. The ramps may then fold towards the crawler storage device. The crawlers 4002 and/or the crawler storage device (including the ramps) may be controlled by a remote controller such that a human does not need to interact with any of the crawlers 4002 or the crawler storage device to store and/or remove crawlers 4002 from storage in the crawler storage device.

Figure 42A:
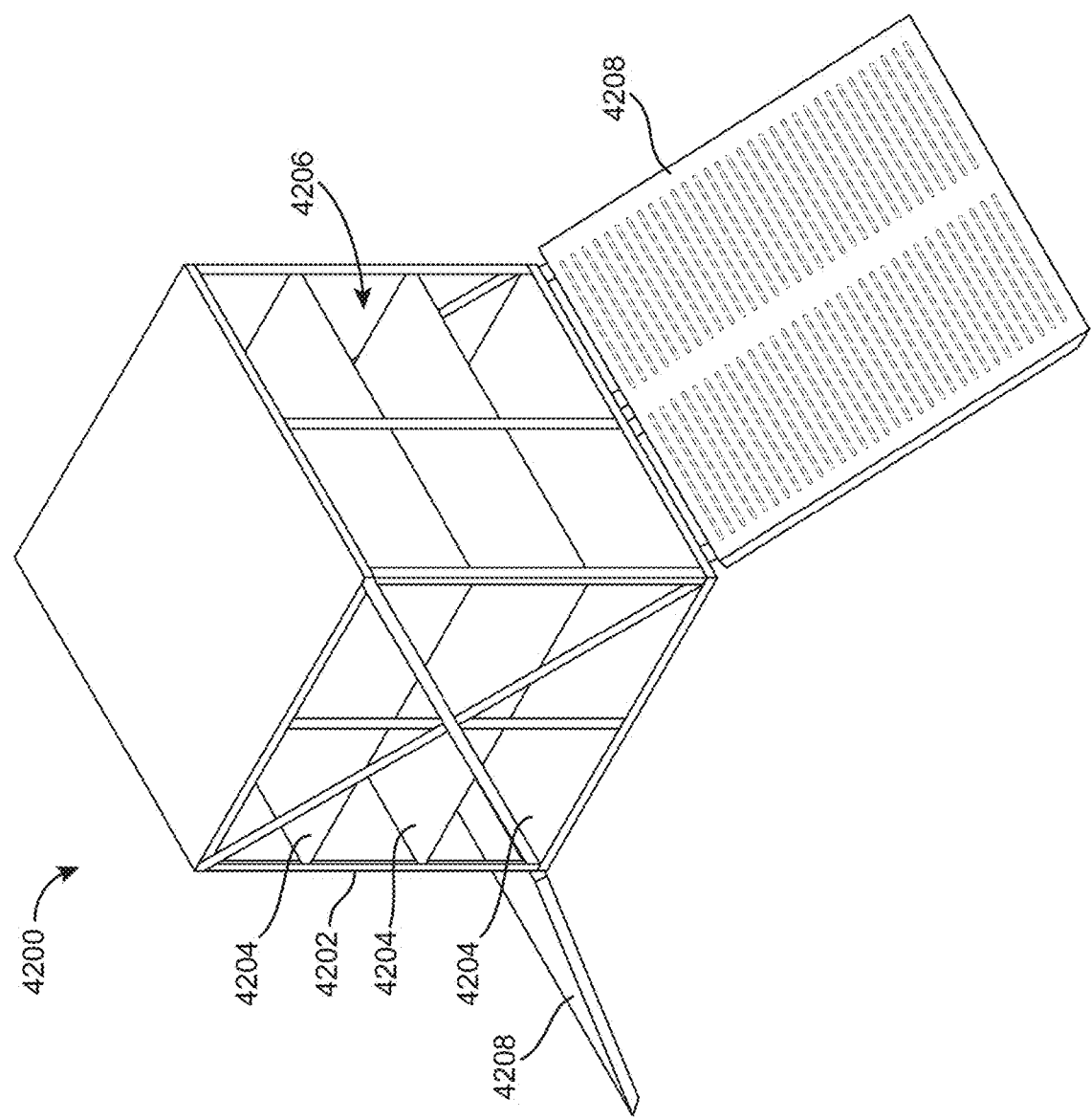
FIGS. 42A-42B are illustrations of crawler storage devices, in accordance with some embodiments of the present disclosure.

Referring now to FIG. 42A, a crawler storage device 4200 is shown, according to some embodiments. The crawler storage device 4200 may include a frame structure 4202 including a plurality of shelves 4204 and defining storage area 4206. The crawler storage device 4200 may include at least one ramp 4208 hingedly coupled to the frame 4202. The ramp 4208 may be configured to rotate between a first position, in which the ramp 4208 encloses a side of the frame 4202, and a second position (shown), in which the ramp 4208 acts as an unloading ramp for the storage area 4206. The storage area 4206 may store one or more crawlers 4002 on each shelf 4204. A lower shelf 4204 may be positioned at the bottom of the storage area 4206. At least one upper shelf 4204 may be positioned above the lower shelf 4204 and may be configured to raise and lower the crawler 4002 within the storage area 4206. For example, an upper shelf 4204 may be positioned on one or more actuators configured to raise and lower the upper shelf 4204. In some embodiments, the upper shelf 4204 may be suspended from the top of the frame 4202 by, for example, one or more wires, and the wires may be coiled by a winch to raise the upper shelf 4204 or released by the winch to lower the upper shelf 4204.

Figure 42B:
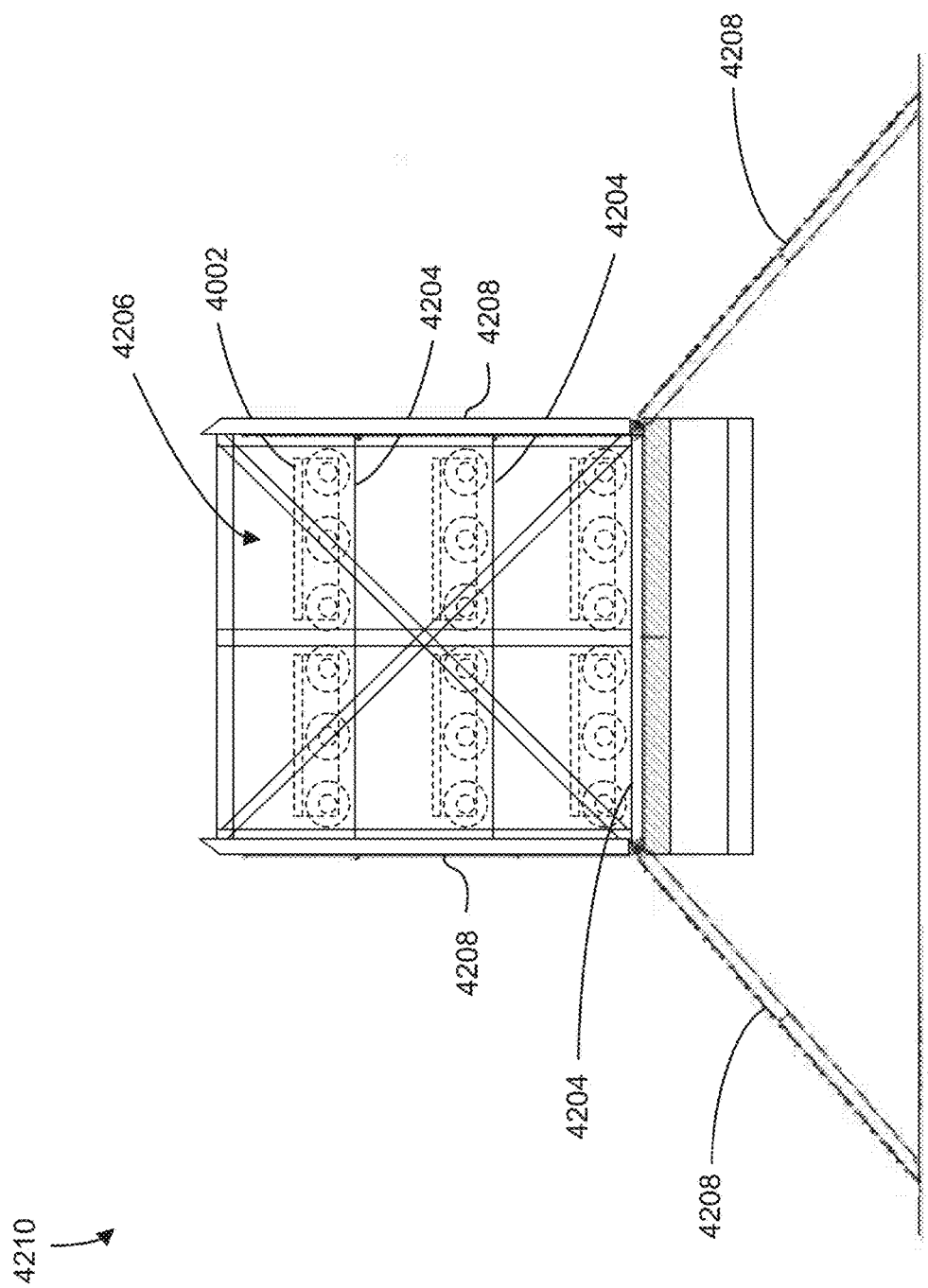

FIG. 42B shows a side view of a crawler storage device 4210 (e.g., similar or equivalent to crawler storage device 4200), according to some embodiments. The crawler storage area 4206 may include a first lower shelf 4204 and two upper shelves 4204. Each shelf 4204 may store at least one crawler 4002 thereupon. The crawler storage device 4210 may be positioned on the bed of a trailer (e.g., the bed 404 of trailer 30). During transportation of the crawlers 4002, one or more ramps of the crawler storage device 4210 may be folded up against the side of the frame of the crawler storage device 4210, thus closing off a respective side of the storage area 4206. When the trailer 30 arrives at an installation site, the one or more ramps 4208 may be folded down such that the ramp 4208 extends from the bed 404 of the trailer 30 to the ground at the installation site. In FIG. 42B, the ramps 4208 are shown in both their stowed positions against the frame 4202 and the deployed positions extending to the ground. The one or more crawlers 4002 positioned on the lower shelf 4204 may then move down the ramp 4208 from the crawler storage area 4206 to the ground at the installation site. Once the lower shelf 4204 is unloaded, the first upper shelf 4204 may lower until it is proximate or touching the lower shelf 4204. The one or more crawlers 4002 positioned on the first upper shelf 4204 may then move down the ramp 4208 from the crawler storage area 4206 to the ground at the installation site. After the first upper shelf 4204 is unloaded, the second upper shelf 4204 may lower until it is proximate or touching the first upper shelf 4204. The one or more crawlers 4002 positioned on the second upper shelf 4204 may then move down the ramp 4208 from the crawler storage area 4206 to the ground at the installation site. The crawlers 4002 may then be used to unload a load positioned on the trailer 30, for example, a modular home 101.

After the crawlers 4002 finish unloading the load from the trailer 30 and the load has been unloaded from the crawlers 4002, the crawlers 4002 may return to the crawler storage device 4210. The crawler storage device 4210 may be loaded in substantially the opposite way in which it was unloaded. One or more crawlers 4002 may move up the ramp 4208 onto the second upper shelf 4204. The second upper shelf 4204 may then be raised above the first upper shelf 4204. Another group of one or more crawlers 4002 may then move up the ramp 4208 onto the first upper shelf 4204. The first upper shelf 4204 may then be raised above the lower shelf 4204. A third group of one or more crawlers 4002 may then move up the ramp 4208 onto the lower shelf 4204. The ramps 4208 may again be folded up against the side of the frame 4202 of the crawler storage device 4210 for transportation to another location.

Figure 43A:
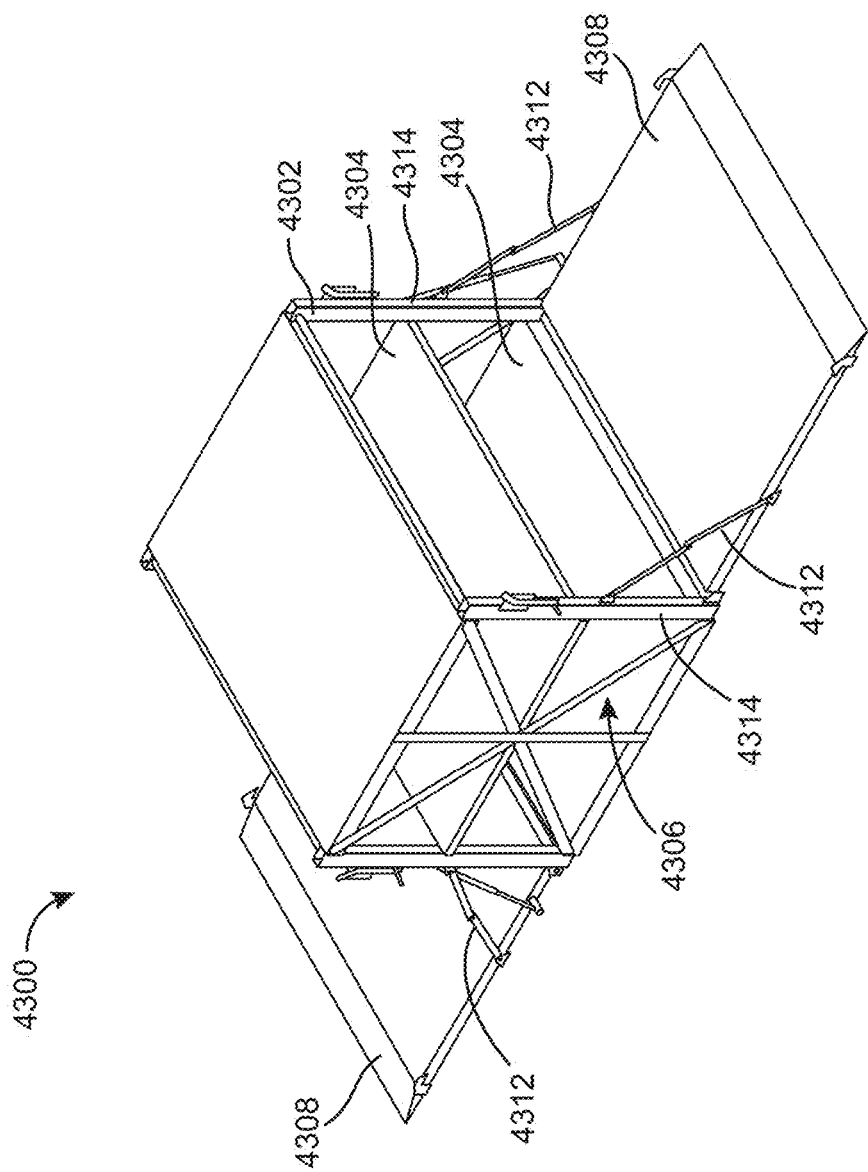
FIGS. 43A-43S are illustrations of other crawler storage devices, in accordance with some embodiments of the present disclosure.

Referring now to FIG. 43A, a crawler storage device 4300 is shown, according to some embodiments. Similar to the crawler storage device 4200, the crawler storage device 4300 may include a frame 4302 defining a crawler storage area 4206. The crawler storage device 4300 may be positioned on the bed of the trailer (e.g., the bed 404 of trailer 30). The crawler storage device 4300 may include a lower shelf 4304 and at least one upper shelf 4304. The upper shelves 4304 of the crawler storage device 4300 may be fixedly coupled to the frame 4302 and not configured to be raised and lowered. The crawler storage device 4300 may include one or more ramps 4308. The one or more ramps 4308 may be hingedly coupled to the frame 4302 and may rotate between a vertical position, in which the ramp 4308 closes off a side of the crawler storage area 4306, and a horizontal position (shown). One or more pairs of linkages 4312 or sets of chains may be coupled to the frame 4302 such that the ramp 4308 does not rotate farther downward than a substantially horizontal position. The ramp 4308 and the pairs of linkages 4312 may be coupled to a rail 4314 that is slidably coupled to the frame 4302. The rail 4314 may be configured to move up and down relative to the frame 4302, thus lifting and lowering the ramp 4308 and the pairs of linkages 4312. For example, one or more linear actuators or one or more chain drives may be used to raise and lower the ramp 4308. The crawler storage device 4300 may be configured to lift the ramp 4308 up to each shelf 4304 and down to the ground.

Figure 43B:
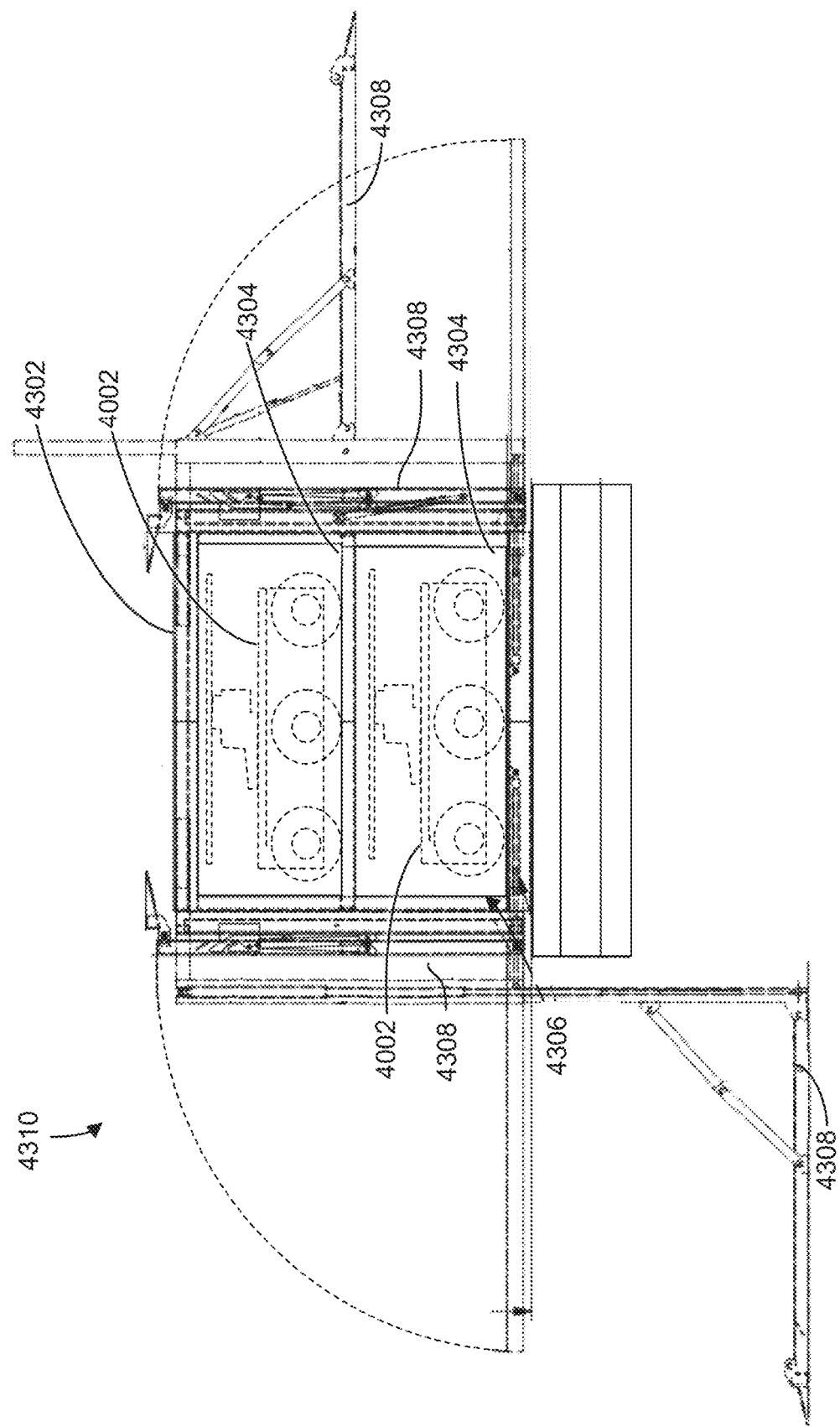

FIG. 43B shows a crawler storage device 4310 (e.g., similar or equivalent to crawler storage device 4300), according to some embodiments. The crawler storage device 4310 may be positioned on the bed 404 of the trailer 30 and may store a plurality of crawlers (e.g., crawlers 4002) on a plurality of shelves 4304. During transportation of the crawlers 4002, the one or more ramps 4308 may be folded into a vertical position to close off a side of the storage area 4306 of the crawler storage device 4310. At the installation site, the one or more ramps 4308 may be folded down to a horizontal position. The ramp 4308 may be raised or lowered such that the ramp 4308 is substantially level with a first shelf 4304 of the plurality of shelves 4304. The one or more crawlers 4002 positioned on the first shelf 4304 may move onto the ramp 4308. The ramp 4308 may then be lowered to the ground at the installation site, and the crawlers 4002 may move off of the ramp 4308 onto the ground. The ramp 4308 may then be raised such that it is substantially level with a second shelf 4304. The one or more crawlers 4002 positioned on the second shelf 4304 may then move onto the ramp 4308. The ramp 4308 may then be lowered to the ground at the installation site, and the crawlers may move off the ramp 4308 onto the ground. The crawlers 4002 may then be used to unload a load, for example, a modular home 101, positioned on the trailer 30.

Figure 43D:
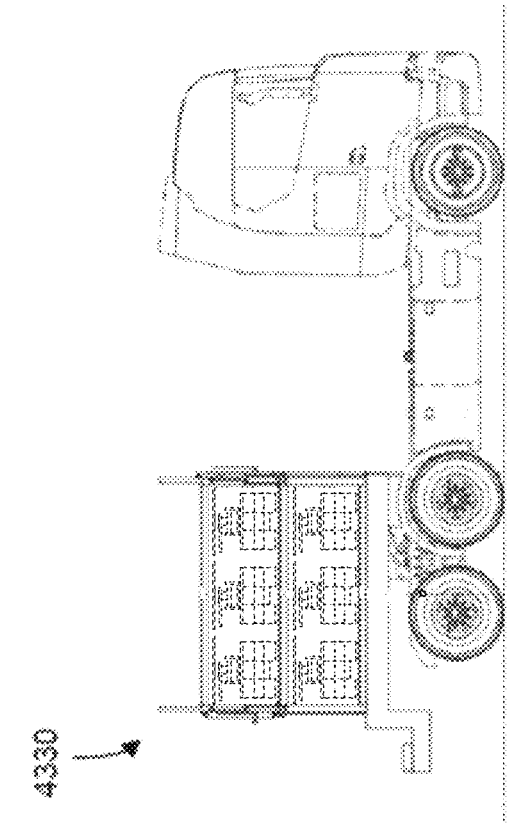
Figure 43E:
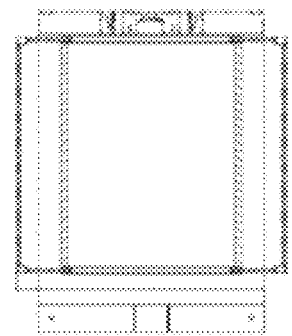
Figure 43C:
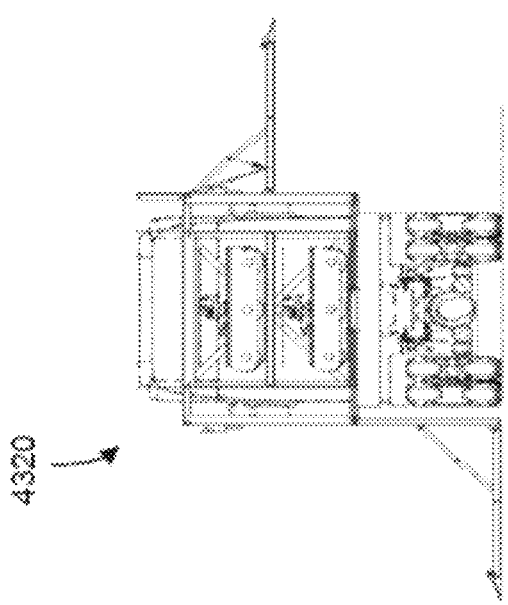
Figure 43F:
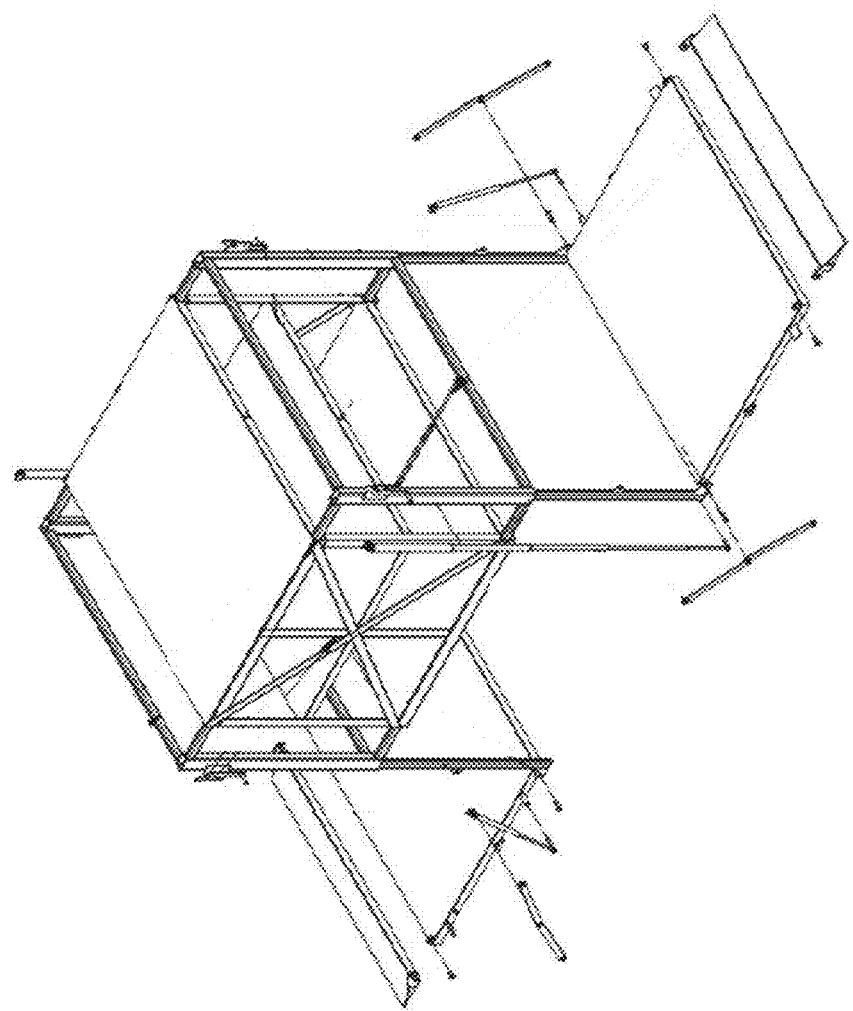

After the crawlers 4002 finish unloading the load from the trailer 30 and the load has been unloaded from the crawlers 4002, the crawlers 4002 may return to the crawler storage device 4310. The crawler storage device 4310 may be loaded in substantially the opposite way in which it was unloaded. The ramp 4308 may be lowered to the ground of the installation site, and a first group of one or more crawlers 4002 may move onto the ramp 4308. The ramp 4308 may then be lifted such that it is level with a first shelf 4304, and the first group of crawlers 4002 may move onto the first shelf 4304. The ramp 4308 may then be lowered back down to the ground of the installation site, and a second group of one or more crawlers 4002 may move under the ramp 4308. The ramp 4308 may then be lifted such that it is level with the second shelf 4304, and the second group of crawlers 4002 may move onto the second shelf 4304. The ramp 4308 may again be folded up against the side of the frame 4302 of the crawler storage device 4310 for transportation to another location. On the left side of FIG. 43B, the ramp 4308 is shown in the vertical stowed position against the frame 4302 as well as the horizontal deployed position lowered to the ground. On the right side of FIG. 43B, the ramp 4308 is shown in the vertical stowed position against the frame 4302 as well as the horizontal deployed position raised to upper shelf 4304. FIGS. 43C-43E show an end view 4320, a side view 4330, and a top section view 4331 of a crawler storage device (e.g., the crawler storage device 4300, 4310) positioned on the bed 404 of a trailer 30, according to some embodiments. FIG. 43F shows an exploded perspective view 4332 of a crawler storage device similar to or the same as the crawler storage device 4300, shown and described with reference to FIG. 43A, according to some embodiments. FIG. 43G shows an end view 4334 of a crawler storage device similar to or the same as the crawler storage device 4300, shown and described with reference to FIG. 43A, according to some embodiments.

Figure 43H:
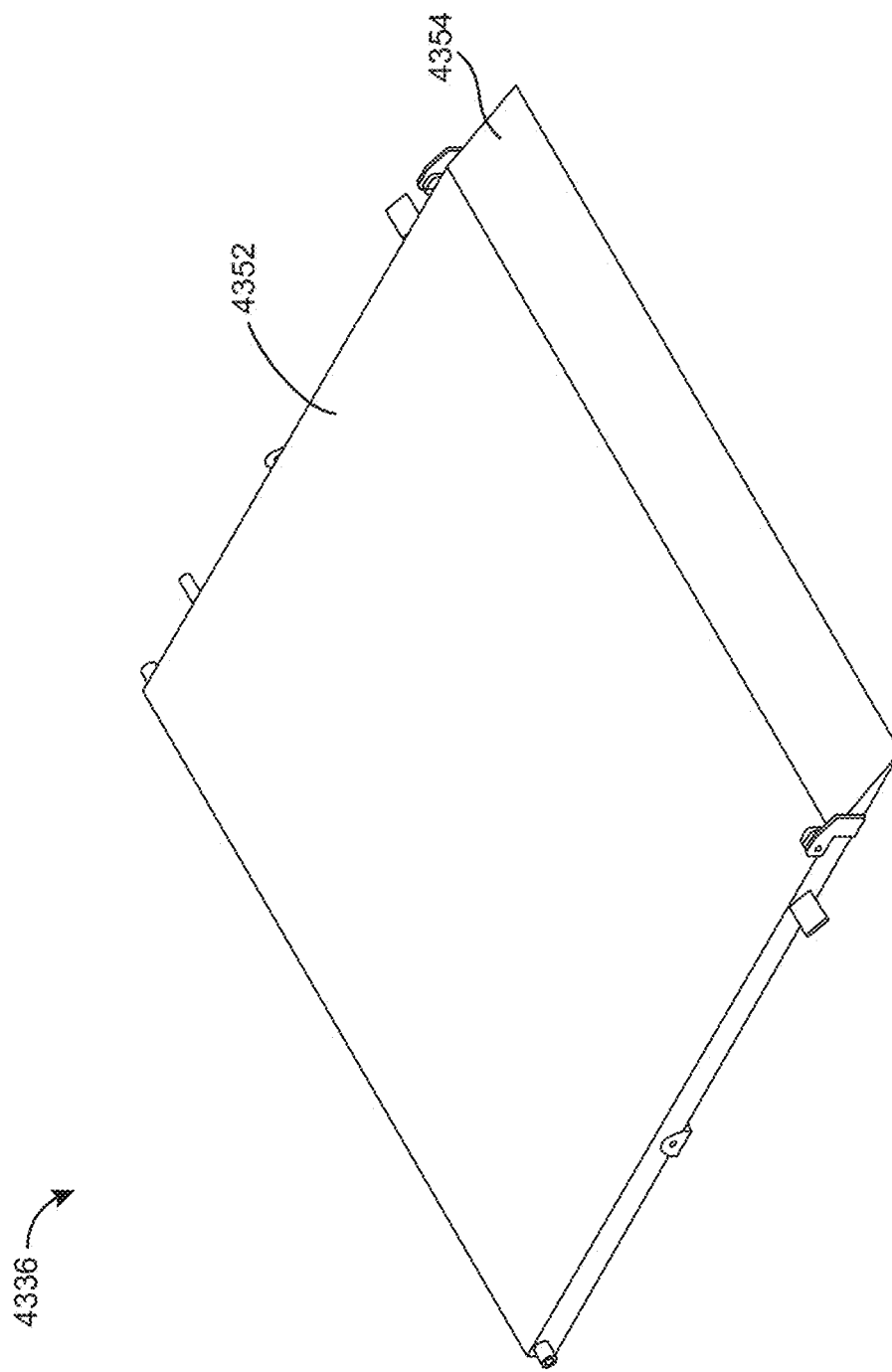
Figure 43I:
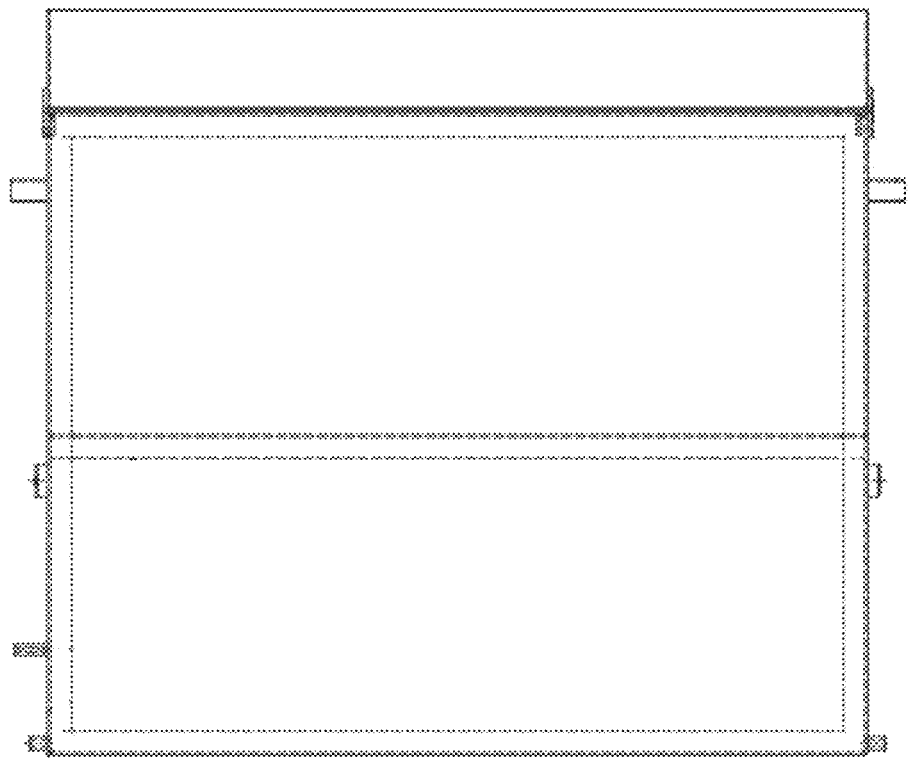
Figure 43R:
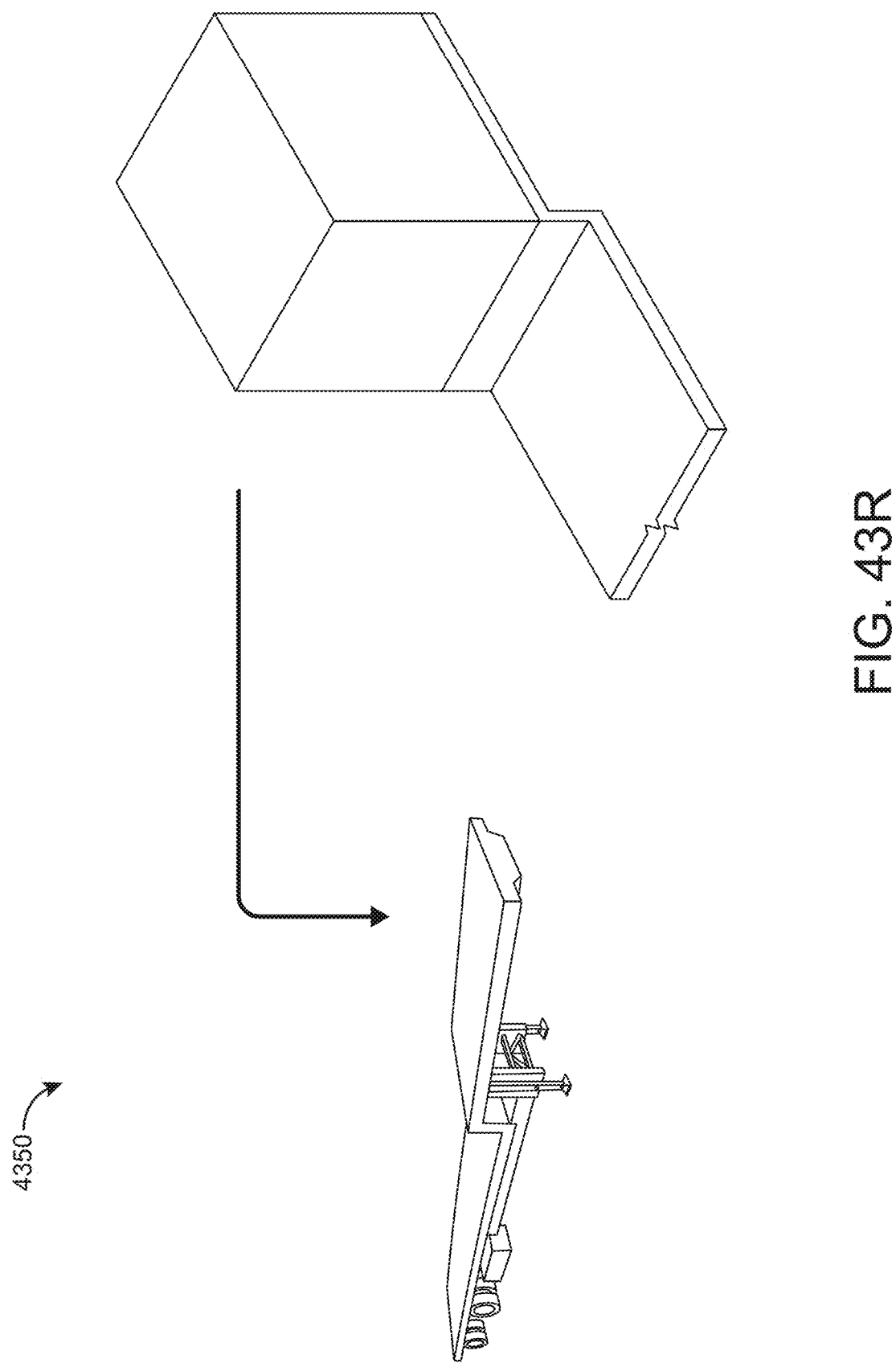
Figure 43S:
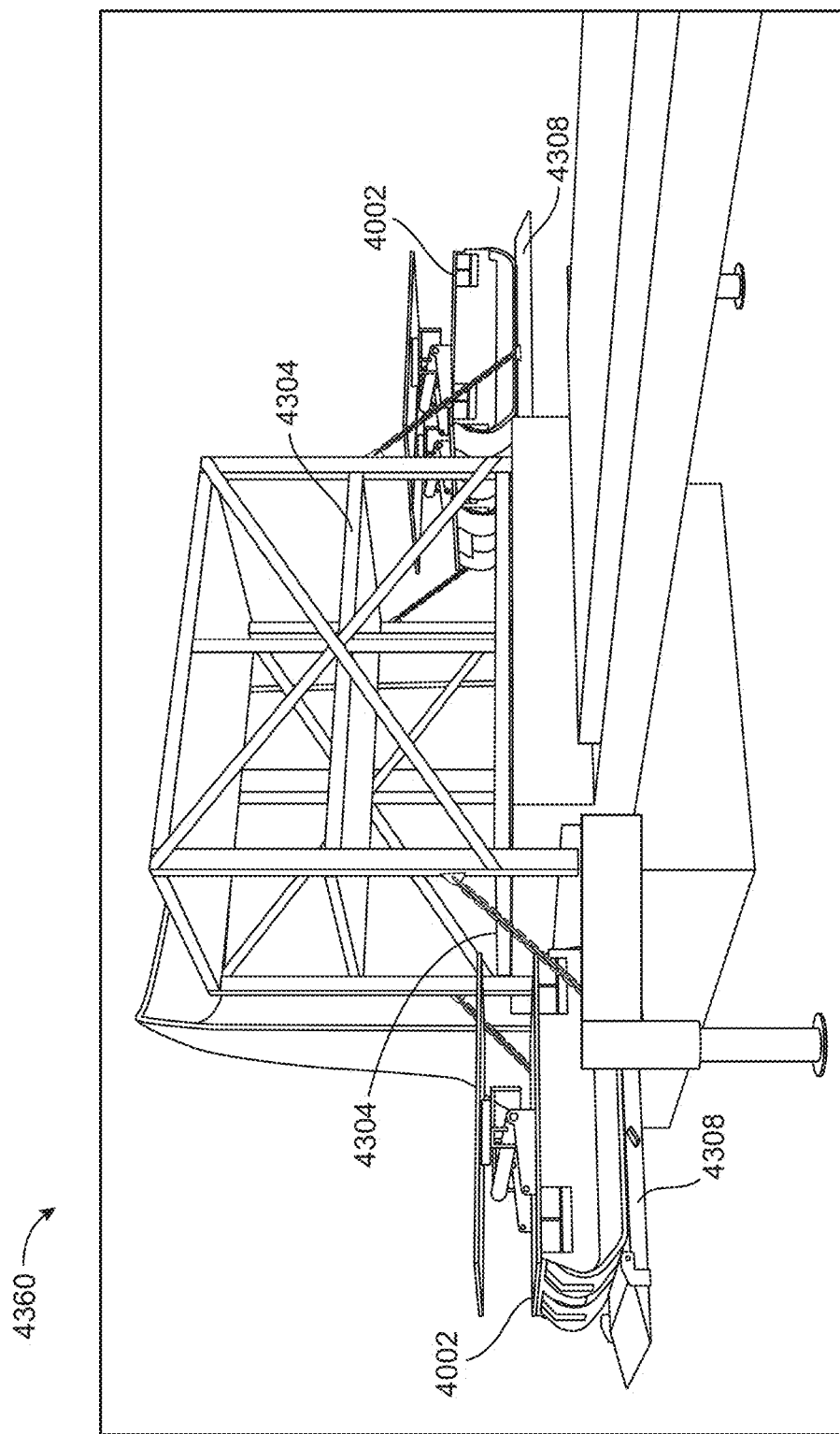

FIG. 43H shows a perspective view of a ramp 4336 of a crawler storage device (e.g., similar to the ramp 4308 of crawler storage device 4300), according to some embodiments. The ramp includes a platform portion 4352 and an end ramp 4354. The end ramp 4354 may be hingedly coupled to the platform portion 4352 such that the end ramp 4354 may rotate into a stowed position when the ramp 4336 is positioned vertically to reduce the height of the ramp 4336 when the trailer (e.g., trailer 30) is moving. The end ramp 4354 is shown in the stowed position in FIG. 43B, according to some embodiments. FIG. 43I shows a top view 4338 of the ramp 4336, according to some embodiments. FIGS. 43J-43Q show various detail views 4340-4347 of the ramp 4336. FIG. 43R shows an outline 4350 showing the area on a bed of a trailer (e.g., the bed 404 of trailer 30) available to position a crawler storage device (e.g., the crawler storage device 4300). FIG. 43S shows a perspective view 4360 of crawlers 4002 being unloaded from a crawler storage device.

FIG. 43K shows an illustration of a crawler storage device 4360, according to some embodiments. The crawler storage device 4360 may be substantially similar to the crawler storage device 4300. The crawler storage device 4360 is shown with two levels (e.g., two shelves 4304), each configured to store two crawlers (e.g., the crawlers 4002). While the crawlers 4002 are being transported to an installation site, the ramps (e.g., platforms, elevator platforms, ramps 4308 etc.) are positioned in a vertical orientation to enclose the crawlers 4002 within the crawler storage device 4360. To unload the crawlers 4002, the ramps 4308 fold down, rotating about a hinge 4362, to a horizontal position, where they are supported by the pairs of linkages 4312. The hinge 4362 and the pairs of linkages 4312 are each coupled to a bar (e.g., the rail 4314) that is configured to move up and down, for example, using a hydraulic actuator, chain and sprocket, or lead screw and motor. In some embodiments, one ramp 4308 may be raised to the upper level of the crawler storage device 4360 to unload the upper crawlers 4002 and the other ramp 4308 may be used to unload the lower crawlers 4002. The crawlers 4002 may then move onto their respective ramps 4308, the ramps 4308 can be lowered to the ground, and the crawlers 4002 can move off the ramps 4308 onto the ground. In some embodiments, the crawler storage device 4360 may include more than two levels 4304 (e.g., three or four levels) and may include only one ramp 4308. The ramp or ramps 4308 may repeat the unloading process as many times as necessary to unload all of the crawlers 4002.

In some embodiments, instead of a ramp, the crawlers may be removed from the trailer bed via an elevator system. For example, a multi-level elevator may be installed onto the trailer bed. The multi-level elevator may be configured such that each level may store a number of crawlers in a row on a platform overlaying the truck bed. Upon arriving at the final destination, the platforms supporting the crawlers may move off of the trailer bed such that the platforms are next to the trailer bed over the ground. The platforms may then lower towards the ground one by one as the crawlers drive off of the platform and away from the crawler storage device. The platforms may continue to lower and enable the crawlers to drive off until all of the crawlers have driven off. The crawlers may transport the modular home to a final destination and then drive back to be lifted back onto the crawler storage system on the trailer.

Figure 44:
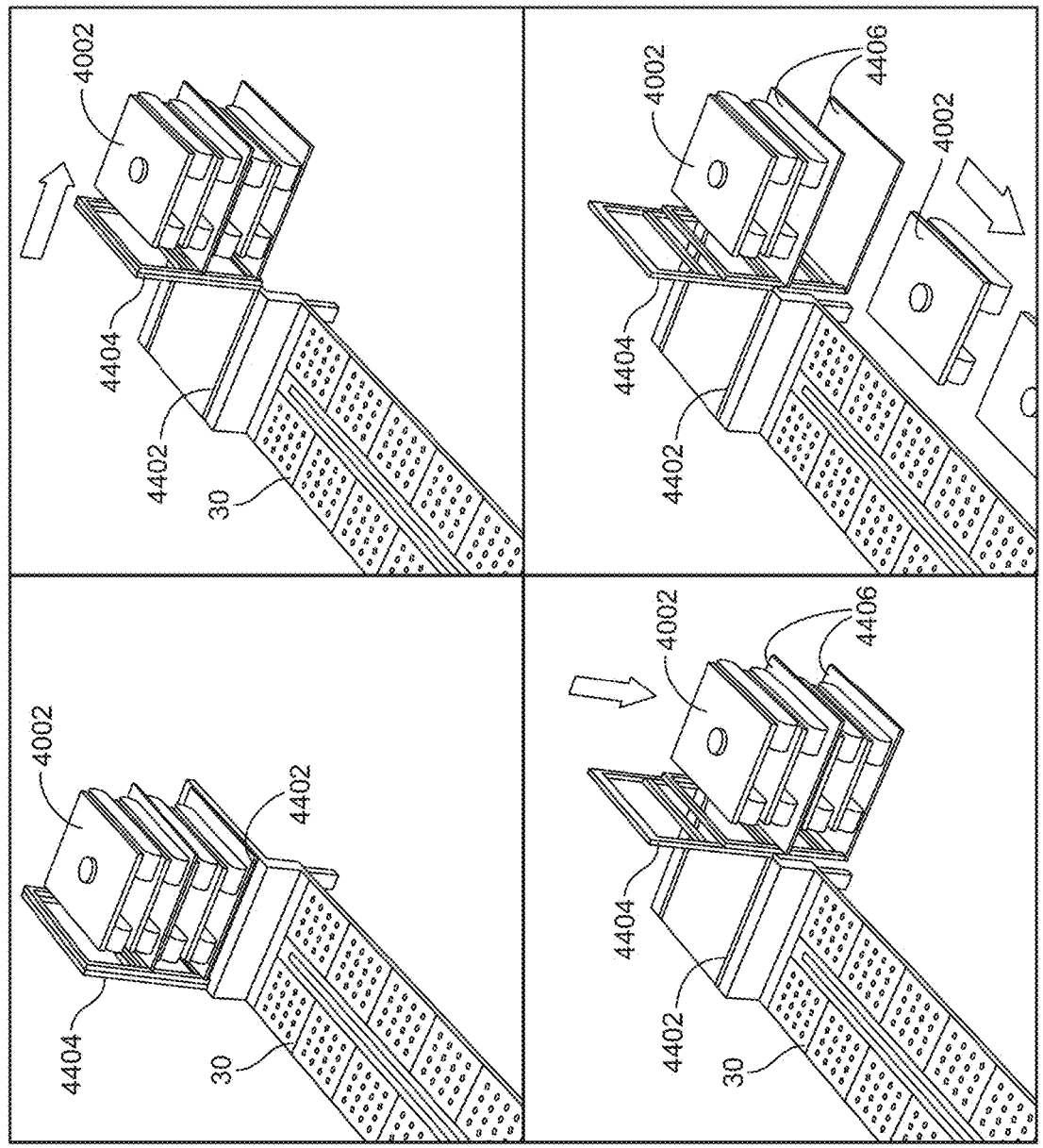
FIG. 44 is an illustration of another crawler storage device in various configurations, in accordance with some embodiments of the present disclosure.

For example, referring now to FIG. 44, a crawler storage device 4400 for loading and unloading crawlers (e.g., the crawlers 4002) from a trailer (e.g., the trailer 30) is shown, according to some embodiments. The crawler storage device 4400 may be positioned on the bed 404 of the trailer 30. A translation assembly 4402 of the crawler storage device 4400 may be configured to selectively slide the crawler storage device 4400 from the bed of the trailer to a position overhanging edge of the bed. For example, a cantilevered number may support the crawler storage device 4400 such that the entire crawler storage device 4400 can move to a position entirely to one side of the trailer. An elevator assembly 4404 may be configured to raise and lower the crawler storage device 4400 after it is moved to the position overhanging the edge of the bed 404 of the trailer 30. The elevator assembly 4404 may lower the crawler storage device 4400 to the ground (e.g., the surface on which the trailer is positioned). Crawler storage device 4400 may include a plurality of shelves 4406. Each shelf 4406 may be configured to support one or more crawlers 4002. At least one of the plurality of shelves 4406 may be configured to raise and lower a crawler 4002 or other load relative to the other shelves 4406. For example, the shelves 4406 other than the lowest shelf 4406 may be configured to move down until they are in contact with or proximate to the lower shelf 4406 such that a crawler 4002 positioned on each shelf 4406 can move on and off the shelf 4406 to or from the ground.

Referring now to FIG. 45, a block diagram of system 4500 for installing a modular home (e.g., modular home 101) is shown, according to some embodiments. The system 4500 may include a controller 4502 configured to control various components of the system 4500. The components of the system 4500 may be equivalent or analogous to the components of the other systems described herein.

The controller 4502 may include a processing circuit 4504. The processing circuit 4504 may include a processor 4506, which can be a single core or multi core processor, or a plurality of processors for parallel processing. The processing circuit 4504 may also include memory 4508 (e.g., random-access memory, read-only memory, flash memory). The memory 4508 may store an application 4510, which may be executed by the processor 4506. The controller 4502 may include a communication interface 4512 (e.g., a network adapter) for communicating with one or more other components of the system 4500. The controller may communicate with the other components of the system 4500, via the communication interface 4512, using a wired or wireless connection (e.g., Bluetooth, Wi-Fi, ZigBee, etc.). The controller 4502 can be operatively coupled to a computer network using the communication interface 4512. The network can be, for example, the Internet, an intranet and/or extranet, or an intranet and/or extranet that is in communication with the Internet. In some embodiments, the network may be a telecommunication and/or data network. The network can include one or more computer servers, which can enable distributed computing, such as cloud computing.

The processing circuit 4504 can execute machine-readable instructions, which can be embodied in a program or software, such as the application 4510. The instructions may be stored in a memory location, such as the memory 4508. The instructions can be directed to the processor 4506, which can subsequently program or otherwise configure the processing circuit 4504 to implement methods of the present disclosure. The processing circuit 4504 can be part of a circuit, such as an integrated circuit. One or more other components of the system 4500 can be included in the circuit. In some cases, the circuit is an application specific integrated circuit (ASIC).

The controller 4502 can communicate with one or more remote computer systems through the network. For instance, the controller 4502 can communicate with a remote computer system of a user (e.g., e.g., a database, an enterprise or extraprise system, an Internet-of-Things (IoT) device, a sensor, or the like). Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the controller 4502 via the network. In some embodiments, the controller 4502 may be positioned on or integrated into a computer, a trailer, a housing portion of a modular home, a crawler storage unit, a crawler, etc. As described above, the processing circuit 4504 of the controller 4502 may include a plurality of processors 4506 distributed among the components of the system 4500 and configured to communicate with each other.

The controller may be configured to communicate with one or more housing portions 4514, one or more winches 4516, one or more crawlers 4518, one or more crawler storage devices 4520, and one or more booms 4522, among other components of the system 4500. The winches 4516 may be equivalent or analogous to the winches described above (e.g., the winch configured to rotate a modular home using the boom 2701, etc.). The controller 4502 may send signals or instructions to a winch 4516, via the communications interface 4512, causing a drum (mandrel, etc.) of the winch 4516 to rotate a first or second direction to coil rope around the drum or release rope from the drum. The booms 4522 may be equivalent or analogous to the boom 2701. The controller 4502 may send commands or instructions to a boom 4522, causing the boom 4522 to extend from the side of the bed of the trailer as described above with reference to boom 2701. The housing portions 4514 may be equivalent or analogous to the housing portions of the modular homes described above (e.g., the housing portions 120, 160 of modular home 101). The controller 4502 may be configured to communicate with the housing portions 4514 in order to receive data from and control the operations of the modular home. For example, the controller 4502 may send instructions or commands to a housing portion 4514 causing the housing portion 4514 to inflate one or more inflatable bladder tanks (e.g., bladder tanks 1411) after the modular home is installed at the installation site and/or to extend or retract mechanical legs in the modular home.

Figure 51A:
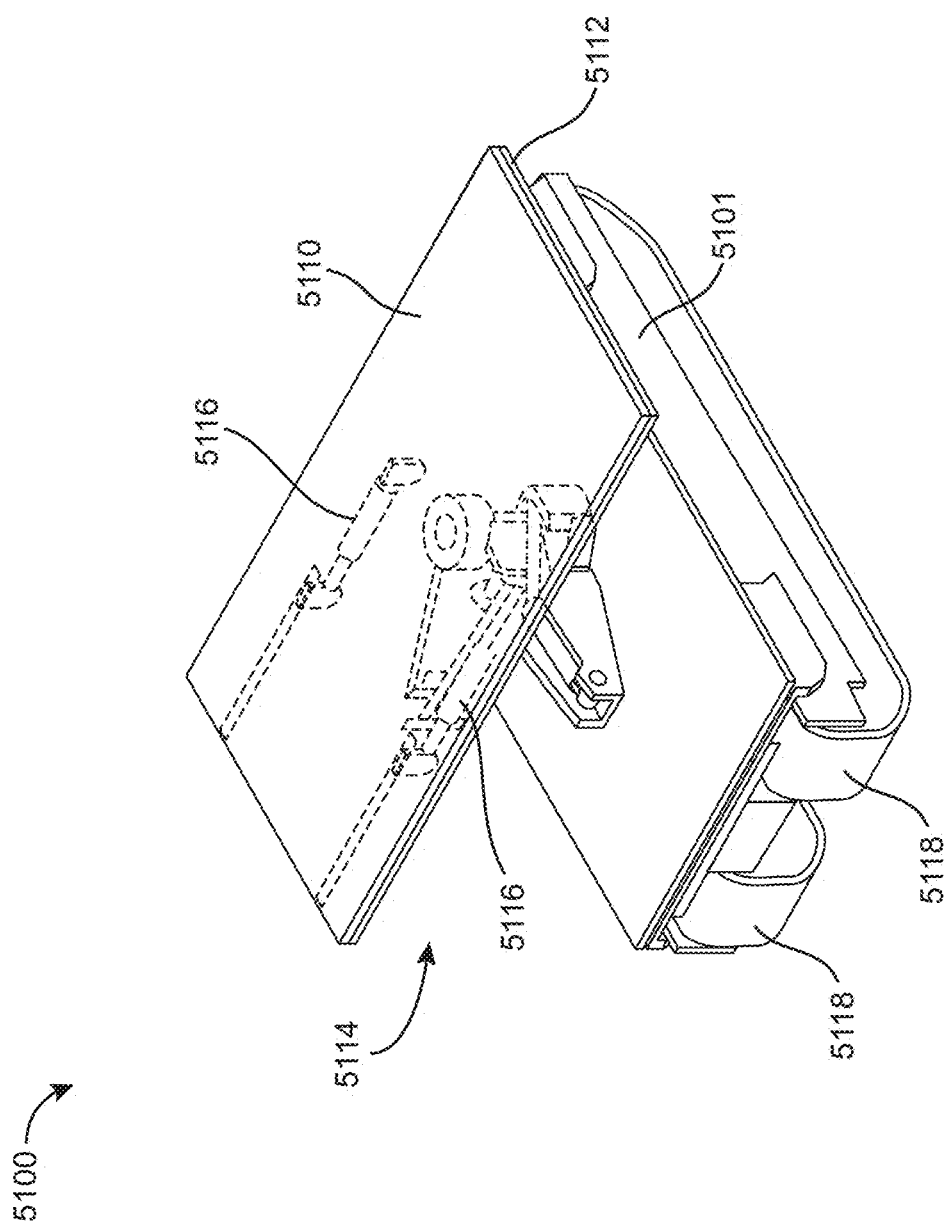
FIGS. 51A and 51B are illustrations of a robotic crawler with a sliding platform in an open and closed position, in accordance with some embodiments of the present disclosure.
Figure 51B:
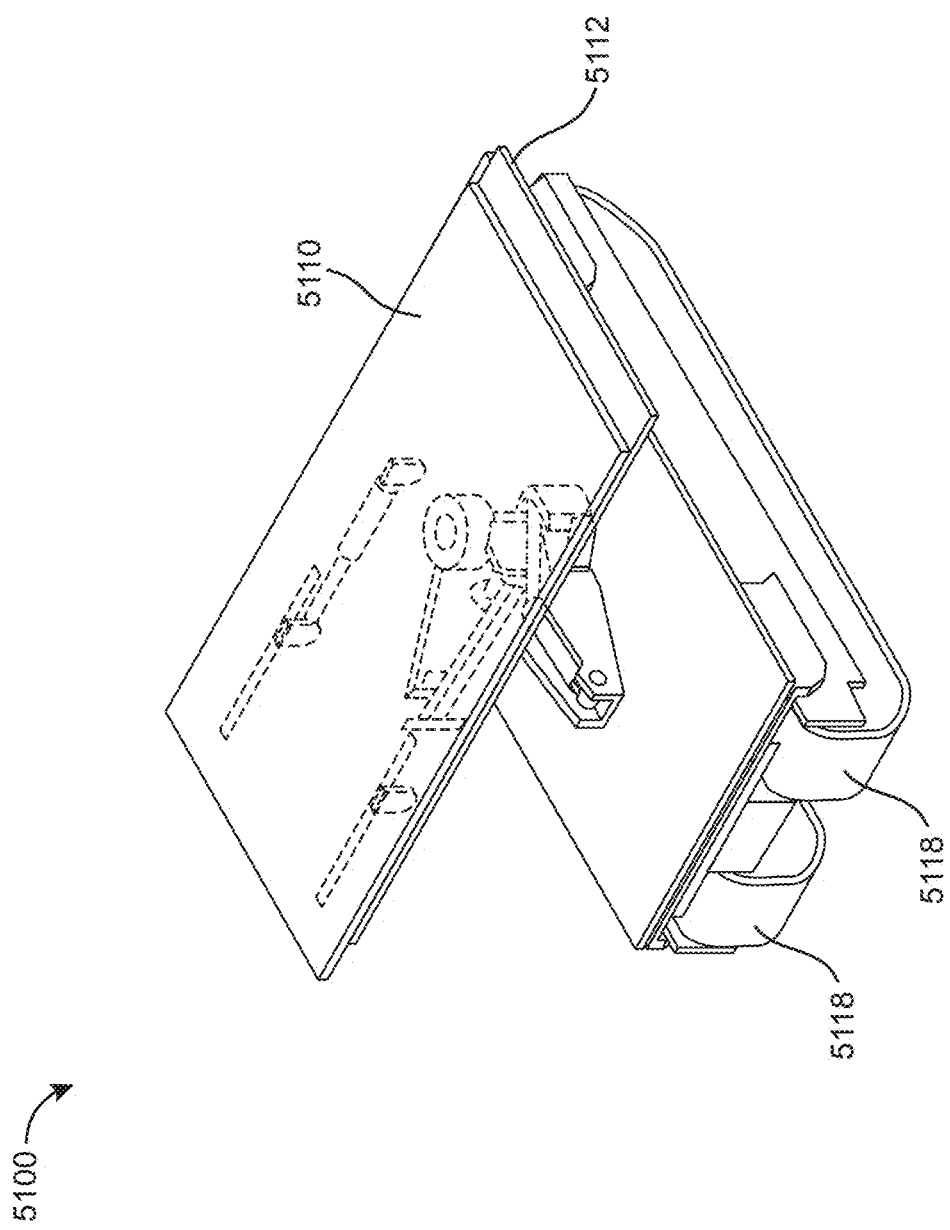

The crawlers 4518 may be analogous or equivalent to the crawlers 190, the crawlers 3802, and/or the crawlers 4002. A crawler 4518 may include continuous tracks 4524 or wheels configured to move the crawlers 4518 across various surfaces and a lift assembly 4526 that can be raised or lowered and tilted to adjust a support surface of the crawler 4518. In some embodiments, the support surface includes a sliding platform 4527 that allows the load supported by the crawler to translate relative to the lift assembly 4526. The sliding platform 4527 may be or include a hydraulic platform. A crawler 5100 with such a sliding platform 4527 is shown in FIGS. 51A and 51B. The controller 4502 may be configured to communicate with the crawlers 4518 to control the movement of the crawlers 4002 and to control the angle and height of the support surface relative to the crawler base, as well as to control the translation of the sliding platform relative to the lift assembly, e.g., by actuating various actuators (e.g., hydraulic actuators, pneumatic actuators, electromechanical actuators, etc.). For example, the controller 4502 may be a component of a user device such as the smartphone or remote control. When the load is positioned on a plurality of crawlers 4518, a user may input a command indicating a direction of the load is to be moved, and the communications interface 4512 of the controller 4502 may send commands or instructions to the crawlers 4518 to simultaneously move in the indicated direction. The crawler storage devices 4520 may be equivalent or analogous to the crawler storage devices 4200, 4300, 4400. A crawler storage device 4520 may include shelves configured to move up and down and or ramps 4530 configured to rotate about a hinge and/or to move up and down. The controller 4502 may be configured to communicate with the crawler storage devices 4520 to control the movement of the ramp, shelves, and any other actuated feature. For example, the controller 4502, via the communications interface 4512, and may send commands or instructions to the crawler storage device 4520 causing the ramp 4530 of the crawler storage device 4520 to fold down, raise, and lower, causing the shelves 4528 to move up and down within the storage area, and/or causing the crawler storage device 4520 to slide to the edge of the bed of the trailer and lowered. The crawlers 4518 and the crawler storage device 4520 may each include memory, a processor, and a communication interface similar to the controller 4502.

In some embodiments, the controller 4502 may enable communication between the components. In some embodiments, the components may communicate with each other directly. For example, the crawlers 4518 may include sensors configured to measure the elevation of each crawler relative to the other crawlers. The sensor data may be sent to the communication interface 4512 of the controller 4502. The processing circuit 4504 may then determine the required extension of the linear actuators (e.g., linear actuators 1001) coupled to the housing portions 4514 in order to keep the housing portions 4514 level as the crawlers 4518 move across the surface. The controller 4502 may then send instructions or signals via the communication interface 4512 to the actuators of the housing portions 4514, causing the actuators 1001 to extend or retract. In some embodiments, the housing portions 4514 may include sensors configured to detect the angle of the ground and the elevation of each crawler 4518 relative to the other crawler storage devices 4520. The sensor data may be sent to the communication interface 4512 of the controller 4502. The processing circuit 4504 may then determine the extension of the actuators 1001 of the crawlers 4518 required to keep the support surfaces of the crawlers 4518 and the housing portions 4514 level. As another example, the controller 4502 may not send a signal to a winch 4516 to coil a rope until a signal is received from a boom 4522 indicating that the boom 4522 is in an extended position.

Figure 46:
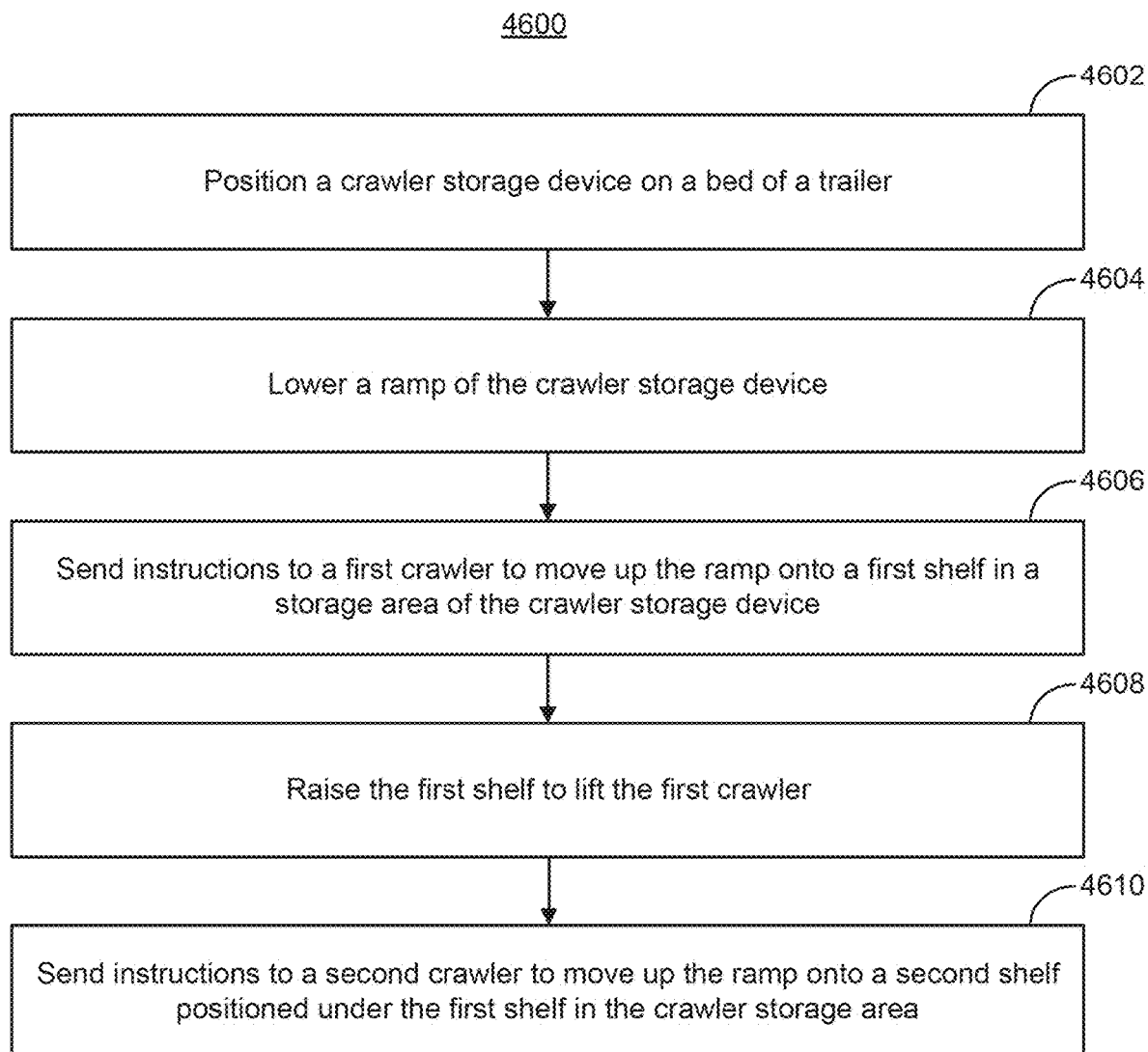
FIG. 46 is an example method of storing crawlers in the crawler hotel of FIGS. 42A-42B, in accordance with some embodiments of the present disclosure.

Referring now to FIG. 46, a method 4600 for storing a plurality of crawlers 4002 is described, according to some embodiments. The method 4600 may include any number of operations and the operations may be performed in any order. The method 4600 may be performed by equipment of a modular home construction company (e.g., the components of system 4500, shown and described with reference to FIG. 45). At operation 4602 of the method 4600, a crawler storage device (e.g., crawler storage device 4200) is positioned on a bed of the trailer. The crawler storage device 4200 may include a plurality of shelves 4204 positioned in a storage area 4206 and a ramp 4208. At operation 4604 of the method 4600, the ramp may be lowered. For example, the ramp 4208 is hingedly coupled to a frame 4202 of the crawler storage device 4200 and may rotate about a hinge from a vertical stowed position to a deployed position in which the ramp 4208 forms a slope from the ground to the storage area 4206. At operation 4606 of the method 4600, instructions are sent to a first crawler 4002 causing the crawler 4002 to move up to the ramp 4208 onto a first shelf 4204 in the storage area 4206. At operation 4608 of the method 4600, the first shelf 4204 is raised to lift the first crawler 4002 within the storage area 4206. A second shelf 4204 may be positioned under the first shelf 4204. At operation 4610 of the method 4600, instructions may be sent to a second crawler 4002 causing the second crawler 4002 to move up the ramp 4208 onto the second shelf 4204. In some embodiments of the method 4600, the crawler storage device 4200 may include more than two shelves 4204. For example, the second shelf 4204 and the first shelf 4204 may both be positioned above a third shelf 4204, and the first and second shelves 4204 may be raised to allow the third crawler 4002 to move up the ramp 4208 onto the third shelf 4204. After all the crawlers 4002 are loaded into the storage area 4206, the ramp 4208 may be raised to a substantially vertical position to close off a side of the storage area 4206.

The method 4600 may be reversed to unload the crawlers 4002 from the crawler storage device 4200. For example, after the ramp 4208 has been lowered to form a slope between the crawler storage device 4200 and the ground, a crawler 4002 on the lowest shelf 4204 may move down the ramp 4208 onto the ground. The next lowest shelf 4204 may be lowered down until it contacts or nearly contacts the lowest shelf 4204, and a crawler 4002 on the next lowest shelf may move down the ramp 4208.

Figure 47:
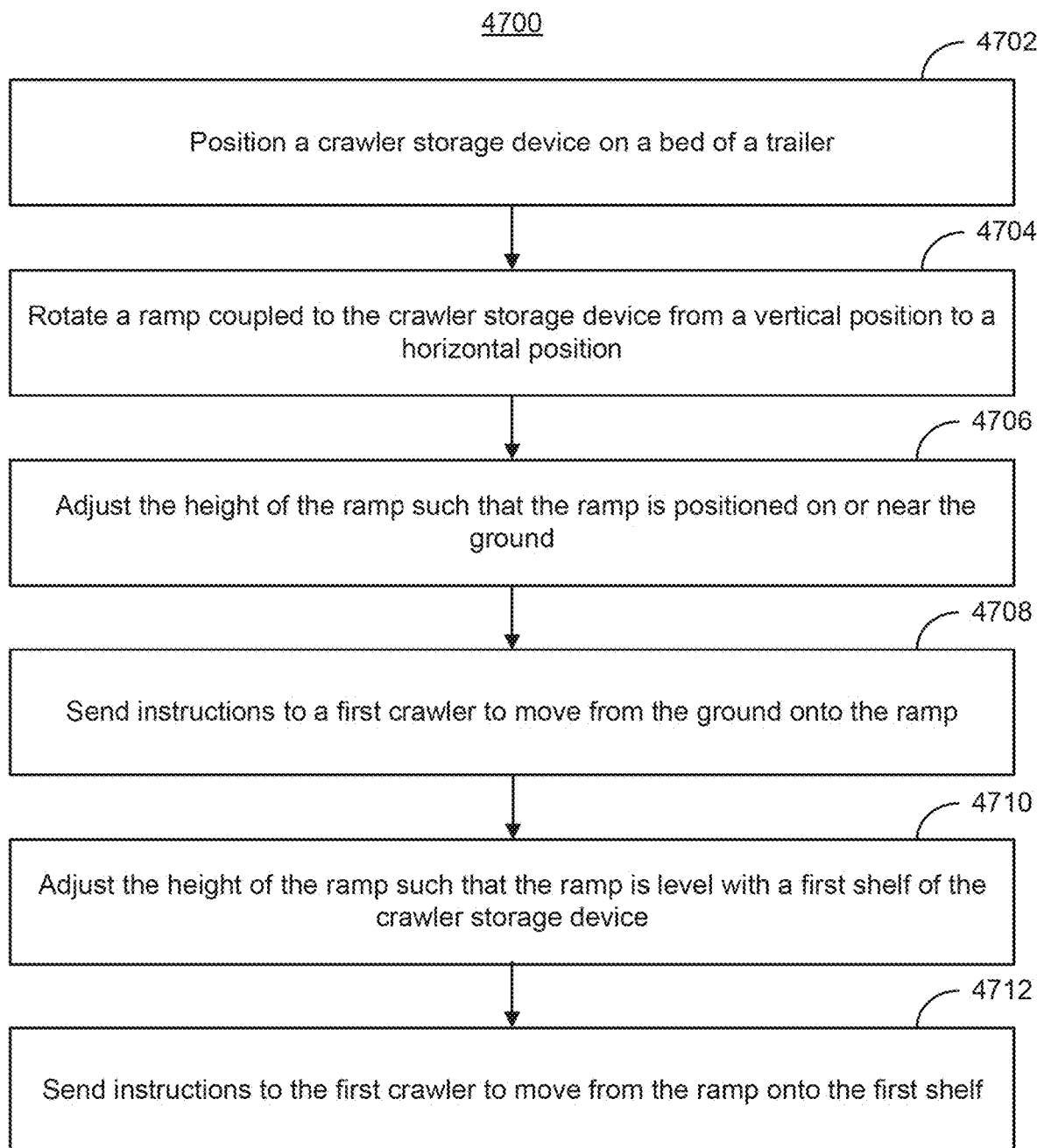
FIG. 47 is an example method of storing crawlers in the crawler hotel of FIGS. 42A-42C, in accordance with some embodiments of the present disclosure.

Referring now to FIG. 47, a method 4700 for storing a plurality of crawlers (e.g., crawlers 4002) is described, according to some embodiments. The method 4700 may include any number of operations and the operations may be performed in any order. The method 4700 may be performed by equipment of a modular home construction company (e.g., the components of system 4500, shown and described with reference to FIG. 45). At operation 4702 of the method 4700, a crawler storage device (e.g., crawler storage device 4300) is positioned on a bed of the trailer (e.g., the bed 404 of trailer 30). At operation 4704 of the method 4700, a ramp 4308 coupled to the crawler storage device 4300 is rotated from a substantially vertical position to a substantially horizontal position. In the substantially vertical position, the ramp 4308 may close off a side of a storage area 4306 of the crawler storage device 4300. In the substantially horizontal position, the ramp 4308 may extend from the crawler storage device 4300 to the side of the bed 404 of the trailer 30. The ramp 4308 may be hingedly coupled to a rail 4314, which may be slidably coupled to the crawler storage device frame 4202 such that the vertical position of the rail 4314 and the ramp 4308 may be adjusted relative to the crawler storage device frame 4202. At operation 4706, the height (e.g., the vertical position) of the ramp 4308 may be adjusted such that the ramp 4308 may be positioned on or near the ground (e.g., a surface on which the trailer 30 is positioned). At operation 4708 of the method 4700, instructions are sent to a first crawler 4002 causing the first crawler 4002 to move from the ground onto the ramp 4308. At operation 4710 of the method 4700, the height of the ramp 4308 is adjusted such that the ramp 4308 is level with a first shelf 4304 in the storage area of the crawler storage device. At operation 4712 of the method 4700, instructions are sent to the first crawler 4002 causing the first crawler 4002 to move from the ramp 4308 onto the first shelf 4304. In some embodiments, additional crawlers 4002 may be loaded onto other shelves 4304 within the storage area 4306. For example, the height of the ramp 4308 may again be adjusted such that the ramp 4308 is positioned on or near the ground. A second crawler 4002 may then move onto the ramp 4308. The height of the ramp 4308 may again be adjusted such the ramp 4308 is level with the second shelf 4304 in the storage area 4306, and the second crawler 4002 may move from the ramp 4308 onto the second shelf 4304. After all the crawlers 4002 are loaded into the storage area 4306, the ramp 4308 may be raised to a substantially vertical position to close off a side of the storage area 4306.

The method 4700 may be reversed to unload the crawlers 4002 from the crawler storage device 4200. For example, after the ramp 4308 has been lowered to the horizontal position, the height of the ramp 4308 may be adjusted such that the ramp 4308 is level with the first shelf 4304. A crawler 4002 positioned on the first shelf may move onto the ramp, the ramp may be lowered to the ground, and the crawler may move off the ramp onto the ground. The height of the ramp may again be adjusted such that the ramp is level with the second shelf. A second crawler positioned on the second shelf may move onto the ramp, the ramp may be lowered to the ground again, and the second crawler may move off the ramp onto the ground.

Figure 48:
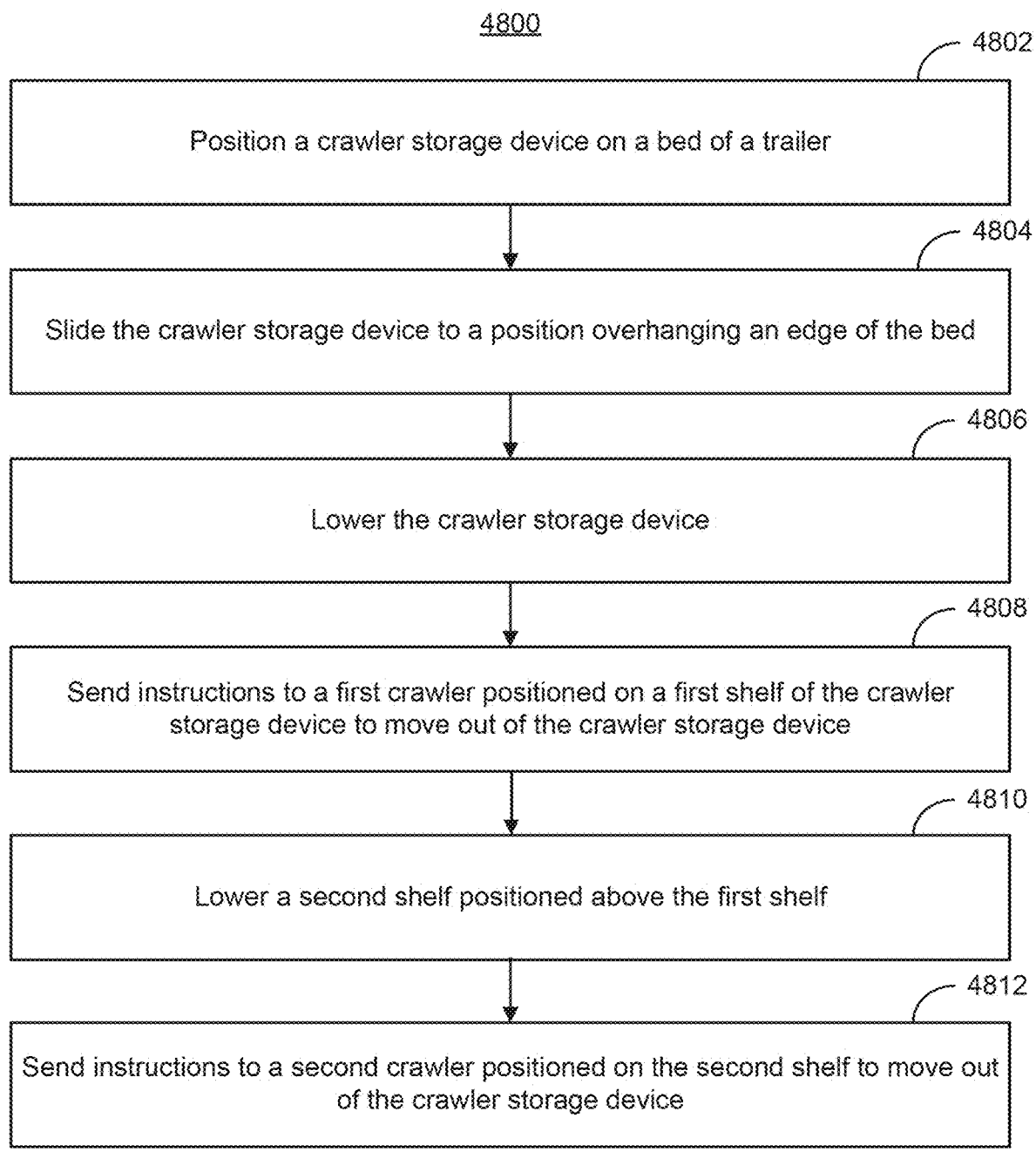
FIG. 48 is an example method of storing crawlers in the crawler hotel of FIG. 44, in accordance with some embodiments of the present disclosure.

Referring now to FIG. 48, a method 4800 for unloading a plurality of crawlers from a trailer (e.g., the trailer 30) is described, according to some embodiments. The method 4800 may include any number of operations and the operations may be performed in any order. The method 4800 may be performed by equipment of a modular home construction company (e.g., the components of system 4500, shown and described with reference to FIG. 45). At operation 4802 of the method 4800, a crawler storage device (e.g., crawler storage device 4400) is positioned on a bed of the trailer. At operation 4804 of the method 4800, the crawler storage device 4400 is slid to a position overhanging an edge of the bed of the trailer 30. The crawler storage device 4400 may be moved to a position at which the entire crawler storage device 4400 is off to the side of the bed of the trailer 30. At operation 4806 of the method 4800, the crawler storage device 4400 may be lowered until it is touching or near the ground (e.g., a surface on which the trailer is positioned). At operation 4808 of the method 4800, instructions are sent to a first crawler 4002 positioned on a first shelf 4406 (e.g., a lowest shelf) of the crawler storage device 4400 causing the first crawler 4002 to move out of the crawler storage device 4400. At operation 4810 of the method 4800, a second shelf 4406 of the plurality of shelves (e.g. a shelf positioned above the first shelf) is lowered to a position contacting or proximate the first shelf 4406. At operation 4812 of the method 4800, instructions are sent to a second crawler 4002 positioned on the second shelf 4204 causing the second crawler 4002 to move out of the crawler storage device 4400.

The method 4800 may be reversed to load the crawlers 4002 into the crawler storage device 4400 and to move the crawler storage device 4400 back onto the bed of the trailer 30. For example, with the crawler storage device 4400 positioned on the ground and each shelf 4406 at its lowest position, a first crawler 4002 may move onto an uppermost shelf 4406. The uppermost shelf 4406 may be raised, and a second crawler 4002 may move onto the next shelf 4406. Once all of the crawlers 4002 are positioned upon shelves 4406 inside the crawler storage device 4400, the crawler storage device 4400 may be lifted and slid back onto the bed of the trailer 30.

Modular Home

Figure 49A:
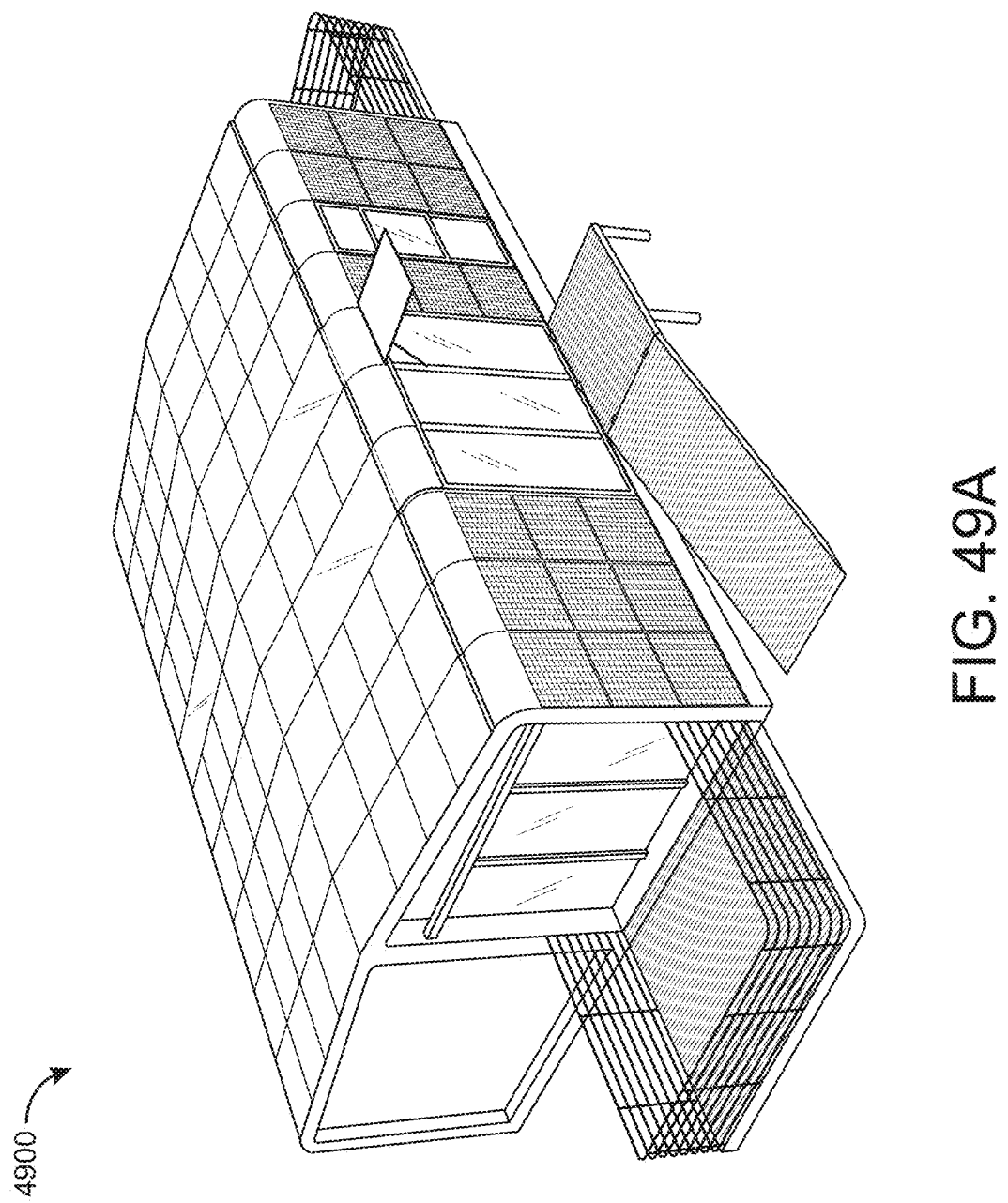
FIGS. 49A-49I are illustrations of an example self-sustaining modular home, in accordance with some embodiments of the present disclosure.

FIG. 49A is a perspective view of a modular home 4900, according to some embodiments. Modular home 4900 may include one or more decks, one or more entryway ramps, and one or more entryway stair assemblies. The modular home 4900 may include a plurality of solar panels positioned on the roof configured to generate electricity for use in the modular home 4900. The modular home 4900 may include one or more windows and/or skylights. The modular home 4900 may include one or more doorways or entryways configured to allow a user to move from outside the modular home 4900 into a living area of the modular home 4900. The modular home 4900 may have a crowned roof configured to allow rainwater to flow off of the roof of the modular home 4900. Modular home 4900 may include multiple housing portions coupled by hinges as described above.

The modular home 4900 design is defined by its unique shape and exterior skin. The modular home 4900 may be covered with a BIPV, which follows a curve at the floor to create a seamless floor-to-roof appearance. Skylights and windows may be integrated into this BIPV system. The overall shape may be derived from the need to deflect wind while maximizing energy production, light, and views. The home may be lifted off the ground by mechanical legs to provide room under the home for a unique network of bladder tanks that are held in place by elastic netting. The unique folding of the home may result in a one of a kind hinge (e.g., an eight foot tall hinge) that is visible on the exterior. The interior of the two bedroom home may maintain the curved appearance of the exterior by the use of curved wood veneer on the wall and ceiling surfaces. The home may be considered 100% off-grid and off all other utilities that would traditionally interact with the ground (no sewer, septic, water pipe connection, etc.). The home may be self-contained by using a "Life Support System" which may be a compact system of equipment and tanks that filters everything used in the house in an infinite recycling loop.

Figure 49B:
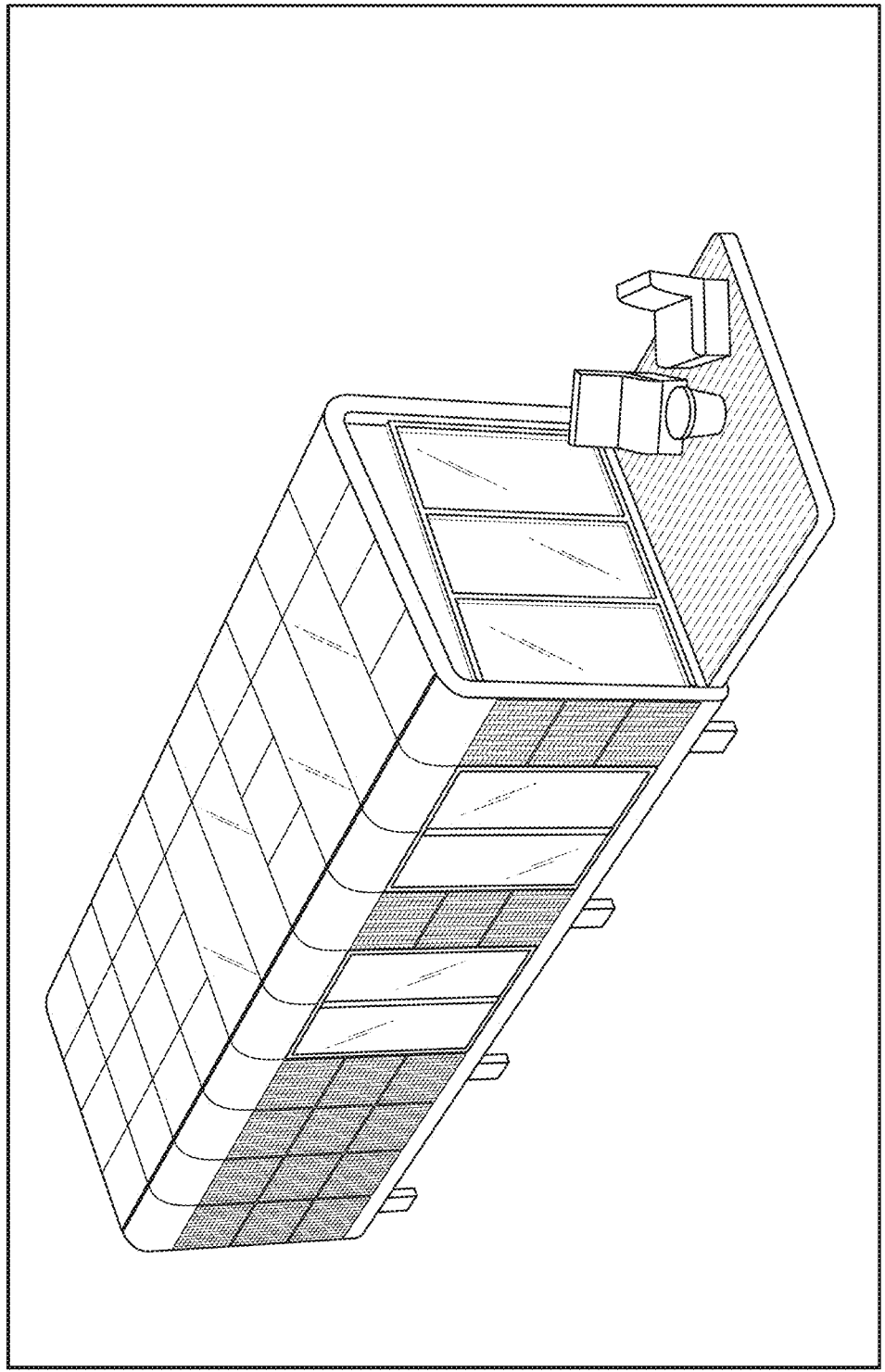

FIG. 49B is a perspective view of the modular home 4902, according to some embodiments. The modular home 4902 may have a similar off-the-grid and self-sustaining capability to the modular home 4900. The modular home 4902 may be a studio or hotel room. The modular home 4902 may include only one housing portion. The modular home 4902 may include a sloped roof configured to allow rainwater to flow off of the roof of the modular home 4902. The modular home 4902 may include one or more decks, one or more entryways, and one or more windows and/or skylights. The modular home 4902 may maintain the curved appearance of the exterior by the use of curved wood veneer on the wall and ceiling surfaces.

Figure 49C:
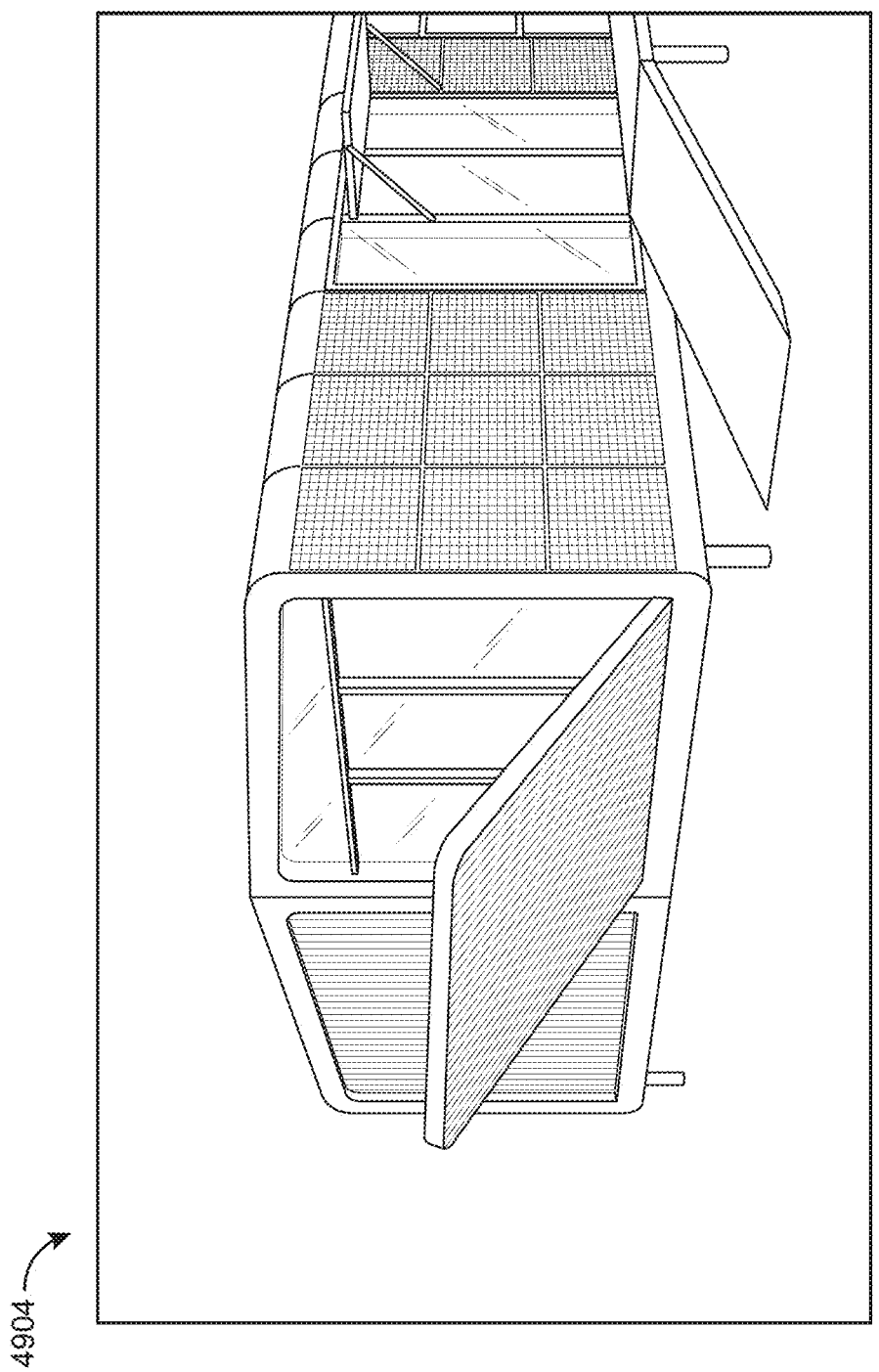

FIG. 49C is a perspective view of a modular home 4900, according to some embodiments. The modular home 4904 may include a fold-down deck that may be equivalent or analogous to the deck 2400 described above. During transportation on the modular home 4904, the fold-down deck may be rotated vertically into a recess in the side of the housing portion to reduce the footprint of the housing portion during shipping and to protect the windows on the side of the housing portion. The fold-down deck may include legs configured to support the deck, as described above with reference to the deck 2400.

Figure 49D:
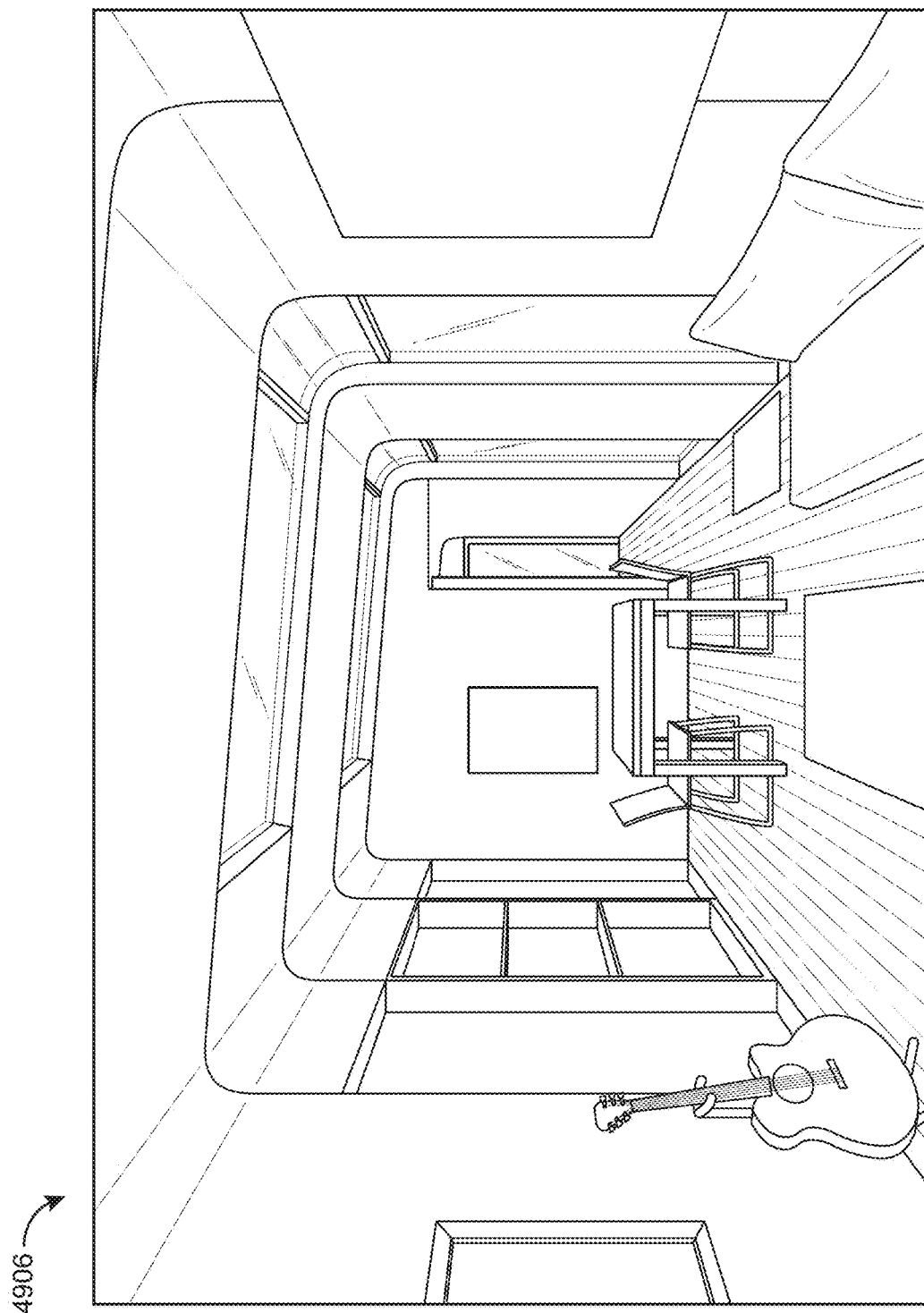

FIG. 49D shows a living area 4906 of the housing portion of the modular home, according to some embodiments. The living area 4906 may include an entryway or doorway allowing the user to move from the living area to the outside of the housing portion. Living area 4906 may include a passageway allowing the user to move from the living area 4906 to a living area of a second housing portion coupled to the first housing portion.

Figure 49E:
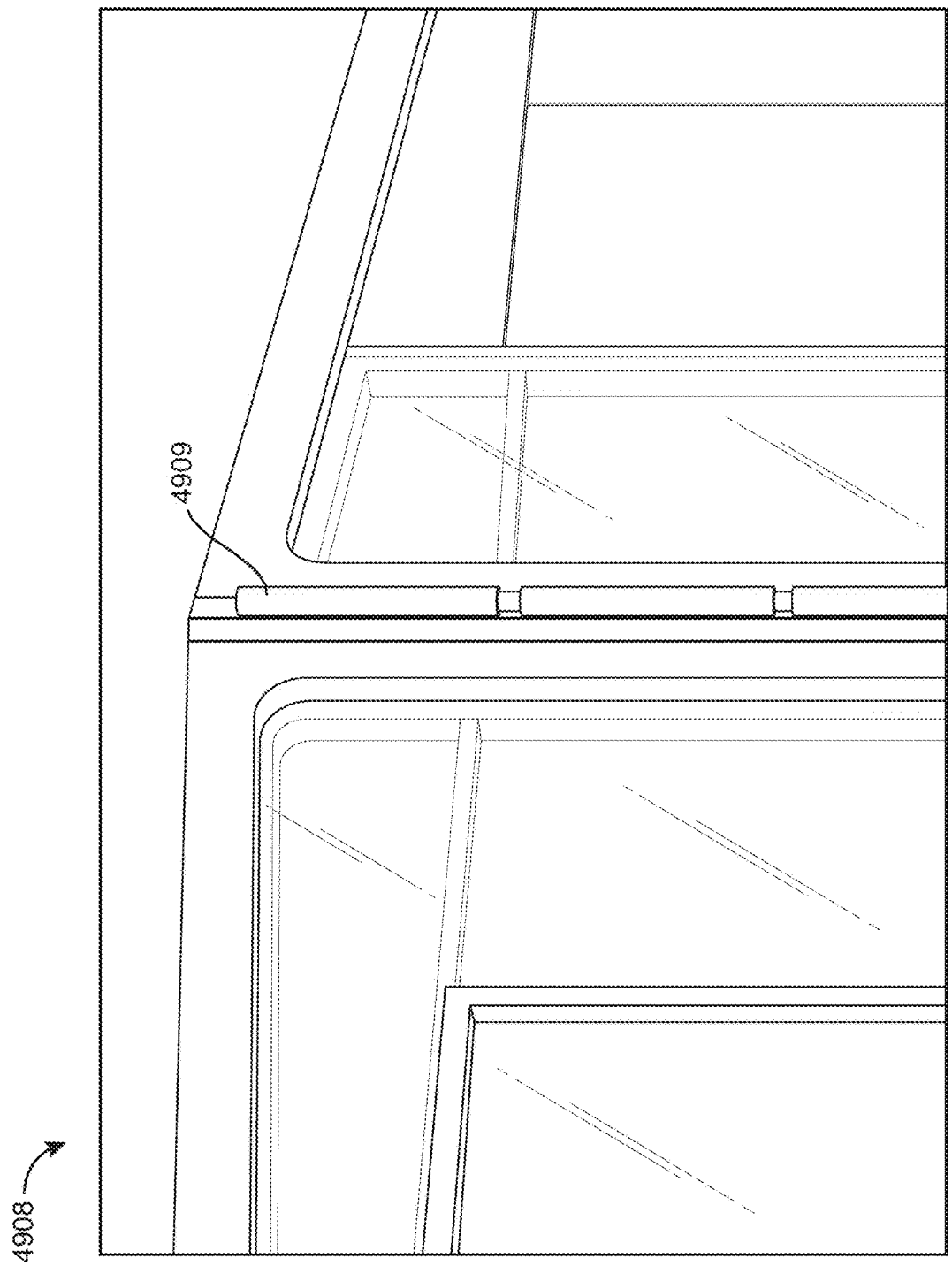

FIG. 49E shows a modular home 4908 including a hinge 4909 applicable to the first housing portion to a second housing portion, according to some embodiments. The hinge 4909 may be equivalent or analogous to the hinge 806 described above. The leaves of the hinge 4909 may be enclosed between the first and second housing portions, and the bores and pins of the hinge may remain visible when the housing portions are coupled together at the installation site.

Figure 49F:
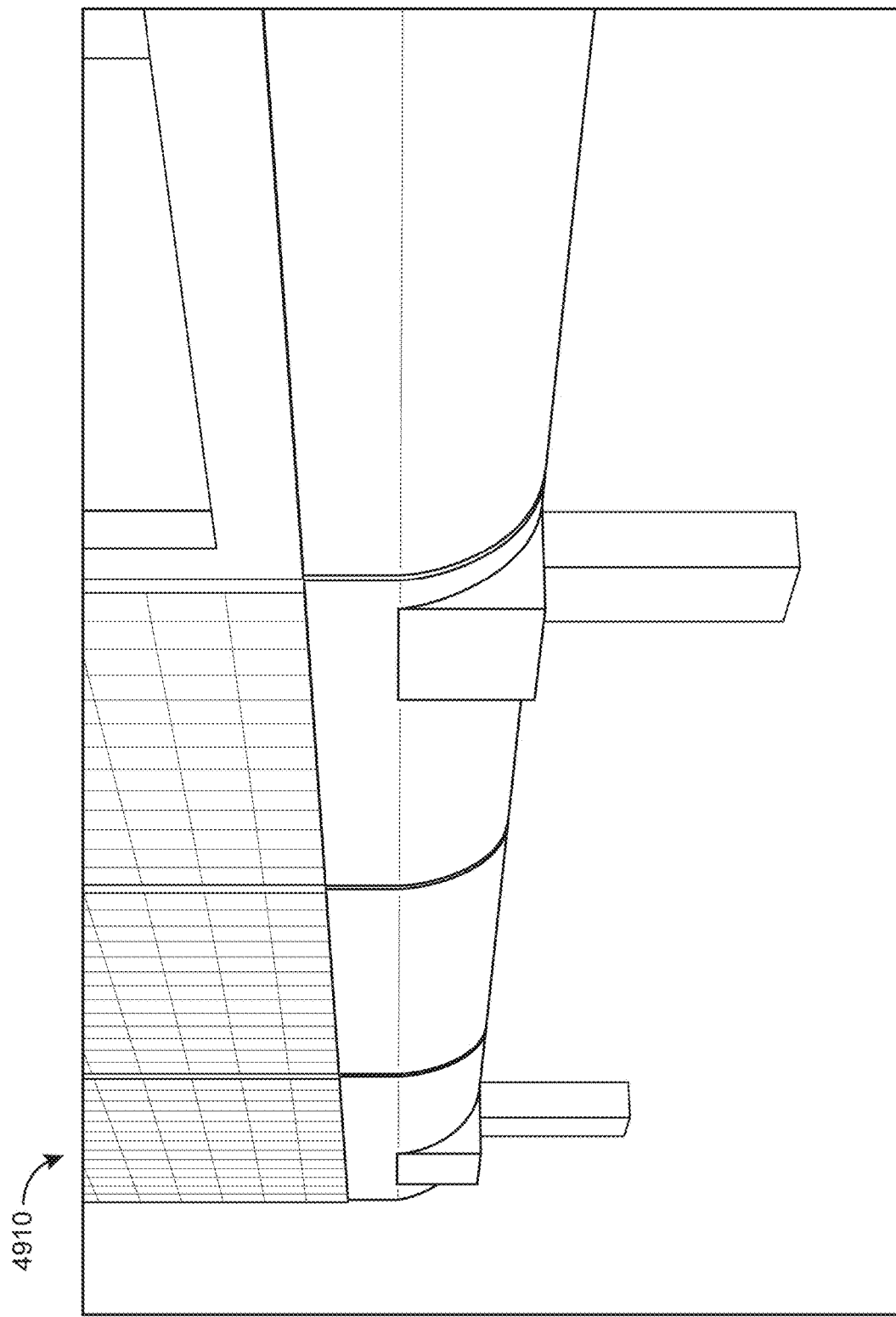

FIG. 49F shows a modular home 4910 supported by linear actuators, according to some embodiments. As described above with reference to linear actuators 1001, the linear actuators may be adjustable to account for variations in the surface at the installation site. Actuators may have base plates with a large enough surface area that the modular home 4910 may be installed in an installation site without a concrete or stone foundation. For example, the modular home 4910 may be installed on a grassy area and the base plates may have sufficient surface area to prevent the actuators from sinking into the soil.

Figure 49G:
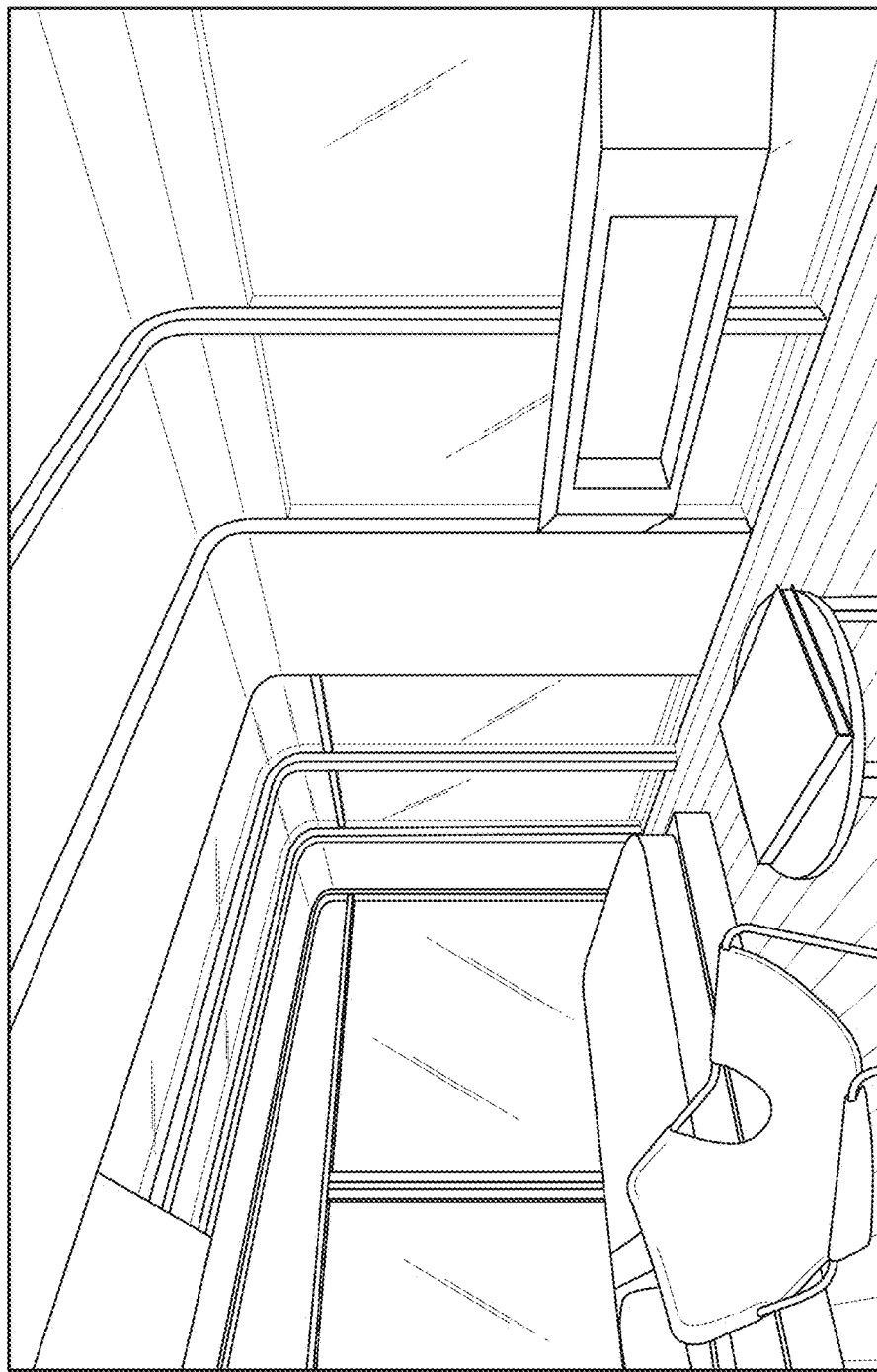
Figure 49H:
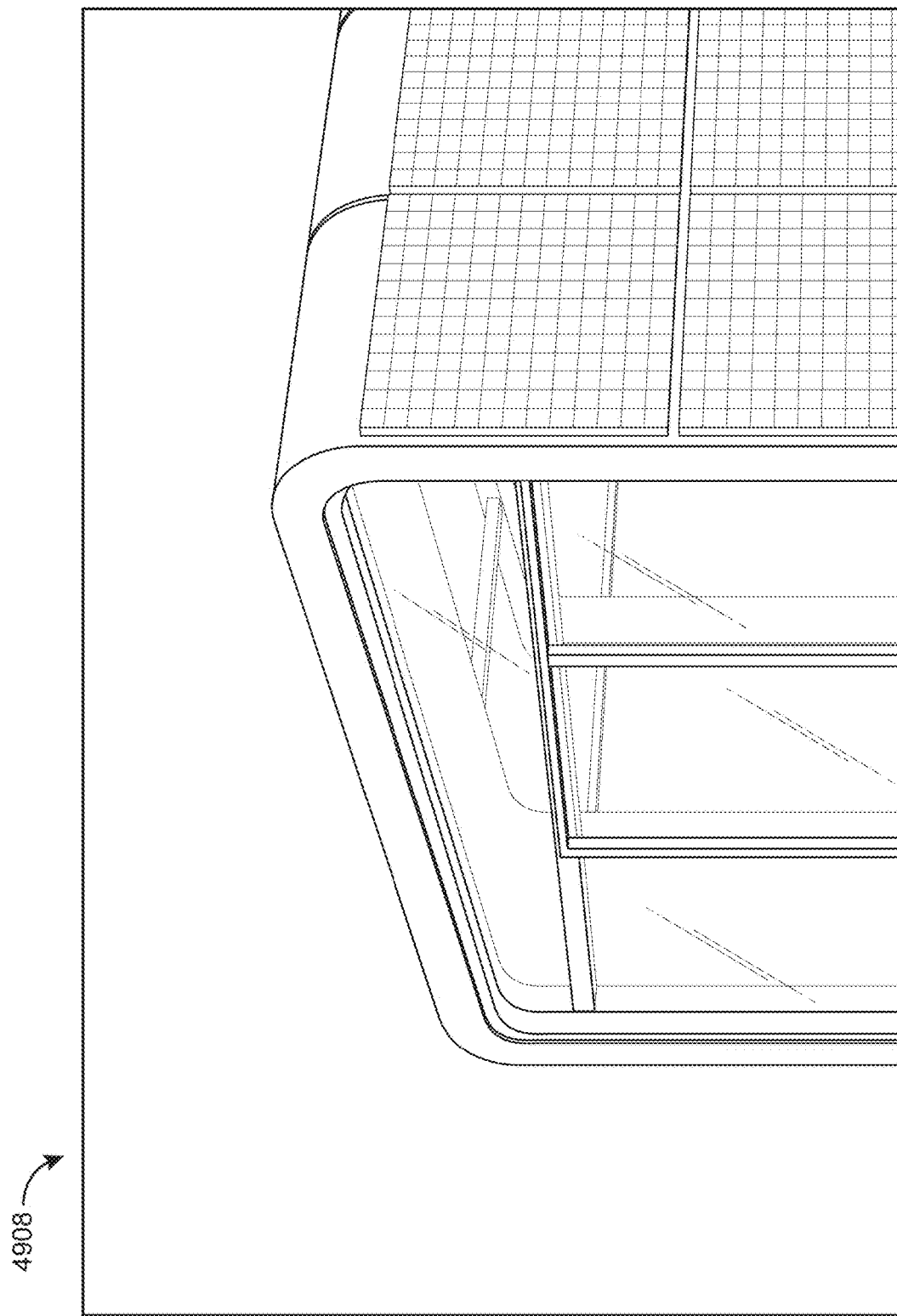
Figure 49I:
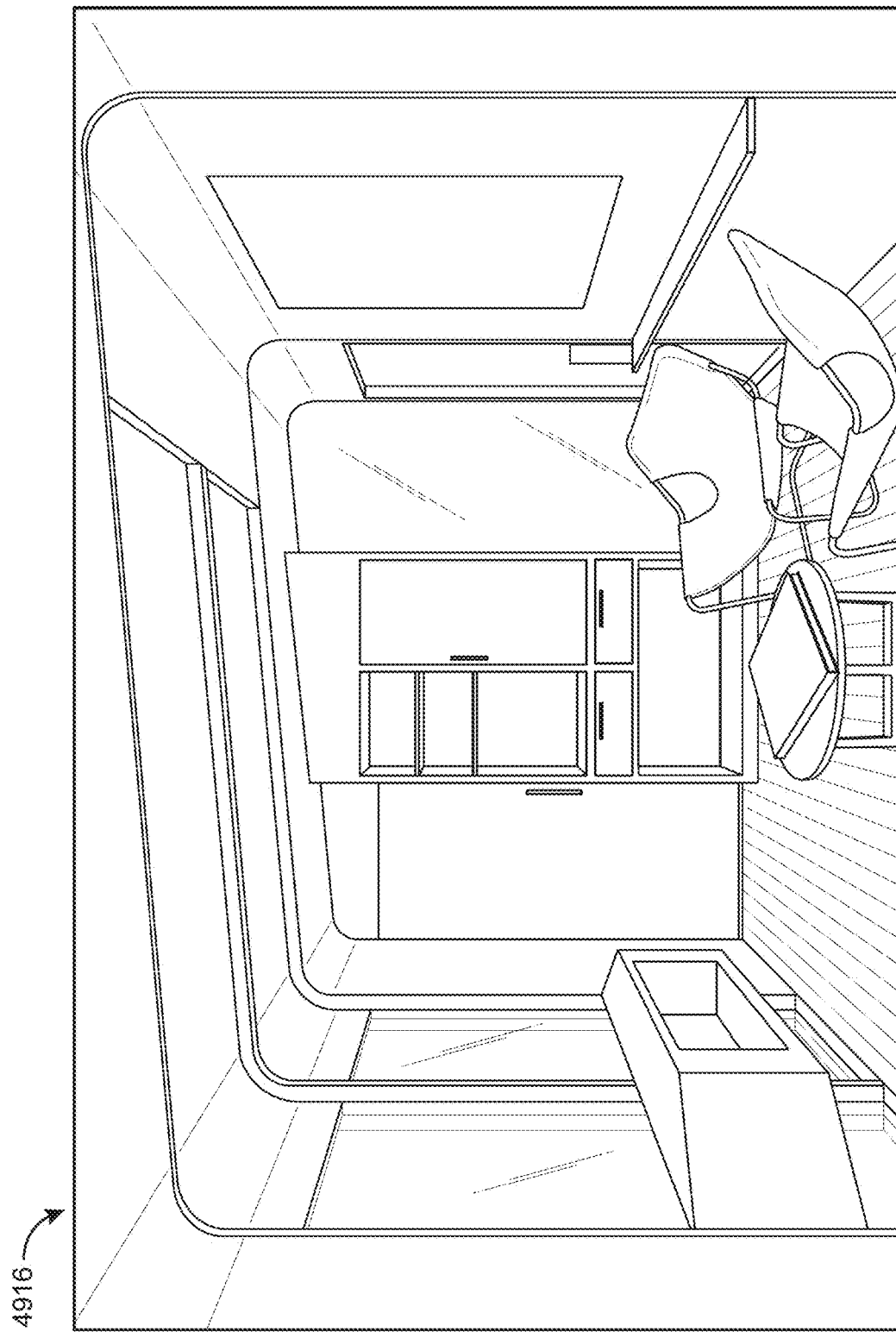

FIG. 49G shows a living area 4912 of the housing portion of the modular home, according to some embodiments. FIG. 49H shows a modular home 4914 with a single housing portion, according to some embodiments. FIG. 49I shows a living area 4916 of the housing portion of the modular home, according to some embodiments.

Transporting and Coupling Portions of a Modular Home Using Robotic Crawlers

In one embodiment of the present disclosure, portions of a modular home may be transported to a building site separately and then connected using crawlers positioned on trailers transporting the portions. For example, robotic crawlers may be used to transport two portions of a modular home to a building site and bring the two portions together such that the portions may be coupled together (e.g., bolted together). To do so, sets of crawlers may each lift a different portion of a modular home off of trailers that brought the portions to the building site. The sets of crawlers may communicate with each other and use sensors to keep the portions level as the crawlers bring the two portions to the final destination for the modular home. After reaching the final destination, the crawlers may remain in a static position while sliding platforms supporting the modular home move laterally to push the portions together until connection bolts in one portion snap into receiving holes in the other portion. Thus, the crawlers may enable heavy portions (e.g., portions that may exceed 10 tons) of modular homes to connect with each other without the use of a crane or human intervention.

Figures 50A, 50B, 50C:
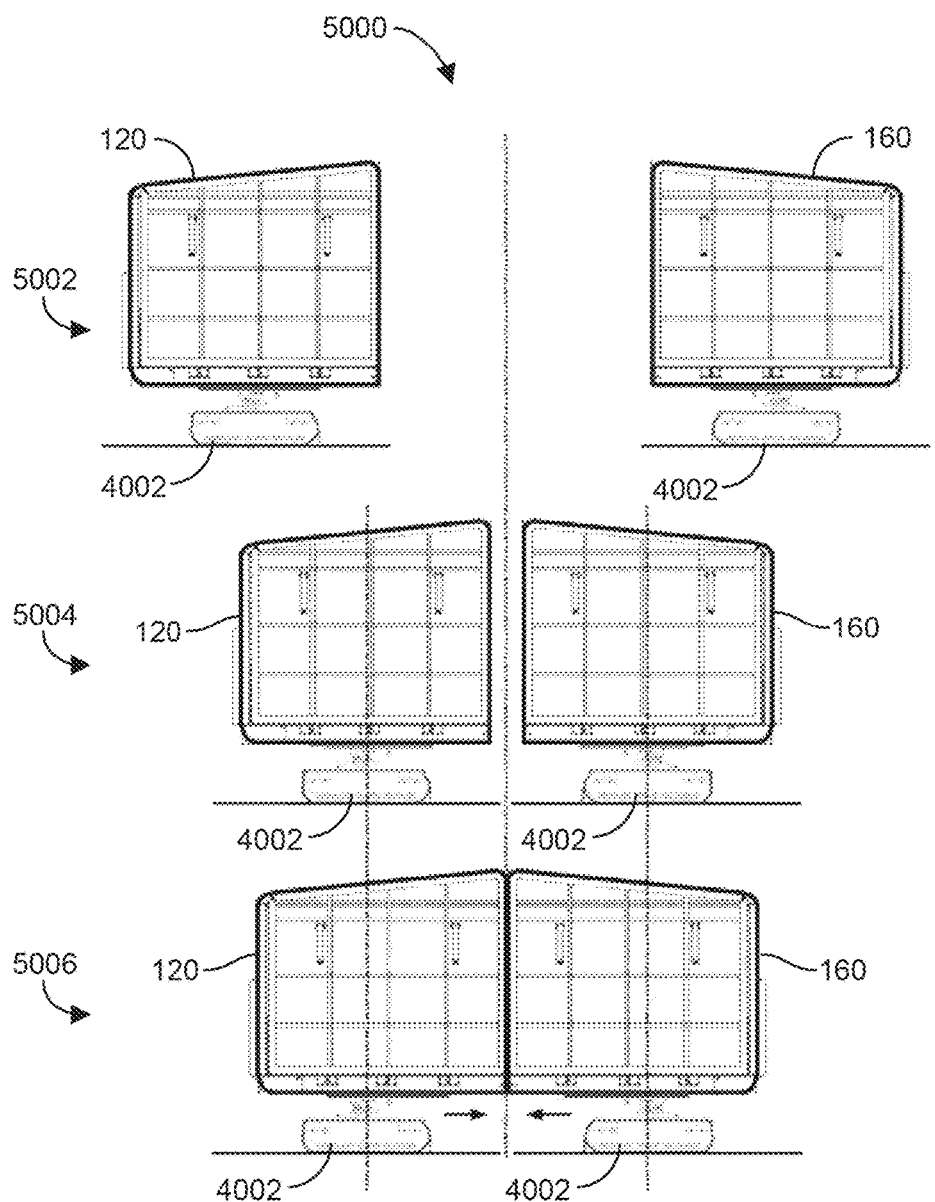
FIGS. 50A-50C are illustrations of an example sequence for transporting and coupling individual portions of a modular home using crawlers, in accordance with some embodiments of the present disclosure.

For example, FIGS. 50A-50C are illustrations of an example sequence 5000 for transporting and coupling individual portions of a modular home (e.g., housing portions 120, 160 of modular home 101) using crawlers (e.g., crawlers 5100, shown in FIGS. 51A and 51B), in accordance with some embodiments of the present disclosure. The sequence 5000 may include any number of operations and the operations may be performed in any order. The sequence 5000 may be performed by equipment of a modular home construction company (e.g., the components of system 4500, shown and described with reference to FIG. 45). At operation 5002, crawlers 5100 transport housing portions 120, 160 of a modular home 101 from separate trailers or delivery trucks to a building site. At operation 5004, the crawlers 5100 align (e.g., perfectly align) and level (e.g., perfectly level) the portions 120, 160 of the modular home 101 a predefined distance from each other (e.g., six inches). At operation 5006, as the crawlers 5100 remain in a fixed position, sliding platforms 5110 on top of the crawlers 5100 and supporting the two portions 120, 160 move laterally to push the two portions 120, 160 together. The two portions 120, 160 may be manually bolted together or may automatically bolt together when the two portions 120, 160 are pushed towards each other.

Figure 50D:
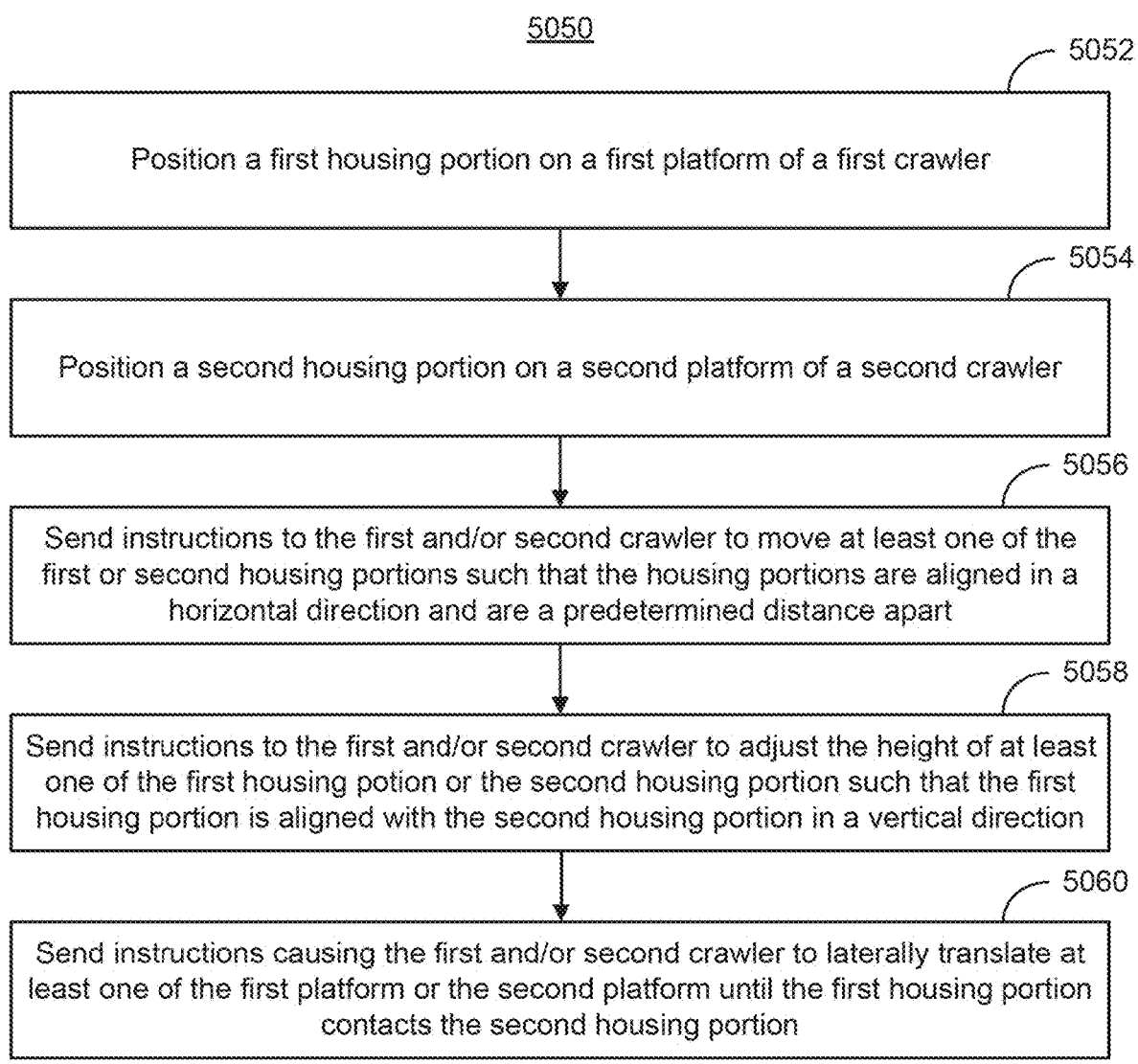
FIG. 50D is an example method of transporting and coupling individual portions of a modular home using crawlers, in accordance with some embodiments of the present disclosure.

Referring now to FIG. 50D, a method 5050 for transporting and coupling individual portions of a modular home (e.g., housing portions 120, 160 of modular home 101) using crawlers (e.g., crawlers 5100) is described, according to some embodiments. The method 5050 may include any number of operations and the operations may be performed in any order. The method 5050 may be performed by equipment of a modular home construction company (e.g., the components of system 4500, shown and described with reference to FIG. 45). At operation 5052 of the method 5050, a first housing portion 120 of a modular home 101 on a platform 5110 of a first crawler 5100. The platform 5110 is configured to be raised and lowered, rotated, and translated laterally relative to the body 5101 of the crawler 5100. At operation 5054 of the method 5050, a second housing portion 160 of a modular home 101 on a platform 5110 of a second crawler 5100. The second crawler 5100, including the platform 5110, may be substantially similar to the first crawler 5100. The first and second housing portions 120, 160 may be configured to be coupled together as in the embodiments described above. At operation 5056, instructions are sent to at least one of the first or second crawlers 5100 causing at least one of the first or second crawlers 5100 to move at least one of the first housing portion 160 or the second housing portion 160 such that the first housing portion 120 is aligned with the second housing portion 160 in a horizontal direction and the first housing portion 120 is a predetermined distance from the second housing portion 160. The housing portions 120, 160 may thus be horizontally aligned in the orientation in which they will be coupled together. "Horizontally aligned" as used herein may refer to a vertical edge of the first housing portion 120 being aligned with a corresponding vertical edge of the second housing portion 160. The aligned vertical edges may be configured to couple together when joining the first and second housing portions 120, 160 to form a complete modular home 101. The predetermined distance between the housing portions 120, 160 may be less than the combined maximum translation stroke of the platforms of the first and second crawlers 5100. At operation 5058, instructions are sent to at least one of the first or second crawlers 5100 causing at least one of the first or second crawlers 5100 to adjust the height of at least one of the first housing portion 120 or the second housing portion 160 such that the first housing portion 120 is aligned with the second housing portion 160 in a vertical direction. One or more actuators of actuator assembly 5114 may be used to adjust the height of the platform and thereby adjust the height of the housing portion 120, 160. The housing portions 120, 160 may thus be horizontally and vertically aligned in the orientation in which they will be coupled together, but still spaced apart. "Vertically aligned" as used herein may refer to the bottom and top edges of the first housing portion 120 being aligned with the corresponding, respective bottom and top edges of the second housing portion 160. The aligned bottom and top edges may be configured to couple together when joining the first and second housing portions 120, 160 to form a complete modular home 101. At operation 5060, instructions are sent to at least one of the first or second crawlers 5100 causing at least one of the first or second crawlers 5100 to laterally translate at least one of the first platform 5110 or the second platform 5110 until the first housing portion 120 contacts the second housing portion 120. Any of the coupling methods described herein may then be used to couple together the first and second housing portions 120, 160. For example, the latch assemblies 5210 may automatically engage when the first housing portion 120 meets the second housing portion 160.

FIGS. 51A and 51B are illustrations of a robotic crawler 5100, in accordance with some embodiments of the present disclosure. The robotic crawler 5100 may be substantially similar to the crawler 4002 shown in FIG. 40B, with the addition of a sliding platform 5110 positioned on top of the crawler 5100. The sliding platform 5110 is positioned on top of a support platform 5112, which is coupled to an actuator assembly 5114. The actuator assembly 5114 may allow for adjustment of the height and angle of the support platform 5112, as described above with reference to the crawler 4002 of FIG. 40B. One or more linear actuators 5116 (e.g., hydraulic cylinders, pneumatic actuators, electromechanical actuators, etc.) may be coupled to the support platform 5112 on one end and the sliding platform 5110 on the other end. When actuated, the linear actuators 5116 slide (e.g., translate) the sliding platform 5110 across the support platform 5112. FIGS. 51A and 51B show the robotic crawler 5100 in a closed position and an open position, respectively. The hydraulic platform 5110 may be used to support a portion 120, 160 of a modular home 101 with one or more other crawlers 5100. The crawler 5100 may move the portion 120, 160 of the modular home 101 to a final destination using the crawler's tractive elements 4118, along with other similar crawlers 5100 supporting the portion 120 of the modular home 101. Another set of crawlers 5100 may similarly move another portion 160 of the modular home 101 to the final destination such that the two portions 120, 160 are close to each other with an open area facing each other. After reaching the final destination, the crawler 5100 may slide the sliding platform 5110 from a closed position (e.g., a position in which the sliding platform 5110 is locked and not moving) into a sliding position (e.g., a position in which the sliding platform 5110 is sliding or has been slid by the linear actuators 5116) in conjunction with the other crawlers 5100 supporting the portion 120 of the modular home 101. The crawler 5100 may slide the sliding platform 5110 in a direction opposite the direction the set of crawlers 5100 supporting the other portion 160 of the modular home 101 slide the other portion 160 such that the two portions 120, 160 slide close together. The crawler 5100 and the other crawlers 5100 may slide the sliding platforms 5110 until the two portions 120, 160 of the modular home contact one another. Upon or responsive to the portions 120, 160 contacting one another, the two portions 120, 160 of the modular home 101 may be bolted together, or may be coupled together using any of the coupling methods described herein.

Figure 52A:
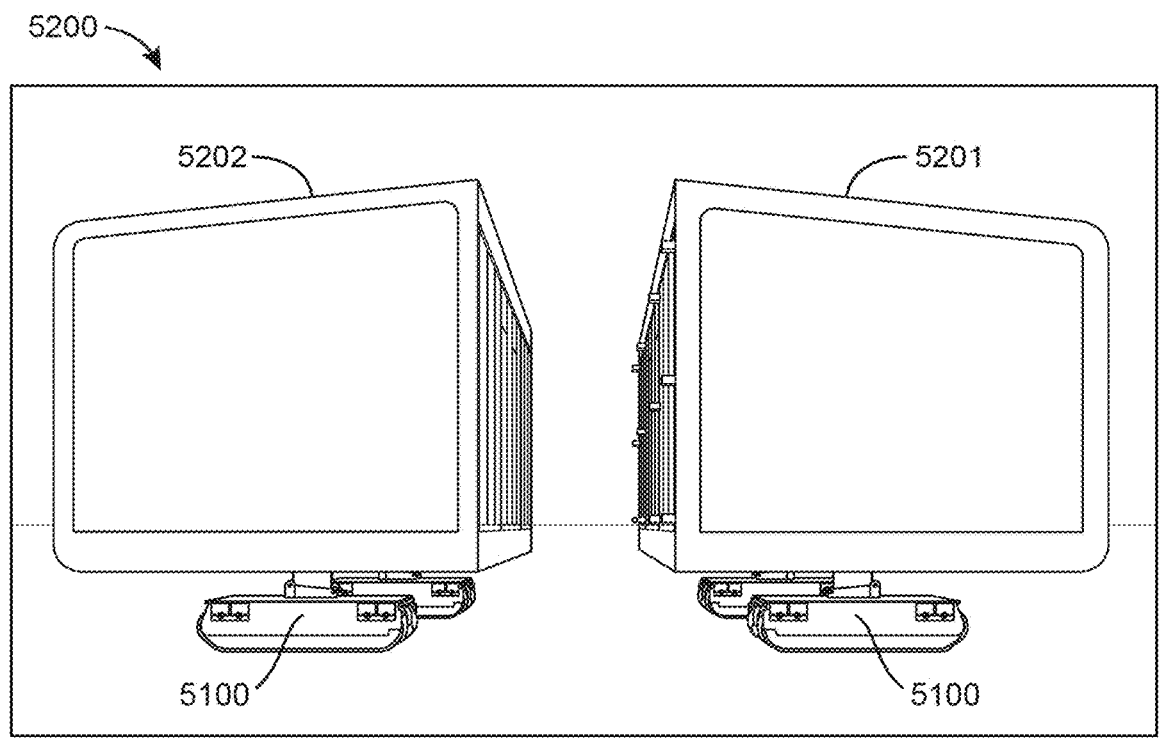
FIGS. 52A and 52B are illustrations of two portions of a modular home being assembled by the robotic crawlers, in accordance with some embodiments of the present disclosure.
Figure 52B:
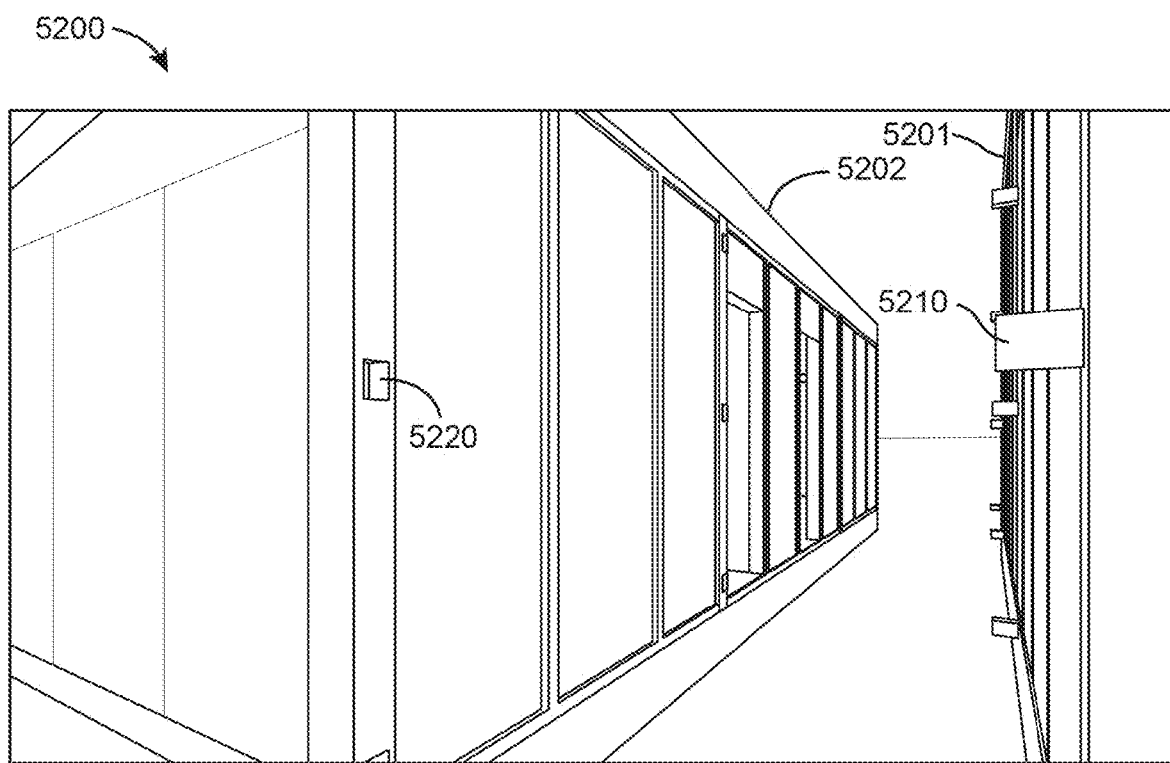

FIGS. 52A and 52B are illustrations of two portions 5201, 5202 of a modular home 5200 being assembled by the robotic crawlers 5100, in accordance with some embodiments of the present disclosure. The first housing portion 5201 includes a plurality of latch assemblies 5210 (e.g., clamp assemblies), and the second housing portion 5202 includes a plurality of receiver assemblies 5220. When the sliding platforms 5110 of the crawlers 5100 move the housing portions 5201, 5201 toward each other, the latch assembles 5210 engage the receiver assemblies 5220 to couple the portions 5201, 5202 together.

Referring now to FIGS. 52C-52F, a top detail view 5230 and a side detail view 5240 of a latch of latch assembly 5210, an isometric view 5250 of the latch assembly 5210, and a top view 5260 showing the latch assembly 5210 engaging the receiver assembly 5220 are shown, according to some embodiments. To install the latch assembly 5210, a pocket 5211 is cut into a structural tube 5212 of the frame of the housing portion 5201. An insert bar 5213 may be fastened or otherwise coupled (e.g., via threaded fasteners or by welding) to the structural tube 5212 such that so that the portions of the structural tube 5212 both above and below the pocket 5211 can resist any forces pulling on the insert bar 5213. For example, the insert bar 5213 may be centered on the pocket 5211 such that an equal amount of the insert bar 5213 extends above and below the pocket 5211. The insert bar 5213 may include or be coupled to a mounting plate 5214 that extends out of the pocket 5211. The latch 5215 is coupled to the mounting bracket. The latch 5215 includes an opening 5216 configured to receive a securing rod 5224 and surrounded by a rotating jaw lock 5217. The receiver assembly 5220 includes an insert bar 5223 (e.g., similar to insert bar 5213) coupled to a securing rod 5224. When the portions 5201, 5202 of the modular home 5200 are moved toward each other by the crawlers 5100 with the latch assemblies 5210 aligned with the receiver assemblies 5220, the securing rod 5224 can push open the rotating jaw lock 5217 and be received in the opening 5216. The rotating jaw lock 5217 can then close around the securing rod 5224 to lock the housing portions 5201, 5202 together. In some embodiments, the rotating jaw lock 5217 may be spring loaded. The rotating jaw lock 5217 and may be pushed open by the securing rod 5224 and be forced closed by the springs when the securing rod 5224 is received in the opening 5216. In other embodiments, the rotating jaw lock 5217 may be opened and closed by an actuator (e.g., an electric actuator). For example, a user may be able to send an instruction from a user device to the rotating jaw lock 5217 causing the rotating jaw lock 5217 to open or close.

Ridge Cap

Figure 53A:
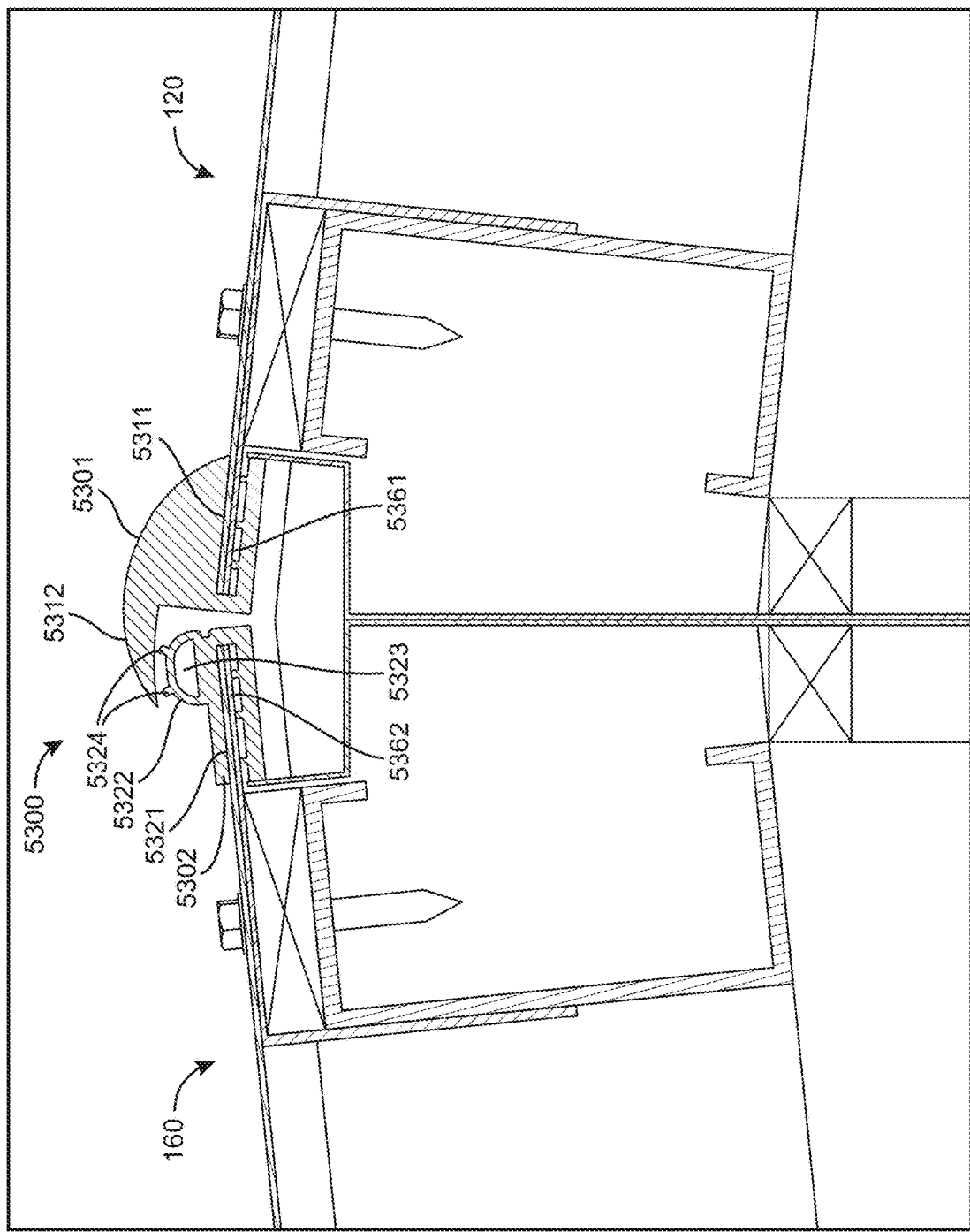
FIGS. 53A-53C are illustrations of a ridge cap assembly, in accordance with some embodiments of the present disclosure.
Figure 53B:
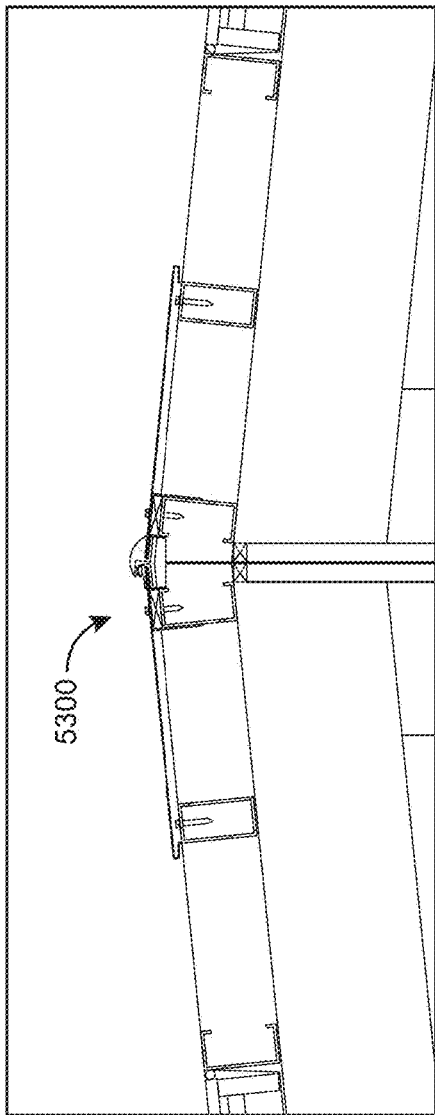
Figure 53C:
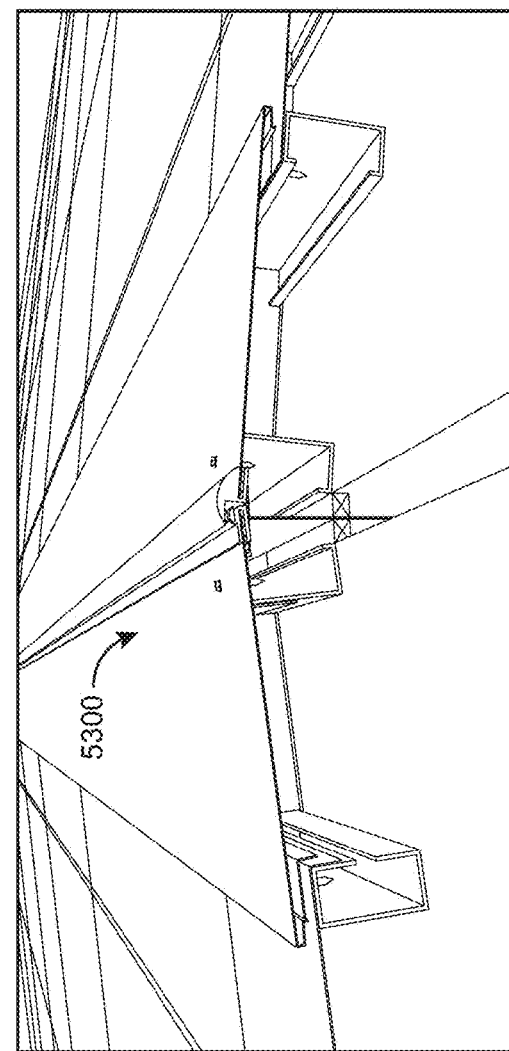

FIGS. 53A-53C are illustrations of a ridge cap assembly 5300, in accordance with some embodiments of the present disclosure. The ridge cap assembly 5300 includes a first scaling member 5301 and a second sealing member 5302. The first sealing member 5301 includes a slot 5311 configured to receive a flange 5361 of a roof panel of a first housing portion 120 of a modular home 101. The slot may be inserted over the flange and the first sealing member 5301 can be fastened to the flange 5361. The first sealing member 5301 includes a cantilevered portion 5312 that extends past the bottom of the slot 5311 and beyond the edge of the flange 5361. The cantilevered portion 5312 extends substantially in the same direction as the flange 5361 is inserted into the slot 5311. The second sealing member 5302 includes a slot 5321 configured to receive a flange 5362 of a roof panel of a second housing portion 160 of the modular home 101. The second sealing member 5302 includes a compressible member 5322 positioned near the bottom of the slot 5321 and the edge of the flange 5362. The compressible member 5322 may include a hollow center 5323 that increases the compressibility of the member 5322. The compressible member 5322 may include two ridges 5324 positioned on top of the member 5322 and opposite the hollow portion 5323. When the housing portions 120, 160 are moved toward each other and fastened together, the cantilevered portion 5312 of the first sealing member 5301 may overlap the compressible member 5322 of the second sealing member 5302. In some embodiments, the cantilevered portion 5312 may contact and compress the compressible member 5322. The cantilevered portion 5312 may contact the ridges 5324 to form a redundant seal to prevent water, debris, and animals from entering the modular home 101 though the space between the roof flanges 5361, 5362. Even if the cantilevered portion 5312 does not contact the compressible member 5322, resulting in a small gap therebetween, the overlap of the cantilevered portion 5312 and compressible member 5322 may substantially prevent water, debris, and animals from entering the modular home 101.

Figure 53E:
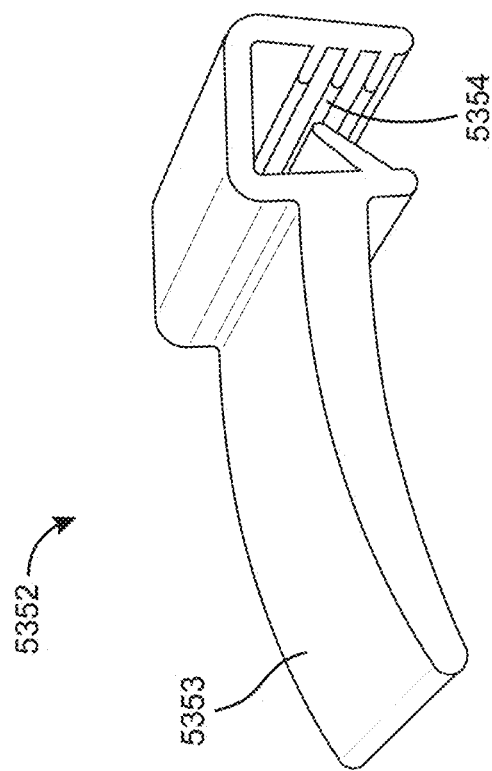
FIGS. 53D and 53E illustrate sealing members similar to those used in the ridge cap assembly of FIGS. 53A-53C, in accordance with some embodiments of the present disclosure.
Figure 53D:
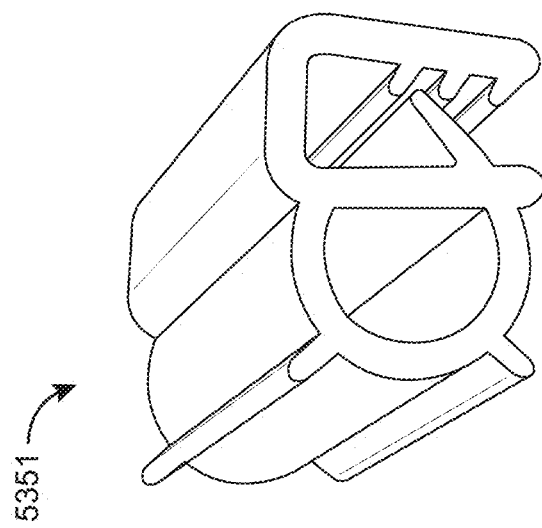

FIGS. 53D and 53E illustrate a third sealing member 5351 and a fourth sealing member 5352. The third sealing member 5351 may be substantially similar to the first sealing member 5301, except that the slot 5321 of 5301 extends further to engage more of the flange 5362 of the roof of the housing portion 120, 160. The fourth sealing member 5352 may be substantially similar to the second sealing member 5301, except that a cantilevered portion 5353 of the fourth sealing member 5352 is oriented perpendicular to the direction that a flange is inserted into the slot 5354, while the cantilevered portion of the second sealing member 5302 is oriented substantially in the same direction that a flange 5361 is inserted into the slot 5311.

Deck and Ramp Hand Winch

FIGS. 54A-54H illustrate a hand winch assembly 5400 for deploying and stowing the decks and ramps of a modular home (e.g., fold-down deck 2400, entryway assembly 2500, etc.), according to some embodiments. The hand winch assembly 5400 may be coupled, for example, to a floor assembly 1400 of the modular home 101, and may allow for the deployment of the decks and ramps by hand, without the need for an electrical power source. The hand winch assembly 5400 includes a removable handcrank lever 5402 coupled to the gearbox assembly 5420, which in turn is coupled to a winch shaft assembly 5440 coupled to a lug 5460. The lug 5460 may be welded, bolted, or otherwise coupled to the deck or ramp, such that rotation of the lug causes the rotation of the deck or ramp. The handcrank lever 5402 includes a handle 5404, an offset member 5406, and an input shaft 5408. The input shaft 5408 is coupled to a drive gear 5422 of the gearbox assembly 5420. A user (e.g., an employee of a modular home construction company) may hold the handle 5404 of the handcrank lever 5402 and rotate it about the input shaft 5408 to turn the drive gear 5422. In some embodiments, the hand winch assembly 5400 includes a bearing to hold the input shaft 5408 in line with the drive gear 5422. In some embodiments, the user may hold the input shaft with the user's other hand while rotating the handle 5404. The drive gear 5422 is configured to rotate a worm gear 5424, which in turn rotates a worm screw 5426, which is coupled to or formed on a worm drive shaft 5428. The worm gear 5424 may be larger than the drive gear 5422, such that output torque is increased and the deck or ramp can be lifted using a relatively low amount of manual force. The worm drive shaft 5428 is coupled to or integrally formed with a second worm screw 5430, which is configured to rotate a second worm gear 5432. The second worm gear 5432 is coupled to and configured to rotate the winch shaft assembly 5440.

Figure 54B:
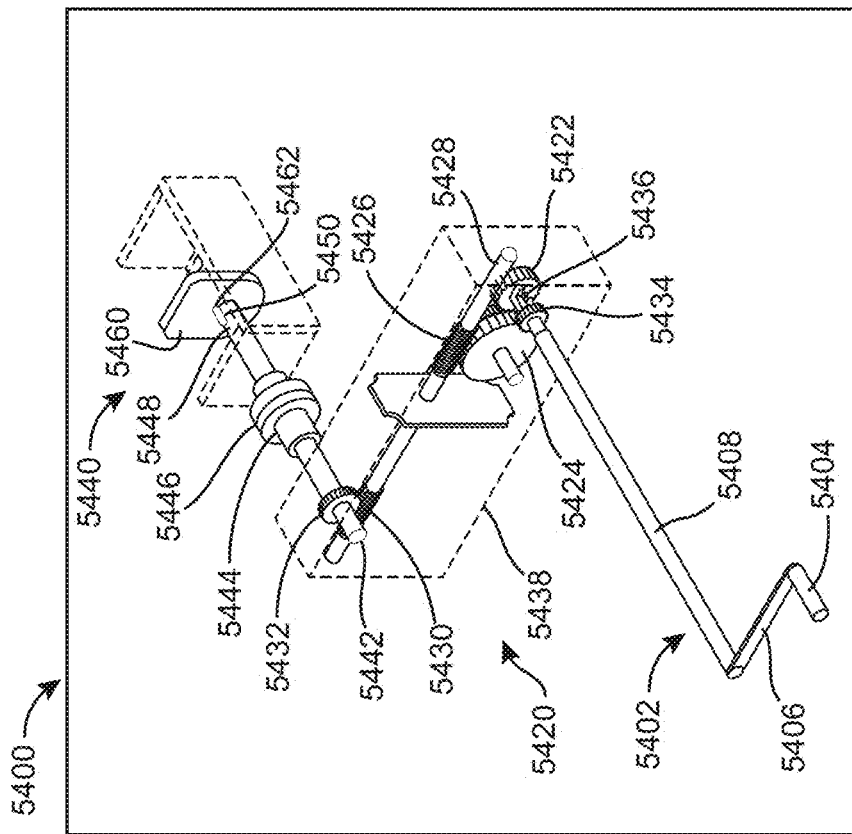
FIGS. 54A-54H illustrate a hand winch assembly for deploying and stowing decks and ramps of a modular home, in accordance with some embodiments of the present disclosure.
Figure 54A:
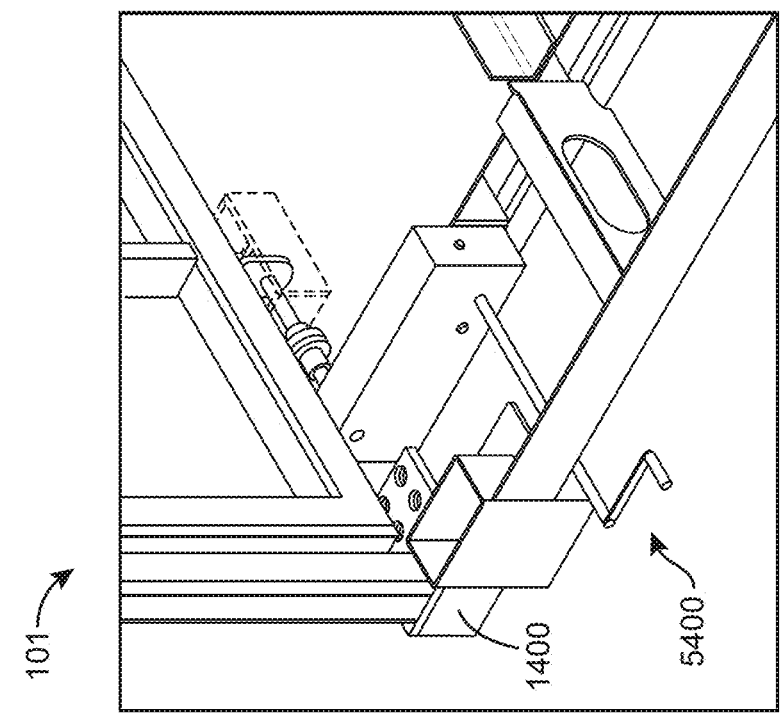

In some embodiments, the winch shaft assembly 5440 may include only a shaft. For case of assembly, in some embodiments (e.g., as shown in FIG. 54B), the winch shaft assembly 5440 may include an intermediate shaft 5442 coupled to the second worm gear 5432 at one end and to a first coupling 5444 at its other end. The first coupling 5444 may be coupled to a second coupling 5446, which is coupled to a winch shaft 5448. The winch shaft 5448 is coupled to and configured to rotate the lug 5460. The winch shaft 5448 may include one or more keyways 5450, and the lug 5460 may include one or more matching keyways 5462. A machine key may be inserted into each pair of keyways to rotatably couple the winch shaft 5448 to the lug 5460. In some embodiments, the gearbox assembly 5420 includes a two-way ratchet gear 5434 with a locking switch 5436. The ratchet gear 5434 may be configured to prevent the ramp or deck from free falling from a stowed position to the deployed position and back-driving the gearbox assembly 5420. The gearbox assembly 5420 may include an outer housing 5438 to protect the other components of the gear assembly from dirt and debris. The shafts 5428, 5442, 5448 and gears 5434, 5422, 5424 may be mounted to bearings to support rotation and maintain alignment. In some embodiments, an input shaft 5408 may be coupled to a powered device rather than to a manual handle 5404. For example, a user could couple a hand drill to an input shaft 5408 and may drive the gearbox assembly 5420 by activating the hand drill. In other embodiments, an actuator may be integrated into the gearbox assembly, and the gearbox assembly 5420 may be driven by the actuator in response to a user input, such as a press of a button coupled to the housing portion 120 or a selection of an option on a GUI of a user device like a tablet or smartphone. A hand winch assembly 5400 may be installed near each of the deployable ramps, decks, and awnings. The handcrank lever 5402 may be removable such that, once installed, the lever 5402 can be removed for aesthetic purposes and to prevent unauthorized operation of the hand winch assemblies 5400 after installation of the modular home 101.

Figures 54C, 54D:
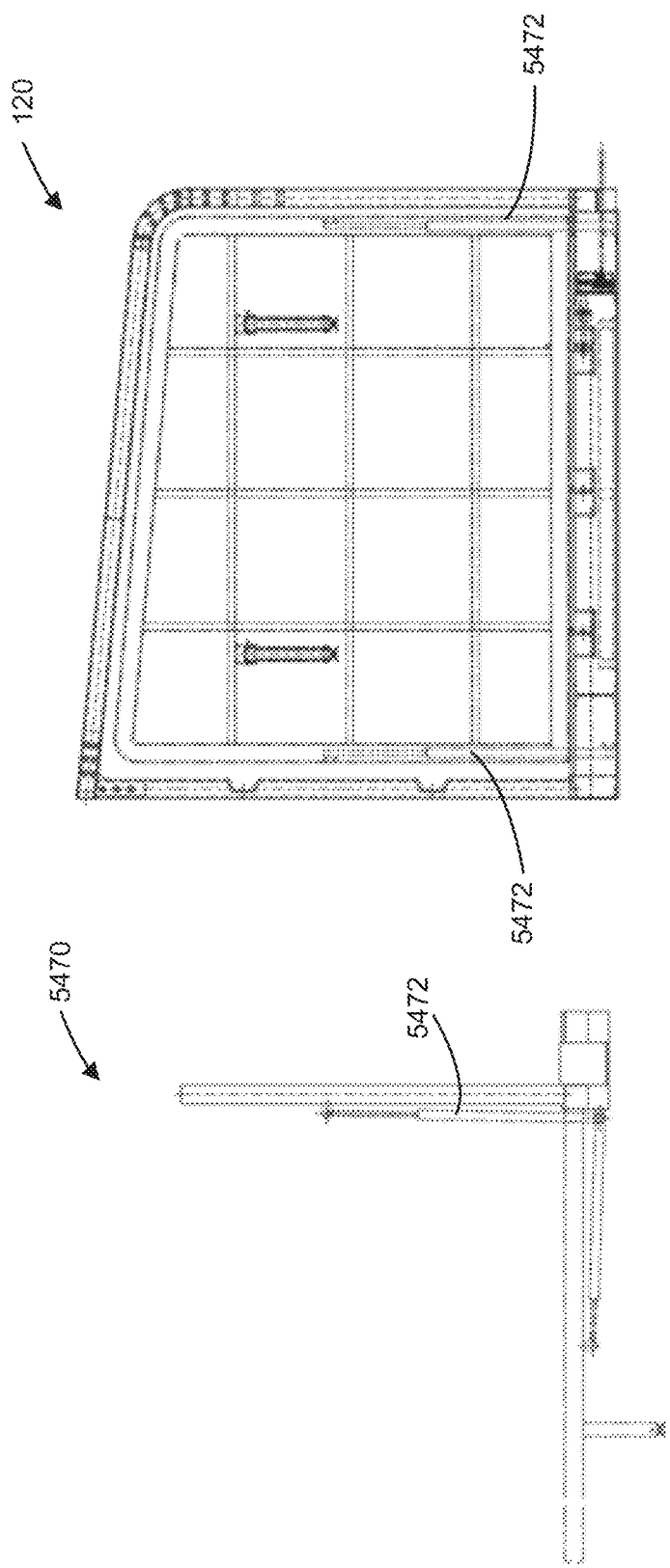
Figure 54F:
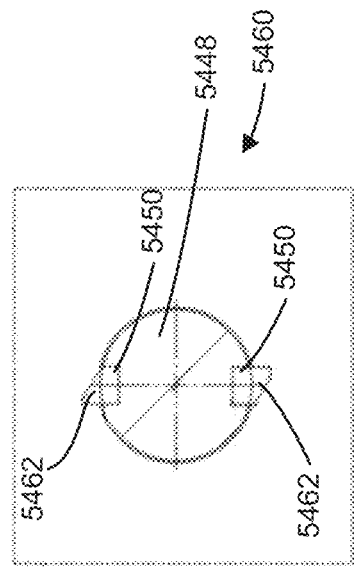
Figure 54H:
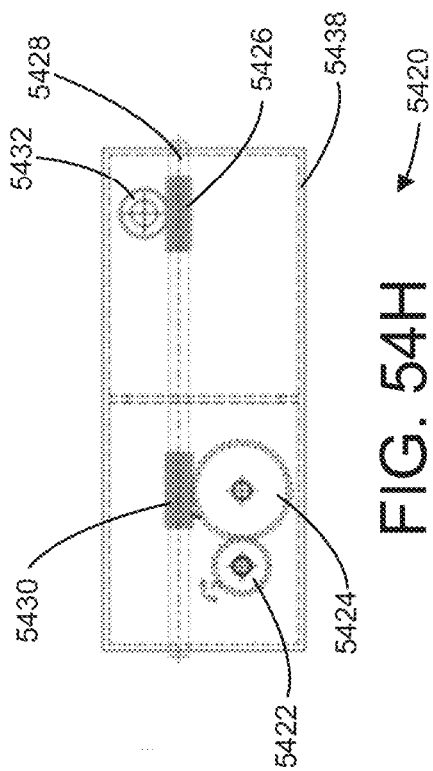
Figure 54E:
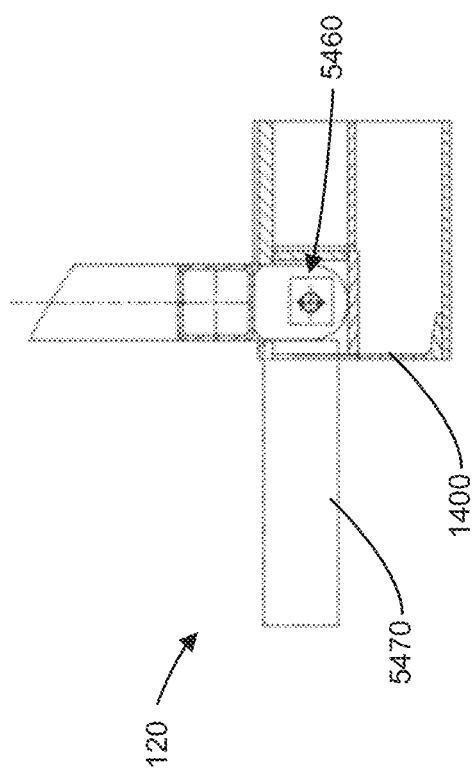
Figure 54G:
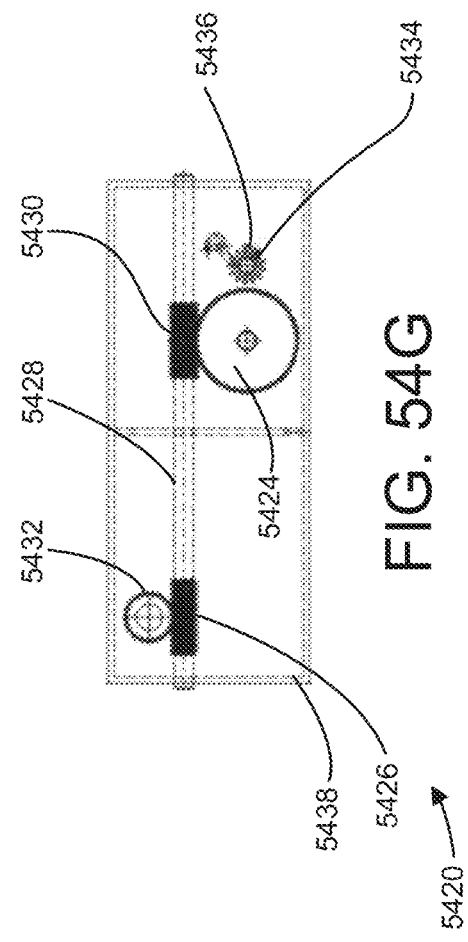

FIGS. 54C-54D illustrate a fold-down deck 5470 (e.g., similar to the fold down deck 2400) mounted to a housing portion (e.g., housing portion 120) that includes the hand winch assembly 5400, according to some embodiments. The fold-down deck 5470 may include one or more struts 5472 (e.g., gas springs) to dampen the downward motion when the deck 5470 is being lowered from the vertical, stored position to the horizontal, deployed position. The struts 5472 may also reduce the force required to lift the deck 5470 to the stowed position form the deployed position, thereby reducing the amount of manual force needed to turn the hand crank lever 5402. FIGS. 54E-54H show additional detail views of the gearbox assembly 5420, the lug 5460, and the fold-down deck 5470.

Bladder Tank Platforms

FIGS. 55A-55D illustrate a floor assembly 5500 (e.g., similar to the floor assembly 1400) of a housing portion of a modular home including two bladder tank support assemblies 5510, according to some embodiments. The bladder tank support assemblies 5510 include a support platform 5512 suspended by four cables 5514 (e.g., wire ropes) from the floor frame 5502. The support platforms 5512 are configured to support the bladder tanks (e.g. bladder tanks 1411) or batteries configured to store power for use in the modular home 101. The cables 5514 of the support platforms 5512 to be raised and lowered using a hand winch assembly 5516. The support platforms at 5512 provide a rigid surface to protect the bladder tanks 1411 from potentially damage due to uneven and sharp surfaces below the floor assembly 5500. Though not shown in FIGS. 55A-55D, the frame 5502 of the floor assembly 5500 may include one or more lower plates (e.g., skid plates 1405 of the floor assembly 1400) coupled to the bottom of the floor joists 5504. The support platforms 5512 may be lowered from an upper position in which the support platforms 5512 are received within an opening in the lower plate (e.g., the openings 1413 in the skid plates 1405 shown in in FIGS. 14A-14C) to a lower position below the floor assembly 5500. For example, the support platform 5512 may be lowered to the ground at the installation location when the linear actuators 1001 have lowered the modular home to the installed height. In the upper position, a lower surface of the support platform 5512 may be substantially flush with a lower surface of the skid plate 1405. In some embodiments, when the support platform 5512 is in the upper position, an upper surface of the support platform 5512 may contact a lower surface of the floor assembly 5500 within the opening 1413. Thus, when the modular home 101 is rotated on the bed of the trailer 30, the support platform 5512 may bear a portion of the weight of the modular home 101. This may further reduce the friction between the modular home and the trailer by distributing the weight of the modular home 101 across a larger surface area.

Figure 55B:
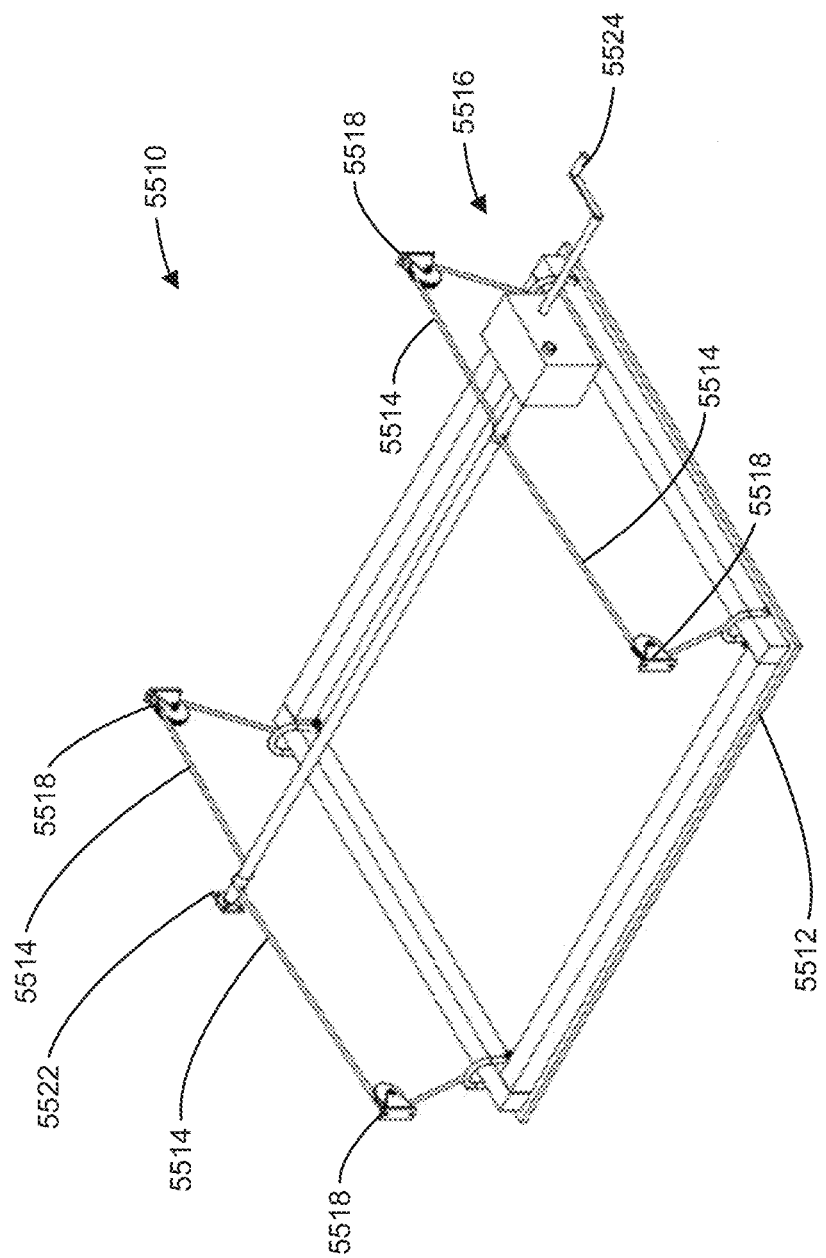

Referring now to FIG. 55B, a bladder tank support assembly 5510 is shown in further detail, according to some embodiments. Four pulleys 5518 are configured to be coupled to the frame 5502 of the floor assembly 5500. The cables 5514 extend through and are rotatably coupled to the pulleys 5518, such that the support platform 5512 hangs from the pulleys 5518 via the cables 5514. The hand winch assembly 5516 may be substantially similar to the hand winch assembly 5400, except that the winch shaft assembly 5440 is replaced with a larger winch shaft 5520 that extends across the support platform 5512. The hand winch assembly 5516 and a shaft bracket 5522 may be coupled to the floor frame 5502 to support the winch shaft 5520. The winch shaft is 5520 may rotate relative to the hand winch assembly 5516 and the shaft bracket 5522 when the removable hand crank lever 5524 is rotated by a user. The cables 5514 may be coupled to the winch shaft 5520 such that when the winch shaft 5520 is rotated using the hand winch assembly 5516, the cables 5514 wrap around the winch shaft 5520. As the cables 5514 wrap around the winch shaft 5520, the cables 5514 are pulled through the pulleys 5518 causing the support platform 5512 to be lifted. The hand winch assembly 5516 can be operated in reverse by rotating the hand crank lever 5524 in the opposite direction to lower the support platform 5512. As the winch shaft 5520 rotates in reverse, the cables 5514 unwrap from the winch shaft 5520 and the support platform 5512 is lowered. The hand winch assembly 5516 may be accessible from underneath the floor frame 5502, or the hand crank lever 5524 may extend beyond the edge of the floor frame 5502 so that the pin and winch assembly 5516 may be operated from the side of the housing portion 120. As discussed above with respect to the hand winch assembly 5400, in some embodiments, the hand winch assembly 5516 may be powered by an integrated or external powered actuator or motor.

Figure 55C:
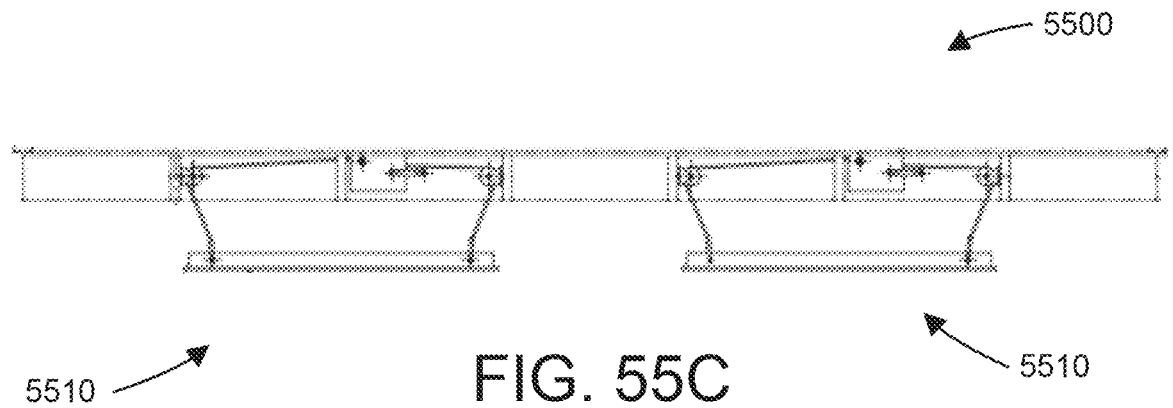
Figure 55D:
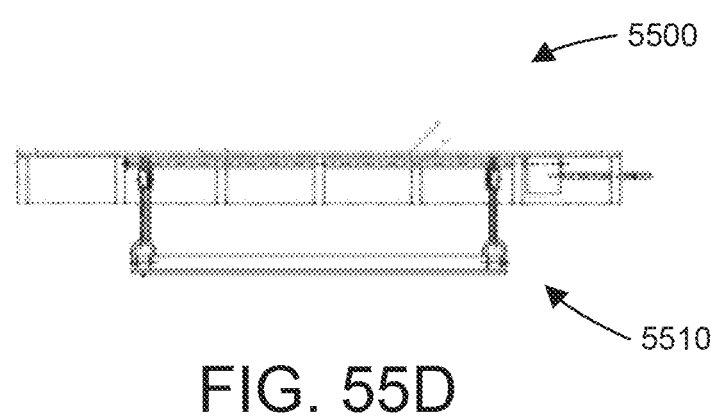

FIGS. 55C-55D show a side view and a section view of the floor assembly 5500, including the bladder tank support assemblies 5510. The support platforms 5512 may be lowered using the hand winch assembly 5516 until the support platforms 5512 rest on the ground or the support platforms 5512 may remain suspended by the cables 5514 at a desired distance below the floor frame 5502. Once the support platforms 5512 have been lowered, the bladder tanks 1411 can be inflated for use. The support platform 5512 may protect the bladder tanks 1411 from potential wear and punctures due to the condition of the ground at the installation site. The support platform 5512 may include integrated heating elements (e.g., electric resistance heaters, heating wires, hot water pipes or tubes, etc.) to heat the bladder tanks 1411. In some embodiments, the modular home 101 may include one or more temperature sensors (e.g., thermometers, thermocouples, etc.) configured to monitor the temperature of the contents of a bladder tank 1411. The modular home or the bladder tank support assembly 5510 supporting the bladder tank 1411 may include a controller including a processor and memory. The memory may store instructions that, when executed by the processor, cause the controller to receive temperature data from the temperature sensor. The instructions may further cause the controller to control and adjust the operation of the heating elements based on the temperature data. For example, a digester bladder tank 1411 for human waste received from the living area of the modular home 101 may operate most efficiently at a specific predetermined temperature. If the temperature in the digester bladder tank 1411 drops below the predetermined temperature, as measured by the temperature sensor, the controller may activate or increase the heat output by the heating elements, for example, by increasing the electrical current through a resistance heater. In some embodiments, a shroud 5526 (e.g., a bellows-style shroud) may surround the gap between the support platform 5512 and the floor frame 5502 for additional protection and thermal insulation of the bladder tank 1411. The shroud 5526 may include heating elements similar to those included in the support platform 5512, which may similarly be operated by the controller based on the detected temperature of the contents of an associated bladder tanks 1411. In some embodiments, the floor assembly 5500 may include access panels accessible via the living area of the modular home 101. A user may use the hand winch assembly 5516 to raise the support platform 5512 such that maintenance can be performed on the bladder tank 1411 or batteries positioned on the support platform 5512 from inside the living area.

When the support platform 5512 is in the lower position and the bladder tanks 1411 are inflated, the bladder tanks 1411 may extend into the opening 1413 in the skid plate 1405, as shown in FIG. 17. Referring still to FIG. 17, an intermediate plate 1705 may be positioned above the opening and between and parallel to the upper plate 1401 and the skid plate 1405. The intermediate plate 1705 may have a footprint that covers the entire opening 1413 such that the upper plate 1401 cannot be accessed via the opening 1413. Thus, the intermediate plate 1705 may substantially seal the opening 1413 such that water, cold air, and animals cannot reach the upper plate 1401. Insulation may also be positioned between the intermediate plate 1705 and the upper plate 1401 to improve temperature control within the living area of the modular home 101. In some embodiments, the intermediate plate 1705 may also function as the second plate 1474 described above with reference to FIGS. 14A-14C. When deflated, the bladder tanks 1411 may fit between the support platform 5512 and the intermediate plate 1705. The support platform 5512 may include a base plate 5542 and a plurality of support member 5544 coupled to the perimeter of the base plate 5542. The support members 5544 may contact the intermediate plate 1705 and a deflated bladder tank may fit between the base plate 5542 and the intermediate plate 1705. In some embodiments, when the support platform 5512 is in the lower position and the bladder tanks 1411 are inflated, the bladder tanks 1411 may extend to and contact the intermediate plate 1705.

Figure 55E:
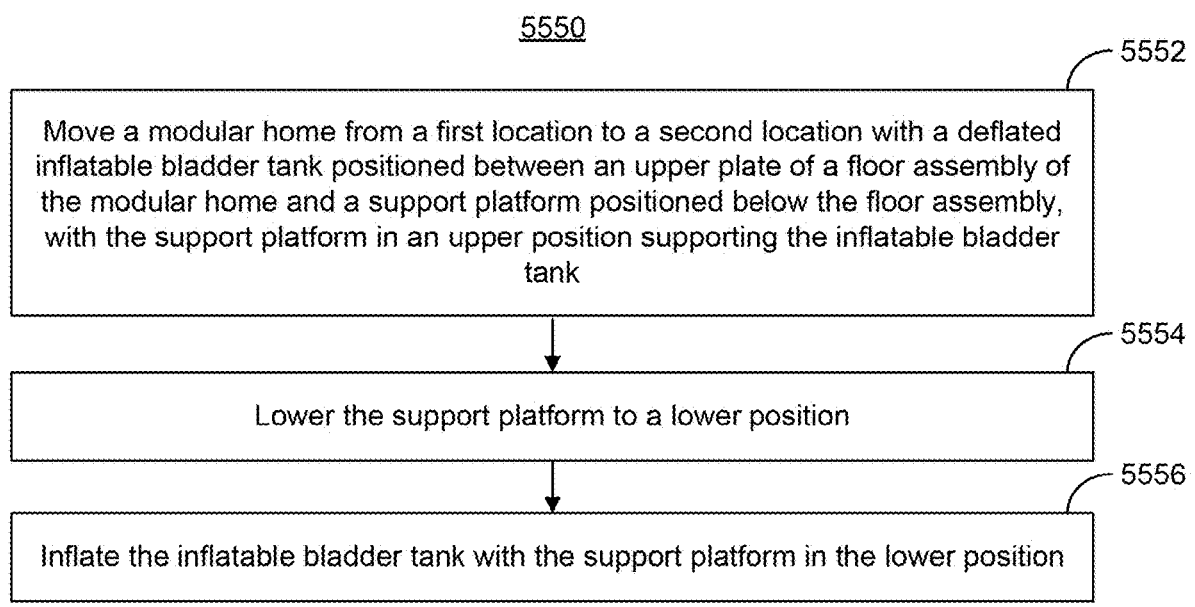
FIG. 55E is an example method for transporting a modular home, in accordance with some embodiments.

Referring now to FIG. 55E, a method 5550 for transporting a modular home (e.g., the modular home 101) is described, in accordance with some embodiments. The method 5550 may include any number of operations and the operations may be performed in any order. The method 5550 may be performed by equipment of a modular home construction company (e.g., the components of the trailer 30, shown and described with reference to FIG. 45). At operation 5552 of the method 5550, a modular home (e.g., modular home 101) is moved from a first location to a second location with a deflated inflatable bladder tank (e.g., the bladder tank 1411) positioned between an upper plate of a floor assembly (e.g., the upper plate 1401 of the floor assembly 1400) of the modular home 101 and a support platform (e.g., the support platform 5512) positioned below the floor assembly 1400, with the support platform 5512 in an upper position supporting the inflatable bladder tank 1411. In the upper position, the lower surface of the support platform 5512 and the lower surface of the skid plates 1405 may be substantially flush, and the deflated bladder tank 1411 may fit between the support platform and the second plate 1474 (e.g., the intermediate plate 1705). If the floor assembly 1400 does not include the intermediate plate 1705, the deflated bladder tank 1411 may fit between the support platform and the upper plate 1401. At operation 5554 of the method 5550, the support platform 5512 is lowered to a lower position. As described above, the support platform 5512 may be suspended from a plurality of cables 5514 run through pulleys 5518 and coupled to a shaft 5520. Lowering the support platform 5512 may include operating a winch assembly (e.g., hand winch assembly 5516) to unwrap the plurality of cables 5514 from a shaft 5520. In some embodiments, the support platform 5512 may be on the ground at an installation site when in the lower position. In some embodiments, the support platform 5512 may remain suspended by the cables 5514 above the ground when in the lower position. At operation 5556 of the method 5500, with the support platform 5512 in the lower position, the bladder tank 1411 is inflated. The bladder tank 1411 may be sized such that, when the bladder tank 1411 inflates, it expands from the support platform 5512 to the intermediate plate 1705 or to the upper plate 1401 if the flooring assembly does not include an intermediate plate 1705.

Modular Home Unloading

Figure 56A:
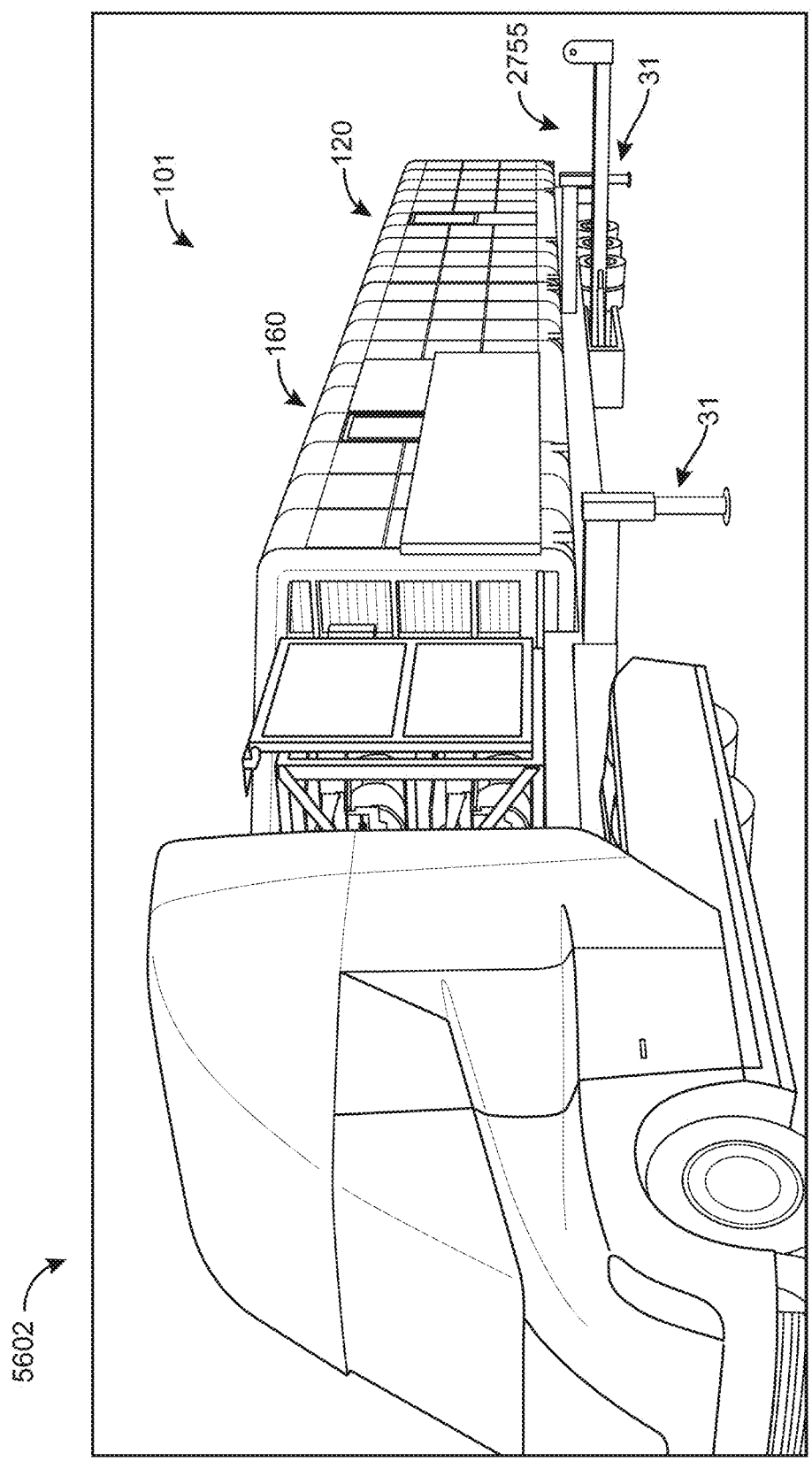
FIGS. 56A-56O illustrate a sequence for unloading a modular home from the bed of a trailer, in accordance with some embodiments of the present disclosure.
Figure 56B:
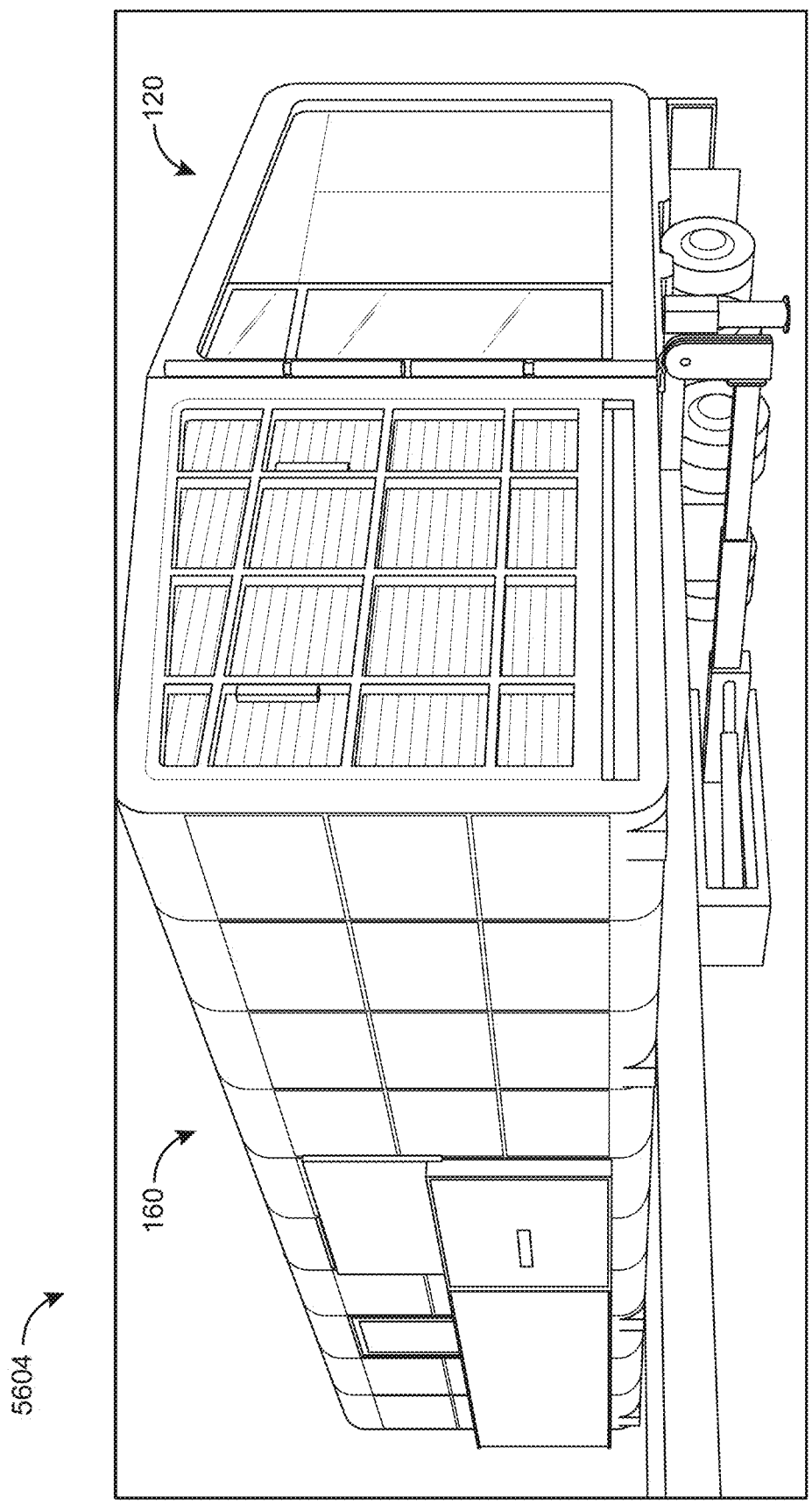
Figure 56C:
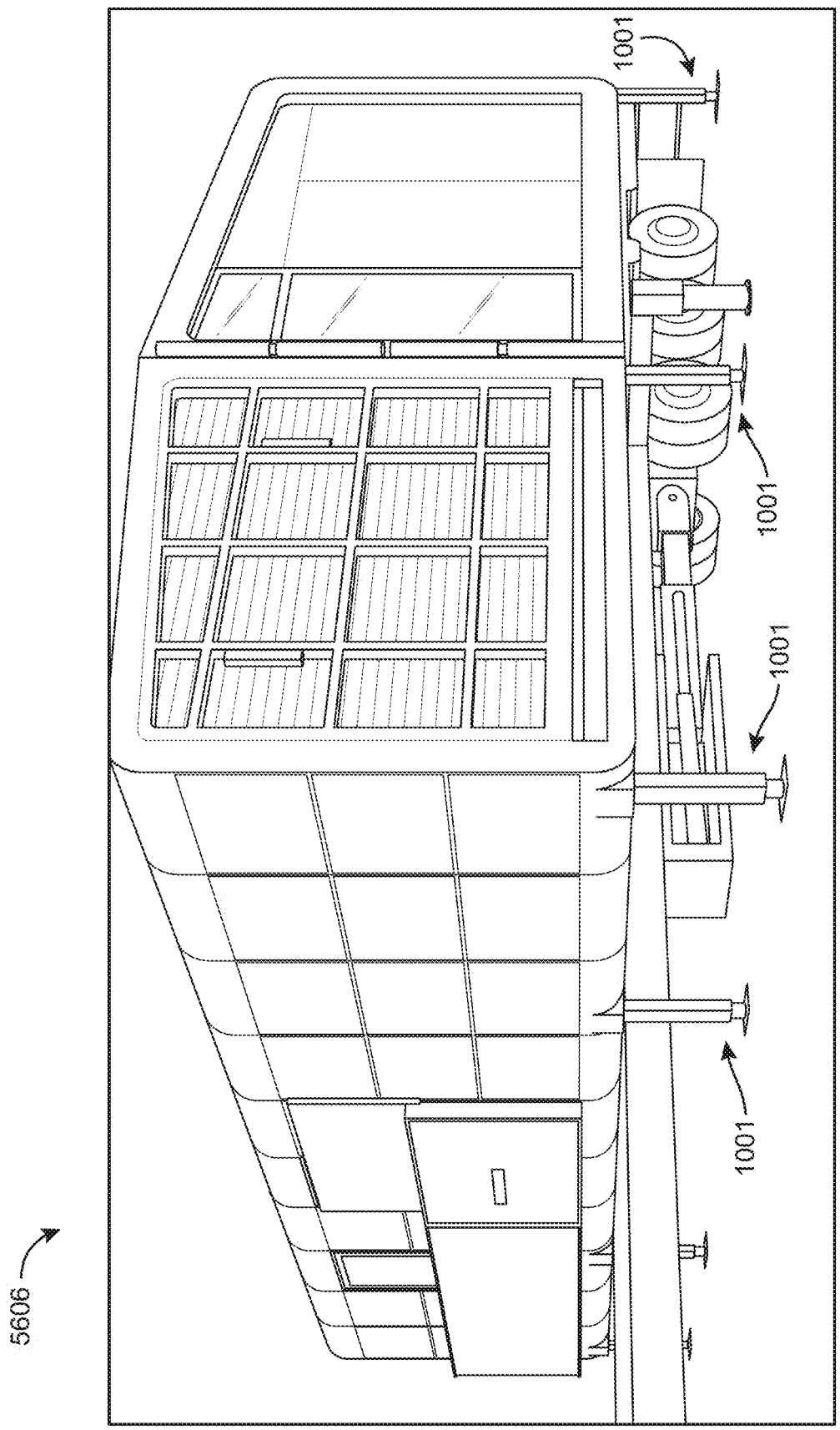
Figure 56E:
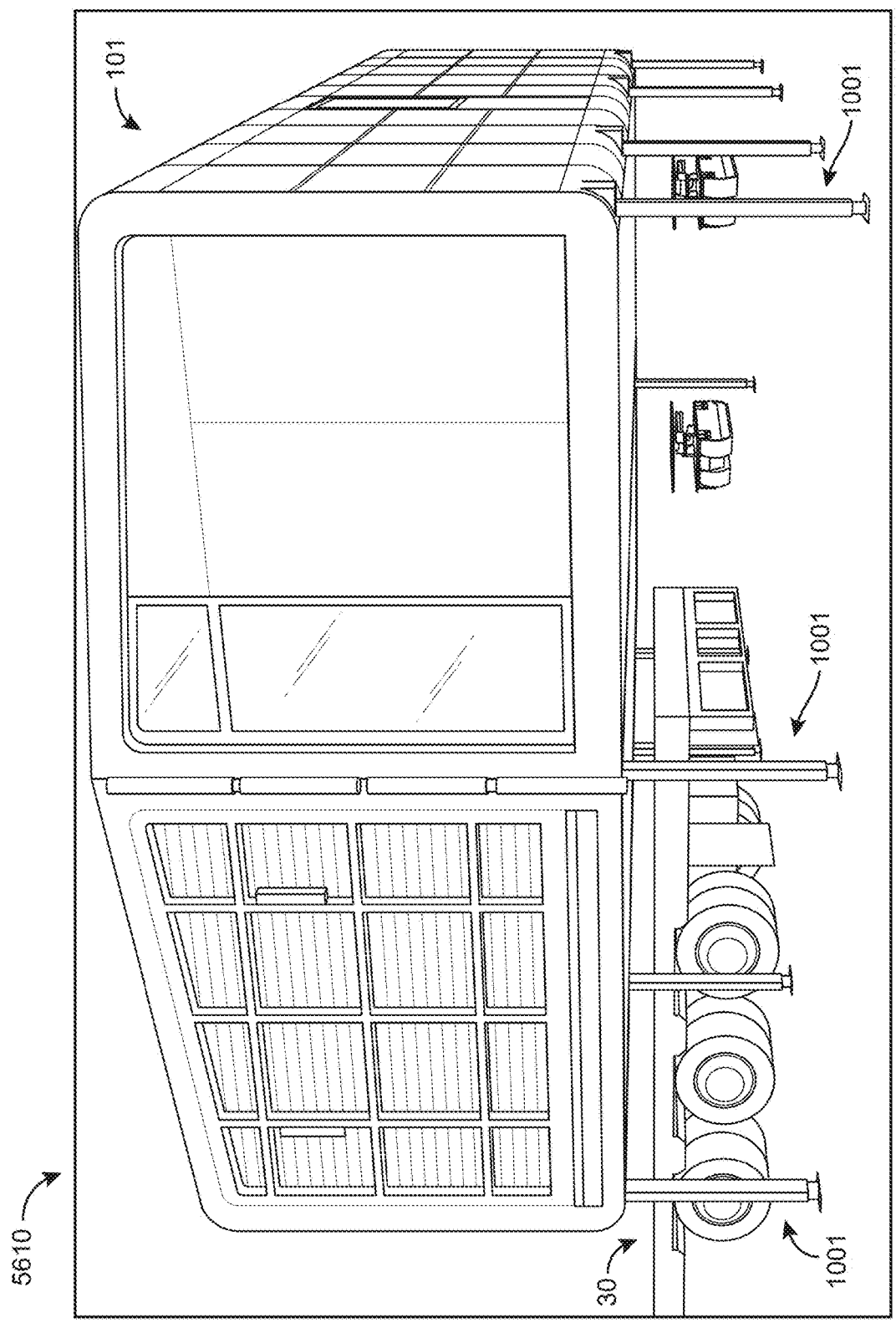
Figure 56F:
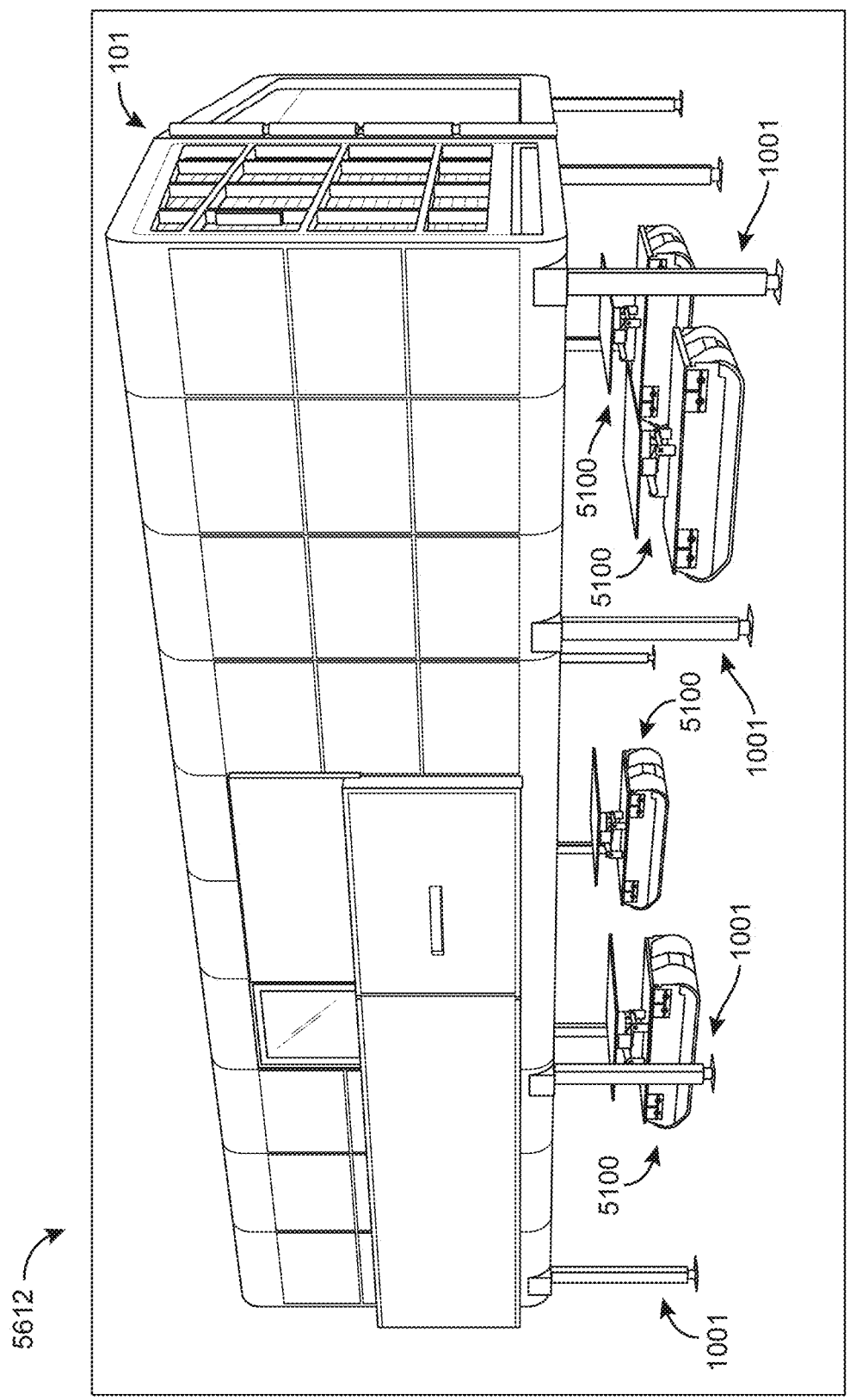
Figure 56H:
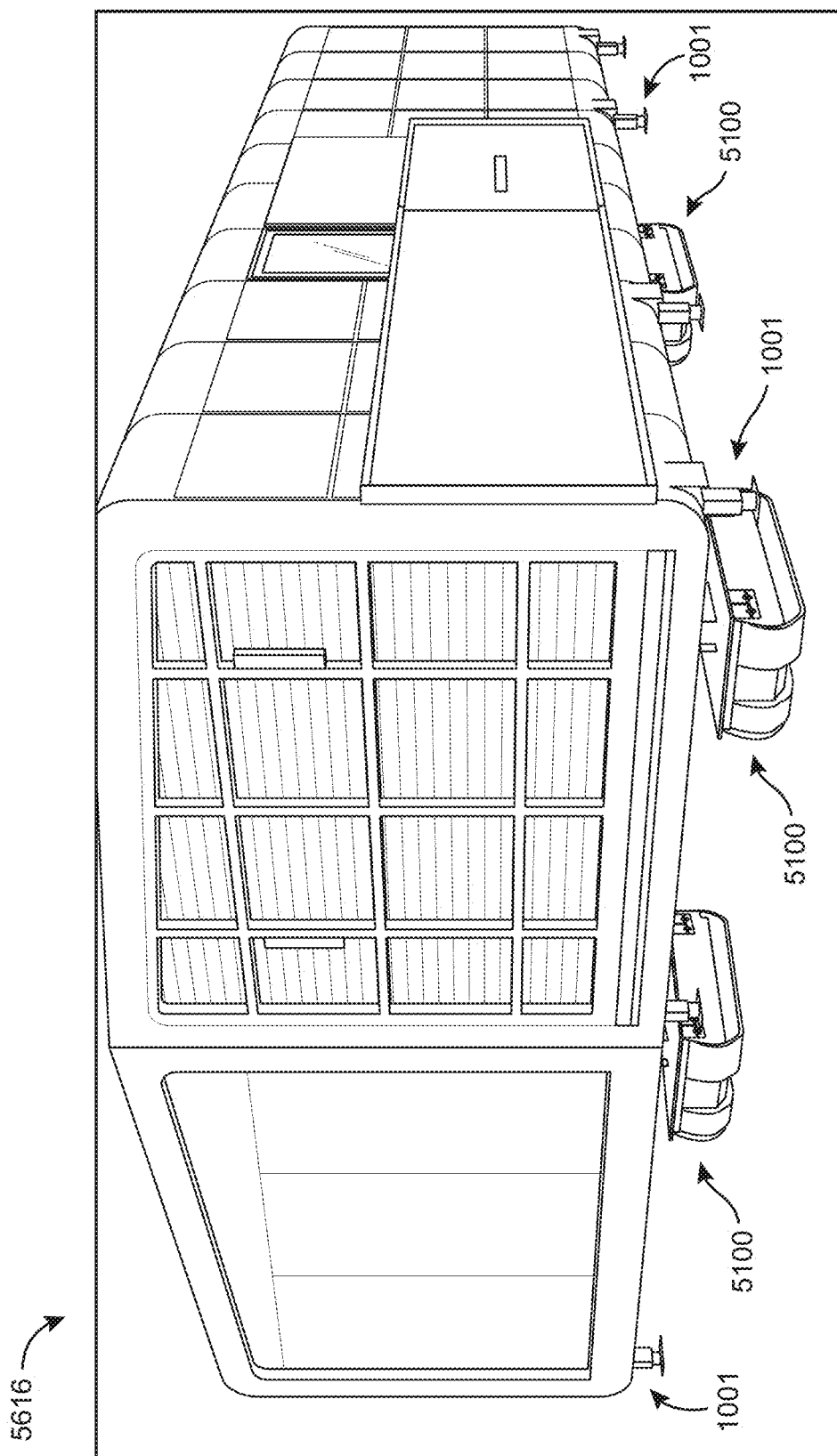
Figure 56I:
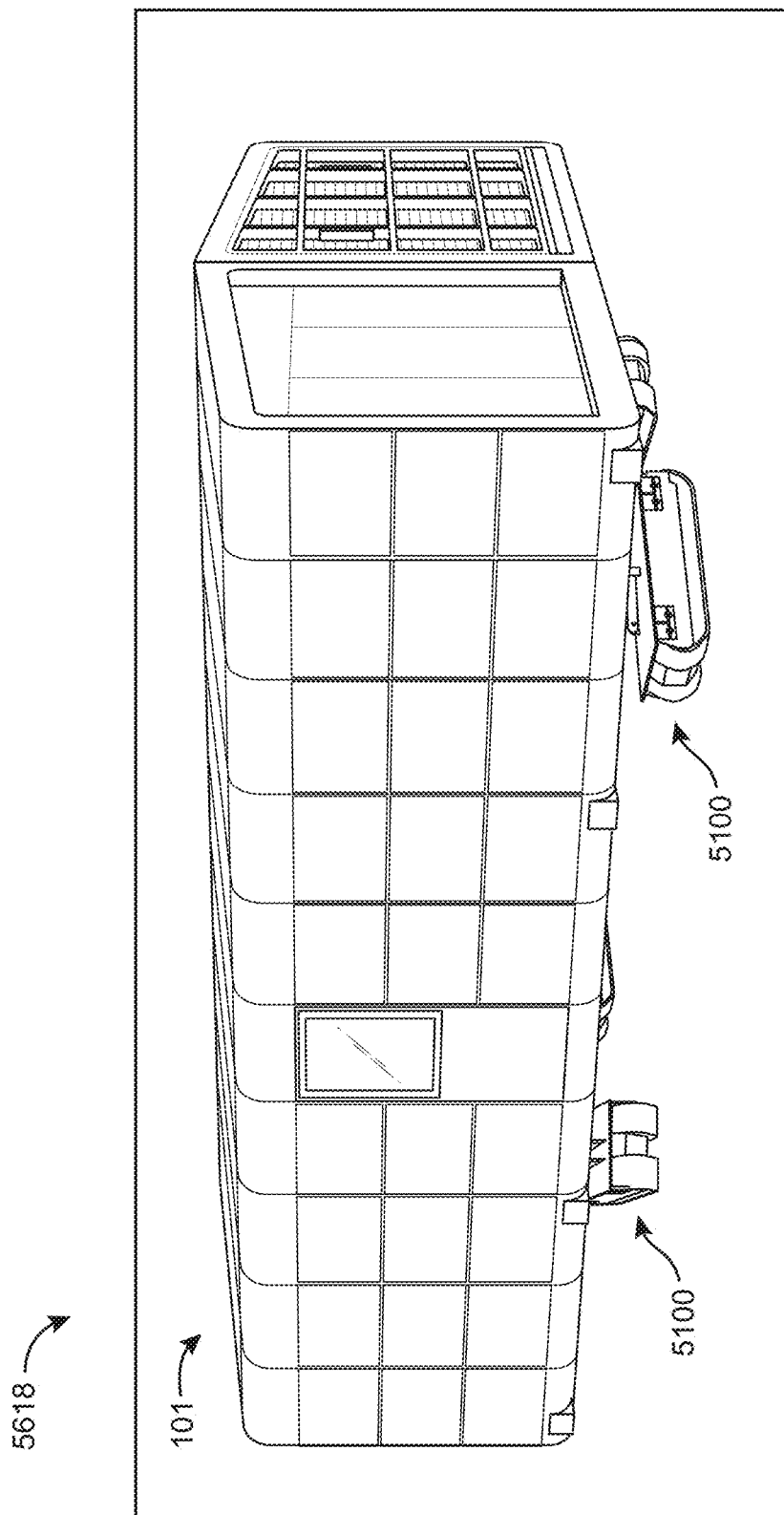
Figure 56J:
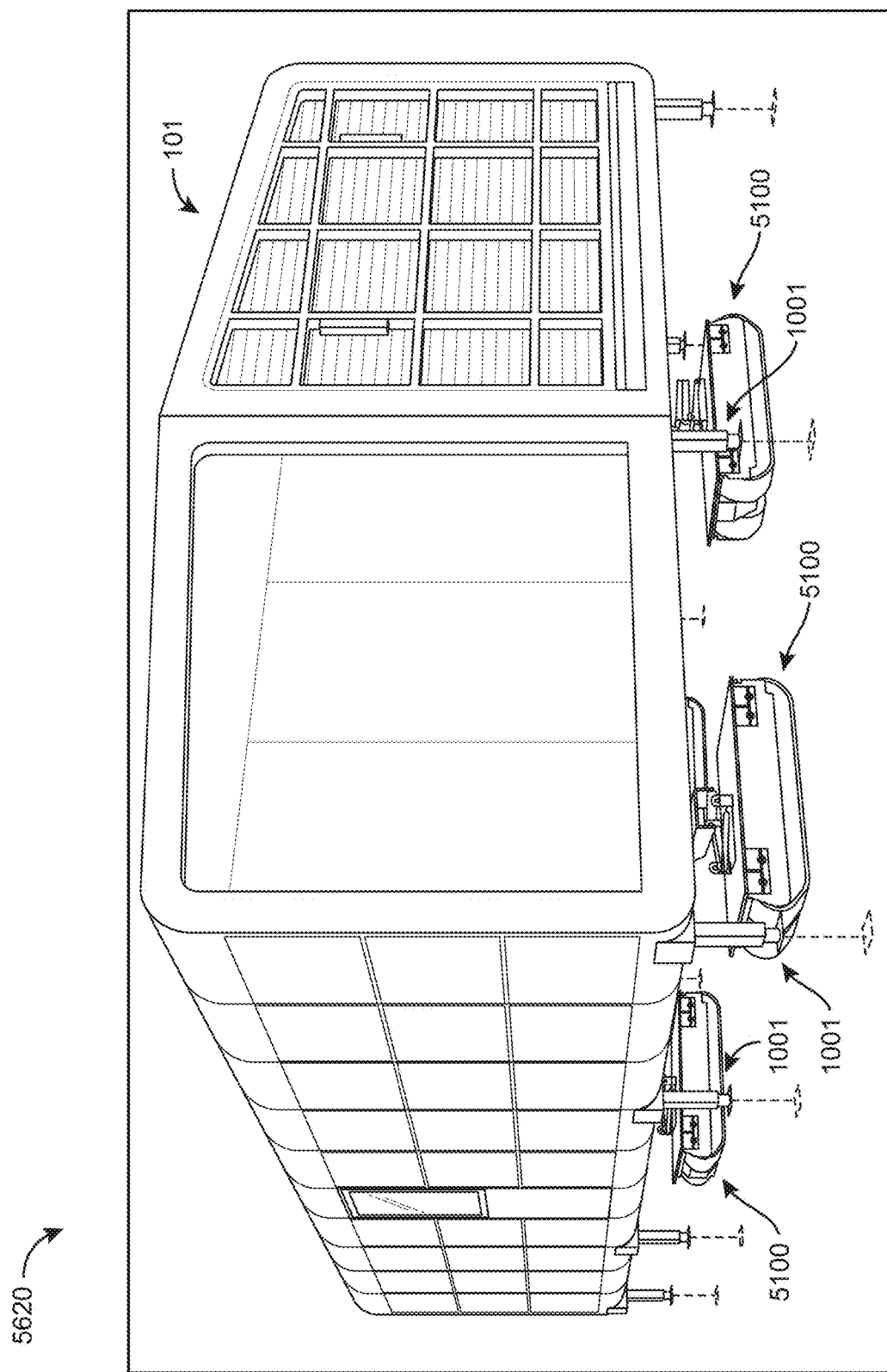
Figure 56L:
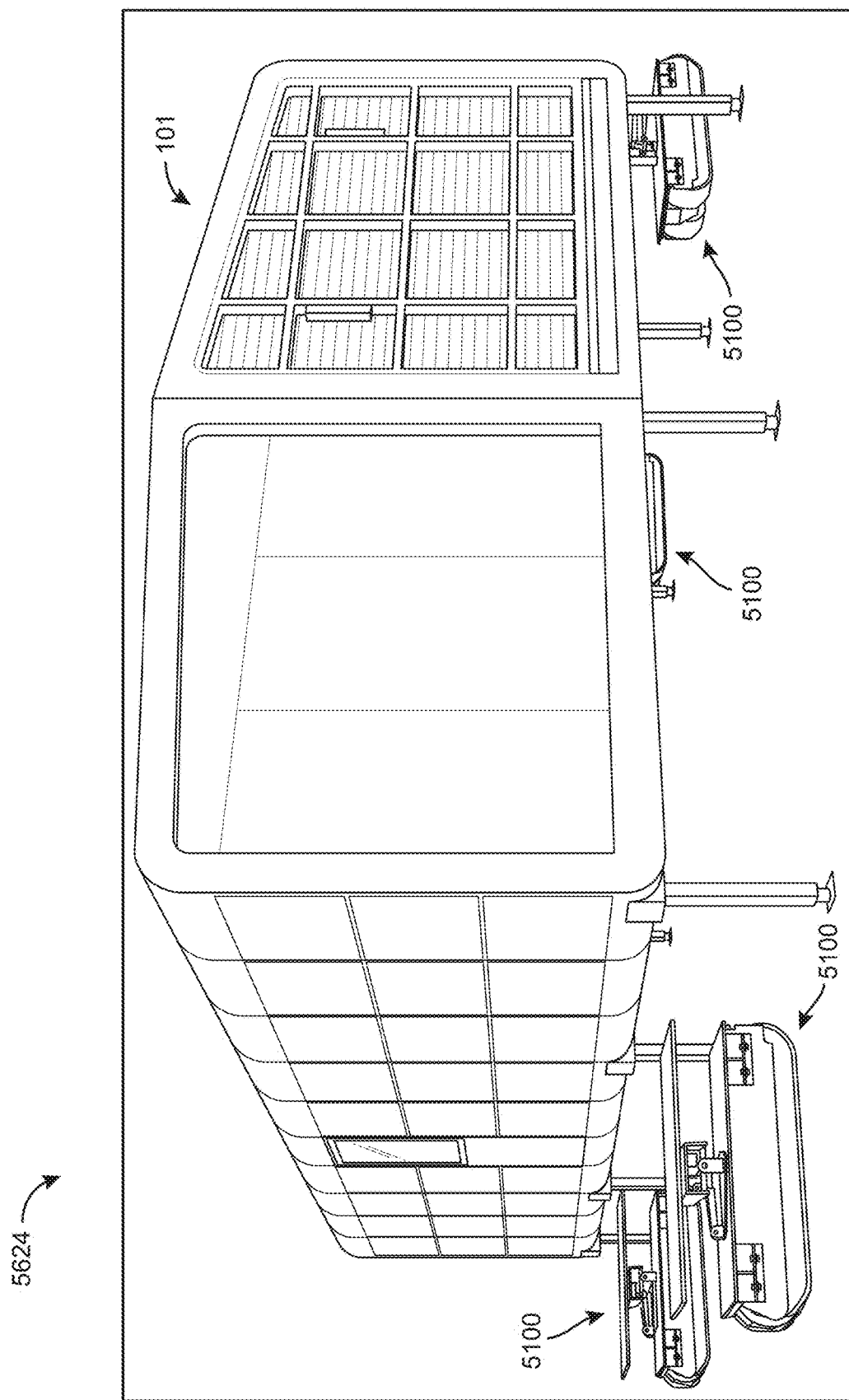
Figure 56M:
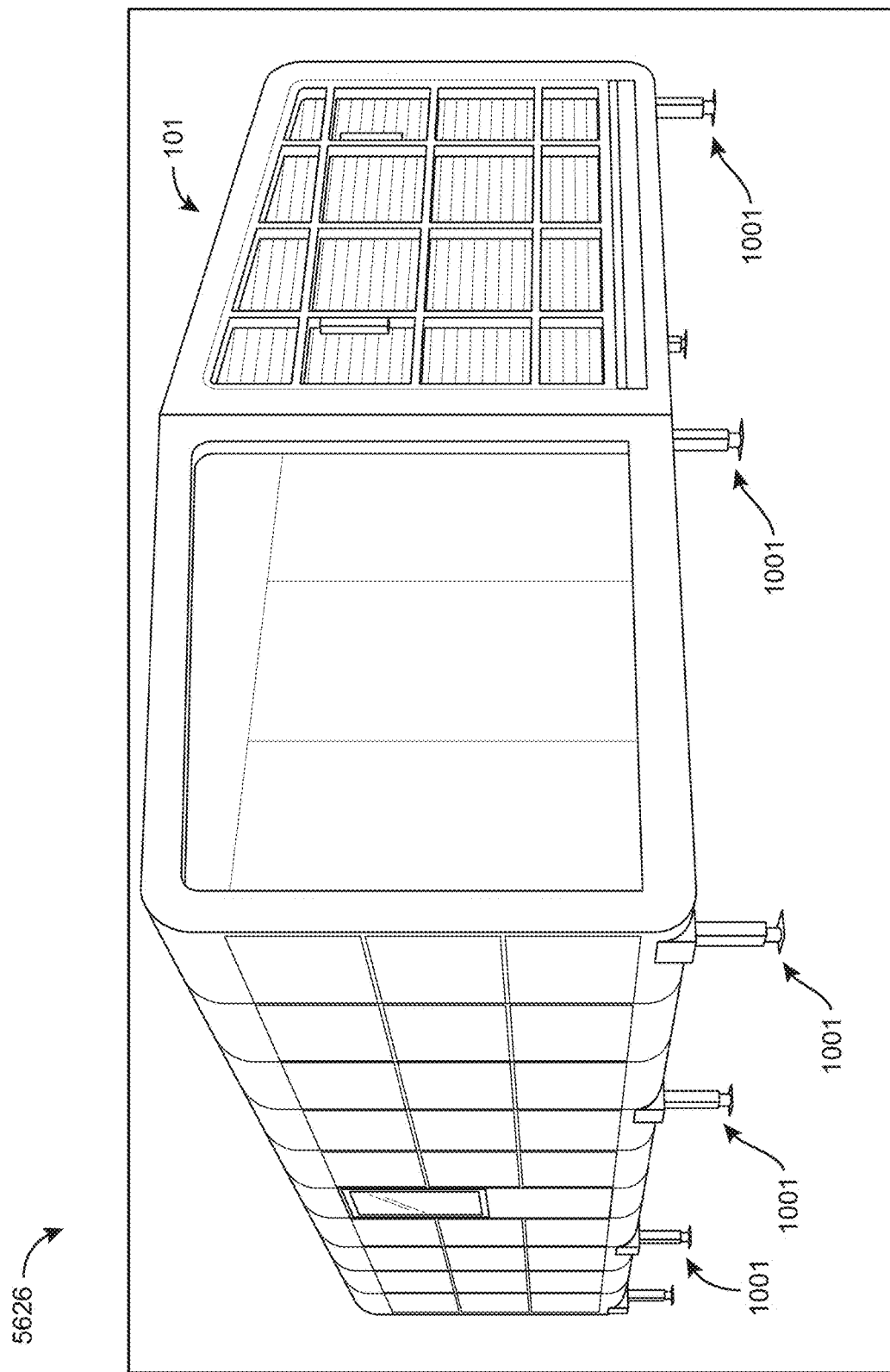
Figure 56N:
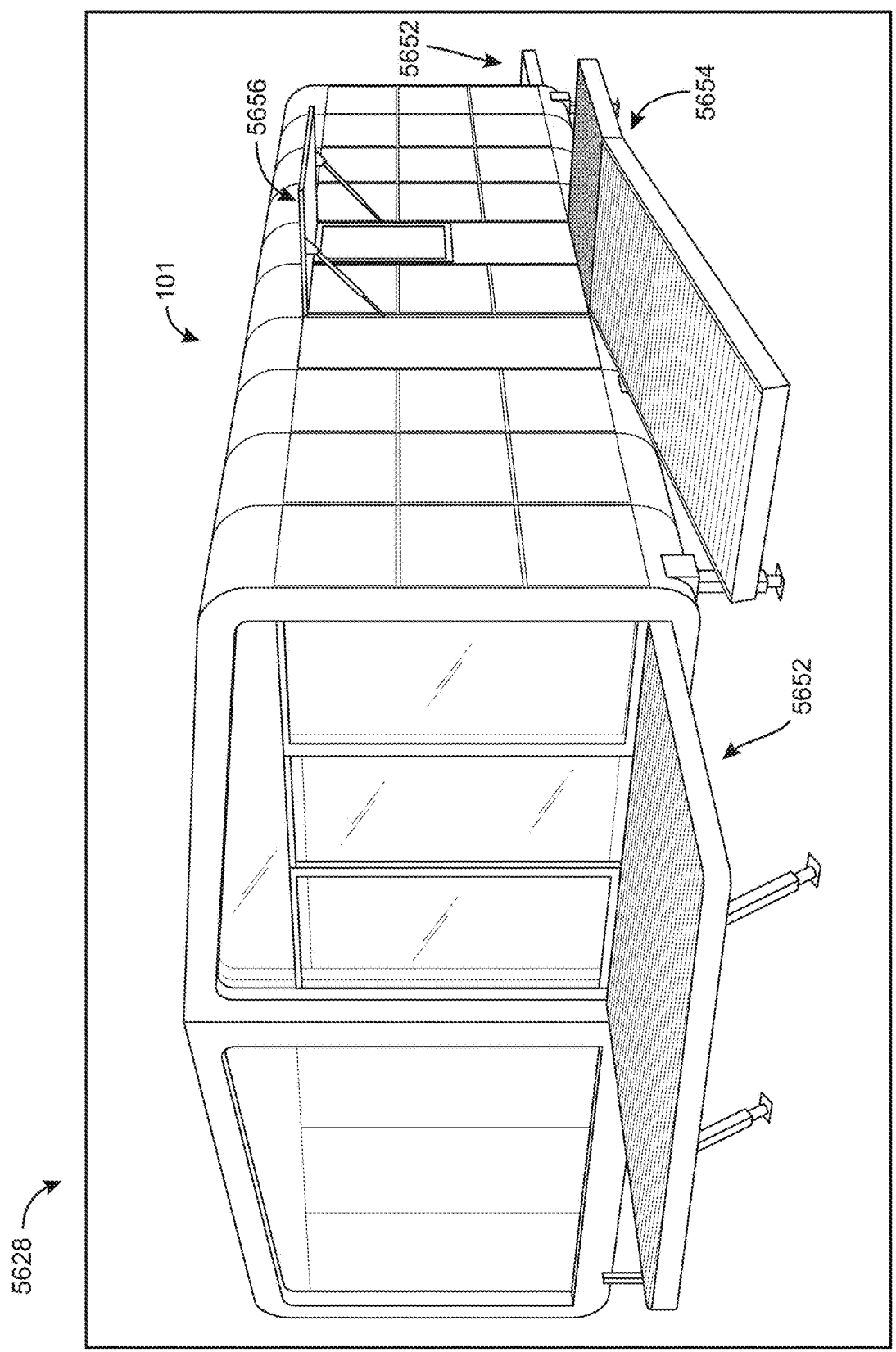
Figure 560:
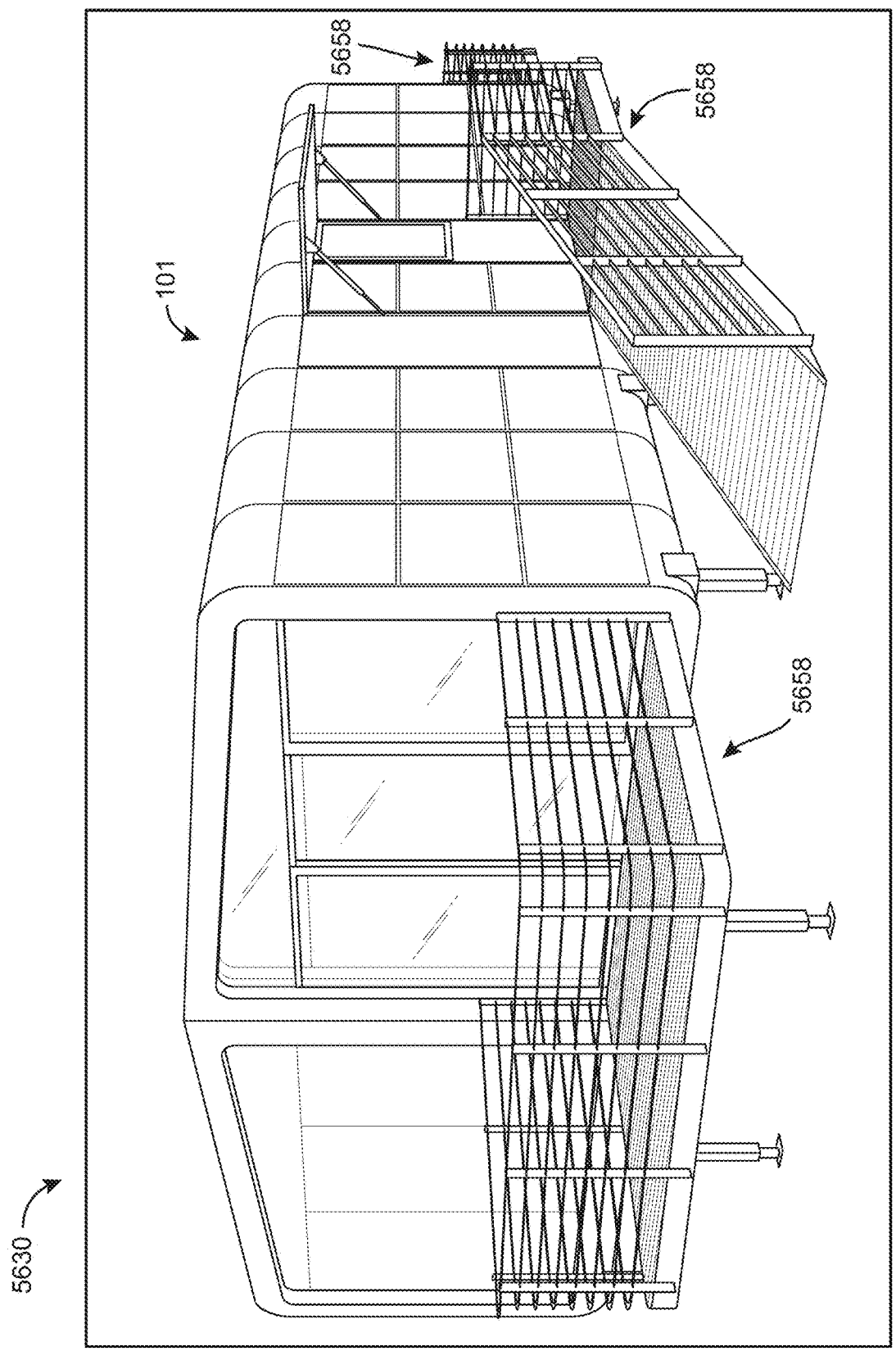

Referring now to FIGS. 56A-56O, a sequence 5600 for unloading a modular home (e.g., modular home 101) from the bed of a trailer (e.g., the trailer 30) in accordance with the systems and methods described herein is shown, according to some embodiments. Portions of the sequence 5600 may be similar or identical to portions of the methods and sequences described above relating to rotating the modular home 101 and unloading the modular home 101 from the trailer 30. The sequence 5600 may include any number of operations and the operations may be performed in any order. The sequence 5600 may be performed by equipment of a modular home construction company (e.g., the components of system 4500, shown and described with reference to FIG. 45). In the sequence 5600, two housing portions 120, 160 may be positioned on the bed of the bed of the trailer 30. The housing portions 120, 140 may be two halves of a single modular home 101 split down the middle of the modular home 101. At operation 5602 of the sequence 5600, trailer outriggers 31 may extend downward to the ground to support the trailer 30, and an extendable winch assembly (e.g., extendable winch assembly 2755) extends from the side of the trailer 30. At operation 5604 of the sequence 5600, the extendable winch assembly 2755 is coupled to the modular home 101, and the housing portions 120, 160 are each rotated approximately ninety degrees using the extendable winch assembly 2755. At operation 5606 of the sequence 5600, linear actuators coupled to the housing portions 120, 160 (e.g., linear actuators 1001) extend downward to the ground. At operation 5608 of the sequence 5600, the linear actuators 1001 engage the ground and lift the modular home 101 off of the trailer 30 and the outriggers 31 of the trailer are lifted. Unlike several of the other methods described above, the linear actuators 1001 extend directly to the ground rather than engaging with crawlers. At operation 5610 of the sequence 5600, the trailer 30 is moved out from underneath the modular home 101, which is fully supported by the linear actuators 1001.

At operation 5612 of the sequence 5600, a plurality of crawlers (e.g., crawlers 5100) are moved underneath the modular home 101. At operation 5614 of the sequence 5600, the linear actuators 1001 lower the modular home 101 onto the plurality of crawlers 5100. Because the trailer 30 has moved out from underneath the modular home 101, one or more of the crawlers 5100 are able to move under the center of the modular home 101 which was previously supported by the trailer 30. In some embodiments, a single crawler 5100 may be positioned under the center of the modular home 101 and may be capable of supporting the modular home 101 without the use of additional crawlers 5100. Additionally, because the linear actuators 1001 are able to lower the modular home 101 onto the crawlers 5100, the crawlers 5100 may not require a support platform that is able to be raised and lowered. At operation 5616 of the sequence 5600, the linear actuators 1001 continue to retract such that the modular home 101 is entirely supported by the crawlers 5100 and the linear actuators 1001 are no longer in contact with the ground. At operation 5618 of the sequence 5600, the crawlers 5100 move across the ground to carry the modular home 101 to the installation location. At operation 5620 of the sequence 5600, the linear actuators 1001 again extend downward from the modular home 101 towards the ground. At operation 5622 of the sequence 5600, the linear actuators 1001 lift the modular home 101 off of the plurality of crawlers 5100 such that the modular home 101 is completely supported by the linear actuators 1001. At operation 5624 of the sequence 5600, the plurality of crawlers 5100 move out from underneath the modular home 101. The crawlers 5100 may return to a crawler hotel on the trailer 30, or may move underneath a second modular home 101 being unloaded from a second trailer. At operation 5626 of the sequence 5600, the linear actuators 1001 lower the modular home 101 to an installed height. The installed height may be a predetermined height at which the modular home 101 can be lived in or otherwise accessed by a user. At the installed height, fold-down decks, fold-down ramps, and/or fold-down stairs may be properly deployed such that the support legs contact the ground and the ramps, decks, and stairs are level. The installed height may also allow the bladder tanks to be deployed underneath the modular home 101. At the installed height, the linear actuators may be locked into place such that the rod of the linear actuator 1001 is unable to retract farther into the housing of a linear actuator 1001 and the modular home 101 may remain at the installed height even if hydraulic pressure or electrical power to the linear actuator 1001 is lost.

In some embodiments, the crawlers 5100 may still include a platform 5110 that can be lifted and lowered by actuators. After the crawlers 5100 move the modular home 101 to the installation location at operation 5618, different methods may be used to unload the modular home 101 form the trailer. For example, rather than extending the linear actuators 1001 a second time to lift the modular home 101 off of the crawlers 5100, the crawlers 5100 may instead lower the modular home 101 onto a plurality of fixed supports positioned at the installation site. The crawler support platform 5110 may be moved to an upper position before the modular home 101 is set on the platforms 5110 or while the modular home 101 is being moved to the installation location. When the modular home 101 arrives at the installation site, the crawlers 5100 may lower the support platforms 5110 until the modular home 101 rests on the fixed supports and support platforms disengage from the modular home 101. The fixed supports may be arranged such that when the modular home 101 is set on the fixed supports, the modular home is at the installed height. In other embodiments in which the crawlers 5100 include an adjustable height platform, while the modular home is still supported by the platforms 5110 of the crawlers 5100 in an upper position, the linear actuators 1001 may extend to a length at which the modular home 101 would be at the installed height. The platforms 5110 may then be lowered until the linear actuators 1001 contact the ground and support the modular home 101 and the platforms 5110 disengage from the lower surface of the modular home 101.

At operation 5628 of the sequence 5600, fold-down decks 5652, a fold-down ramp 5654, and a fold-up awning 5656 are moved from respective stowed positions to respective deployed positions. In the stowed position, the decks 5652, ramps 5654, and awnings 5656 may be positioned against a vertical wall of the modular home 101. The awning 5656 may be positioned above a doorway and may include a light configured to illuminate the doorway. When moved to the deployed position, the ramps, decks, and awnings may extend from the modular home 101 perpendicularly to the vertical wall. At operation 5630 of the sequence 5600, railings 5658 are installed on the fold-down decks 5652 and the fold-down ramp 5654. In some embodiments, operations 5612-5624 may not be necessary because the trailer 30 is able to position a modular home 101 in the installed position without the need for the crawlers 5100 to maneuver the modular home into the installed position. In these embodiments, the trailer 30 may be moved such that the modular home 101 is positioned above the installed position, the linear actuators 1001 may lift the modular home 101 of the trailer 30, the trailer 30 may move out from underneath the modular home 101, and the linear actuators 1001 may lower the modular home 101 to the installed height.

In order to load the modular home 101 onto the trailer, the sequence 5600 may be substantially reversed. First, the linear actuators may raise the modular home 101, and the crawlers 5100 may move underneath the modular home 101. Next, the linear actuators 1001 may retract to lower the modular home 101 onto the crawlers 5100. Then, the crawlers 5100 may move the modular home 101 to a loading position accessible by the trailer 30. The linear actuators 1001 may then extend to the ground and lift the modular home 101 off of the crawlers 5100. Next, the crawlers 5100 may move out from under the modular home 101, and the trailer 30 may be moved under the modular home 101. For example, a tractor unit coupled to the trailer 30 may back the trailer 30 under the modular home 101. Next, the linear actuators 1001 may retract to lower the modular home 101 onto the trailer 30. The linear actuators 1001 may continue to retract until the linear actuators 1001 are no longer in contact with the ground and the modular home 101 is fully supported by the trailer 30. Finally, the edges of the modular home 101 not coupled by the hinge may be decoupled from one another and the housing portions 120, 160 may be rotated back into a longitudinal orientation on the bed of the trailer 30. When the trailer 30 is able to be maneuvered under the modular home 101, the crawlers 5100 may not be required. The linear actuators 1001 may extend to lift the modular home 101, the trailer may be backed under the modular home 101, and the linear actuators 1001 may retract to lower the modular home 101 onto the trailer 30. The housing portions 120, 160 can then be rotated into a longitudinal position as described above.

Figure 57:
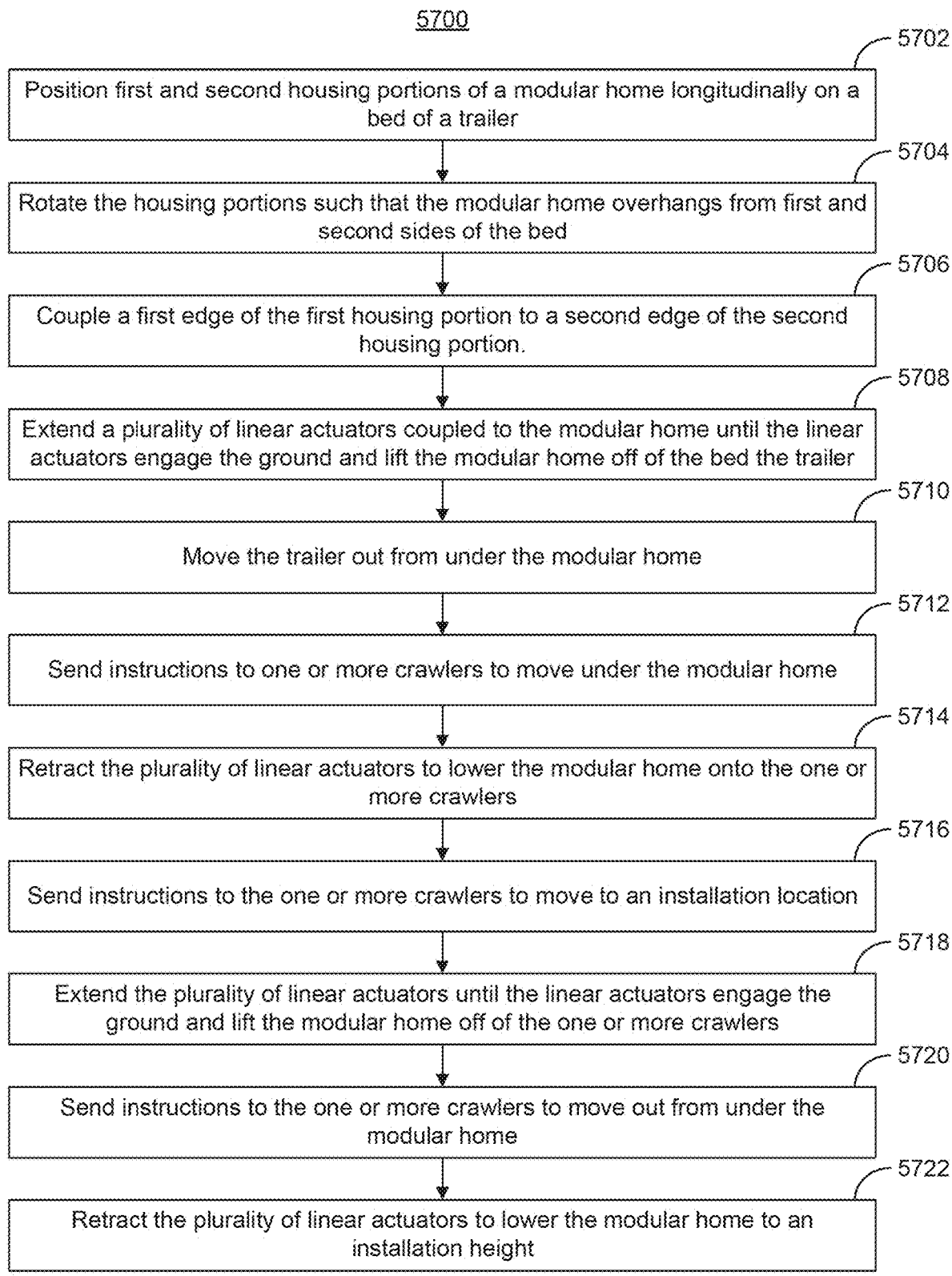
FIG. 57 illustrates a method for unloading a modular home from a trailer, in accordance with some embodiments.

Referring now to FIG. 57, a method 5700 for unloading a modular home (e.g., the modular home 101) from a trailer (e.g., the trailer 30) is described, in accordance with some embodiments. The method 5700 may include any number of operations and the operations may be performed in any order. The method 5700 may be performed by equipment of a modular home construction company (e.g., the components of system 4500, shown and described with reference to FIG. 45). The method 5700 may correspond to a portion of the sequence 5600 described above. At operation 5702 of the method 5700, a first housing portion 120 and a second housing portion 160 of the modular home 101 are positioned longitudinally on the bed of the trailer 30. At operation 5704 of the method 5700, the housing portions 120, 160 are rotated such that the modular home 101 overhangs from first and second sides of the bed. The housing portions may each be rotated approximately 90 degrees using, for example, the extendable winch assembly 2755 as described above. Also as described above, the housing portions 120, 160 may be coupled together at a vertical edge by a hinge, such that pulling the hinge using the extendable winch assembly 2755 causes the housing portions 120, 160 to rotate about pins in a slot. At operation 5706 of the method 5700, an edge of the first housing portion 120 is coupled to an edge of the second housing portion 160. For example, the vertical edges opposite the vertical edges joined by the hinge may be coupled together. At operation 5708 of the method 5700, a plurality of linear actuators (e.g., linear actuators 1001) coupled to the overhanging portions of the modular home 101 are extended until the linear actuators 1001 engage the ground and lift the modular home 101 off of the bed the trailer 30, such that the modular home 101 is supported by only the linear actuators 1001. At operation 5710 of the method 5700, the trailer 30 is moved out from underneath the modular home 101. For example, a tractor unit coupled to the trailer 30 may drive forward to move the trailer 30 out from under the modular home 101.

At operation 5712 of the method 5700, one or more crawlers (e.g., crawlers 5100) are instructed to move under the modular home 101. At operation 5714 of the method 5700, the linear actuators 1001 are retracted to lower the modular home 101 onto the one or more crawlers 5100. At operation 5716 of the method 5700, instructions are sent to the one or more crawlers 5100 to move and carry the modular home 101 to an installation location. At operation 5718 of the method 5700, the linear actuators 1001 are extended into the linear actuators 1001 engage the ground and lift the modular home 101 off of the one or more crawlers 5100. At operation 5720 of the method 5700, instructions are sent to the one or more crawlers 5100 to move out from under the modular home 101. At operation 5722 of the method 5700, the plurality of linear actuators 1001 are retracted to lower the modular home 101 to an installation height. In some embodiments, the method 5700 may include additional operations, including deploying decks, ramps, and awnings as described above. Deploying decks, ramps, and awnings may include operating a hand winch assembly 5400. In some embodiments, a locking mechanism may be engaged to lock the linear actuators in place such that, for example, hydraulic pressure or electric power is not required to maintain the modular home at the installation height. For example, a pin may be inserted (e.g., manually, or using a solenoid) into the rod of the linear actuator to stop the rod from retracting further into the cylinder housing. In some embodiments, the linear actuators may include an integrated brake or self-locking mechanism to prevent the rod from back-driving into the actuator housing once at the modular home is at installation height.

Figure 58:
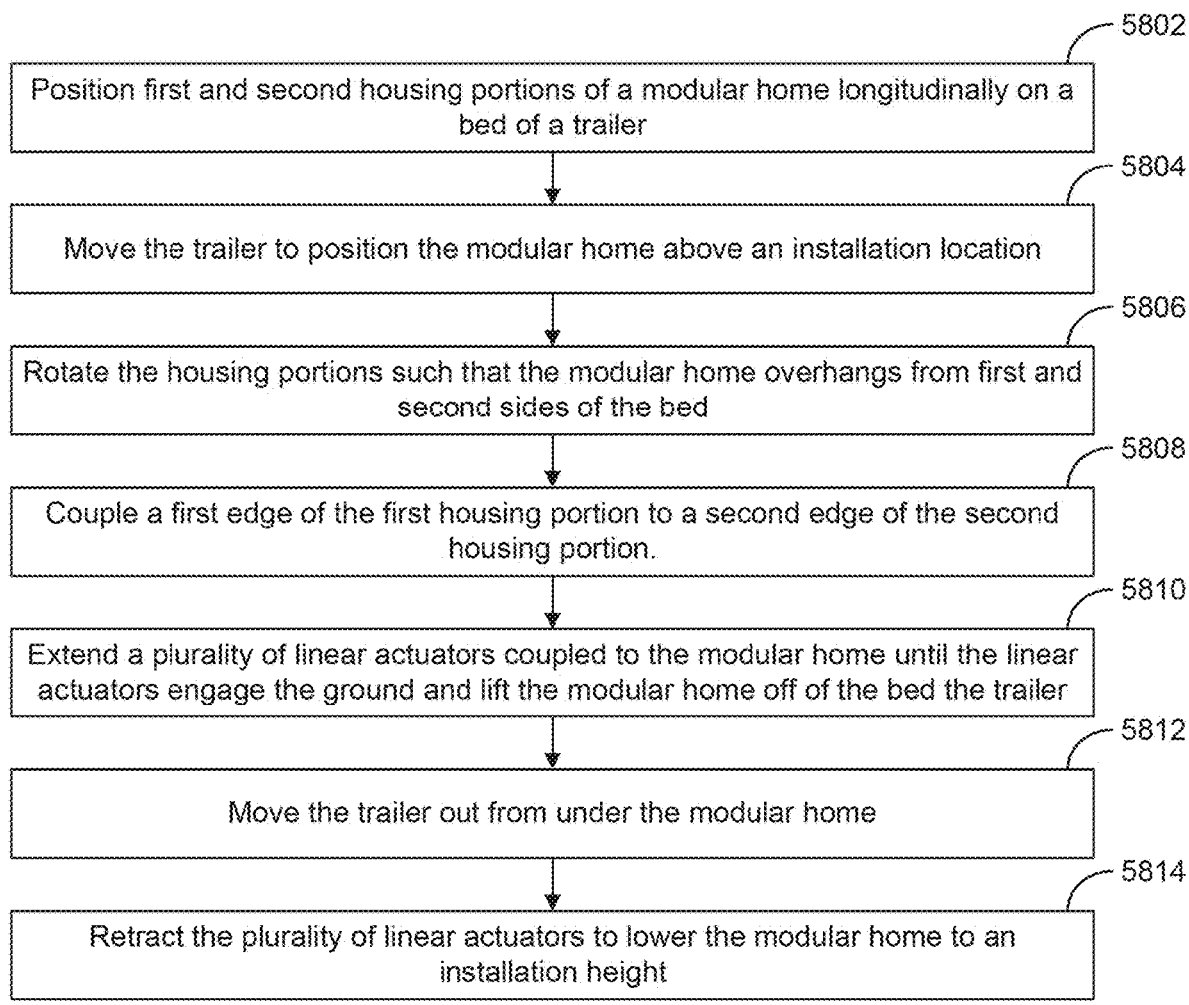
FIG. 58 illustrates a method for unloading a modular home from a trailer without the use of crawlers, in accordance with some embodiments of the present disclosure.

Referring now to FIG. 58, a method 5800 for unloading a modular home (e.g., the modular home 101) from a trailer (e.g., the trailer 30) without the use of crawlers is described, in accordance with some embodiments. The method 5800 may include any number of operations and the operations may be performed in any order. The method 5800 may be performed by equipment of a modular home construction company (e.g., the components of system 4500, shown and described with reference to FIG. 45). The method 5800 may include any number of operations and the operations may be performed in any order. The method 5800 may be performed by equipment of a modular home construction company (e.g., the components of system 4500, shown and described with reference to FIG. 45). At operation 5802 of the method 5800, a first housing portion 120 and a second housing portion 160 of the modular home 101 are positioned longitudinally on the bed of the trailer 30. At operation 5804 of the method 5800, the trailer 30 is moved to position a modular home 101 above an installation location. For example, a tractor unit coupled to the trailer 30 may tow the trailer 30 such that the modular home 101 is positioned above the installation location. At operation 5806 of the method 5800, the housing portions 120, 160 are rotated such that the modular home 101 overhangs from first and second sides of the bed. The housing portions may each be rotated approximately 90 degrees using, for example, the extendable winch assembly 2755 as described above. Also as described above, the housing portions 120, 160 may be coupled together at a vertical edge by a hinge, such that pulling the hinge using the extendable winch assembly 2755 causes the housing portions 120, 160 to rotate about pins in a slot. At operation 5808 of the method 5800, an edge of the first housing portion 120 is coupled to an edge of the second housing portion 160. For example, the vertical edges opposite the vertical edges joined by the hinge may be coupled together. At operation 5810 of the method 5800, a plurality of linear actuators (e.g., linear actuators 1001) coupled to the overhanging portions of the modular home 101 are extended until the linear actuators 1001 engage the ground and lift the modular home 101 off of the bed the trailer 30, such that the modular home 101 is supported by only the linear actuators 1001. At operation 5812 of the method 5800, the trailer 30 is moved out from underneath the modular home 101. For example, a tractor unit coupled to the trailer 30 may drive forward to move the trailer 30 out from under the modular home 101. At operation 5814 of the method 5800, the plurality of linear actuators 1001 are retracted to lower the modular home to an installation height.

Figure 59:
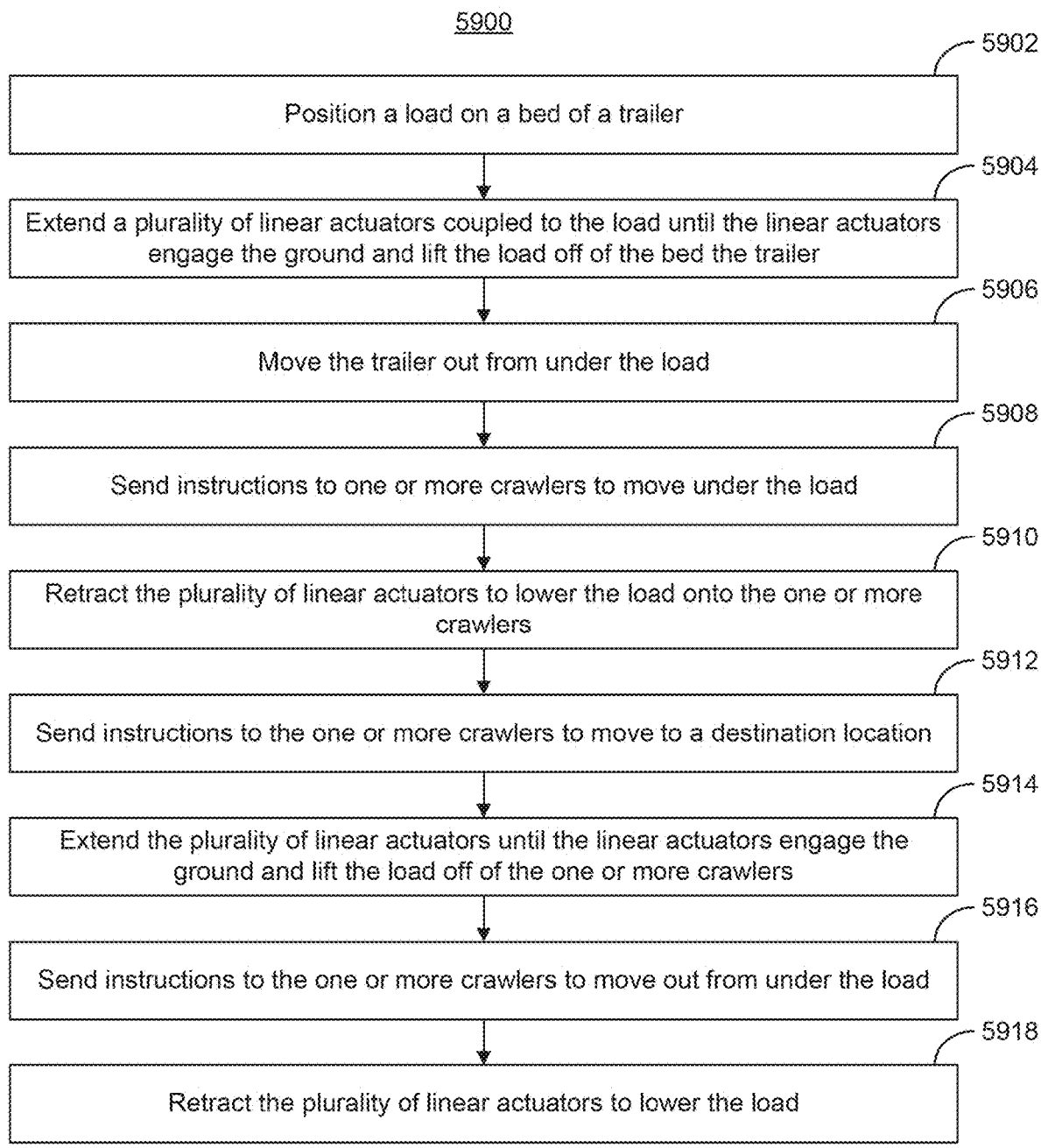
FIG. 59 illustrates a method for unloading a load from a trailer, in accordance with some embodiments of the present disclosure.

A method similar to the method 5700 may be used to unload other loads (e.g., shipping containers, single-portion modular homes, etc.) from a trailer. Referring now to FIG. 59, a method 5900 for unloading a load from a trailer (e.g., the trailer 30) is described, in accordance with some embodiments. The method 5900 may include any number of operations and the operations may be performed in any order. The method 5900 may be performed by equipment of a modular home construction company (e.g., the components of system 4500, shown and described with reference to FIG. 45). At operation 5902 of the method 5900, a load is positioned on a bed of the trailer 30. The load may be positioned longitudinally on the trailer 30 such that the footprint of the load is substantially fully positioned on the trailer 30. At operation 5904 of the method 5900, a plurality of linear actuators (e.g., linear actuators 1001) are extended until the linear actuators 1001 engage the ground and lift the load off of the bed of the trailer 30. In some embodiments, the load may be rotated on the bed of the trailer 30 such that the load overhangs from each side of the bed of the trailer 30. The plurality of linear actuators 1001 may be coupled to the portions of the load that overhang the sides of the trailer 30 after the load has been rotated. In some embodiments, the load may not be not rotated, and the linear actuators 1001 overhang from the sides of the trailer 30 when the load is in the longitudinal position. In some embodiments, the linear actuators 1001 may be moved from a position above the trailer 30 to a position overhanging the sides of the trailer 30 before the linear actuators are extended to the ground. For example, the linear actuators 1001 may be coupled to a hinge or additional actuator such that the linear actuators 1001 can be moved from a stowed position for when the trailer is being moved to a deployed position for when the linear actuators 1001 are used to lift the load off of the trailer 30. At operation 5906 of the method 5900, with the load fully supported by the linear actuators and lifted off of the trailer 30, the trailer is moved out from under the load. For example, a tractor unit coupled to the trailer 30 may drive forward to move the trailer 30 out from under the load.

At operation 5908 of the method 5900, instructions are sent to one or more crawlers (e.g., crawlers 5100), the instructions causing the crawlers 5100 to move under the load. At operation 5910 of the method 5900, the plurality of linear actuators 1001 are retracted to lower the load and to the one or more crawlers 5100. The linear actuators 1001 may retract until the load is fully supported by the one or more crawlers 5100. At operation 5912 of the method 5900, instructions are sent to the one or more crawlers 5100, the instructions causing the crawlers 5100 to move the load to a destination location. For example, the crawlers 5100 may move the load to a destination location that is not reachable by the trailer due to the terrain or space constraints. This may obviate the need for the use of forklifts, cranes, or other material handling devices. At operation 5914 of the method 5900, once at the destination location, the linear actuators 1001 are extended until the linear actuators 1001 engage the ground and lift the load off of the one or more crawlers 5100. At operation 5916 of the method 5900, with the load fully supported by the linear actuators 1001, instructions are sent to the one or more crawlers 5100, the instructions causing the crawlers 5100 to move out from under the load. At operation 5918 of the method 5900, the linear actuators 1001 are retracted to lower the load. For example, the load may be lowered to the ground such that the load is no longer supported by the linear actuators 1001. In some embodiments, after the load is lowered to a desired height, the linear actuators 1001 may be locked, for example using a pin as described above, so that the rod of the linear actuators 1001 cannot retract further into the cylinder housing. Thus, the linear actuators 1001 may continue to support the load even if, for example there is a loss of hydraulic pressure or electric power to the linear actuators 1001.

In the methods 5700, 5800, 5900, the crawlers may not require a platform that can be raised and lowered because the linear actuators 1001 are able to lower the modular home 101 or other load onto the platform. When moving the trailer 30 out from underneath the modular home 101 or other load, the crawlers can be positioned under the center of the modular home 101 or load in order to better distribute the weight between the crawlers. In some embodiments, a crawler may be a large enough and have sufficient load carrying capacity to support the modular home 101 or load without additional crawlers.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A trailer configured to transport a load, the trailer comprising:
    a bed comprising an upper surface configured to support the load;
    a first rotation pin configured to move along a slot in the bed;
    a second rotation pin coupled to the bed; and
    a rotation mechanism positioned in the slot and coupled to the first rotation pin by a first rope, the rotation mechanism configured to pull the first rotation pin toward the second rotation pin,
        wherein the first rotation pin extends out of the slot above the bed, and
        wherein a portion of the first rotation pin extending above the bed comprises a bearing having an axis of rotation substantially perpendicular to the upper surface of the bed.

2. A trailer configured to transport a load, the trailer comprising:
    a bed comprising an upper surface configured to support the load;
    a first rotation pin configured to move along a slot in the bed;
    a second rotation pin coupled to the bed; and
    a rotation mechanism positioned in the slot and coupled to the first rotation pin by a first rope, the rotation mechanism configured to pull the first rotation pin toward the second rotation pin,
        wherein the second rotation pin is configured to move along the slot in the bed, and
        wherein the rotation mechanism is coupled to the second rotation pin by a second rope and configured to pull the first rotation pin and the second rotation pin toward each other simultaneously.

3. The trailer of claim 2, wherein the first rotation pin extends out of the slot above the bed.

4. The trailer of claim 2, further comprising:
    a first pulley positioned in the slot proximate a first end of the slot;
    a third rope coupling the rotation mechanism to the first rotation pin via the first pulley;
    a second pulley positioned in the slot proximate a second end of the slot; and
    a fourth rope coupling the rotation mechanism to the second rotation pin via the second pulley,
        wherein the rotation mechanism is configured to be operated in reverse to pull the third rope through the first pulley and the fourth rope through the second pulley to pull the first rotation pin and the second rotation pin away from each other simultaneously.

5. The trailer of claim 2, further comprising a front rotation mechanism positioned near a front of the bed and a third rope coupling the front rotation mechanism to the first rotation pin, the front rotation mechanism configured to pull the first rotation pin away from the second rotation pin.

6. The trailer of claim 2, further comprising a rear rotation mechanism positioned near a rear of the bed and a third rope coupling the rear rotation mechanism to the first rotation pin, the rear rotation mechanism configured to pull the first rotation pin away from the second rotation pin.

7. The trailer of claim 2, wherein the first rotation pin comprises a first plurality of wheels configured to roll along the bottom of the slot and a second plurality of wheels configured to reduce friction between the first rotation pin and sides of the slot.

8. A trailer configured to transport a load, the trailer comprising:
- a bed comprising an upper surface configured to support the load;
- a first rotation pin configured to move along a slot in the bed;
- a second rotation pin coupled to the bed; and
- a rotation mechanism positioned in the slot and coupled to the first rotation pin by a first rope, the rotation mechanism configured to pull the first rotation pin toward the second rotation pin, further comprising a first pulley positioned in the slot proximate a first end of the slot and a third rope coupling the rotation mechanism to the first rotation pin through the first pulley, wherein the rotation mechanism is configured to be operated in reverse to pull the third rope through the first pulley to pull the first rotation pin away from the second rotation pin.

9. A trailer configured to transport a load, the trailer comprising:
- a bed comprising an upper surface configured to support the load;
- a first rotation pin configured to move along a slot in the bed;
- a second rotation pin coupled to the bed;
- a rotation mechanism positioned in the slot and coupled to the first rotation pin by a first rope, the rotation mechanism configured to pull the first rotation pin toward the second rotation pin; and
- a second rotation mechanism coupled to a side of the bed.

10. A method of repositioning a load on a trailer comprising a bed, a first rotation pin extending from and configured to move along a slot in the bed and coupled to a first rotation mechanism, a second rotation pin extending from the bed, and a second rotation mechanism coupled to a side of the bed, the method comprising:
- coupling a first portion of the load to the first rotation pin;
- coupling a second portion of the load to the second rotation pin; and
- operating the rotation mechanism to pull the first rotation pin toward the second rotation pin.

11. The method of claim 10, wherein the first portion of the load comprises a pin socket configured to receive the first rotation pin, and wherein coupling the first portion of the load to the first rotation pin comprises positioning the first portion of the load on the bed with the pin socket surrounding the first rotation pin.

12. The method of claim 11, wherein when the first portion of the load is positioned on the bed and coupled to the first rotation pin, an upper surface of the first rotation pin does not contact the first portion of the load.

13. The method of claim 10, wherein the first portion of the load is coupled to the second portion of the load by a hinge, wherein operating the rotation mechanism to pull the first rotation pin toward the second rotation pin causes the first portion of the load to rotate relative to the second portion of the load.

14. The method of claim 13, further comprising:
- coupling a center region of the load to a second rotation mechanism coupled to a side of the bed of the trailer; and
- operating the second rotation mechanism to pull the load toward the side of the bed to initiate the rotation of the first portion of the load.

15. The method of claim 10, further comprising operating the rotation mechanism in reverse to pull the first rotation pin away from the second rotation pin.

16. The method of claim 10, wherein operating the rotation mechanism to pull the first rotation pin toward the second rotation pin comprises simultaneously pulling the second rotation pin toward the first pin.

17. The method of claim 16, wherein the first portion of the load is coupled to the second portion of the load by a hinge comprising a hinge pin, wherein operating the winch to pull the first rotation pin toward the second rotation pin and the second rotation pin toward the first rotation pin causes the first portion of the load and the second portion of the load to rotate about the hinge pin.

18. A trailer configured to transport a load, the trailer comprising:
- a bed comprising an upper surface configured to support the load,
- a slot extending along the bed;
- a first pin configured to move along the slot;
- a second pin configured to move along the slot; and
- a rotation mechanism positioned in the slot, the rotation mechanism coupled to the first pin by a first rope and to the second pin by a second rope such that rotation of the rotation mechanism in a first direction is configured to cause the first pin and the second pin to move toward each other.

19. The trailer of claim 18, further comprising a first pulley positioned in the slot and a second pulley positioned in the slot, wherein the rotation mechanism is coupled to the first pin by a third rope via the first pulley and to the second pin by a fourth rope via the second pulley such that rotation of the rotation mechanism in a direction opposite the first direction is configured to cause the first pin and the second pin to move away from each other.

* * * * *